United States Patent
Lee et al.

(10) Patent No.: US 12,216,754 B2
(45) Date of Patent: Feb. 4, 2025

(54) USER INTERFACES FOR AUTHENTICATING TO PERFORM SECURE OPERATIONS

(71) Applicant: Apple Inc., Cupertino, CA (US)

(72) Inventors: Sung Chang Lee, Saratoga, CA (US); Bowen Cheng, Chengdu (CN); Yue Hang, Suzhou (CN); Weiqi Pan, Shanghai (CN); Yue Shen, Tianjin (CN); Xiaoguang Yang, Beijing (CN); Xiaofeng Yu, Shanghai (CN); Feng Zhang, Shenzhen (CN); Liang Zhao, Shenzhen (CN); Qiuji Zhao, Singapore (SG); Wendong Zhong, Shenzhen (CN)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 17/732,222

(22) Filed: Apr. 28, 2022

(65) Prior Publication Data
US 2023/0019250 A1   Jan. 19, 2023

Related U.S. Application Data

(60) Provisional application No. 63/186,694, filed on May 10, 2021.

(51) Int. Cl.
*G06F 21/00* (2013.01)
*G06F 21/32* (2013.01)
*G06F 21/34* (2013.01)

(52) U.S. Cl.
CPC .............. *G06F 21/34* (2013.01); *G06F 21/32* (2013.01); *G06F 2221/2117* (2013.01)

(58) Field of Classification Search
CPC ... G06F 21/34; G06F 21/32; G06F 2221/2117
See application file for complete search history.

(56) References Cited

U.S. PATENT DOCUMENTS

| | | |
|---|---|---|
| 5,229,764 A | 7/1993 | Matchett et al. |
| 5,237,159 A | 8/1993 | Stephens et al. |
| 5,265,007 A | 11/1993 | Barnhard, Jr. et al. |
| 5,484,988 A | 1/1996 | Hills et al. |
| 5,615,384 A | 3/1997 | Allard et al. |
| 5,691,524 A | 11/1997 | Josephson |
| 5,717,868 A | 2/1998 | James |
| 5,767,457 A | 6/1998 | Gerpheide et al. |
| 5,783,808 A | 7/1998 | Josephson |

(Continued)

FOREIGN PATENT DOCUMENTS

| | | |
|---|---|---|
| AR | 060465 A1 | 6/2008 |
| AU | 2016100090 A4 | 3/2016 |

(Continued)

OTHER PUBLICATIONS

Applicant-Initiated Interview Summary received for U.S. Appl. No. 16/938,362, mailed on Nov. 2, 2022, 2 pages.

(Continued)

*Primary Examiner* — William A Corum, Jr.
(74) *Attorney, Agent, or Firm* — DLA Piper LLP (US)

(57) ABSTRACT

The present disclosure generally relates to methods and user interfaces for authentication, including providing authentication at a computer system in accordance with some embodiments.

51 Claims, 40 Drawing Sheets

(56) References Cited

U.S. PATENT DOCUMENTS

| | | |
|---|---|---|
| 5,801,763 A | 9/1998 | Suzuki |
| 5,828,773 A | 10/1998 | Setlak et al. |
| 5,838,306 A | 11/1998 | O'Connor et al. |
| 5,852,670 A | 12/1998 | Setlak et al. |
| 5,910,989 A | 6/1999 | Naccache |
| 5,933,134 A | 8/1999 | Shieh |
| 5,960,411 A | 9/1999 | Hartman et al. |
| 5,974,150 A | 10/1999 | Kaish et al. |
| 5,983,197 A | 11/1999 | Enta |
| 6,016,484 A | 1/2000 | Williams et al. |
| 6,064,429 A | 5/2000 | Belk et al. |
| 6,104,922 A | 8/2000 | Baumann |
| 6,111,517 A | 8/2000 | Atick et al. |
| 6,141,436 A | 10/2000 | Srey et al. |
| 6,151,208 A | 11/2000 | Bartlett |
| 6,151,593 A | 11/2000 | Cho et al. |
| 6,164,528 A | 12/2000 | Hills et al. |
| 6,173,402 B1 | 1/2001 | Chapman |
| 6,189,785 B1 | 2/2001 | Lowery |
| 6,192,380 B1 | 2/2001 | Light et al. |
| 6,193,152 B1 | 2/2001 | Fernando et al. |
| 6,219,793 B1 | 4/2001 | Li et al. |
| 6,230,148 B1 | 5/2001 | Pare, Jr. et al. |
| 6,260,027 B1 | 7/2001 | Takahashi et al. |
| 6,282,655 B1 | 8/2001 | Given |
| 6,289,114 B1 | 9/2001 | Mainguet |
| 6,317,835 B1 | 11/2001 | Bilger et al. |
| 6,323,846 B1 | 11/2001 | Westerman et al. |
| 6,328,207 B1 | 12/2001 | Gregoire et al. |
| 6,337,919 B1 | 1/2002 | Dunton |
| 6,374,145 B1 | 4/2002 | Lignoul |
| 6,398,646 B1 | 6/2002 | Wei et al. |
| 6,408,087 B1 | 6/2002 | Kramer |
| 6,421,453 B1 | 7/2002 | Kanevsky et al. |
| 6,560,711 B1 | 5/2003 | Given et al. |
| 6,570,557 B1 | 5/2003 | Westerman et al. |
| 6,573,883 B1 | 6/2003 | Bartlett |
| 6,581,042 B2 | 6/2003 | Pare, Jr. et al. |
| 6,618,806 B1 | 9/2003 | Brown et al. |
| 6,639,584 B1 | 10/2003 | Li |
| 6,644,546 B2 | 11/2003 | George et al. |
| 6,662,166 B2 | 12/2003 | Pare, Jr. et al. |
| 6,677,932 B1 | 1/2004 | Westerman |
| 6,709,333 B1 | 3/2004 | Bradford et al. |
| 6,720,860 B1 | 4/2004 | Narayanaswami |
| 6,795,569 B1 | 9/2004 | Setlak |
| 6,922,147 B1 | 7/2005 | Viksnins et al. |
| 6,941,001 B1 | 9/2005 | Bolle et al. |
| 6,950,810 B2 | 9/2005 | Lapsley et al. |
| 6,970,855 B2 | 11/2005 | Das et al. |
| 6,980,081 B2 | 12/2005 | Anderson |
| 7,027,619 B2 | 4/2006 | Pavlidis et al. |
| 7,030,860 B1 | 4/2006 | Hsu et al. |
| 7,039,221 B1 | 5/2006 | Tumey et al. |
| 7,046,838 B1 | 5/2006 | Sakagawa et al. |
| 7,057,607 B2 | 6/2006 | Mayoraz et al. |
| 7,079,652 B1 | 7/2006 | Harris |
| 7,081,905 B1 | 7/2006 | Raghunath |
| 7,086,085 B1 | 8/2006 | Brown et al. |
| 7,099,845 B2 | 8/2006 | Higgins et al. |
| 7,099,850 B1 | 8/2006 | Mann et al. |
| 7,124,300 B1 | 10/2006 | Lemke |
| 7,130,454 B1 | 10/2006 | Berube et al. |
| 7,190,816 B2 | 3/2007 | Mitsuyu et al. |
| 7,239,728 B1 | 7/2007 | Choi et al. |
| 7,346,778 B1 | 3/2008 | Guiter et al. |
| 7,356,516 B2 | 4/2008 | Richey et al. |
| 7,359,880 B2 | 4/2008 | Abel et al. |
| 7,414,613 B2 | 8/2008 | Simelius |
| 7,415,720 B2 | 8/2008 | Jung |
| 7,420,546 B2 | 9/2008 | Abdallah et al. |
| 7,430,537 B2 | 9/2008 | Templeton et al. |
| 7,535,344 B2 | 5/2009 | Obradovich |
| 7,542,592 B2 | 6/2009 | Singh et al. |
| 7,546,470 B2 | 6/2009 | Schultz |
| 7,630,522 B2 | 12/2009 | Popp et al. |
| 7,633,076 B2 | 12/2009 | Huppi et al. |
| 7,644,019 B2 | 1/2010 | Woda et al. |
| 7,657,441 B2 | 2/2010 | Richey et al. |
| 7,657,849 B2 | 2/2010 | Chaudhri et al. |
| 7,676,748 B1 | 3/2010 | Barrus et al. |
| 7,689,508 B2 | 3/2010 | Davis et al. |
| 7,697,729 B2 | 4/2010 | Howell et al. |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,860,536 B2 | 12/2010 | Jobs et al. |
| 7,860,936 B1 | 12/2010 | Newstadt et al. |
| 7,921,297 B2 | 4/2011 | Ortiz et al. |
| 8,006,299 B2 | 8/2011 | Suominen |
| 8,018,440 B2 | 9/2011 | Townsend et al. |
| 8,042,157 B2 | 10/2011 | Bennett et al. |
| 8,050,997 B1 | 11/2011 | Nosek et al. |
| 8,060,571 B2 | 11/2011 | Rao |
| 8,095,634 B2 | 1/2012 | Rao et al. |
| 8,131,848 B1 | 3/2012 | Denise |
| 8,145,912 B2 | 3/2012 | Mclean |
| 8,157,164 B1 | 4/2012 | Billman |
| 8,195,507 B2 | 6/2012 | Postrel |
| 8,254,642 B2 | 8/2012 | Kobayashi et al. |
| 8,254,647 B1 | 8/2012 | Nechyba et al. |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,392,259 B2 | 3/2013 | Macgillivray et al. |
| 8,395,658 B2 | 3/2013 | Corson |
| 8,396,265 B1 | 3/2013 | Ross et al. |
| 8,438,400 B2 | 5/2013 | Hoghaug et al. |
| 8,452,654 B1 | 5/2013 | Wooters et al. |
| 8,452,978 B2 | 5/2013 | Alward et al. |
| 8,488,040 B2 | 7/2013 | Chen et al. |
| 8,526,915 B2 | 9/2013 | Kakiuchi et al. |
| 8,538,158 B1 | 9/2013 | Denise |
| 8,543,834 B1 | 9/2013 | Barra |
| 8,560,004 B1 | 10/2013 | Tsvetkov et al. |
| 8,581,877 B2 | 11/2013 | Yoo |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,619,050 B2 | 12/2013 | Herz et al. |
| 8,638,385 B2 | 1/2014 | Bhogal |
| 8,639,621 B1 | 1/2014 | Kennedy et al. |
| 8,646,060 B1 | 2/2014 | Ben Ayed |
| 8,679,012 B1 | 3/2014 | Kayyali |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,782,775 B2 | 7/2014 | Fadell et al. |
| 8,788,838 B1 | 7/2014 | Fadell et al. |
| 8,826,415 B2 | 9/2014 | Last |
| 8,831,677 B2 | 9/2014 | Villa-Real |
| 8,892,474 B1 | 11/2014 | Inskeep et al. |
| 8,904,479 B1 | 12/2014 | Johansson et al. |
| 8,943,580 B2 | 1/2015 | Fadell et al. |
| 8,949,618 B1 | 2/2015 | Lee et al. |
| 8,949,902 B1 | 2/2015 | Fabian-Isaacs et al. |
| 8,963,806 B1 | 2/2015 | Starner et al. |
| 8,983,846 B2 | 3/2015 | Di Profio et al. |
| 8,988,490 B2 | 3/2015 | Fujii |
| 8,994,499 B2 | 3/2015 | Zhao et al. |
| 9,002,322 B2 | 4/2015 | Cotterill |
| 9,031,847 B2 | 5/2015 | Sarin et al. |
| 9,038,167 B2 | 5/2015 | Fadell et al. |
| 9,053,293 B2 | 6/2015 | Latzina |
| 9,098,931 B2 | 8/2015 | Shpunt et al. |
| 9,128,601 B2 | 9/2015 | Fadell et al. |
| 9,134,896 B2 | 9/2015 | Fadell et al. |
| 9,170,645 B2 | 10/2015 | Park et al. |
| 9,177,130 B2 | 11/2015 | Nechyba et al. |
| 9,179,298 B2 | 11/2015 | Jung et al. |
| 9,250,795 B2 | 2/2016 | Fadell et al. |
| 9,253,375 B2 | 2/2016 | Milanfar et al. |
| 9,269,083 B1 | 2/2016 | Jarajapu et al. |

(56) References Cited

U.S. PATENT DOCUMENTS

| | | |
|---|---|---|
| 9,269,196 B1 | 2/2016 | Fan et al. |
| 9,274,647 B2 | 3/2016 | Fadell et al. |
| 9,294,476 B1 | 3/2016 | Lurey et al. |
| 9,304,624 B2 | 4/2016 | Fadell et al. |
| 9,305,155 B1 | 4/2016 | Vo et al. |
| 9,324,067 B2 | 4/2016 | Van Os et al. |
| 9,329,771 B2 | 5/2016 | Fadell et al. |
| 9,349,035 B1 | 5/2016 | Gerber et al. |
| 9,355,234 B1 | 5/2016 | Magi Shaashua et al. |
| 9,411,460 B2 | 8/2016 | Dumont et al. |
| 9,451,210 B1 | 9/2016 | Smus |
| 9,477,872 B2 | 10/2016 | Sarve et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,519,901 B1 | 12/2016 | Dorogusker |
| 9,526,127 B1 | 12/2016 | Taubman et al. |
| 9,549,323 B2 | 1/2017 | Lee et al. |
| 9,558,636 B1 | 1/2017 | Burdick |
| 9,569,605 B1 | 2/2017 | Schneider et al. |
| 9,569,655 B2 | 2/2017 | Harper |
| 9,600,709 B2 | 3/2017 | Russo |
| 9,613,245 B1 | 4/2017 | Eltoft et al. |
| 9,678,571 B1 | 6/2017 | Robert et al. |
| 9,716,825 B1 | 7/2017 | Manzari et al. |
| 9,753,541 B1 | 9/2017 | Robert et al. |
| 9,817,549 B2 | 11/2017 | Chandrasekaran |
| 9,847,999 B2 | 12/2017 | Van Os et al. |
| 9,851,214 B1 | 12/2017 | Chintakindi |
| 9,881,198 B2 | 1/2018 | Lee et al. |
| 9,898,642 B2 | 2/2018 | Han et al. |
| 9,913,246 B1 | 3/2018 | Carey et al. |
| 9,922,317 B2 | 3/2018 | Bak et al. |
| 9,953,149 B2 | 4/2018 | Tussy |
| 9,984,270 B2 | 5/2018 | Yousefpor et al. |
| 10,003,738 B2 | 6/2018 | Lautenbach et al. |
| 10,019,904 B1 | 7/2018 | Chan et al. |
| 10,073,541 B1 | 9/2018 | Baldwin |
| 10,089,607 B2 | 10/2018 | Ziat et al. |
| 10,096,015 B2 | 10/2018 | Bak et al. |
| 10,163,105 B1 | 12/2018 | Ziraknejad et al. |
| 10,199,051 B2 | 2/2019 | Binder et al. |
| 10,334,054 B2 | 6/2019 | Van Os et al. |
| 10,410,035 B2 | 9/2019 | Han et al. |
| 10,440,574 B2 | 10/2019 | Ledvina et al. |
| 10,482,461 B2 | 11/2019 | Van Os et al. |
| 10,701,067 B1 | 6/2020 | Ziraknejad et al. |
| 10,749,967 B2 | 8/2020 | Van Os et al. |
| 10,803,281 B2 | 10/2020 | Han et al. |
| 10,805,758 B2 | 10/2020 | Norris et al. |
| 10,931,813 B1 | 2/2021 | Kim et al. |
| 10,943,382 B2 | 3/2021 | Shapiro et al. |
| 10,971,171 B2 | 4/2021 | Davis et al. |
| 11,026,085 B2 | 6/2021 | Grange et al. |
| 11,100,349 B2 | 8/2021 | Cohen et al. |
| 11,751,053 B2 * | 9/2023 | Lee .................. H04W 4/80 726/20 |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047365 A1 | 11/2001 | Yonaitis |
| 2001/0047488 A1 | 11/2001 | Verplaetse et al. |
| 2002/0002682 A1 | 1/2002 | Tsuchiyama et al. |
| 2002/0004760 A1 | 1/2002 | Yoshida et al. |
| 2002/0015024 A1 | 2/2002 | Westerman et al. |
| 2002/0046064 A1 | 4/2002 | Maury et al. |
| 2002/0059295 A1 | 5/2002 | Ludtke et al. |
| 2002/0061130 A1 | 5/2002 | Kirk et al. |
| 2002/0065774 A1 | 5/2002 | Young et al. |
| 2002/0095588 A1 | 7/2002 | Shigematsu et al. |
| 2002/0097145 A1 | 7/2002 | Tumey et al. |
| 2002/0109668 A1 | 8/2002 | Rosenberg et al. |
| 2002/0120867 A1 | 8/2002 | Mitchell et al. |
| 2002/0136435 A1 | 9/2002 | Prokoski |
| 2002/0141586 A1 | 10/2002 | Margalit et al. |
| 2002/0190960 A1 | 12/2002 | Kuo et al. |
| 2002/0191029 A1 | 12/2002 | Gillespie et al. |
| 2002/0191817 A1 | 12/2002 | Sato et al. |
| 2003/0006280 A1 | 1/2003 | Seita et al. |
| 2003/0028639 A1 | 2/2003 | Yamamoto et al. |
| 2003/0038754 A1 | 2/2003 | Goldstein et al. |
| 2003/0046557 A1 | 3/2003 | Miller et al. |
| 2003/0048173 A1 | 3/2003 | Shigematsu et al. |
| 2003/0059092 A1 | 3/2003 | Okubo et al. |
| 2003/0076298 A1 | 4/2003 | Rosenberg |
| 2003/0097413 A1 | 5/2003 | Vishik et al. |
| 2003/0103652 A1 | 6/2003 | Lee et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0141959 A1 | 7/2003 | Keogh et al. |
| 2003/0160815 A1 | 8/2003 | Muschetto |
| 2003/0163710 A1 | 8/2003 | Ortiz et al. |
| 2003/0188183 A1 | 10/2003 | Lee et al. |
| 2003/0200184 A1 | 10/2003 | Dominguez et al. |
| 2003/0210127 A1 | 11/2003 | Anderson |
| 2003/0236746 A1 | 12/2003 | Turner et al. |
| 2004/0010722 A1 | 1/2004 | Ha |
| 2004/0030934 A1 | 2/2004 | Mizoguchi et al. |
| 2004/0046638 A1 | 3/2004 | Kawasaki |
| 2004/0059590 A1 | 3/2004 | Mercredi et al. |
| 2004/0073432 A1 | 4/2004 | Stone |
| 2004/0076310 A1 | 4/2004 | Hersch et al. |
| 2004/0085300 A1 | 5/2004 | Matusis et al. |
| 2004/0085351 A1 | 5/2004 | Tokkonen |
| 2004/0088564 A1 | 5/2004 | Norman |
| 2004/0091136 A1 | 5/2004 | Dombrowski |
| 2004/0113819 A1 | 6/2004 | Gauthey et al. |
| 2004/0122685 A1 | 6/2004 | Bunce |
| 2004/0131237 A1 | 7/2004 | Machida |
| 2004/0135801 A1 | 7/2004 | Thompson et al. |
| 2004/0137890 A1 | 7/2004 | Kalke |
| 2004/0143553 A1 | 7/2004 | Torget et al. |
| 2004/0151347 A1 | 8/2004 | Wisniewski |
| 2004/0172562 A1 | 9/2004 | Berger et al. |
| 2004/0181695 A1 | 9/2004 | Walker et al. |
| 2004/0196400 A1 | 10/2004 | Stavely et al. |
| 2004/0210771 A1 | 10/2004 | Wood et al. |
| 2004/0215572 A1 | 10/2004 | Uehara et al. |
| 2004/0229560 A1 | 11/2004 | Maloney |
| 2004/0230843 A1 | 11/2004 | Jansen |
| 2004/0239648 A1 | 12/2004 | Abdallah et al. |
| 2004/0239732 A1 | 12/2004 | Silverbrook |
| 2004/0242200 A1 | 12/2004 | Maeoka et al. |
| 2004/0250138 A1 | 12/2004 | Schneider |
| 2004/0252867 A1 | 12/2004 | Lan et al. |
| 2004/0254891 A1 | 12/2004 | Blinn et al. |
| 2004/0257196 A1 | 12/2004 | Kotzin |
| 2004/0260955 A1 | 12/2004 | Mantyla |
| 2005/0024341 A1 | 2/2005 | Gillespie et al. |
| 2005/0028082 A1 | 2/2005 | Topalov et al. |
| 2005/0040962 A1 | 2/2005 | Funkhouser et al. |
| 2005/0041841 A1 | 2/2005 | Yoo et al. |
| 2005/0060554 A1 | 3/2005 | O'donoghue |
| 2005/0071188 A1 | 3/2005 | Thuerk |
| 2005/0071635 A1 | 3/2005 | Furuyama |
| 2005/0071647 A1 | 3/2005 | Fujinuma et al. |
| 2005/0074147 A1 | 4/2005 | Smith et al. |
| 2005/0078855 A1 | 4/2005 | Chandler et al. |
| 2005/0079896 A1 | 4/2005 | Kokko et al. |
| 2005/0091213 A1 | 4/2005 | Schutz et al. |
| 2005/0093834 A1 | 5/2005 | Abdallah et al. |
| 2005/0093868 A1 | 5/2005 | Hinckley |
| 2005/0096009 A1 | 5/2005 | Ackley |
| 2005/0097171 A1 | 5/2005 | Hikichi |
| 2005/0097608 A1 | 5/2005 | Penke et al. |
| 2005/0100198 A1 | 5/2005 | Nakano et al. |
| 2005/0105778 A1 | 5/2005 | Sung et al. |
| 2005/0110801 A1 | 5/2005 | Lin |
| 2005/0111708 A1 | 5/2005 | Chou |
| 2005/0113071 A1 | 5/2005 | Nagata |
| 2005/0114686 A1 | 5/2005 | Ball et al. |

(56) References Cited

U.S. PATENT DOCUMENTS

| | | |
|---|---|---|
| 2005/0116840 A1 | 6/2005 | Simelius |
| 2005/0117752 A1 | 6/2005 | Ilma et al. |
| 2005/0144452 A1 | 6/2005 | Lynch et al. |
| 2005/0169503 A1 | 8/2005 | Howell et al. |
| 2005/0174325 A1 | 8/2005 | Setlak et al. |
| 2005/0177867 A1 | 8/2005 | Toutonghi |
| 2005/0187873 A1 | 8/2005 | Labrou et al. |
| 2005/0190059 A1 | 9/2005 | Wehrenberg |
| 2005/0204173 A1 | 9/2005 | Chang |
| 2005/0206501 A1 | 9/2005 | Farhat |
| 2005/0220304 A1 | 10/2005 | Lenoir et al. |
| 2005/0221798 A1 | 10/2005 | Sengupta et al. |
| 2005/0226472 A1 | 10/2005 | Komura et al. |
| 2005/0231625 A1 | 10/2005 | Parulski et al. |
| 2005/0250538 A1 | 11/2005 | Narasimhan et al. |
| 2005/0253817 A1 | 11/2005 | Rytivaara et al. |
| 2005/0254086 A1 | 11/2005 | Shouno |
| 2006/0017692 A1 | 1/2006 | Wehrenberg et al. |
| 2006/0021003 A1 | 1/2006 | Fisher et al. |
| 2006/0029262 A1 | 2/2006 | Fujimatsu et al. |
| 2006/0032908 A1 | 2/2006 | Sines |
| 2006/0036553 A1 | 2/2006 | Gupta et al. |
| 2006/0039686 A1 | 2/2006 | Soh et al. |
| 2006/0056664 A1 | 3/2006 | Iwasaki |
| 2006/0075228 A1 | 4/2006 | Black et al. |
| 2006/0075250 A1 | 4/2006 | Liao |
| 2006/0078176 A1 | 4/2006 | Abiko et al. |
| 2006/0080525 A1 | 4/2006 | Ritter et al. |
| 2006/0093183 A1 | 5/2006 | Hosoi et al. |
| 2006/0093192 A1 | 5/2006 | Bechtel |
| 2006/0097172 A1 | 5/2006 | Park |
| 2006/0102843 A1 | 5/2006 | Bazakos et al. |
| 2006/0104488 A1 | 5/2006 | Bazakos et al. |
| 2006/0107067 A1 | 5/2006 | Safal et al. |
| 2006/0115130 A1 | 6/2006 | Kozlay |
| 2006/0116555 A1 | 6/2006 | Pavlidis et al. |
| 2006/0120707 A1 | 6/2006 | Kusakari et al. |
| 2006/0136087 A1 | 6/2006 | Higashiura |
| 2006/0136734 A1 | 6/2006 | Telek et al. |
| 2006/0156028 A1 | 7/2006 | Aoyama et al. |
| 2006/0161870 A1 | 7/2006 | Hotelling et al. |
| 2006/0161871 A1 | 7/2006 | Hotelling et al. |
| 2006/0165060 A1 | 7/2006 | Dua et al. |
| 2006/0192775 A1 | 8/2006 | Nicholson et al. |
| 2006/0192868 A1 | 8/2006 | Wakamori |
| 2006/0206709 A1 | 9/2006 | Labrou et al. |
| 2006/0208065 A1 | 9/2006 | Mendelovich et al. |
| 2006/0214910 A1 | 9/2006 | Mizuno et al. |
| 2006/0215886 A1 | 9/2006 | Black |
| 2006/0219776 A1 | 10/2006 | Finn |
| 2006/0224645 A1 | 10/2006 | Kadi |
| 2006/0224882 A1 | 10/2006 | Chin |
| 2006/0234764 A1 | 10/2006 | Gamo et al. |
| 2006/0239517 A1 | 10/2006 | Creasey et al. |
| 2006/0250578 A1 | 11/2006 | Pohl et al. |
| 2006/0274920 A1 | 12/2006 | Tochikubo et al. |
| 2006/0280340 A1 | 12/2006 | Derakhshani et al. |
| 2006/0282671 A1 | 12/2006 | Burton |
| 2006/0282682 A1 | 12/2006 | Masaki et al. |
| 2006/0285663 A1 | 12/2006 | Rathus et al. |
| 2006/0288226 A1 | 12/2006 | Kowal |
| 2006/0288234 A1 | 12/2006 | Azar et al. |
| 2006/0294007 A1 | 12/2006 | Barthelemy |
| 2006/0294025 A1 | 12/2006 | Mengerink |
| 2007/0008066 A1 | 1/2007 | Fukuda |
| 2007/0009139 A1 | 1/2007 | Landschaft et al. |
| 2007/0014439 A1 | 1/2007 | Ando et al. |
| 2007/0016958 A1 | 1/2007 | Bodepudi et al. |
| 2007/0021194 A1 | 1/2007 | Aida |
| 2007/0024579 A1 | 2/2007 | Rosenberg |
| 2007/0025723 A1 | 2/2007 | Baudisch et al. |
| 2007/0061126 A1 | 3/2007 | Russo et al. |
| 2007/0061889 A1 | 3/2007 | Sainaney et al. |
| 2007/0067642 A1 | 3/2007 | Singhal |
| 2007/0073649 A1 | 3/2007 | Kikkoji et al. |
| 2007/0075965 A1 | 4/2007 | Huppi et al. |
| 2007/0079137 A1 | 4/2007 | Tu |
| 2007/0081081 A1 | 4/2007 | Cheng |
| 2007/0089164 A1 | 4/2007 | Gao et al. |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0126859 A1 | 6/2007 | Choi et al. |
| 2007/0143628 A1 | 6/2007 | Genda |
| 2007/0150842 A1 | 6/2007 | Chaudhri et al. |
| 2007/0162963 A1 | 7/2007 | Penet et al. |
| 2007/0180492 A1 | 8/2007 | Hassan et al. |
| 2007/0186106 A1 | 8/2007 | Ting et al. |
| 2007/0189583 A1 | 8/2007 | Shimada et al. |
| 2007/0192168 A1 | 8/2007 | Van Luchene |
| 2007/0194113 A1 | 8/2007 | Esplin et al. |
| 2007/0200916 A1 | 8/2007 | Han |
| 2007/0201730 A1 | 8/2007 | Masaki et al. |
| 2007/0204037 A1 | 8/2007 | Kunz et al. |
| 2007/0208743 A1 | 9/2007 | Sainaney et al. |
| 2007/0219901 A1 | 9/2007 | Garbow et al. |
| 2007/0220273 A1 | 9/2007 | Campisi |
| 2007/0226778 A1 | 9/2007 | Pietruszka |
| 2007/0229221 A1 | 10/2007 | Saotome |
| 2007/0230773 A1 | 10/2007 | Nagao et al. |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0244811 A1 | 10/2007 | Tumminaro |
| 2007/0250573 A1 | 10/2007 | Rothschild et al. |
| 2007/0253604 A1 | 11/2007 | Inoue et al. |
| 2007/0255564 A1 | 11/2007 | Yee et al. |
| 2007/0259716 A1 | 11/2007 | Mattice et al. |
| 2007/0260547 A1 | 11/2007 | Little |
| 2007/0277224 A1 | 11/2007 | Osborn et al. |
| 2007/0280515 A1 | 12/2007 | Goto |
| 2007/0287423 A1 | 12/2007 | Kakiuchi et al. |
| 2007/0294182 A1 | 12/2007 | Hammad |
| 2008/0001703 A1 | 1/2008 | Goto |
| 2008/0017721 A1 | 1/2008 | Zehnacker |
| 2008/0027947 A1 | 1/2008 | Pritchett et al. |
| 2008/0032801 A1 | 2/2008 | Brunet De Courssou |
| 2008/0040786 A1 | 2/2008 | Chang et al. |
| 2008/0041936 A1 | 2/2008 | Vawter |
| 2008/0042866 A1 | 2/2008 | Morse et al. |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0054081 A1 | 3/2008 | Mullen |
| 2008/0059351 A1 | 3/2008 | Richey et al. |
| 2008/0069412 A1 | 3/2008 | Champagne et al. |
| 2008/0072045 A1 | 3/2008 | Mizrah |
| 2008/0084539 A1 | 4/2008 | Daniel |
| 2008/0092245 A1 | 4/2008 | Alward et al. |
| 2008/0114678 A1 | 5/2008 | Bennett et al. |
| 2008/0114980 A1 | 5/2008 | Sridhar |
| 2008/0133931 A1 | 6/2008 | Kosaka |
| 2008/0140868 A1 | 6/2008 | Kalayjian et al. |
| 2008/0165255 A1 | 7/2008 | Christie et al. |
| 2008/0167834 A1 | 7/2008 | Herz et al. |
| 2008/0172598 A1 | 7/2008 | Jacobsen et al. |
| 2008/0178283 A1 | 7/2008 | Pratt et al. |
| 2008/0201454 A1 | 8/2008 | Soffer |
| 2008/0208762 A1 | 8/2008 | Arthur et al. |
| 2008/0212849 A1 | 9/2008 | Gao |
| 2008/0218641 A1 | 9/2008 | Kjeldsen et al. |
| 2008/0229409 A1 | 9/2008 | Miller et al. |
| 2008/0231729 A1 | 9/2008 | Sato et al. |
| 2008/0246917 A1 | 10/2008 | Phinney et al. |
| 2008/0250481 A1 | 10/2008 | Beck et al. |
| 2008/0275779 A1 | 11/2008 | Lakshminarayanan |
| 2008/0292144 A1 | 11/2008 | Kim et al. |
| 2008/0309632 A1 | 12/2008 | Westerman et al. |
| 2008/0314971 A1 | 12/2008 | Faith et al. |
| 2008/0317292 A1 | 12/2008 | Baker et al. |
| 2008/0319875 A1 | 12/2008 | Levchin et al. |
| 2008/0320391 A1 | 12/2008 | Lemay et al. |
| 2009/0005165 A1 | 1/2009 | Arezina et al. |
| 2009/0006292 A1 | 1/2009 | Block |

(56) References Cited

U.S. PATENT DOCUMENTS

| | | |
|---|---|---|
| 2009/0006846 A1 | 1/2009 | Rosenblatt |
| 2009/0006991 A1 | 1/2009 | Lindberg et al. |
| 2009/0016574 A1 | 1/2009 | Tsukahara |
| 2009/0031375 A1 | 1/2009 | Sullivan et al. |
| 2009/0036165 A1 | 2/2009 | Brede |
| 2009/0037742 A1 | 2/2009 | Narayanaswami |
| 2009/0054044 A1 | 2/2009 | Ikemori et al. |
| 2009/0055484 A1 | 2/2009 | Vuong et al. |
| 2009/0061837 A1 | 3/2009 | Chaudhri et al. |
| 2009/0063851 A1 | 3/2009 | Nijdam |
| 2009/0064055 A1 | 3/2009 | Chaudhri et al. |
| 2009/0067685 A1 | 3/2009 | Boshra et al. |
| 2009/0074255 A1 | 3/2009 | Holm |
| 2009/0082066 A1 | 3/2009 | Katz |
| 2009/0083847 A1 | 3/2009 | Fadell et al. |
| 2009/0083850 A1 | 3/2009 | Fadell et al. |
| 2009/0094681 A1 | 4/2009 | Sadler et al. |
| 2009/0106558 A1 | 4/2009 | Delgrosso et al. |
| 2009/0119754 A1 | 5/2009 | Schubert |
| 2009/0122149 A1 | 5/2009 | Ishii |
| 2009/0144074 A1 | 6/2009 | Choi |
| 2009/0146779 A1 | 6/2009 | Kumar et al. |
| 2009/0158390 A1 | 6/2009 | Guan |
| 2009/0159696 A1 | 6/2009 | Mullen |
| 2009/0160609 A1 | 6/2009 | Lin et al. |
| 2009/0164878 A1 | 6/2009 | Cottrille |
| 2009/0165107 A1 | 6/2009 | Tojo et al. |
| 2009/0168756 A1 | 7/2009 | Kurapati et al. |
| 2009/0175509 A1 | 7/2009 | Gonion et al. |
| 2009/0176565 A1 | 7/2009 | Kelly et al. |
| 2009/0187423 A1 | 7/2009 | Kim |
| 2009/0193514 A1 | 7/2009 | Adams et al. |
| 2009/0199188 A1 | 8/2009 | Fujimaki |
| 2009/0201257 A1 | 8/2009 | Saitoh et al. |
| 2009/0210308 A1 | 8/2009 | Toomer et al. |
| 2009/0215533 A1 | 8/2009 | Zalewski et al. |
| 2009/0224874 A1 | 9/2009 | Dewar et al. |
| 2009/0228938 A1 | 9/2009 | White et al. |
| 2009/0241169 A1 | 9/2009 | Dhand et al. |
| 2009/0258667 A1 | 10/2009 | Suzuki et al. |
| 2009/0262947 A1 | 10/2009 | Karlsson et al. |
| 2009/0312049 A1 | 12/2009 | Isomursu |
| 2009/0327744 A1 | 12/2009 | Hatano et al. |
| 2009/0328162 A1 | 12/2009 | Kokumai et al. |
| 2010/0008545 A1 | 1/2010 | Ueki et al. |
| 2010/0026640 A1 | 2/2010 | Kim et al. |
| 2010/0027854 A1 | 2/2010 | Chatterjee et al. |
| 2010/0034432 A1 | 2/2010 | Ono et al. |
| 2010/0042835 A1 | 2/2010 | Lee et al. |
| 2010/0075656 A1 | 3/2010 | Howarter et al. |
| 2010/0082462 A1 | 4/2010 | Yuan et al. |
| 2010/0082481 A1 | 4/2010 | Lin et al. |
| 2010/0088148 A1 | 4/2010 | Presswala et al. |
| 2010/0107229 A1 | 4/2010 | Najafi et al. |
| 2010/0114731 A1 | 5/2010 | Kingston et al. |
| 2010/0122327 A1 | 5/2010 | Linecker et al. |
| 2010/0124363 A1 | 5/2010 | Ek et al. |
| 2010/0131303 A1 | 5/2010 | Collopy et al. |
| 2010/0146384 A1 | 6/2010 | Peev et al. |
| 2010/0153265 A1 | 6/2010 | Hershfield et al. |
| 2010/0158327 A1 | 6/2010 | Kangas et al. |
| 2010/0164684 A1 | 7/2010 | Sasa et al. |
| 2010/0178873 A1 | 7/2010 | Lee et al. |
| 2010/0185871 A1 | 7/2010 | Scherrer et al. |
| 2010/0191570 A1 | 7/2010 | Michaud et al. |
| 2010/0205091 A1 | 8/2010 | Graziano et al. |
| 2010/0207721 A1 | 8/2010 | Nakajima et al. |
| 2010/0216425 A1 | 8/2010 | Smith |
| 2010/0223145 A1 | 9/2010 | Dragt |
| 2010/0225607 A1 | 9/2010 | Kim |
| 2010/0231356 A1 | 9/2010 | Kim |
| 2010/0240415 A1 | 9/2010 | Kim et al. |
| 2010/0243741 A1 | 9/2010 | Eng |
| 2010/0251243 A1 | 9/2010 | Gill et al. |
| 2010/0265204 A1 | 10/2010 | Tsuda |
| 2010/0267362 A1 | 10/2010 | Smith et al. |
| 2010/0269156 A1 | 10/2010 | Hohlfeld et al. |
| 2010/0273461 A1 | 10/2010 | Choi |
| 2010/0302016 A1 | 12/2010 | Zaborowski |
| 2010/0311397 A1 | 12/2010 | Li |
| 2010/0313263 A1 | 12/2010 | Uchida et al. |
| 2011/0010470 A1 | 1/2011 | Hulbert et al. |
| 2011/0013813 A1 | 1/2011 | Yamamoto et al. |
| 2011/0035799 A1 | 2/2011 | Handler |
| 2011/0050976 A1 | 3/2011 | Kwon |
| 2011/0052013 A1 | 3/2011 | Sasahara et al. |
| 2011/0054268 A1 | 3/2011 | Fidacaro et al. |
| 2011/0055763 A1 | 3/2011 | Utsuki et al. |
| 2011/0065479 A1 | 3/2011 | Nader |
| 2011/0067098 A1 | 3/2011 | Ruggiero et al. |
| 2011/0088086 A1 | 4/2011 | Swink et al. |
| 2011/0099079 A1 | 4/2011 | White et al. |
| 2011/0119610 A1 | 5/2011 | Hackborn et al. |
| 2011/0122294 A1 | 5/2011 | Suh et al. |
| 2011/0138166 A1 | 6/2011 | Peszek et al. |
| 2011/0142234 A1 | 6/2011 | Rogers |
| 2011/0145049 A1 | 6/2011 | Hertel et al. |
| 2011/0149874 A1 | 6/2011 | Reif |
| 2011/0161116 A1 | 6/2011 | Peak et al. |
| 2011/0163969 A1 | 7/2011 | Freddy et al. |
| 2011/0164269 A1 | 7/2011 | Kamishiro |
| 2011/0175703 A1 | 7/2011 | Benkley, III |
| 2011/0187497 A1 | 8/2011 | Chin |
| 2011/0201306 A1 | 8/2011 | Ali Al-Harbi |
| 2011/0215921 A1 | 9/2011 | Ben et al. |
| 2011/0225426 A1 | 9/2011 | Agarwal et al. |
| 2011/0230769 A1 | 9/2011 | Yamazaki |
| 2011/0231914 A1 | 9/2011 | Hung |
| 2011/0251892 A1 | 10/2011 | Laracey |
| 2011/0254683 A1 | 10/2011 | Soldan et al. |
| 2011/0286640 A1 | 11/2011 | Kwon et al. |
| 2011/0288970 A1 | 11/2011 | Kidron et al. |
| 2011/0296324 A1 | 12/2011 | Goossens et al. |
| 2011/0300829 A1 | 12/2011 | Nurmi et al. |
| 2012/0009896 A1 | 1/2012 | Bandyopadhyay et al. |
| 2012/0023185 A1 | 1/2012 | Holden et al. |
| 2012/0023573 A1 | 1/2012 | Shi |
| 2012/0028659 A1 | 2/2012 | Whitney et al. |
| 2012/0028695 A1 | 2/2012 | Walker et al. |
| 2012/0032891 A1 | 2/2012 | Parivar et al. |
| 2012/0036556 A1 | 2/2012 | Lebeau et al. |
| 2012/0069231 A1 | 3/2012 | Chao |
| 2012/0072546 A1 | 3/2012 | Etchegoyen |
| 2012/0078751 A1 | 3/2012 | Macphail et al. |
| 2012/0081282 A1 | 4/2012 | Chin |
| 2012/0089507 A1 | 4/2012 | Zhang et al. |
| 2012/0089835 A1 | 4/2012 | Peckover |
| 2012/0095853 A1 | 4/2012 | Von et al. |
| 2012/0095865 A1 | 4/2012 | Doherty et al. |
| 2012/0123806 A1 | 5/2012 | Schumann et al. |
| 2012/0123937 A1 | 5/2012 | Spodak et al. |
| 2012/0139698 A1 | 6/2012 | Tsui et al. |
| 2012/0197743 A1 | 8/2012 | Grigg et al. |
| 2012/0200489 A1 | 8/2012 | Miyashita et al. |
| 2012/0215553 A1 | 8/2012 | Leston |
| 2012/0218125 A1 | 8/2012 | Demirdjian et al. |
| 2012/0221464 A1 | 8/2012 | Pasquero et al. |
| 2012/0235790 A1 | 9/2012 | Zhao et al. |
| 2012/0245985 A1 | 9/2012 | Cho et al. |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0283871 A1 | 11/2012 | Chai et al. |
| 2012/0284297 A1 | 11/2012 | Aguera-Arcas et al. |
| 2012/0290449 A1 | 11/2012 | Mullen et al. |
| 2012/0291121 A1 | 11/2012 | Huang et al. |
| 2012/0293438 A1 | 11/2012 | Chaudhri et al. |
| 2012/0295708 A1 | 11/2012 | Hernandez-Abrego et al. |
| 2012/0310760 A1 | 12/2012 | Phillips et al. |
| 2012/0311499 A1 | 12/2012 | Dellinger et al. |
| 2012/0316933 A1 | 12/2012 | Pentland et al. |
| 2012/0322370 A1 | 12/2012 | Lee |
| 2012/0322371 A1 | 12/2012 | Lee |
| 2012/0327183 A1 | 12/2012 | Fujii |

(56) References Cited

U.S. PATENT DOCUMENTS

| | | |
|---|---|---|
| 2013/0013499 A1 | 1/2013 | Kalgi |
| 2013/0015946 A1 | 1/2013 | Lau et al. |
| 2013/0024932 A1 | 1/2013 | Toebes et al. |
| 2013/0030934 A1 | 1/2013 | Bakshi et al. |
| 2013/0031217 A1 | 1/2013 | Rajapakse |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0060687 A1 | 3/2013 | Bak et al. |
| 2013/0067545 A1 | 3/2013 | Hanes |
| 2013/0073321 A1 | 3/2013 | Hofmann et al. |
| 2013/0074194 A1 | 3/2013 | White et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0082974 A1 | 4/2013 | Kerr et al. |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0102281 A1 | 4/2013 | Kanda et al. |
| 2013/0103519 A1 | 4/2013 | Kountotsis et al. |
| 2013/0110719 A1 | 5/2013 | Carter et al. |
| 2013/0122866 A1 | 5/2013 | Huang |
| 2013/0124423 A1 | 5/2013 | Fisher |
| 2013/0124855 A1 | 5/2013 | Varadarajan et al. |
| 2013/0127854 A1 | 5/2013 | Shpunt et al. |
| 2013/0129162 A1 | 5/2013 | Cheng et al. |
| 2013/0136341 A1 | 5/2013 | Yamamoto |
| 2013/0145448 A1 | 6/2013 | Newell |
| 2013/0148867 A1 | 6/2013 | Wang |
| 2013/0151414 A1 | 6/2013 | Zhu et al. |
| 2013/0160110 A1 | 6/2013 | Schechter et al. |
| 2013/0166325 A1 | 6/2013 | Ganapathy et al. |
| 2013/0169549 A1 | 7/2013 | Seymour et al. |
| 2013/0176208 A1 | 7/2013 | Tanaka et al. |
| 2013/0191911 A1 | 7/2013 | Dellinger et al. |
| 2013/0200146 A1 | 8/2013 | Moghadam et al. |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0231127 A1 | 9/2013 | Kildal et al. |
| 2013/0239202 A1 | 9/2013 | Adams et al. |
| 2013/0243264 A1 | 9/2013 | Aoki |
| 2013/0244615 A1 | 9/2013 | Miller |
| 2013/0247175 A1 | 9/2013 | Nechyba et al. |
| 2013/0254574 A1 | 9/2013 | Zacchio et al. |
| 2013/0254858 A1 | 9/2013 | Giardina et al. |
| 2013/0262857 A1 | 10/2013 | Neuman et al. |
| 2013/0279768 A1 | 10/2013 | Boshra |
| 2013/0282577 A1 | 10/2013 | Milne |
| 2013/0286161 A1 | 10/2013 | Lv et al. |
| 2013/0290187 A1 | 10/2013 | Itwaru |
| 2013/0301832 A1 | 11/2013 | Harper |
| 2013/0304514 A1 | 11/2013 | Hyde et al. |
| 2013/0304651 A1 | 11/2013 | Smith et al. |
| 2013/0307771 A1 | 11/2013 | Parker et al. |
| 2013/0312087 A1 | 11/2013 | Latzina |
| 2013/0332358 A1 | 12/2013 | Zhao |
| 2013/0332364 A1 | 12/2013 | Templeton et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0342672 A1 | 12/2013 | Gray et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006155 A1 | 1/2014 | Ramirez et al. |
| 2014/0006285 A1 | 1/2014 | Chi et al. |
| 2014/0013422 A1 | 1/2014 | Janus et al. |
| 2014/0019352 A1 | 1/2014 | Shrivastava |
| 2014/0025513 A1 | 1/2014 | Cooke et al. |
| 2014/0026188 A1 | 1/2014 | Gubler |
| 2014/0040120 A1 | 2/2014 | Cho et al. |
| 2014/0047560 A1 | 2/2014 | Meyer et al. |
| 2014/0056491 A1 | 2/2014 | Knight |
| 2014/0058860 A1 | 2/2014 | Roh et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0062853 A1 | 3/2014 | Chaudhri et al. |
| 2014/0068740 A1 | 3/2014 | Lecun et al. |
| 2014/0068751 A1 | 3/2014 | Last |
| 2014/0070957 A1 | 3/2014 | Longinotti-Buitoni et al. |
| 2014/0074635 A1 | 3/2014 | Reese et al. |
| 2014/0074716 A1 | 3/2014 | Ni |
| 2014/0085191 A1 | 3/2014 | Gonion et al. |
| 2014/0085460 A1 | 3/2014 | Park et al. |
| 2014/0094143 A1 | 4/2014 | Ayotte |
| 2014/0100952 A1 | 4/2014 | Bart et al. |
| 2014/0101056 A1 | 4/2014 | Wendling |
| 2014/0104178 A1 | 4/2014 | Jo |
| 2014/0109018 A1 | 4/2014 | Casey et al. |
| 2014/0111420 A1 | 4/2014 | Ahn et al. |
| 2014/0112555 A1 | 4/2014 | Fadell et al. |
| 2014/0115695 A1 | 4/2014 | Fadell et al. |
| 2014/0118519 A1 | 5/2014 | Sahin |
| 2014/0119620 A1 | 5/2014 | Jung et al. |
| 2014/0122331 A1 | 5/2014 | Vaish et al. |
| 2014/0123275 A1 | 5/2014 | Azar et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0135631 A1 | 5/2014 | Brumback et al. |
| 2014/0143145 A1 | 5/2014 | Kortina et al. |
| 2014/0143693 A1 | 5/2014 | Goossens et al. |
| 2014/0155031 A1 | 6/2014 | Lee et al. |
| 2014/0157153 A1 | 6/2014 | Yuen et al. |
| 2014/0164082 A1 | 6/2014 | Sun et al. |
| 2014/0165000 A1 | 6/2014 | Fleizach et al. |
| 2014/0173450 A1 | 6/2014 | Akula |
| 2014/0187163 A1 | 7/2014 | Fujita |
| 2014/0188673 A1 | 7/2014 | Graham et al. |
| 2014/0189829 A1 | 7/2014 | Mclachlan et al. |
| 2014/0193783 A1 | 7/2014 | Jeong et al. |
| 2014/0205161 A1 | 7/2014 | Salatino et al. |
| 2014/0222436 A1 | 8/2014 | Binder et al. |
| 2014/0222664 A1 | 8/2014 | Milne |
| 2014/0226131 A1 | 8/2014 | Lopez et al. |
| 2014/0244365 A1 | 8/2014 | Price et al. |
| 2014/0244493 A1 | 8/2014 | Kenyon et al. |
| 2014/0247229 A1 | 9/2014 | Cho et al. |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0258828 A1 | 9/2014 | Lymer et al. |
| 2014/0270374 A1 | 9/2014 | Unzueta |
| 2014/0279442 A1 | 9/2014 | Luoma et al. |
| 2014/0279497 A1 | 9/2014 | Qaim-Maqami et al. |
| 2014/0279556 A1 | 9/2014 | Priebatsch et al. |
| 2014/0283018 A1 | 9/2014 | Dadu et al. |
| 2014/0283128 A1 | 9/2014 | Shepherd et al. |
| 2014/0292641 A1 | 10/2014 | Cho et al. |
| 2014/0293079 A1 | 10/2014 | Milanfar et al. |
| 2014/0298432 A1 | 10/2014 | Brown |
| 2014/0304809 A1 | 10/2014 | Fadell et al. |
| 2014/0311447 A1 | 10/2014 | Surnilla et al. |
| 2014/0313307 A1 | 10/2014 | Oh et al. |
| 2014/0337221 A1 | 11/2014 | Hoyos |
| 2014/0337634 A1 | 11/2014 | Johnson et al. |
| 2014/0337931 A1 | 11/2014 | Cotterill |
| 2014/0344896 A1 | 11/2014 | Pak et al. |
| 2014/0344904 A1 | 11/2014 | Venkataramani et al. |
| 2014/0350924 A1 | 11/2014 | Zurek et al. |
| 2014/0354401 A1 | 12/2014 | Soni et al. |
| 2014/0354538 A1 | 12/2014 | Lee et al. |
| 2014/0359140 A1 | 12/2014 | Shankarraman |
| 2014/0359454 A1 | 12/2014 | Lee et al. |
| 2014/0365904 A1 | 12/2014 | Kim et al. |
| 2014/0366159 A1 | 12/2014 | Cohen |

(56) References Cited

U.S. PATENT DOCUMENTS

| | | |
|---|---|---|
| 2014/0375835 A1 | 12/2014 | Bos |
| 2014/0380465 A1 | 12/2014 | Fadell et al. |
| 2015/0002696 A1 | 1/2015 | He et al. |
| 2015/0006207 A1 | 1/2015 | Jarvis et al. |
| 2015/0020081 A1 | 1/2015 | Cho et al. |
| 2015/0033364 A1 | 1/2015 | Wong |
| 2015/0043790 A1 | 2/2015 | Ono et al. |
| 2015/0044965 A1 | 2/2015 | Kurimoto et al. |
| 2015/0049014 A1 | 2/2015 | Saito |
| 2015/0051846 A1 | 2/2015 | Masuya |
| 2015/0051913 A1 | 2/2015 | Choi |
| 2015/0054764 A1 | 2/2015 | Kim et al. |
| 2015/0058146 A1 | 2/2015 | Aissi et al. |
| 2015/0074418 A1 | 3/2015 | Lee et al. |
| 2015/0074615 A1 | 3/2015 | Han et al. |
| 2015/0095175 A1 | 4/2015 | Dua |
| 2015/0109191 A1 | 4/2015 | Johnson et al. |
| 2015/0111559 A1 | 4/2015 | Leaver et al. |
| 2015/0121251 A1 | 4/2015 | Siddhartha et al. |
| 2015/0124053 A1 | 5/2015 | Tamura et al. |
| 2015/0127539 A1 | 5/2015 | Ye et al. |
| 2015/0130716 A1 | 5/2015 | Sridharan et al. |
| 2015/0135282 A1 | 5/2015 | Kong et al. |
| 2015/0146945 A1 | 5/2015 | Han |
| 2015/0154001 A1 | 6/2015 | Knox et al. |
| 2015/0154589 A1 | 6/2015 | Li |
| 2015/0179008 A1 | 6/2015 | Sung et al. |
| 2015/0186152 A1 | 7/2015 | Jothiswaran et al. |
| 2015/0186860 A1 | 7/2015 | Rangarajan |
| 2015/0187019 A1 | 7/2015 | Fernandes et al. |
| 2015/0195277 A1 | 7/2015 | Faaborg et al. |
| 2015/0205353 A1 | 7/2015 | Feng et al. |
| 2015/0208244 A1 | 7/2015 | Nakao |
| 2015/0212681 A1 | 7/2015 | Shinozaki et al. |
| 2015/0213244 A1 | 7/2015 | Lymberopoulos et al. |
| 2015/0215128 A1 | 7/2015 | Pal |
| 2015/0220924 A1 | 8/2015 | Bakker |
| 2015/0235018 A1 | 8/2015 | Gupta et al. |
| 2015/0235055 A1 | 8/2015 | An et al. |
| 2015/0235098 A1 | 8/2015 | Lee et al. |
| 2015/0242611 A1 | 8/2015 | Cotterill |
| 2015/0245159 A1 | 8/2015 | Osman |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0261292 A1 | 9/2015 | Conzola et al. |
| 2015/0261387 A1 | 9/2015 | Petersen et al. |
| 2015/0271175 A1 | 9/2015 | Je et al. |
| 2015/0295921 A1 | 10/2015 | Cao |
| 2015/0304330 A1 | 10/2015 | Soamboonsrup et al. |
| 2015/0310259 A1 | 10/2015 | Lau et al. |
| 2015/0324113 A1 | 11/2015 | Kapp et al. |
| 2015/0334567 A1 | 11/2015 | Chen et al. |
| 2015/0339652 A1 | 11/2015 | Park et al. |
| 2015/0341717 A1 | 11/2015 | Song et al. |
| 2015/0346845 A1 | 12/2015 | Di Censo et al. |
| 2015/0347738 A1 | 12/2015 | Ulrich et al. |
| 2015/0348001 A1 | 12/2015 | Van Os et al. |
| 2015/0348002 A1 | 12/2015 | Van et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0349959 A1 | 12/2015 | Marciniak |
| 2015/0362977 A1 | 12/2015 | Doniwa |
| 2015/0363632 A1 | 12/2015 | Ahn et al. |
| 2015/0365400 A1 | 12/2015 | Cox |
| 2015/0370323 A1 | 12/2015 | Cieplinski et al. |
| 2015/0379252 A1 | 12/2015 | Tang et al. |
| 2016/0005024 A1 | 1/2016 | Harrell |
| 2016/0006745 A1 | 1/2016 | Furuichi et al. |
| 2016/0019536 A1 | 1/2016 | Ortiz et al. |
| 2016/0025993 A1 | 1/2016 | Mor et al. |
| 2016/0026779 A1 | 1/2016 | Grigg et al. |
| 2016/0036965 A1* | 2/2016 | Kim ................... H04M 1/67 455/411 |
| 2016/0037345 A1 | 2/2016 | Margadoudakis |
| 2016/0042166 A1 | 2/2016 | Kang et al. |
| 2016/0047666 A1 | 2/2016 | Fuchs |
| 2016/0048705 A1 | 2/2016 | Yang |
| 2016/0050199 A1 | 2/2016 | Ganesan |
| 2016/0055324 A1 | 2/2016 | Agarwal |
| 2016/0063235 A1 | 3/2016 | Tussy |
| 2016/0063298 A1 | 3/2016 | Tuneld et al. |
| 2016/0063828 A1 | 3/2016 | Verweij et al. |
| 2016/0078281 A1 | 3/2016 | Gongaware et al. |
| 2016/0092665 A1 | 3/2016 | Cowan et al. |
| 2016/0094705 A1 | 3/2016 | Vendrow |
| 2016/0100156 A1 | 4/2016 | Zhou et al. |
| 2016/0104034 A1 | 4/2016 | Wilder et al. |
| 2016/0117681 A1 | 4/2016 | Jiao et al. |
| 2016/0127641 A1 | 5/2016 | Gove |
| 2016/0132840 A1 | 5/2016 | Bowles et al. |
| 2016/0134488 A1 | 5/2016 | Straub et al. |
| 2016/0147987 A1 | 5/2016 | Jang et al. |
| 2016/0148042 A1 | 5/2016 | Gonion et al. |
| 2016/0148384 A1 | 5/2016 | Bud et al. |
| 2016/0154956 A1 | 6/2016 | Fadell et al. |
| 2016/0165205 A1 | 6/2016 | Liu et al. |
| 2016/0171192 A1 | 6/2016 | Holz et al. |
| 2016/0188860 A1 | 6/2016 | Lee et al. |
| 2016/0189451 A1 | 6/2016 | Yoo et al. |
| 2016/0191506 A1 | 6/2016 | Wang |
| 2016/0192324 A1 | 6/2016 | Zhang et al. |
| 2016/0217310 A1 | 7/2016 | Shah et al. |
| 2016/0224966 A1 | 8/2016 | Van Os et al. |
| 2016/0224973 A1 | 8/2016 | Van Os et al. |
| 2016/0232513 A1 | 8/2016 | Purves et al. |
| 2016/0234023 A1 | 8/2016 | Mozer et al. |
| 2016/0239701 A1 | 8/2016 | Lee et al. |
| 2016/0241543 A1 | 8/2016 | Jung et al. |
| 2016/0253665 A1 | 9/2016 | Van Os et al. |
| 2016/0259936 A1 | 9/2016 | Mukherjee et al. |
| 2016/0261581 A1 | 9/2016 | Wang et al. |
| 2016/0267779 A1 | 9/2016 | Kuang |
| 2016/0275281 A1 | 9/2016 | Ranjit et al. |
| 2016/0277396 A1 | 9/2016 | Gardiner et al. |
| 2016/0284123 A1 | 9/2016 | Hare et al. |
| 2016/0292525 A1 | 10/2016 | Aoki |
| 2016/0294557 A1 | 10/2016 | Baldwin et al. |
| 2016/0294837 A1 | 10/2016 | Turgeman |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0320838 A1 | 11/2016 | Teller et al. |
| 2016/0332025 A1 | 11/2016 | Repka |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0358180 A1 | 12/2016 | Van Os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0371438 A1 | 12/2016 | Annulis |
| 2016/0378961 A1 | 12/2016 | Park |
| 2016/0378966 A1 | 12/2016 | Alten |
| 2017/0004828 A1 | 1/2017 | Lee et al. |
| 2017/0017834 A1 | 1/2017 | Sabitov et al. |
| 2017/0032168 A1 | 2/2017 | Kim |
| 2017/0032375 A1 | 2/2017 | Van Os et al. |
| 2017/0039358 A1 | 2/2017 | Yuen et al. |
| 2017/0039567 A1 | 2/2017 | Stern et al. |
| 2017/0046507 A1 | 2/2017 | Archer et al. |
| 2017/0046508 A1 | 2/2017 | Shin et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0102916 A1 | 4/2017 | Noble et al. |
| 2017/0124328 A1 | 5/2017 | Krishnapura |
| 2017/0142584 A1 | 5/2017 | Oh et al. |
| 2017/0147681 A1 | 5/2017 | Tankersley et al. |
| 2017/0147802 A1 | 5/2017 | Li |
| 2017/0148010 A1 | 5/2017 | Bak et al. |

(56) References Cited

U.S. PATENT DOCUMENTS

| | | |
|---|---|---|
| 2017/0161750 A1 | 6/2017 | Yao et al. |
| 2017/0163588 A1 | 6/2017 | Devasthali et al. |
| 2017/0169202 A1 | 6/2017 | Duggan et al. |
| 2017/0169204 A1 | 6/2017 | Fadell et al. |
| 2017/0169287 A1 | 6/2017 | Tokunaga et al. |
| 2017/0180637 A1 | 6/2017 | Lautenbach et al. |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0199997 A1 | 7/2017 | Fadell et al. |
| 2017/0213211 A1 | 7/2017 | Sibert et al. |
| 2017/0235361 A1 | 8/2017 | Rigazio et al. |
| 2017/0235926 A1 | 8/2017 | Fyke et al. |
| 2017/0244703 A1 | 8/2017 | Lee et al. |
| 2017/0264608 A1 | 9/2017 | Moore et al. |
| 2017/0269792 A1 | 9/2017 | Xu et al. |
| 2017/0286656 A1 | 10/2017 | Kohli |
| 2017/0300897 A1 | 10/2017 | Ferenczi et al. |
| 2017/0318019 A1 | 11/2017 | Gordon et al. |
| 2017/0323141 A1 | 11/2017 | Lee et al. |
| 2017/0329949 A1 | 11/2017 | Civelli |
| 2017/0332035 A1 | 11/2017 | Shah et al. |
| 2017/0339151 A1 | 11/2017 | Van Os et al. |
| 2017/0344251 A1 | 11/2017 | Hajimusa et al. |
| 2017/0357320 A1 | 12/2017 | Chaudhri et al. |
| 2017/0357788 A1 | 12/2017 | Ledvina et al. |
| 2018/0004924 A1 | 1/2018 | Tieu |
| 2018/0018514 A1 | 1/2018 | Azam et al. |
| 2018/0021954 A1 | 1/2018 | Fischer et al. |
| 2018/0063249 A1 | 3/2018 | Nguyen |
| 2018/0075439 A1 | 3/2018 | Bak et al. |
| 2018/0088787 A1 | 3/2018 | Bereza et al. |
| 2018/0096690 A1 | 4/2018 | Mixter et al. |
| 2018/0109629 A1 | 4/2018 | Van Os et al. |
| 2018/0117944 A1 | 5/2018 | Lee |
| 2018/0131721 A1 | 5/2018 | Jones et al. |
| 2018/0144178 A1 | 5/2018 | Han et al. |
| 2018/0150627 A1 | 5/2018 | Rodefer |
| 2018/0158066 A1 | 6/2018 | Van Os et al. |
| 2018/0173928 A1 | 6/2018 | Han et al. |
| 2018/0173929 A1 | 6/2018 | Han et al. |
| 2018/0173930 A1 | 6/2018 | Han et al. |
| 2018/0181201 A1 | 6/2018 | Grant et al. |
| 2018/0181737 A1 | 6/2018 | Tussy |
| 2018/0211093 A1 | 7/2018 | Bae et al. |
| 2018/0233139 A1 | 8/2018 | Finkelstein et al. |
| 2018/0262834 A1 | 9/2018 | Cho et al. |
| 2018/0268747 A1 | 9/2018 | Braun |
| 2018/0276673 A1 | 9/2018 | Van Os et al. |
| 2018/0302790 A1 | 10/2018 | Cotterill |
| 2018/0321826 A1 | 11/2018 | Bereza et al. |
| 2018/0357631 A1 | 12/2018 | Bak et al. |
| 2018/0365898 A1 | 12/2018 | Costa |
| 2019/0020483 A1 | 1/2019 | Meng |
| 2019/0050867 A1 | 2/2019 | Van Os et al. |
| 2019/0053739 A1 | 2/2019 | Inoue et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0124510 A1 | 4/2019 | Cotterill |
| 2019/0156607 A1 | 5/2019 | Tao et al. |
| 2019/0164134 A1 | 5/2019 | Morrow et al. |
| 2019/0180088 A1 | 6/2019 | Norimatsu |
| 2019/0220647 A1 | 7/2019 | Han et al. |
| 2019/0228140 A1 | 7/2019 | Arroyo et al. |
| 2019/0243957 A1 | 8/2019 | Fadell et al. |
| 2019/0276051 A1 | 9/2019 | Marti et al. |
| 2019/0278900 A1 | 9/2019 | Yang et al. |
| 2019/0289079 A1 | 9/2019 | Van Os et al. |
| 2019/0333508 A1 | 10/2019 | Rao et al. |
| 2019/0347389 A1 | 11/2019 | Kawakita et al. |
| 2019/0347391 A1 | 11/2019 | Kim et al. |
| 2019/0364020 A1 | 11/2019 | Wardell et al. |
| 2019/0370448 A1 | 12/2019 | Devine et al. |
| 2019/0370583 A1 | 12/2019 | Van Os et al. |
| 2019/0392129 A1* | 12/2019 | Tsai ................. G06V 40/70 |
| 2019/0394649 A1 | 12/2019 | Ledvina et al. |
| 2020/0042685 A1 | 2/2020 | Tussy et al. |
| 2020/0065821 A1 | 2/2020 | Van Os et al. |
| 2020/0103963 A1 | 4/2020 | Kelly et al. |
| 2020/0104620 A1 | 4/2020 | Cohen et al. |
| 2020/0120503 A1 | 4/2020 | Cotterill |
| 2020/0142484 A1 | 5/2020 | Maalouf et al. |
| 2020/0234027 A1 | 7/2020 | Han et al. |
| 2020/0280446 A1 | 9/2020 | Matsumoto |
| 2020/0311509 A1 | 10/2020 | Benkley et al. |
| 2020/0356761 A1 | 11/2020 | Gonion et al. |
| 2020/0366742 A1 | 11/2020 | Van Os et al. |
| 2020/0367827 A1 | 11/2020 | Min et al. |
| 2020/0372514 A1 | 11/2020 | Van Os et al. |
| 2020/0401686 A1 | 12/2020 | Duchastel |
| 2021/0014070 A1 | 1/2021 | Gopalakrishnan et al. |
| 2021/0042549 A1 | 2/2021 | Van Os et al. |
| 2021/0048883 A1 | 2/2021 | Kelly et al. |
| 2021/0073823 A1 | 3/2021 | Van Os |
| 2021/0105277 A1 | 4/2021 | Epstein et al. |
| 2021/0192530 A1 | 6/2021 | Van Os et al. |
| 2021/0203506 A1 | 7/2021 | Edwards et al. |
| 2022/0012323 A1* | 1/2022 | Moriwaki ........... H04L 63/0861 |
| 2022/0027446 A1 | 1/2022 | Van Os et al. |
| 2022/0058257 A1 | 2/2022 | Cotterill |
| 2022/0067133 A1 | 3/2022 | Fadell et al. |
| 2022/0100841 A1 | 3/2022 | Yang et al. |
| 2022/0124254 A1 | 4/2022 | Dellinger et al. |
| 2022/0180667 A1 | 6/2022 | Cohen et al. |
| 2022/0229895 A1* | 7/2022 | Ranjan ................ G06F 21/35 |
| 2022/0237274 A1 | 7/2022 | Paul et al. |
| 2022/0244838 A1 | 8/2022 | Bereza et al. |
| 2022/0277063 A1 | 9/2022 | Arroyo et al. |
| 2022/0284084 A1 | 9/2022 | Deng |
| 2022/0342972 A1 | 10/2022 | Van Os et al. |
| 2022/0351549 A1 | 11/2022 | Van Os et al. |
| 2022/0382839 A1* | 12/2022 | Vargas ................ G06N 3/04 |
| 2023/0021247 A1 | 1/2023 | Han et al. |
| 2023/0089689 A1 | 3/2023 | Bordes et al. |
| 2023/0185373 A1 | 6/2023 | Kelly et al. |
| 2023/0214466 A1 | 7/2023 | Fadell et al. |
| 2023/0252779 A1 | 8/2023 | Gonion et al. |
| 2023/0259598 A1 | 8/2023 | Arroyo et al. |
| 2023/0364936 A1 | 11/2023 | Antonakis |
| 2023/0401032 A1 | 12/2023 | Cohen et al. |
| 2023/0409160 A1 | 12/2023 | Han et al. |
| 2024/0184869 A1 | 6/2024 | Van Os et al. |

FOREIGN PATENT DOCUMENTS

| | | |
|---|---|---|
| AU | 2017100556 A4 | 6/2017 |
| CA | 2949642 A1 | 6/2017 |
| CN | 1163669 A | 10/1997 |
| CN | 1183475 A | 6/1998 |
| CN | 1220433 A | 6/1999 |
| CN | 1335557 A | 2/2002 |
| CN | 1452739 A | 10/2003 |
| CN | 1484425 A | 3/2004 |
| CN | 1183475 C | 1/2005 |
| CN | 1592914 A | 3/2005 |
| CN | 1663174 A | 8/2005 |
| CN | 1685357 A | 10/2005 |
| CN | 1695163 A | 11/2005 |
| CN | 1741104 A | 3/2006 |
| CN | 1742252 A | 3/2006 |
| CN | 1801708 A | 7/2006 |
| CN | 1836397 A | 9/2006 |
| CN | 1846221 A | 10/2006 |
| CN | 1908981 A | 2/2007 |
| CN | 1960546 A | 5/2007 |
| CN | 101005681 A | 7/2007 |
| CN | 101035335 A | 9/2007 |
| CN | 101039184 A | 9/2007 |
| CN | 101080737 A | 11/2007 |
| CN | 101171604 A | 4/2008 |
| CN | 101226616 A | 7/2008 |

(56) References Cited

FOREIGN PATENT DOCUMENTS

| | | |
|---|---|---|
| CN | 101227359 A | 7/2008 |
| CN | 101268470 A | 9/2008 |
| CN | 101299694 A | 11/2008 |
| CN | 101341718 A | 1/2009 |
| CN | 101341727 A | 1/2009 |
| CN | 101454795 A | 6/2009 |
| CN | 101485128 A | 7/2009 |
| CN | 101610155 A | 12/2009 |
| CN | 101656548 A | 2/2010 |
| CN | 101719955 A | 6/2010 |
| CN | 101730907 A | 6/2010 |
| CN | 101788880 A | 7/2010 |
| CN | 101816165 A | 8/2010 |
| CN | 101833651 A | 9/2010 |
| CN | 101847139 A | 9/2010 |
| CN | 101960896 A | 1/2011 |
| CN | 102004908 A | 4/2011 |
| CN | 102016877 A | 4/2011 |
| CN | 102065148 A | 5/2011 |
| CN | 102096546 A | 6/2011 |
| CN | 102164213 A | 8/2011 |
| CN | 102202192 A | 9/2011 |
| CN | 102209321 A | 10/2011 |
| CN | 102244530 A | 11/2011 |
| CN | 102265586 A | 11/2011 |
| CN | 102282578 A | 12/2011 |
| CN | 102394919 A | 3/2012 |
| CN | 102396205 A | 3/2012 |
| CN | 102542444 A | 7/2012 |
| CN | 102591889 A | 7/2012 |
| CN | 102737313 A | 10/2012 |
| CN | 102750631 A | 10/2012 |
| CN | 102833423 A | 12/2012 |
| CN | 102841683 A | 12/2012 |
| CN | 202735894 U | 2/2013 |
| CN | 102984195 A | 3/2013 |
| CN | 103020807 A | 4/2013 |
| CN | 103092503 A | 5/2013 |
| CN | 103188280 A | 7/2013 |
| CN | 103209642 A | 7/2013 |
| CN | 103229206 A | 7/2013 |
| CN | 103257826 A | 8/2013 |
| CN | 103262108 A | 8/2013 |
| CN | 103294171 A | 9/2013 |
| CN | 103324909 A | 9/2013 |
| CN | 203179000 U | 9/2013 |
| CN | 103346957 A | 10/2013 |
| CN | 103413218 A | 11/2013 |
| CN | 203299885 U | 11/2013 |
| CN | 103455913 A | 12/2013 |
| CN | 103489095 A | 1/2014 |
| CN | 103501304 A | 1/2014 |
| CN | 103577982 A | 2/2014 |
| CN | 103701605 A | 4/2014 |
| CN | 103763327 A | 4/2014 |
| CN | 103765861 A | 4/2014 |
| CN | 103778533 A | 5/2014 |
| CN | 103853328 A | 6/2014 |
| CN | 104252675 A | 12/2014 |
| CN | 104321778 A | 1/2015 |
| CN | 104361302 A | 2/2015 |
| CN | 104539924 A | 4/2015 |
| CN | 104732396 A | 6/2015 |
| CN | 104753766 A | 7/2015 |
| CN | 104935497 A | 9/2015 |
| CN | 105051651 A | 11/2015 |
| CN | 105093526 A | 11/2015 |
| CN | 105099861 A | 11/2015 |
| CN | 105100123 A | 11/2015 |
| CN | 105389491 A | 3/2016 |
| CN | 105391843 A | 3/2016 |
| CN | 105703909 A | 6/2016 |
| CN | 105827624 A | 8/2016 |
| CN | 105844101 A | 8/2016 |
| CN | 105844462 A | 8/2016 |
| CN | 105868613 A | 8/2016 |
| CN | 105874405 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106487754 A | 3/2017 |
| CN | 106503514 A | 3/2017 |
| CN | 106533918 A | 3/2017 |
| CN | 106575332 A | 4/2017 |
| CN | 106778222 A | 5/2017 |
| CN | 106895554 A | 6/2017 |
| CN | 106961415 A | 7/2017 |
| CN | 107797657 A | 3/2018 |
| CN | 107870690 A | 4/2018 |
| CN | 108574773 A | 9/2018 |
| CN | 109769397 A | 5/2019 |
| DE | 10153591 A1 | 5/2003 |
| EP | 0593386 A2 | 4/1994 |
| EP | 0923018 A2 | 6/1999 |
| EP | 1229496 A2 | 8/2002 |
| EP | 1422589 A1 | 5/2004 |
| EP | 1599862 A2 | 11/2005 |
| EP | 1626330 A1 | 2/2006 |
| EP | 1645989 A2 | 4/2006 |
| EP | 1736908 A2 | 12/2006 |
| EP | 1835697 A2 | 9/2007 |
| EP | 2173298 A1 | 4/2010 |
| EP | 2180665 A1 | 4/2010 |
| EP | 1835697 A3 | 6/2010 |
| EP | 2224348 A1 | 9/2010 |
| EP | 2309410 A1 | 4/2011 |
| EP | 1626330 A4 | 1/2012 |
| EP | 2568693 A2 | 3/2013 |
| EP | 2632193 A2 | 8/2013 |
| EP | 2674889 A2 | 12/2013 |
| EP | 2713298 A1 | 4/2014 |
| EP | 2725521 A2 | 4/2014 |
| EP | 2725537 A1 | 4/2014 |
| EP | 2741175 A2 | 6/2014 |
| EP | 2762997 A2 | 8/2014 |
| EP | 2960822 A1 | 12/2015 |
| EP | 2981115 A2 | 2/2016 |
| EP | 2993619 A1 | 3/2016 |
| EP | 2568693 A3 | 7/2016 |
| EP | 3057024 A1 | 8/2016 |
| EP | 3076334 A1 | 10/2016 |
| EP | 3118761 A1 | 1/2017 |
| EP | 3190563 A1 | 7/2017 |
| EP | 2801972 B1 | 1/2018 |
| EP | 1835697 B1 | 5/2018 |
| EP | 3373132 A2 | 9/2018 |
| EP | 2632193 B1 | 10/2018 |
| EP | 2568693 B1 | 12/2019 |
| EP | 3633963 A1 | 4/2020 |
| GB | 2184576 A | 6/1987 |
| GB | 2312040 A | 10/1997 |
| GB | 2313460 A | 11/1997 |
| GB | 2360618 A | 9/2001 |
| GB | 2466038 A | 6/2010 |
| GB | 2500321 A | 9/2013 |
| IN | 201917024374 A | 9/2020 |
| JP | 4-158434 A | 6/1992 |
| JP | 6-284182 A | 10/1994 |
| JP | 7-146942 A | 6/1995 |
| JP | 7-220008 A | 8/1995 |
| JP | 9-81309 A | 3/1997 |
| JP | 9-128208 A | 5/1997 |
| JP | 9-221950 A | 8/1997 |
| JP | 9-269930 A | 10/1997 |
| JP | 10-69346 A | 3/1998 |
| JP | 10-232934 A | 9/1998 |
| JP | 10-247936 A | 9/1998 |
| JP | 10-269358 A | 10/1998 |
| JP | 11-39385 A | 2/1999 |

(56) References Cited

FOREIGN PATENT DOCUMENTS

| | | |
|---|---|---|
| JP | 11-73530 A | 3/1999 |
| JP | 11-185016 A | 7/1999 |
| JP | 11-242745 A | 9/1999 |
| JP | 2000-259477 A | 9/2000 |
| JP | 2000-283720 A | 10/2000 |
| JP | 2000-315118 A | 11/2000 |
| JP | 2001-92554 A | 4/2001 |
| JP | 2001-92783 A | 4/2001 |
| JP | 2001-103046 A | 4/2001 |
| JP | 2001-155137 A | 6/2001 |
| JP | 2001-331758 A | 11/2001 |
| JP | 2002-49570 A | 2/2002 |
| JP | 2002-99854 A | 4/2002 |
| JP | 2002-149171 A | 5/2002 |
| JP | 2002-159052 A | 5/2002 |
| JP | 2002-515145 A | 5/2002 |
| JP | 2002-183093 A | 6/2002 |
| JP | 2002-207525 A | 7/2002 |
| JP | 2002-222412 A | 8/2002 |
| JP | 2002-288137 A | 10/2002 |
| JP | 2003-16398 A | 1/2003 |
| JP | 2003-67343 A | 3/2003 |
| JP | 2003-141541 A | 5/2003 |
| JP | 2003-143290 A | 5/2003 |
| JP | 2003-150550 A | 5/2003 |
| JP | 2003-178244 A | 6/2003 |
| JP | 2003-298689 A | 10/2003 |
| JP | 2003-346059 A | 12/2003 |
| JP | 2004-86866 A | 3/2004 |
| JP | 2004-104813 A | 4/2004 |
| JP | 2004-194069 A | 7/2004 |
| JP | 2004-252736 A | 9/2004 |
| JP | 2004-265353 A | 9/2004 |
| JP | 2004-532477 A | 10/2004 |
| JP | 2004-313459 A | 11/2004 |
| JP | 2004-334788 A | 11/2004 |
| JP | 2004-348600 A | 12/2004 |
| JP | 2004-348601 A | 12/2004 |
| JP | 2004-356816 A | 12/2004 |
| JP | 2005-4490 A | 1/2005 |
| JP | 2005-71225 A | 3/2005 |
| JP | 2005-84991 A | 3/2005 |
| JP | 2005-115480 A | 4/2005 |
| JP | 2005-122700 A | 5/2005 |
| JP | 2005-143890 A | 6/2005 |
| JP | 2005-202578 A | 7/2005 |
| JP | 2005-521961 A | 7/2005 |
| JP | 2005-523505 A | 8/2005 |
| JP | 2005-293280 A | 10/2005 |
| JP | 2005-317049 A | 11/2005 |
| JP | 2005-327076 A | 11/2005 |
| JP | 2005-339425 A | 12/2005 |
| JP | 2006-12080 A | 1/2006 |
| JP | 2006-18613 A | 1/2006 |
| JP | 2006-31182 A | 2/2006 |
| JP | 2006-85559 A | 3/2006 |
| JP | 2006-93912 A | 4/2006 |
| JP | 2006-107288 A | 4/2006 |
| JP | 2006-114018 A | 4/2006 |
| JP | 2006-115043 A | 4/2006 |
| JP | 2006-127502 A | 5/2006 |
| JP | 2006-163960 A | 6/2006 |
| JP | 2006-172180 A | 6/2006 |
| JP | 2006-189999 A | 7/2006 |
| JP | 2006-191245 A | 7/2006 |
| JP | 2006-197071 A | 7/2006 |
| JP | 2006-202278 A | 8/2006 |
| JP | 2006-215705 A | 8/2006 |
| JP | 2006-520053 A | 8/2006 |
| JP | 2006212185 A | 8/2006 |
| JP | 2006-259930 A | 9/2006 |
| JP | 2006-259931 A | 9/2006 |
| JP | 2006-277670 A | 10/2006 |
| JP | 2006-303701 A | 11/2006 |
| JP | 2006-308375 A | 11/2006 |
| JP | 2007-11667 A | 1/2007 |
| JP | 2007-34637 A | 2/2007 |
| JP | 2007-52574 A | 3/2007 |
| JP | 2007-52770 A | 3/2007 |
| JP | 2007-58397 A | 3/2007 |
| JP | 2007-71008 A | 3/2007 |
| JP | 2007-507011 A | 3/2007 |
| JP | 2007-102278 A | 4/2007 |
| JP | 2007-116318 A | 5/2007 |
| JP | 2007-116602 A | 5/2007 |
| JP | 2007-128201 A | 5/2007 |
| JP | 2007-135149 A | 5/2007 |
| JP | 2007-140696 A | 6/2007 |
| JP | 2007-141002 A | 6/2007 |
| JP | 2007-148801 A | 6/2007 |
| JP | 2007-199984 A | 8/2007 |
| JP | 2007-226293 A | 9/2007 |
| JP | 2007-226794 A | 9/2007 |
| JP | 2007-304854 A | 11/2007 |
| JP | 2007-334637 A | 12/2007 |
| JP | 2008-5180 A | 1/2008 |
| JP | 2008-15800 A | 1/2008 |
| JP | 2008-33681 A | 2/2008 |
| JP | 2008-46692 A | 2/2008 |
| JP | 2008-70926 A | 3/2008 |
| JP | 2008-71158 A | 3/2008 |
| JP | 2008-75424 A | 4/2008 |
| JP | 2008-250601 A | 10/2008 |
| JP | 2009-9434 A | 1/2009 |
| JP | 2009-15543 A | 1/2009 |
| JP | 2009-42802 A | 2/2009 |
| JP | 2009-49878 A | 3/2009 |
| JP | 2009-87156 A | 4/2009 |
| JP | 2009-99076 A | 5/2009 |
| JP | 2009-135770 A | 6/2009 |
| JP | 2009-211166 A | 9/2009 |
| JP | 2009-240523 A | 10/2009 |
| JP | 2009-258991 A | 11/2009 |
| JP | 2010-9513 A | 1/2010 |
| JP | 2010-15417 A | 1/2010 |
| JP | 2010-503082 A | 1/2010 |
| JP | 2010-28404 A | 2/2010 |
| JP | 2010-102718 A | 5/2010 |
| JP | 2010-517390 A | 5/2010 |
| JP | 2010-152506 A | 7/2010 |
| JP | 2010-165012 A | 7/2010 |
| JP | 2010-524051 A | 7/2010 |
| JP | 2010-211577 A | 9/2010 |
| JP | 2010-211579 A | 9/2010 |
| JP | 2010-250386 A | 11/2010 |
| JP | 2010-271779 A | 12/2010 |
| JP | 2010-541046 A | 12/2010 |
| JP | 2011-22687 A | 2/2011 |
| JP | 2011-53849 A | 3/2011 |
| JP | 2011-54120 A | 3/2011 |
| JP | 2011-65590 A | 3/2011 |
| JP | 2011-97287 A | 5/2011 |
| JP | 2011-519439 A | 7/2011 |
| JP | 2011-192228 A | 9/2011 |
| JP | 2011-209787 A | 10/2011 |
| JP | 2011-217146 A | 10/2011 |
| JP | 2011-237857 A | 11/2011 |
| JP | 2011-242924 A | 12/2011 |
| JP | 2012-8951 A | 1/2012 |
| JP | 2012-8985 A | 1/2012 |
| JP | 2012-504273 A | 2/2012 |
| JP | 2012-73724 A | 4/2012 |
| JP | 2012-508930 A | 4/2012 |
| JP | 2012-99025 A | 5/2012 |
| JP | 2012-164070 A | 8/2012 |
| JP | 2012-168802 A | 9/2012 |
| JP | 2012-194661 A | 10/2012 |
| JP | 2012-208719 A | 10/2012 |
| JP | 2012-215981 A | 11/2012 |
| JP | 2012-529699 A | 11/2012 |
| JP | 2013-9073 A | 1/2013 |
| JP | 2013-20496 A | 1/2013 |
| JP | 2013-30052 A | 2/2013 |
| JP | 2013-34322 A | 2/2013 |

(56) References Cited

FOREIGN PATENT DOCUMENTS

| | | |
|---|---|---|
| JP | 2013-58828 A | 3/2013 |
| JP | 2013-88906 A | 5/2013 |
| JP | 2013-114317 A | 6/2013 |
| JP | 2013-114498 A | 6/2013 |
| JP | 2013-140540 A | 7/2013 |
| JP | 2013-530445 A | 7/2013 |
| JP | 2013-149206 A | 8/2013 |
| JP | 2013-533532 A | 8/2013 |
| JP | 2013-534008 A | 8/2013 |
| JP | 5267966 B2 | 8/2013 |
| JP | 2013-178723 A | 9/2013 |
| JP | 2013-534662 A | 9/2013 |
| JP | 2013-232197 A | 11/2013 |
| JP | 2014-44719 A | 3/2014 |
| JP | 2014-44724 A | 3/2014 |
| JP | 2014-75155 A | 4/2014 |
| JP | 2014-102845 A | 6/2014 |
| JP | 2014-110009 A | 6/2014 |
| JP | 2014-110638 A | 6/2014 |
| JP | 2014-131359 A | 7/2014 |
| JP | 2014-517366 A | 7/2014 |
| JP | 2014-230061 A | 12/2014 |
| JP | 2014-239478 A | 12/2014 |
| JP | 2015-14923 A | 1/2015 |
| JP | 2015-36925 A | 2/2015 |
| JP | 2015-56142 A | 3/2015 |
| JP | 2015-75877 A | 4/2015 |
| JP | 2015-187783 A | 10/2015 |
| JP | 2015-207051 A | 11/2015 |
| JP | 2016-508007 A | 3/2016 |
| JP | 2016-76799 A | 5/2016 |
| JP | 2016-521403 A | 7/2016 |
| JP | 2016-162000 A | 9/2016 |
| JP | 2016-534435 A | 11/2016 |
| JP | 6023162 B2 | 11/2016 |
| JP | 2016-224960 A | 12/2016 |
| JP | 2017-16170 A | 1/2017 |
| JP | 2017-500656 A | 1/2017 |
| JP | 2017-91129 A | 5/2017 |
| JP | 2017-102952 A | 6/2017 |
| JP | 2017-117159 A | 6/2017 |
| JP | 2017-138846 A | 8/2017 |
| JP | 2018-36965 A | 3/2018 |
| JP | 2018-136886 A | 8/2018 |
| KR | 10-2000-0030544 A | 6/2000 |
| KR | 10-2001-0019345 A | 3/2001 |
| KR | 2001-0074059 A | 8/2001 |
| KR | 2002-0002484 A | 1/2002 |
| KR | 10-2002-0019031 A | 3/2002 |
| KR | 10-2002-0022295 A | 3/2002 |
| KR | 10-2002-0038162 A | 5/2002 |
| KR | 10-2002-0087665 A | 11/2002 |
| KR | 10-2004-0005505 A | 1/2004 |
| KR | 10-2004-0049502 A | 6/2004 |
| KR | 10-2005-0061975 A | 6/2005 |
| KR | 10-2006-0018063 A | 2/2006 |
| KR | 10-0652624 B1 | 12/2006 |
| KR | 10-2007-0026808 A | 3/2007 |
| KR | 10-2007-0081773 A | 8/2007 |
| KR | 10-2007-0120125 A | 12/2007 |
| KR | 10-0805341 B1 | 2/2008 |
| KR | 10-2008-0064395 A | 7/2008 |
| KR | 10-2009-0011323 A | 2/2009 |
| KR | 10-2009-0089472 A | 8/2009 |
| KR | 10-2010-0074218 A | 7/2010 |
| KR | 10-2011-0056561 A | 5/2011 |
| KR | 10-2011-0098435 A | 9/2011 |
| KR | 10-2011-0101683 A | 9/2011 |
| KR | 10-2011-0114732 A | 10/2011 |
| KR | 10-2012-0040693 A | 4/2012 |
| KR | 10-2012-0052150 A | 5/2012 |
| KR | 10-2012-0076675 A | 7/2012 |
| KR | 10-2012-0087333 A | 8/2012 |
| KR | 10-2012-0127842 A | 11/2012 |
| KR | 10-2013-0011423 A | 1/2013 |
| KR | 10-2013-0027326 A | 3/2013 |
| KR | 10-1253392 B1 | 4/2013 |
| KR | 10-2013-0044292 A | 5/2013 |
| KR | 101312097 B1 | 9/2013 |
| KR | 10-2013-0116905 A | 10/2013 |
| KR | 10-1330962 B1 | 11/2013 |
| KR | 10-1342208 B1 | 12/2013 |
| KR | 10-2014-0015171 A | 2/2014 |
| KR | 10-2014-0018019 A | 2/2014 |
| KR | 10-2014-0026263 A | 3/2014 |
| KR | 10-2014-0055429 A | 5/2014 |
| KR | 10-2014-0137400 A | 12/2014 |
| KR | 10-2015-0013264 A | 2/2015 |
| KR | 10-2015-0029495 A | 3/2015 |
| KR | 10-2015-0068013 A | 6/2015 |
| KR | 10-2016-0012636 A | 2/2016 |
| KR | 10-2016-0014623 A | 2/2016 |
| KR | 10-2016-0026337 A | 3/2016 |
| KR | 10-2016-0026791 A | 3/2016 |
| KR | 10-2016-0045633 A | 4/2016 |
| KR | 10-2016-0048215 A | 5/2016 |
| KR | 10-2016-0054573 A | 5/2016 |
| KR | 10-2016-0099432 A | 8/2016 |
| KR | 10-2017-0023063 A | 3/2017 |
| KR | 10-2017-0065563 A | 6/2017 |
| KR | 10-1820573 B1 | 1/2018 |
| TW | 200529636 A | 9/2005 |
| TW | 200601176 A | 1/2006 |
| TW | 200642408 A | 12/2006 |
| TW | 200919255 A | 5/2009 |
| TW | 201137722 A | 11/2011 |
| TW | 201316247 A | 4/2013 |
| TW | 201324310 A | 6/2013 |
| TW | 201409345 A | 3/2014 |
| WO | 1997/41528 A1 | 11/1997 |
| WO | 1998/58346 A1 | 12/1998 |
| WO | 1999/28701 A1 | 6/1999 |
| WO | 1999/44114 A1 | 9/1999 |
| WO | 00/55812 A1 | 9/2000 |
| WO | 2001/57757 A1 | 8/2001 |
| WO | 2001/80017 A1 | 10/2001 |
| WO | 2002/01864 A1 | 1/2002 |
| WO | 2003/038698 A1 | 5/2003 |
| WO | 2003/083793 A2 | 10/2003 |
| WO | 2004/029862 A1 | 4/2004 |
| WO | 2004/079530 A2 | 9/2004 |
| WO | 2004/104813 A1 | 12/2004 |
| WO | 2005/008568 A1 | 1/2005 |
| WO | 2005/020036 A2 | 3/2005 |
| WO | 2005/048832 A1 | 6/2005 |
| WO | 2005/106774 A2 | 11/2005 |
| WO | 2006/004155 A1 | 1/2006 |
| WO | 2006/051462 A1 | 5/2006 |
| WO | 2006/113834 A2 | 10/2006 |
| WO | 2007/029710 A1 | 3/2007 |
| WO | 2007/060102 A1 | 5/2007 |
| WO | 2007/070014 A1 | 6/2007 |
| WO | 2007/072447 A2 | 6/2007 |
| WO | 2007/073422 A1 | 6/2007 |
| WO | 2007/076210 A1 | 7/2007 |
| WO | 2007/116521 A1 | 10/2007 |
| WO | 2008/008101 A2 | 1/2008 |
| WO | 2008/024454 A1 | 2/2008 |
| WO | 2008/030779 A2 | 3/2008 |
| WO | 2008/147457 A1 | 12/2008 |
| WO | 2008/151229 A1 | 12/2008 |
| WO | 2009/042392 A2 | 4/2009 |
| WO | 2009/045335 A2 | 4/2009 |
| WO | 2009/108645 A1 | 9/2009 |
| WO | 2010/039337 A2 | 4/2010 |
| WO | 2010/056484 A2 | 5/2010 |
| WO | 2010/059306 A2 | 5/2010 |
| WO | 2010/086993 A1 | 8/2010 |
| WO | 2010/120972 A1 | 10/2010 |
| WO | 2010/128442 A2 | 11/2010 |
| WO | 2011/130422 A2 | 10/2011 |
| WO | 2012/068193 A2 | 5/2012 |
| WO | 2012/083113 A2 | 6/2012 |
| WO | 2012/128750 A1 | 9/2012 |

(56) References Cited

FOREIGN PATENT DOCUMENTS

| | | |
|---|---|---|
| WO | 2012/129231 A1 | 9/2012 |
| WO | 2013/000150 A1 | 1/2013 |
| WO | 2013/003372 A1 | 1/2013 |
| WO | 2013/023224 A2 | 2/2013 |
| WO | 2013/066659 A1 | 5/2013 |
| WO | 2013/096943 A1 | 6/2013 |
| WO | 2013/096949 A1 | 6/2013 |
| WO | 2013/097882 A1 | 7/2013 |
| WO | 2013/125222 A1 | 8/2013 |
| WO | 2013/137503 A1 | 9/2013 |
| WO | 2013/169849 A2 | 11/2013 |
| WO | 2013/169877 A2 | 11/2013 |
| WO | 2013/177500 A1 | 11/2013 |
| WO | 2013/177548 A1 | 11/2013 |
| WO | 2013/181102 A1 | 12/2013 |
| WO | 2014/004556 A1 | 1/2014 |
| WO | 2014/012456 A1 | 1/2014 |
| WO | 2014/057795 A1 | 4/2014 |
| WO | 2014/078965 A1 | 5/2014 |
| WO | 2014/105274 A1 | 7/2014 |
| WO | 2014/105276 A1 | 7/2014 |
| WO | 2014/115605 A1 | 7/2014 |
| WO | 2014/124332 A2 | 8/2014 |
| WO | 2014/147297 A1 | 9/2014 |
| WO | 2014/193465 A1 | 12/2014 |
| WO | 2015/057320 A1 | 4/2015 |
| WO | 2015/062382 A1 | 5/2015 |
| WO | 2015/069153 A1 | 5/2015 |
| WO | 2015/088141 A1 | 6/2015 |
| WO | 2015/119605 A1 | 8/2015 |
| WO | 2015/120019 A1 | 8/2015 |
| WO | 2015/195216 A1 | 12/2015 |
| WO | 2015/196448 A1 | 12/2015 |
| WO | 2016/025036 A1 | 2/2016 |
| WO | 2016/029853 A1 | 3/2016 |
| WO | 2016/036218 A1 | 3/2016 |
| WO | 2016/049439 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/189390 A2 | 12/2016 |
| WO | 2016/196054 A1 | 12/2016 |
| WO | 2016/201037 A1 | 12/2016 |
| WO | 2017/012302 A1 | 1/2017 |
| WO | 2017/030223 A1 | 2/2017 |
| WO | 2017/043314 A1 | 3/2017 |
| WO | 2017/094052 A1 | 6/2017 |
| WO | 2017/218094 A1 | 12/2017 |
| WO | 2018/048632 A1 | 3/2018 |
| WO | 2018/212801 A1 | 11/2018 |
| WO | 2018/226265 A1 | 12/2018 |
| WO | 2019/033129 A2 | 2/2019 |
| WO | 2021/216044 A1 | 10/2021 |

OTHER PUBLICATIONS

Applicant-Initiated Interview Summary received for U.S. Appl. No. 17/409,570, mailed on Dec. 7, 2022, 4 pages.
Applicant-Initiated Interview Summary received for U.S. Appl. No. 17/409,570, mailed on Nov. 3, 2022, 5 pages.
Applicant-Initiated Interview Summary received for U.S. Appl. No. 17/409,570, mailed on Nov. 29, 2022, 4 pages.
Applicant-Initiated Interview Summary received for U.S. Appl. No. 17/863,974, mailed on Dec. 9, 2022, 2 pages.
Brief Communication Regarding Oral Proceedings received for European Patent Application No. 17799904.2, mailed on Sep. 13, 2022, 1 page.
Brief Communication Regarding Oral Proceedings received for European Patent Application No. 19160348.9, mailed on Nov. 8, 2022, 3 pages.
Corrected Notice of Allowance received for U.S. Appl. No. 16/369,473, mailed on Sep. 9, 2022, 2 pages.
Decision to Grant received for European Patent Application No. 19194828.0, mailed on Oct. 27, 2022, 3 pages.
Decision to Grant received for European Patent Application No. 19769336.9, mailed on Oct. 7, 2022, 2 pages.
Decision to Refuse received for European Patent Application No. 17799904.2, mailed on Sep. 19, 2022, 4 pages.
Decision to Refuse received for European Patent Application No. 19150528.8, mailed on Sep. 9, 2022, 4 pages.
Extended European Search Report received for European Patent Application No. 22188377.0, mailed on Oct. 27, 2022, 8 pages.
Feng et al., "A Prototype Three-Dimensional Position Sensitive CdZnTe Detector Array", IEEE Transactions On Nuclear Science, vol. 54, No. 4., Aug. 2007, 6 pages.
Final Office Action received for U.S. Appl. No. 17/193,991, mailed on Dec. 22, 2022, 6 pages.
Final Office Action received for U.S. Appl. No. 17/409,570, mailed on Nov. 9, 2022, 37 pages.
Final Office Action received for U.S. Appl. No. 17/516,495, mailed on Nov. 15, 2022, 12 pages.
Final Office Action received for U.S. Appl. No. 17/863,974, mailed on Dec. 16, 2022, 23 pages.
Intention to Grant received for European Patent Application No. 20186286.9, mailed on Sep. 15, 2022, 9 pages.
Jianxin et al., "Fingerprint-based Authentication in Networking Environment", Artificial Intelligence Institute of Zhejiang University, Hangzhou Zhejiang 310027, China, Dec. 28, 2001, 4 pages (Official Copy Only) (See Communication under 37 CFR § 1.98(a) (3)).
Non-Final Office Action received for U.S. Appl. No. 16/938,362, mailed on Sep. 14, 2022, 14 pages.
Non-Final Office Action received for U.S. Appl. No. 17/193,991, mailed on Oct. 6, 2022, 7 pages.
Non-Final Office Action received for U.S. Appl. No. 17/409,570, mailed on Sep. 21, 2022, 35 pages.
Non-Final Office Action received for U.S. Appl. No. 17/863,974, mailed on Oct. 24, 2022, 23 pages.
Notice of Acceptance received for Australian Patent Application No. 2021250944, mailed on Nov. 14, 2022, 3 pages.
Notice of Acceptance received for Australian Patent Application No. 2021254574, mailed on Dec. 14, 2022, 3 pages.
Notice of Allowance received for Chinese Patent Application No. 201710198190.6, mailed on Sep. 23, 2022, 7 pages (3 pages of English Translation and 4 pages of Official Copy).
Notice of Allowance received for Japanese Patent Application No. 2021-001028, mailed on Sep. 9, 2022, 4 pages (1 page of English Translation and 3 pages of Official Copy).
Notice of Allowance received for Japanese Patent Application No. 2021-131310, mailed on Dec. 9, 2022, 4 pages (1 pages of English Translation and 3 pages of Official Copy).
Notice of Allowance received for U.S. Appl. No. 17/087,855, mailed on Nov. 25, 2022, 8 pages.
Notice of Allowance received for U.S. Appl. No. 17/498,557, mailed on Dec. 2, 2022, 9 pages.
Office Action received for Australian Patent Application No. 2019281965, mailed on Nov. 18, 2022, 7 pages.
Office Action received for Australian Patent Application No. 2021250944, mailed on Sep. 16, 2022, 3 pages.
Office Action received for Australian Patent Application No. 2021254574, mailed on Oct. 15, 2022, 3 pages.
Office Action received for Australian Patent Application No. 2022200900, mailed on Nov. 30, 2022, 6 pages.
Office Action received for Chinese Patent Application No. 201910109868.8, mailed on Nov. 18, 2022, 32 pages (17 pages of English Translation and 15 pages of Official Copy).
Office Action received for Chinese Patent Application No. 201980009669.8, mailed on Nov. 22, 2022, 16 pages (10 pages of English Translation and 6 pages of Official Copy).
Office Action received for European Patent Application No. 20198076.0, mailed on Sep. 22, 2022, 7 pages.
Office Action received for Japanese Patent Application No. 2020-184605, mailed on Dec. 12, 2022, 9 pages (4 pages of English Translation and 5 pages of Official Copy).

(56) References Cited

OTHER PUBLICATIONS

Office Action received for Japanese Patent Application No. 2020-566978, mailed on Sep. 26, 2022, 4 pages (2 pages of English Translation and 2 pages of Official Copy).
Office Action received for Japanese Patent Application No. 2021-084065, mailed on Nov. 14, 2022, 10 pages (5 pages of English Translation and 5 pages of Official Copy).
Office Action received for Japanese Patent Application No. 2021-131310, mailed on Sep. 2, 2022, 9 pages (5 pages of English Translation and 4 pages of Official Copy).
Office Action received for Japanese Patent Application No. 2021-149549, mailed on Oct. 21, 2022, 4 pages (2 pages of English Translation and 2 pages of Official Copy).
Result of Consultation received for European Patent Application No. 18208881.5, mailed on Dec. 6, 2022, 10 pages.
Summons to Attend Oral Proceedings received for European Patent Application No. 15727291.5, mailed on Sep. 12, 2022, 13 pages.
Summons to Attend Oral Proceedings received for European Patent Application No. 16201195.1, mailed on Sep. 12, 2022, 14 pages.
The Youtube Tech Guy, "How to Setup Face Unlock on Your Android", Available online at: https://www.youtube.com/watch?v=iJYFLYKYvTk, Apr. 12, 2012, 1 page.
Applicant-Initiated Interview Summary received for U.S. Appl. No. 17/479,974, mailed on Nov. 1, 2023, 2 pages.
Intention to Grant received for European Patent Application No. 20198076.0, mailed on Oct. 25, 2023, 11 pages.
Non-Final Office Action received for U.S. Appl. No. 18/136,819, mailed on Nov. 7, 2023, 8 pages.
Notice of Allowance received for Korean Patent Application No. 10-2022-7029609, mailed on Oct. 23. 2023, 8 pages (2 pages of English Translation and 6 pages of Official Copy).
Notice of Allowance received for U.S. Appl. No. 17/496,716, mailed on Nov. 8, 2023, 24 pages.
Office Action received for Australian Patent Application No. 2022203027, mailed on Oct. 25, 2023, 5 pages.
Office Action received for Australian Patent Application No. 2022279466, mailed on Oct. 25, 2023, 3 pages.
Office Action received for Chinese Patent Application No. 201910901500.5, mailed on Sep. 29, 2023, 15 pages (5 pages of English Translation and 10 pages of Official Copy).
Office Action received for Japanese Patent Application No. 2022-140146, mailed on Oct. 20, 2023, 8 pages (4 pages of English Translation and 4 pages of Official Copy).
Applicant-Initiated Interview Summary received for U.S. Appl. No. 17/863,974, mailed on May 25, 2023, 2 pages.
Office Action received for Korean Patent Application No. 10-2022-7004578, mailed on May 11, 2023, 8 pages (4 pages of English Translation and 4 pages of Official Copy).
Supplemental Notice of Allowance received for U.S. Appl. No. 17/955,311, mailed on May 26, 2023, 2 pages.
Final Office Action received for U.S. Appl. No. 17/479,974, mailed on Jun. 28, 2023, 32 pages.
Non-Final Office Action received for U.S. Appl. No. 17/962,369, mailed on Jun. 9, 2023, 17 pages.
Notice of Allowance received for U.S. Appl. No. 17/519,025, mailed on Jun. 22, 2023, 7 pages.
Office Action received for Chinese Patent Application No. 202211285112.7, mailed on May 18, 2023, 16 pages (6 pages of English Translation and 10 pages of Official Copy).
Applicant-Initiated Interview Summary received for U.S. Appl. No. 17/725,311, mailed on Jan. 16, 2024, 6 pages.
Applicant-Initiated Interview Summary received for U.S. Appl. No. 18/105,191, mailed on Jan. 17, 2024, 2 pages.
Notice of Acceptance received for Australian Patent Application No. 2022279466, mailed on Jan. 10, 2024, 3 pages.
Notice of Hearing received for Indian Patent Application No. 201817036875, mailed on Jan. 11, 2024, 3 pages.
Office Action received for Australian Patent Application No. 2022218517, mailed on Dec. 21, 2023, 5 pages.
Office Action received for Chinese Patent Application No. 201910901500.5, mailed on Dec. 22, 2023, 19 pages (6 pages of English Translation and 13 pages of Official Copy).
amazon.com, "Visual ID on Echo Show", Online Available at: <https://www.amazon.com/b?ie=UTF8&node=23615589011>, retrieved on Aug. 16, 2023, 3 pages.
Decision to Refuse received for Japanese Patent Application No. 2022-151495, mailed on Jan. 12, 2024, 14 pages (7 pages of English Translation and 7 pages of Official Copy).
Final Office Action received for U.S. Appl. No. 17/479,974, mailed on Jan. 19, 2024, 16 pages.
Final Office Action received for U.S. Appl. No. 17/900,734, mailed on Jan. 19, 2024, 11 pages.
Notice of Allowance received for Japanese Patent Application No. 2022-100394, mailed on Jan. 12, 2024, 4 pages (1 page of English Translation and 3 pages of Official Copy).
Office Action received for Australian Patent Application No. 2023200797, mailed on Jan. 23, 2024, 5 pages.
Applicant-Initiated Interview Summary received for U.S. Appl. No. 17/496,716, mailed on Sep. 14, 2023, 2 pages.
Office Action received for Australian Patent Application No. 2022200900, mailed on Sep. 8, 2023, 4 pages.
Office Action received for Australian Patent Application No. 2023203469, mailed on Aug. 31, 2023, 5 pages.
Office Action received for German Patent Application No. 112014004134.3, mailed on Jul. 31, 2023, 11 pages (1 page of English Translation and 10 pages of Official Copy).
Examiner's Answer to Appeal Brief received for U.S. Appl. No. 17/516,495, mailed on Jul. 28, 2023, 13 pages.
International Preliminary Report on Patentability received for PCT Patent Application No. PCT/US2022/013730, mailed on Aug. 3, 2023, 15 pages.
Notice of Allowance received for Korean Patent Application No. 10-2022-7014519, mailed on Jul. 28, 2023, 7 pages (2 pages of English Translation and 5 pages of Official Copy).
Notice of Allowance received for Korean Patent Application No. 10-2022-7015289, mailed on Jul. 31, 2023, 8 pages (2 pages of English Translation and 6 pages of Official Copy).
Notice of Allowance received for U.S. Appl. No. 17/863,974, mailed on Aug. 9, 2023, 2 pages.
Office Action received for Australian Patent Application No. 2022218517, mailed on Jul. 24, 2023, 6 pages.
Office Action received for Chinese Patent Application No. 201910901500.5, mailed on Jun. 30, 2023, 27 pages (9 pages of English Translation and 18 pages of Official Copy).
Office Action received for Korean Patent Application No. 10-2022-7033655, mailed on Jul. 27, 2023, 5 pages (2 pages of English Translation and 3 pages of Official Copy).
Non-Final Office Action received for U.S. Appl. No. 17/479,974, mailed on Oct. 10, 2023, 20 pages.
Office Action received for Japanese Patent Application No. 2022-100394, mailed on Sep. 29, 2023, 6 pages (3 pages of English Translation and 3 pages of Official Copy).
Office Action received for Japanese Patent Application No. 2022-151495, mailed on Sep. 29, 2023, 11 pages (5 pages of English Translation and 6 pages of Official Copy).
Office Action received for Korean Patent Application No. 10-2022-0150750, mailed on Sep. 20, 2023, 15 pages (7 pages of English Translation and 8 pages of Official Copy).
Office Action received for Korean Patent Application No. 10-2023-7024803, mailed on Sep. 19, 2023, 7 pages (3 pages of English Translation and 4 pages of Official Copy).
Advisory Action received for U.S. Appl. No. 14/503,296, mailed on Oct. 2, 2015, 3 pages.
Advisory Action received for U.S. Appl. No. 14/980,344, mailed on Feb. 10, 2020, 5 pages.
Advisory Action received for U.S. Appl. No. 14/980,344, mailed on Mar. 27, 2019, 5 pages.
Advisory Action received for U.S. Appl. No. 15/137,944, mailed on May 11, 2017, 6 pages.
Advisory Action received for U.S. Appl. No. 16/164,561, mailed on Nov. 14, 2019, 2 pages.

(56) References Cited

OTHER PUBLICATIONS

Advisory Action received for U.S. Appl. No. 16/369,473, mailed on May 12, 2022, 4 pages.
Advisory Action received for U.S. Appl. No. 16/422,736, mailed on Mar. 12, 2021, 3 pages.
Advisory Action received for U.S. Appl. No. 15/250,152, mailed on Mar. 25, 2019, 5 pages.
Applicant Initiated Interview Summary received for U.S. Appl. No. 13/243,045, mailed on Oct. 22, 2019, 3 pages.
Applicant Initiated Interview Summary received for U.S. Appl. No. 15/714,887, mailed on Aug. 19, 2020, 4 pages.
Applicant Initiated Interview Summary received for U.S. Appl. No. 15/714,887, mailed on Mar. 17, 2020, 5 pages.
Applicant Initiated Interview Summary received for U.S. Appl. No. 16/147,023, mailed on Oct. 29, 2019, 3 pages.
Applicant Initiated Interview Summary received for U.S. Appl. No. 16/553,622, mailed on Aug. 3, 2020, 3 pages.
Applicant-Initiated Interview Summary received for U.S. Appl. No. 14/612,214, mailed on Feb. 18, 2020, 3 pages.
Applicant-Initiated Interview Summary received for U.S. Appl. No. 16/125,267, mailed on Feb. 8, 2021, 3 pages.
Applicant-Initiated Interview Summary received for U.S. Appl. No. 16/125,267, mailed on Jan. 25, 2022, 5 pages.
Applicant-Initiated Interview Summary received for U.S. Appl. No. 16/125,267, mailed on Jun. 25, 2021, 5 pages.
Applicant-Initiated Interview Summary received for U.S. Appl. No. 16/125,267, mailed on Oct. 25, 2021, 4 pages.
Applicant-Initiated Interview Summary received for U.S. Appl. No. 16/125,267, mailed on Sep. 14, 2020, 5 pages.
Applicant-Initiated Interview Summary received for U.S. Appl. No. 16/369,355, mailed on Jul. 28, 2021, 2 pages.
Applicant-Initiated Interview Summary received for U.S. Appl. No. 16/369,473, mailed on Apr. 16, 2021, 2 pages.
Applicant-Initiated Interview Summary received for U.S. Appl. No. 16/369,473, mailed on Oct. 13, 2020, 5 pages.
Applicant-Initiated Interview Summary received for U.S. Appl. No. 16/369,473, mailed on Oct. 18, 2021, 2 pages.
Applicant-Initiated Interview Summary received for U.S. Appl. No. 16/369,473, mailed on Sep. 21, 2020, 5 pages.
Applicant-Initiated Interview Summary received for U.S. Appl. No. 16/422,736, mailed on Feb. 24, 2021, 3 pages.
Applicant-Initiated Interview Summary received for U.S. Appl. No. 16/422,736, mailed on Sep. 28, 2020, 3 pages.
Applicant-Initiated Interview Summary received for U.S. Appl. No. 16/667,271, mailed on Apr. 8, 2020, 3 pages.
Applicant-Initiated Interview Summary received for U.S. Appl. No. 16/670,949, mailed on Apr. 6, 2021, 2 pages.
Applicant-Initiated Interview Summary received for U.S. Appl. No. 17/087,855, mailed on Feb. 28, 2022, 2 pages.
Applicant-Initiated Interview Summary received for U.S. Appl. No. 17/087,855, mailed on Nov. 5, 2021, 2 pages.
Board Decision received for Chinese Patent Application No. 201410407626.4, mailed on Jun. 8, 2020, 17 pages (1 page of English Translation and 16 pages of Official Copy).
Board Decision received for Chinese Patent Application No. 201510284896.5, mailed on Nov. 19, 2021, 14 pages (1 page of English Translation and 13 pages of Official Copy).
Board Decision received for Chinese Patent Application No. 201580043701.6, mailed on Aug. 19, 2021, 2 pages (1 page of English Translation and 1 page of Official Copy).
Board Decision received for Chinese Patent Application No. 201710094150.7, mailed on Dec. 22, 2021, 20 pages (1 page of English Translation and 19 pages of Official Copy).
Board Decision received for Chinese Patent Application No. 201810094316.X, mailed on Dec. 3, 2021, 18 pages (1 page of English Translation and 17 pages of Official Copy).
Board Opinion received for Chinese Patent Application No. 201610459968.X, mailed on Mar. 3, 2022, 11 pages (3 pages of English Translation and 8 pages of Official Copy).
Board Opinion received for Chinese Patent Application No. 201810094316.X, mailed on Sep. 30, 2021, 11 pages (3 pages of English Translation and 8 pages of Official Copy).
Board Opinion received for Chinese Patent Application No. 201810338826.7, mailed on Jan. 19, 2022, 18 pages (6 pages of English Translation and 12 pages of Official Copy).
Brief Communication Regarding Oral Proceedings received for European Patent Application No. 15727291.5, mailed on Jun. 9, 2020, 12 pages.
Brief Communication Regarding Oral Proceedings received for European Patent Application No. 16201159.7, mailed on Jun. 29, 2021, 13 pages.
Brief Communication regarding Oral Proceedings received for European Patent Application No. 16201205.8, mailed on May 29, 2020, 29 pages.
Brief Communication Regarding Oral Proceedings received for European Patent Application No. 18713408.5, mailed on Sep. 28, 2021, 2 pages.
Brief Communication Regarding Oral Proceedings received for European Patent Application No. 18830326.7, mailed on Jun. 30, 2021, 2 pages.
Brief Communication Regarding Oral Proceedings received for European Patent Application No. 19194828.0, mailed on May 6, 2022, 1 page.
Certificate of Examination received for Australian Patent Application No. 2017100553, mailed on Jan. 17, 2018, 2 pages.
Corrected Notice of Allowance received for U.S. Appl. No. 12/074,985, mailed on Oct. 10, 2013, 4 pages.
Corrected Notice of Allowance received for U.S. Appl. No. 14/612,214, mailed on May 1, 2020, 2 pages.
Corrected Notice of Allowance received for U.S. Appl. No. 14/719,217, mailed on Apr. 22, 2019, 2 pages.
Corrected Notice of Allowance received for U.S. Appl. No. 14/719,217, mailed on Mar. 20, 2019, 2 pages.
Corrected Notice of Allowance received for U.S. Appl. No. 15/017,436, mailed on Sep. 2, 2016, 5 pages.
Corrected Notice of Allowance received for U.S. Appl. No. 15/137,944, mailed on Jan. 11, 2018, 2 pages.
Corrected Notice of Allowance received for U.S. Appl. No. 15/137,944, mailed on Jan. 19, 2018, 2 pages.
Corrected Notice of Allowance received for U.S. Appl. No. 15/269,901, mailed on Oct. 3, 2017, 4 pages.
Corrected Notice of Allowance received for U.S. Appl. No. 15/294,439, mailed on Mar. 13, 2019, 4 pages.
Corrected Notice of Allowance received for U.S. Appl. No. 15/357,873, mailed on Jan. 19, 2018, 2 pages.
Corrected Notice of Allowance received for U.S. Appl. No. 15/357,873, mailed on Mar. 16, 2018, 2 pages.
Corrected Notice of Allowance received for U.S. Appl. No. 15/845,794, mailed on Feb. 25, 2019, 2 pages.
Corrected Notice of Allowance received for U.S. Appl. No. 15/866,341, mailed on Aug. 21, 2019, 3 pages.
Corrected Notice of Allowance received for U.S. Appl. No. 15/866,341, mailed on Aug. 26, 2019, 3 pages.
Corrected Notice of Allowance received for U.S. Appl. No. 16/125,267, mailed on Apr. 4, 2022, 2 pages.
Corrected Notice of Allowance received for U.S. Appl. No. 16/125,267, mailed on Mar. 16, 2022, 2 pages.
Corrected Notice of Allowance received for U.S. Appl. No. 16/125,267, mailed on May 4, 2022, 3 pages.
Corrected Notice of Allowance received for U.S. Patent Application No. 16/241, 199, mailed on Sep. 13, 2021, 5 pages.
Corrected Notice of Allowance received for U.S. Appl. No. 16/386,707, mailed on Feb. 19, 2021, 2 pages.
Corrected Notice of Allowance received for U.S. Appl. No. 16/386,707, mailed on Jan. 25, 2021, 2 pages.
Corrected Notice of Allowance received for U.S. Appl. No. 16/422,736, mailed on Jul. 9, 2021, 2 pages.
Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.

(56) References Cited

OTHER PUBLICATIONS

Corrected Notice of Allowance received for U.S. Appl. No. 16/456,839, mailed on Apr. 29, 2021, 2 pages.
Corrected Notice of Allowance received for U.S. Appl. No. 16/456,839, mailed on Jul. 20, 2021, 3 pages.
Corrected Notice of Allowance received for U.S. Appl. No. 16/553,622, mailed on Sep. 23, 2020, 5 pages.
Corrected Notice of Allowance received for U.S. Appl. No. 16/670,949, mailed on Sep. 8, 2021, 2 pages.
Corrected Notice of Allowance received for U.S. Appl. No. 16/843,638, mailed on Dec. 22, 2021, 2 pages.
Corrected Notice of Allowance received for U.S. Appl. No. 16/843,638, mailed on Feb. 16, 2022, 2 pages.
Corrected Notice of Allowance received for U.S. Appl. No. 16/987,003, mailed on Sep. 1, 2021, 3 pages.
Decision on Appeal received for Korean Patent Application No. 10-2015-7010262, mailed on Dec. 21, 2018, 16 pages (3 pages of English Translation and 13 pages of Official Copy).
Decision on Appeal received for Korean Patent Application No. 10-2016-0152210, mailed on Jun. 23, 2020, 20 pages (2 pages of English Translation and 18 pages of Official Copy).
Decision on Appeal received for Korean Patent Application No. 10-2020-7020782, mailed on Jan. 24, 2022, 22 pages (2 pages of English Translation and 20 pages of Official Copy).
Decision on Appeal received for U.S. Appl. No. 13/243,045, mailed on Mar. 18, 2019, 10 Pages.
Decision on Appeal received for U.S. Appl. No. 13/243,045, mailed on May 10, 2021, 11 pages.
Decision on Appeal received for U.S. Appl. No. 14/612,214, mailed on Sep. 3, 2019, 10 pages.
Decision on Appeal received for U.S. Appl. No. 15/714,887, mailed on Feb. 18, 2022, 14 pages.
Decision to Grant received for Danish Patent Application No. PA201670628, mailed on Nov. 20, 2017, 2 pages.
Decision to Grant received for Danish Patent Application No. PA201770418, mailed on Oct. 25, 2019, 3 pages.
Decision to Grant received for Danish Patent Application No. PA201770419, mailed on Oct. 25, 2018, 2 pages.
Decision to Grant received for Danish Patent Application No. PA201770715, mailed on Feb. 15, 2019, 2 pages.
Decision to Grant received for Danish Patent Application No. PA201770782, mailed on Oct. 25, 2019, 2 pages.
Decision to Grant received for Danish Patent Application No. PA201870370, mailed on Mar. 29, 2019, 2 pages.
Decision to Grant received for Danish Patent Application No. PA201870371, mailed on Mar. 29, 2019, 2 pages.
Decision to Grant received for Danish Patent Application No. PA201870855, mailed on Oct. 20, 2020, 2 pages.
Decision to Grant received for Danish Patent Application No. PA201970127, mailed on Aug. 20, 2020, 2 pages.
Decision to Grant received for European Patent Application No. 12773460.6, mailed on Jun. 27, 2019, 2 pages.
Decision to Grant received for European Patent Application No. 13171145.9, mailed on Jul. 11, 2019, 2 pages.
Decision to Grant received for European Patent Application No. 14853215.3, mailed on Sep. 27, 2018, 2 pages.
Decision to Grant received for European Patent Application No. 15168475.0, mailed on Sep. 30, 2021, 2 pages.
Decision to Grant received for European Patent Application No. 15719347.5, mailed on Jun. 24, 2021, 2 pages.
Decision to Grant received for European Patent Application No. 17853654.6, mailed on Apr. 15, 2021, 2 pages.
Decision to Grant received for European Patent Application No. 18190250.3, mailed on Oct. 1, 2020, 2 pages.
Decision to Grant received for European Patent Application No. 18704335.1, mailed on Sep. 24, 2020, 2 pages.
Decision to Grant received for European Patent Application No. 18830326.7, mailed on Nov. 11, 2021, 3 pages.
Decision to Grant received for European Patent Application No. 20196476.4, mailed on Jan. 13, 2022, 2 pages.
Decision to Grant received for Japanese Patent Application No. 2017-075031, mailed on Jul. 1, 2019, 3 pages (1 page of English Translation and 2 pages of Official Copy).
Decision to Refuse received for European Patent Application No. 12770400.5, mailed on Nov. 8, 2018, 12 pages.
Decision to Refuse received for European Patent Application No. 15727291.5, mailed on Jun. 30, 2020, 21 pages.
Decision to Refuse received for European Patent Application No. 15728352.4, mailed on May 28, 2020, 25 pages.
Decision to Refuse received for European Patent Application No. 16201159.7, mailed on Sep. 27, 2021, 22 pages.
Decision to Refuse received for European Patent Application No. 16201195.1, mailed on Mar. 4, 2019, 23 pages.
Decision to Refuse received for European Patent Application No. 16201205.8, mailed on Jun. 30, 2020, 29 pages.
Examiner's Answer to Appeal Brief received for U.S. Appl. No. 13/243,045, mailed on Oct. 26, 2020, 17 pages.
Examiner's Answer to Appeal Brief received for U.S. Appl. No. 15/714,887, mailed on Aug. 27, 2021, 23 pages.
Examiner's Pre-Review Report received for Japanese Patent Application No. 2018-113081, mailed on Apr. 28, 2021, 4 pages (2 pages of English Translation and 2 pages of Official Copy).
Examiner's Pre-Review Report received for Japanese Patent Application No. 2019-563560, mailed on Dec. 27, 2021, 4 pages (2 pages of English Translation and 2 pages of Official Copy).
Extended European Search Report received for European Patent Application No. 14853215.3, mailed on Sep. 13, 2016, 9 pages.
Extended European Search Report received for European Patent Application No. 16177139.9, mailed on Nov. 4, 2016, 7 pages.
Extended European Search Report received for European Patent Application No. 16201159.7, mailed on Mar. 27, 2017, 12 pages.
Extended European Search Report Received for European Patent Application No. 16201195.1, mailed on Feb. 7, 2017, 13 pages.
Extended European Search Report received for European Patent Application No. 16201205.8, mailed on Jan. 5, 2017, 12 pages.
Extended European Search Report received for European Patent Application No. 17799904.2, mailed on Jul. 30, 2018, 7 pages.
Extended European Search Report received for European Patent Application No. 17853654.6, mailed on Jul. 8, 2019, 9 pages.
Extended European Search Report received for European Patent Application No. 18190250.3, mailed on Nov. 9, 2018, 6 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19160344.8, mailed on Jun. 14, 2019, 7 pages.
Extended European Search Report received for European Patent Application No. 19160348.9, mailed on Jul. 19, 2019, 6 pages.
Extended European Search Report received for European Patent Application No. 19186538.5, mailed on Oct. 9, 2019, 10 pages.
Extended European Search Report received for European Patent Application No. 19194828.0, mailed on Dec. 19, 2019, 7 pages.
Extended European Search Report received for European Patent Application No. 20186286.9, mailed on Nov. 2, 2020, 9 pages.
Extended European Search Report received for European Patent Application No. 20191533.7, mailed on Nov. 13, 2020, 8 pages.
Extended European Search Report received for European Patent Application No. 20196476.4, mailed on Nov. 5, 2020, 5 pages.
Extended European Search Report received for European Patent Application No. 20198076.0, mailed on Jan. 13, 2021, 8 pages.
Extended European Search Report received for European Patent Application No. 21166287.9, mailed on Nov. 5, 2021, 10 pages.
Extended European Search Report received for European Patent Application No. 21166718.3, mailed on Jul. 6, 2021, 11 pages.
Extended European Search Report received for European Patent Application No. 21173988.3, mailed on Aug. 23, 2021, 6 pages.
Extended European Search Report received for European Patent Application No. 22150595.1, mailed on Apr. 8, 2022, 6 pages.
Final Office Action received for U.S. Appl. No. 12/074,985, mailed on Dec. 2, 2011, 19 pages.
Final Office Action received for U.S. Appl. No. 13/243,045, mailed on Jan. 15, 2020, 12 pages.

(56) References Cited

OTHER PUBLICATIONS

Final Office Action received for U.S. Appl. No. 13/248,882, mailed on Dec. 4, 2013, 22 pages.
Final Office Action received for U.S. Appl. No. 14/285,378, mailed on Jul. 23, 2015, 19 pages.
Final Office Action received for U.S. Appl. No. 14/480,183, mailed on Jun. 28, 2017, 14 pages.
Final Office Action received for U.S. Appl. No. 14/503,072, mailed on Mar. 2, 2017, 9 pages.
Final Office Action received for U.S. Appl. No. 14/503,072, mailed on Sep. 1, 2015, 16 pages.
Final Office Action received for U.S. Appl. No. 14/503,296, mailed on Apr. 24, 2019, 5 pages.
Final Office Action received for U.S. Appl. No. 14/503,296, mailed on Jul. 2, 2015, 7 pages.
Final Office Action received for U.S. Appl. No. 14/503,296, mailed on Jun. 4, 2018, 8 pages.
Final Office Action received for U.S. Appl. No. 14/612,214, mailed on Dec. 7, 2015, 13 pages.
Final Office Action received for U.S. Appl. No. 14/719,217, mailed on Feb. 23, 2017, 37 pages.
Final Office Action received for U.S. Appl. No. 14/980,344, mailed on Dec. 5, 2018, 17 pages.
Final Office Action received for U.S. Appl. No. 14/980,344, mailed on Nov. 25, 2019, 13 pages.
Final Office Action received for U.S. Appl. No. 15/137,944, mailed on Feb. 27, 2017, 10 pages.
Final Office Action received for U.S. Appl. No. 15/470,752, mailed on Mar. 13, 2018, 14 pages.
Final Office Action received for U.S. Appl. No. 15/714,887, mailed on Nov. 13, 2020, 60 pages.
Final Office Action received for U.S. Appl. No. 15/714,887, mailed on Nov. 15, 2019, 55 pages.
Final Office Action received for U.S. Appl. No. 15/866,341, mailed on May 14, 2019, 10 pages.
Final Office Action received for U.S. Appl. No. 15/872,685, mailed on Oct. 26, 2018, 10 pages.
Final Office Action received for U.S. Appl. No. 15/899,966, mailed on Nov. 5, 2018, 10 Pages.
Final Office Action received for U.S. Appl. No. 16/125,267, mailed on Aug. 26, 2021, 22 pages.
Final Office Action received for U.S. Appl. No. 16/125,267, mailed on Dec. 10, 2020, 20 pages.
Final Office Action received for U.S. Appl. No. 16/147,023, mailed on Jul. 23, 2019, 18 pages.
Final Office Action received for U.S. Appl. No. 16/147,115, mailed on Jun. 19, 2019, 14 pages.
Final Office Action received for U.S. Appl. No. 16/164,561, mailed on Sep. 5, 2019, 12 pages.
Final Office Action received for U.S. Appl. No. 16/369,473, mailed on Dec. 14, 2020, 17 pages.
Final Office Action received for U.S. Appl. No. 16/369,473, mailed on Jan. 25, 2022, 19 pages.
Final Office Action received for U.S. Appl. No. 16/422,736, mailed on Jan. 11, 2021, 39 pages.
Final Office Action received for U.S. Appl. No. 17/087,855, mailed on Mar. 31, 2022, 23 pages.
Final Office Action received for U.S. Appl. No. 15/250, 152, mailed on Aug. 23, 2017, 24 pages.
Final Office Action received for U.S. Appl. No. 15/250, 152, mailed on Nov. 16, 2018, 30 pages.
Intention to Grant received for Danish Patent Application No. PA201670628, mailed on Aug. 28, 2017, 2 pages.
Intention to Grant received for Danish Patent Application No. PA201770418, mailed on Aug. 22, 2019, 2 pages.
Intention to Grant received for Danish Patent Application No. PA201770418, mailed on Nov. 16, 2018, 3 pages.
Intention to Grant received for Danish Patent Application No. PA201770419, mailed on Mar. 28, 2018, 2 pages.
Intention to Grant received for Danish Patent Application No. PA201770714, mailed on Feb. 15, 2019, 2 pages.
Intention to Grant received for Danish Patent Application No. PA201770714, mailed on Nov. 2, 2018, 2 pages.
Intention to Grant received for Danish Patent Application No. PA201770715, mailed on Nov. 13, 2018, 2 pages.
Intention to Grant received for Danish Patent Application No. PA201770782, mailed on Aug. 8, 2019, 2 pages.
Intention to Grant received for Danish Patent Application No. PA201870370, mailed on Jan. 2, 2019, 2 pages.
Intention to Grant received for Danish Patent Application No. PA201870371, mailed on Jan. 2, 2019, 2 pages.
Intention to Grant received for Danish Patent Application No. PA201870855, mailed on Jul. 13, 2020, 2 pages.
Intention to Grant received for Danish Patent Application No. PA201970127, mailed on Apr. 21, 2020, 2 pages.
Intention to Grant received for European Patent Application No. 12773460.6, mailed on Feb. 4, 2019, 8 pages.
Intention to Grant received for European Patent Application No. 12773460.6, mailed on Jun. 17, 2019, 4 pages.
Intention to Grant received for European Patent Application No. 13171145.9, mailed on Feb. 21, 2019, 8 pages.
Intention to Grant received for European Patent Application No. 14853215.3, mailed on Jun. 27, 2018, 9 pages.
Intention to Grant received for European Patent Application No. 15168475.0, mailed on Feb. 4, 2020, 9 pages.
Intention to Grant received for European Patent Application No. 15168475.0, mailed on Jan. 22, 2021, 8 pages.
Intention to Grant received for European Patent Application No. 15168475.0, mailed on Jul. 7, 2021, 8 pages.
Intention to Grant received for European Patent Application No. 15719347.5, mailed on Dec. 8, 2020, 7 pages.
Intention to Grant received for European Patent Application No. 15719347.5, mailed on Jun. 8, 2021, 7 pages.
Intention to Grant received for European Patent Application No. 15719347.5, mailed on May 11, 2021, 8 pages.
Intention to Grant received for European Patent Application No. 17853654.6, mailed on Nov. 23, 2020, 8 pages.
Intention to Grant received for European Patent Application No. 18190250.3, mailed on May 15, 2020, 9 pages.
Intention to grant received for European Patent Application No. 18704335.1, mailed on Apr. 17, 2020, 6 pages.
Intention to Grant received for European Patent Application No. 18713408.5, mailed on Mar. 17, 2022, 10 pages.
Intention to Grant received for European Patent Application No. 18713408.5, mailed on Oct. 28, 2021, 10 pages.
Intention to Grant received for European Patent Application No. 18830326.7, mailed on Sep. 15, 2021, 11 pages.
Intention to Grant received for European Patent Application No. 19160344.8, mailed on May 13, 2022, 10 pages.
Intention to Grant received for European Patent Application No. 20196476.4, mailed on Aug. 25, 2021, 9 pages.
International Preliminary Report on Patentability received for PCT Patent Application No. PCT/US2018/014658, mailed on Nov. 28, 2019, 14 pages.
International Preliminary Report on Patentability received for PCT Patent Application No. PCT/US2018/049289, mailed on Mar. 19, 2020, 9 pages.
International Preliminary Report on Patentability received for PCT Patent Application No. PCT/US2012/057319, mailed on Apr. 10, 2014, 6 pages.
International Preliminary Report on Patentability received for PCT Patent Application No. PCT/US2012/057656, mailed on Apr. 10, 2014, 6 pages.
International Preliminary Report on Patentability received for PCT Patent Application No. PCT/US2014/054800, mailed on Mar. 31, 2016, 27 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2015/033326, mailed on Dec. 8, 2016, 11 pages.

(56) References Cited

OTHER PUBLICATIONS

International Preliminary Report on Patentability received for PCT Patent Application No. PCT/US2015/033380, mailed on Dec. 8, 2016, 10 pages.
International Preliminary Report on Patentability received for PCT Patent Application No. PCT/US2017/032240, mailed on Nov. 29, 2018, 29 pages.
International Preliminary Report on Patentability received for PCT Patent Application No. PCT/US2017/049760, mailed on Apr. 4, 2019, 9 pages.
International Preliminary Report on Patentability received for PCT Patent Application No. PCT/US2018/015603, mailed on Mar. 19, 2020, 8 pages.
International Preliminary Report on Patentability received for PCT Patent Application No. PCT/US2019/012571, mailed on Aug. 6, 2020, 10 pages.
International Preliminary Report on Patentability received for PCT Patent Application No. PCT/US2019/035092, mailed on Dec. 17, 2020, 10 pages.
International Preliminary Report on Patentability received for PCT Patent Application No. PCT/US2019/049227, mailed on Apr. 8, 2021, 11 pages.
International Preliminary Report on Patentability received for PCT Patent Application No. PCT/US2019/049239, mailed on Apr. 8, 2021, 12 pages.
International Search Report and Written Opinion received for PCT Application No. PCT/US2015/033326, mailed on Aug. 10, 2015, 13 pages.
International Search Report and Written Opinion received for PCT Patent Application No. PCT/US17/49760, mailed on Jan. 19, 2018, 12 pages.
International Search Report and Written Opinion received for PCT Patent Application No. PCT/US2012/057319, mailed on Feb. 25, 2013, 7 pages.
International Search Report and Written Opinion received for PCT Patent Application No. PCT/US2012/057656, mailed on Feb. 25, 2013, 7 pages.
International Search Report and Written Opinion received for PCT Patent Application No. PCT/US2015/033380, mailed on Aug. 10, 2015, 13 pages.
International Search Report and Written Opinion received for PCT Patent Application No. PCT/US2017/032240, mailed on Sep. 21, 2017, 33 pages.
International Search Report and Written Opinion received for PCT Patent Application No. PCT/US2018/014658, mailed on Jun. 6, 2018, 20 pages.
International Search Report and Written Opinion received for PCT Patent Application No. PCT/US2018/015603, mailed on Jun. 22, 2018, 13 pages.
International Search Report and Written Opinion received for PCT Patent Application No. PCT/US2018/049289, mailed on Feb. 19, 2019, 12 pages.
International Search Report and Written Opinion received for PCT Patent Application No. PCT/US2019/012571, mailed on May 6, 2019, 15 pages.
International Search Report and Written Opinion received for PCT Patent Application No. PCT/US2019/035092, mailed on Jan. 16, 2020, 16 pages.
International Search Report and Written Opinion received for PCT Patent Application No. PCT/US2019/049227, mailed on Dec. 12, 2019, 14 pages.
International Search Report and Written Opinion received for PCT Patent Application No. PCT/US2019/049239, mailed on Jan. 22, 2020, 18 pages.
Invitation to Pay Addition Fees received for PCT Patent Application No. PCT/US2018/014658, mailed on Apr. 11, 2018, 14 pages.
Invitation to Pay Additional Fee received for PCT Patent Application No. PCT/US17/32240, mailed on Jul. 12, 2017, 2 pages.
Invitation to Pay Additional Fee received for PCT Patent Application No. PCT/US2019/035092, mailed on Nov. 20, 2019, 6 pages.
Invitation to pay Additional fees received for PCT Patent Application No. PCT/US17/49760, mailed on Nov. 21, 2017, 2 pages.
Invitation to Pay Additional Fees received for PCT Patent Application No. PCT/US2014/054800, mailed on Oct. 31, 2014, 2 pages.
Invitation to Pay Additional Fees received for PCT Patent Application No. PCT/US2019/049239, mailed on Dec. 4, 2019, 10 pages.
Invitation to Pay Search Fees received for European Patent Application No. 19731554.2, mailed on Dec. 16, 2021, 3 pages.
Managing Windows User Accounts on Your Home Computer, Available online at: https://www.informit.com/articles/article.aspx?p=478948&seqNum=8, Jun. 23, 2006, 2 pages.
Minutes of the Oral Proceedings received for European Application No. 12770400.5, mailed on Nov. 6, 2018, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201159.7, mailed on Sep. 23, 2021, 6 pages.
Minutes of the Oral Proceedings received for European Patent Application No. 16201205.8, mailed on Jun. 29, 2020, 6 pages.
Non-Final Office Action received for U.S. Appl. No. 14/503,072, mailed on Jan. 26, 2015, 12 pages.
Non-Final Office Action received for U.S. Appl. No. 14/503,296, mailed on Jan. 30, 2015, 16 pages.
Non-Final Office Action received for U.S. Appl. No. 15/899,966, mailed on May 4, 2018, 10 pages.
Non-Final Office Action received for U.S. Appl. No. 15/900,047, mailed on May 8, 2018, 7 pages.
Non-Final Office Action received for U.S. Appl. No. 14/503,364, mailed on Feb. 3, 2016, 16 pages.
Non-Final Office Action received for U.S. Appl. No. 12/074,985, mailed on Apr. 19, 2011, 24 pages.
Non-Final Office Action received for U.S. Appl. No. 12/074,985, mailed on Mar. 18, 2013, 19 pages.
Non-Final Office Action received for U.S. Appl. No. 13/243,045, mailed on Jun. 12, 2019, 11 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/090,344, mailed on Jan. 15, 2015, 13 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/480,183, mailed on Oct. 18, 2016, 12 pages.
Non-Final Office Action received for U.S. Appl. No. 14/503,072, mailed on Jun. 17, 2016, 19 pages.
Non-Final Office Action received for U.S. Appl. No. 14/503,296, mailed on Aug. 28, 2017, 14 pages.
Non-Final Office Action received for U.S. Appl. No. 14/503,296, mailed on Oct. 5, 2016, 11 pages.
Non-Final Office Action received for U.S. Appl. No. 14/503,296, mailed on Sep. 18, 2018, 20 pages.
Non-Final Office Action received for U.S. Appl. No. 14/503,381, mailed on May 13, 2015, 13 pages.
Non-Final Office Action received for U.S. Appl. No. 14/612,214, mailed on Jul. 29, 2015, 12 pages.
Non-Final Office Action received for U.S. Appl. No. 14/612,214, mailed on Nov. 20, 2019, 11 pages.
Non-Final Office Action received for U.S. Appl. No. 14/642,366, mailed on Aug. 24, 2015, 7 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/980,344, mailed on Mar. 14, 2018, 13 pages.
Non-Final Office Action received for U.S. Appl. No. 14/980,344, mailed on May 14, 2019, 11 pages.

(56) References Cited

OTHER PUBLICATIONS

Non-Final Office Action received for U.S. Appl. No. 15/134,638, mailed on Sep. 20, 2016, 6 pages.
Non-Final Office Action received for U.S. Appl. No. 15/137,944, mailed on Jul. 27, 2017, 13 pages.
Non-Final Office Action received for U.S. Appl. No. 15/137,944, mailed on Oct. 18, 2016, 10 pages.
Non-Final Office Action received for U.S. Appl. No. 15/269,801, mailed on Dec. 30, 2016, 17 pages.
Non-Final Office Action received for U.S. Appl. No. 15/294,439, mailed on Jan. 26, 2018, 18 pages.
Non-Final Office Action received for U.S. Appl. No. 15/470,752, mailed on Aug. 28, 2018, 12 pages.
Non-Final Office Action received for U.S. Appl. No. 15/470,752, mailed on Jul. 28, 2017, 11 pages.
Non-Final Office Action received for U.S. Appl. No. 15/714,887, mailed on May 27, 2020, 48 pages.
Non-Final Office Action received for U.S. Appl. No. 15/714,887, mailed on May 30, 2019, 47 pages.
Non-Final Office Action received for U.S. Appl. No. 15/845,794, mailed on Oct. 15, 2018, 8 pages.
Non-Final Office Action received for U.S. Appl. No. 15/866,341, mailed on Nov. 13, 2018, 11 pages.
Non-Final Office Action received for U.S. Appl. No. 15/872,685, mailed on Mar. 27, 2018, 9 pages.
Non-Final Office Action received for U.S. Appl. No. 15/894,221, mailed on Jul. 25, 2018, 21 pages.
Non-Final Office Action received for U.S. Appl. No. 15/903,456, mailed on Sep. 6, 2018, 20 pages.
Non-Final Office Action received for U.S. Appl. No. 15/992,722, mailed on Aug. 6, 2020, 7 pages.
Non-Final Office Action received for U.S. Appl. No. 16/035,419, mailed on Jan. 30, 2019, 24 pages.
Non-Final Office Action received for U.S. Appl. No. 16/125,267, mailed on Jul. 2, 2020, 20 pages.
Non-Final Office Action received for U.S. Appl. No. 16/125,267, mailed on Mar. 26, 2021, 20 pages.
Non-Final Office Action received for U.S. Appl. No. 16/125,267, mailed on Nov. 23, 2021, 21 pages.
Non-Final Office Action received for U.S. Appl. No. 16/147,023, mailed on Dec. 26, 2018, 17 pages.
Non-Final Office Action received for U.S. Appl. No. 16/147,115, mailed on Dec. 13, 2018, 12 pages.
Non-Final Office Action received for U.S. Appl. No. 16/164,561, mailed on Jan. 4, 2019, 14 pages.
Non-Final Office Action received for U.S. Appl. No. 16/241,199, mailed on Aug. 20, 2020, 11 pages.
Non-Final Office Action received for U.S. Appl. No. 16/369,355, mailed on Apr. 29, 2021, 16 pages.
Non-Final Office Action received for U.S. Appl. No. 16/369,473, mailed on Apr. 27, 2020, 12 pages.
Non-Final Office Action received for U.S. Appl. No. 16/369,473, mailed on Jun. 11, 2021, 19 pages.
Non-Final Office Action received for U.S. Appl. No. 16/422,736, mailed on Jun. 23, 2020, 24 pages.
Non-Final Office Action received for U.S. Appl. No. 16/434,865, mailed on Jan. 16, 2020, 9 pages.
Non-Final Office Action received for U.S. Appl. No. 16/542,084, mailed on Jan. 24, 2020, 21 pages.
Non-Final Office Action received for U.S. Appl. No. 16/553,622, mailed on May 29, 2020, 11 pages.
Non-Final Office Action received for U.S. Appl. No. 16/667,271, mailed on Dec. 13, 2019, 8 pages.
Non-Final Office Action received for U.S. Appl. No. 16/670,949, mailed on Dec. 9, 2020, 11 pages.
Non-Final Office Action received for U.S. Appl. No. 16/987,003, mailed on May 10, 2021, 20 pages.
Non-Final Office Action received for U.S. Appl. No. 16/990,974, mailed on Oct. 15, 2020, 6 pages.
Non-Final Office Action received for U.S. Appl. No. 17/087,855, mailed on Dec. 24, 2021, 21 pages.
Non-Final Office Action received for U.S. Appl. No. 15/250,152, mailed on Jul. 12, 2021, 17 pages.
Non-Final Office Action received for U.S. Appl. No. 15/250,152, mailed on Apr. 6, 2018, 31 pages.
Non-Final Office Action received for U.S. Appl. No. 15/250,152, mailed on Mar. 2, 2017, 26 pages.
Non-Final Office Action received for U.S. Appl. No. 15/945,610, mailed on mailed on Sep. 20, 2018, 9 pages.
Notice of Acceptance received for Australian Patent Application No. 2014334869, mailed on Jan. 3, 2018, 3 pages.
Notice of Acceptance received for Australian Patent Application No. 2015266650, mailed on Jan. 18, 2018, 3 pages.
Notice of Acceptance received for Australian Patent Application No. 2015266693, mailed on Jan. 18, 2018, 3 pages.
Notice of Acceptance received for Australian Patent Application No. 2016201310, mailed on Feb. 21, 2018, 3 pages.
Notice of Acceptance Received for Australian Patent Application No. 2016203896, mailed on Mar. 2, 2018, 3 Pages.
Notice of Acceptance Received for Australian Patent Application No. 2016203898 mailed on Feb. 21, 2018, 3 pages.
Notice of Acceptance Received for Australian Patent Application No. 2017201064, mailed on Feb. 20, 2018, 3 pages.
Notice of Acceptance received for Australian Patent Application No. 2017266867, mailed on Mar. 6, 2019, 3 pages.
Notice of Acceptance received for Australian Patent Application No. 2017330208, mailed on Nov. 28, 2019, 3 pages.
Notice of Acceptance received for Australian Patent Application No. 2018202559, mailed on Oct. 21, 2019, 3 pages.
Notice of Acceptance received for Australian Patent Application No. 2018229544, mailed on May 4, 2020, 3 pages.
Notice of Acceptance received for Australian Patent Application No. 2018270420, mailed on Jul. 21, 2021, 3 pages.
Notice of Acceptance received for Australian Patent Application No. 2018279788, mailed on Nov. 6, 2019, 3 pages.
Notice of Acceptance received for Australian Patent Application No. 2018312629, mailed on Nov. 7, 2019, 4 pages.
Notice of Acceptance received for Australian Patent Application No. 2019200360, mailed on Mar. 15, 2019, 3 pages.
Notice of Acceptance received for Australian Patent Application No. 2019201101, mailed on May. 6, 2019, 3 pages.
Notice of Acceptance received for Australian Patent Application No. 2019203473, mailed on Nov. 7, 2019, 3 pages.
Notice of Acceptance received for Australian Patent Application No. 2019204387, mailed on Dec. 4, 2020, 3 pages.
Notice of Acceptance received for Australian Patent Application No. 2019346842, mailed on Jan. 21, 2021, 3 pages.
Notice of Acceptance received for Australian Patent Application No. 2020200685, mailed on Oct. 29, 2020, 3 pages.
Notice of Acceptance received for Australian Patent Application No. 2020200795, mailed on Feb. 28, 2020, 3 pages.
Notice of Acceptance received for Australian Patent Application No. 2020201306, mailed on Mar. 12, 2020, 3 pages.
Notice of Acceptance received for Australian Patent Application No. 2020201721, mailed on Jul. 6, 2021, 3 pages.
Notice of Acceptance received for Australian Patent Application No. 2020204256, mailed on Oct. 9, 2021, 3 pages.
Notice of Acceptance received for Australian Patent Application No. 2020207785, mailed on May 4, 2022, 3 pages.
Notice of Acceptance received for Australian Patent Application No. 2020239783, mailed on Mar. 2, 2021, 3 pages.
Notice of Acceptance received for Australian Patent Application No. 2020289822, mailed on Dec. 22, 2021, 3 pages.
Notice of Acceptance received for Australian Patent Application No. 2021200415, mailed on May 9, 2022, 3 pages.
Notice of Acceptance received for Australian Patent Application No. 2022200617, mailed on May 12, 2022, 3 pages.
Notice of Allowance received for Australian Patent Application No. 2015202397, mailed on Feb. 15, 2017, 3 pages.
Notice of Allowance received for Chinese Patent Application No. 201280047459.6, mailed on Jan. 31, 2018, 2 pages (1 page of English Translation and 1 page of Official Copy).

(56) References Cited

OTHER PUBLICATIONS

Notice of Allowance received for Chinese Patent Application No. 201410407626.4, mailed on Aug. 27, 2020, 2 pages (1 pages of English Translation and 1 pages of Official Copy).
Notice of Allowance received for Chinese Patent Application No. 201480058054.1, mailed on Jul. 8, 2019, 2 pages (1 page of English Translation and 1 page of Official Copy).
Notice of Allowance received for Chinese Patent Application No. 201520357381.9, mailed on Jul. 29, 2015, 4 pages (2 pages of English Translation and 2 pages of Official Copy).
Notice of Allowance received for Chinese Patent Application No. 201520358683.8, issued on Mar. 10, 2016, 5 pages (3 pages of English Translation and 2 pages of Official Copy).
Notice of Allowance received for Chinese Patent Application No. 201580043701.6, mailed on Jan. 26, 2022, 2 pages (1 page of English Translation and 1 page of Official Copy).
Notice of Allowance received for Chinese Patent Application No. 201620480708.6, mailed on Apr. 20, 2017, 3 pages (2 pages of English translation and 1 page of Official Copy).
Notice of Allowance received for Chinese Patent Application No. 201620480846.4, mailed on Apr. 20, 2017, 3 pages (2 pages of English Translation and 1 page of Official Copy).
Notice of Allowance received for Chinese Patent Application No. 201710093861.2, mailed on Sep. 24, 2019, 4 pages (1 page of English Translation and 3 pages of Official Copy).
Notice of Allowance received for Chinese Patent Application No. 201710094150.7, mailed on Feb. 23, 2022, 4 pages (1 page of English Translation and 3 pages of Official Copy).
Notice of Allowance received for Chinese Patent Application No. 201780002398.4, mailed on Jun. 17, 2019, 2 pages (1 page of English Translation and 1 page of Official Copy).
Notice of Allowance received for Chinese Patent Application No. 201810338038.8, mailed on Jun. 30, 2020, 2 pages (1 page of English Translation and 1 page of Official Copy).
Notice of Allowance received for Chinese Patent Application No. 201810338040.5, mailed on Mar. 30, 2022, 6 pages (2 pages of English Translation and 4 pages of Official Copy).
Notice of Allowance received for Chinese Patent Application No. 201810339290.0, mailed on Mar. 9, 2022, 2 pages (1 page of English Translation and 1 page of Official Copy).
Notice of Allowance received for Chinese Patent Application No. 201810954931.3, mailed on Jun. 23, 2021, 4 pages (1 page of English Translation and 3 pages of Official Copy).
Notice of Allowance received for Chinese Patent Application No. 201810955077.2, mailed on Jul. 14, 2021, 2 pages (1 page of English Translation and 1 page of Official Copy).
Notice of Allowance received for Chinese Patent Application No. 201811460172.1, mailed on Jan. 11, 2021, 2 pages (1 page of English Translation and 1 page of Official Copy).
Notice of Allowance received for Chinese Patent Application No. 201910278273.5, mailed on Nov. 19, 2020, 2 pages (1 page of English Translation and 1 page of Official Copy).
Notice of Allowance received for Chinese Patent Application No. 201910744886.3, mailed on Jun. 3, 2021, 2 pages (1 page of English Translation and 1 page of Official Copy).
Notice of Allowance received for Chinese Patent Application No. 201910899698.8, mailed on Oct. 23, 2020, 4 pages (1 page of English Translation and 3 pages of Official Copy).
Notice of Allowance received for Japanese Patent Application No. 2013-098406, mailed on Jan. 23, 2017, 18 Pages. (Official Copy only) See Communication Under 37 CFR § 1.98(a) (3).
Notice of Allowance received for Japanese Patent Application No. 2015-083696, mailed on Jan. 6, 2017, 3 pages (Official Copy Only) See Communication Under 37 CFR § 1.98(a) (3).
Notice of Allowance received for Japanese Patent Application No. 2016-131998, mailed on Nov. 30, 2018, 4 pages (1 page of English Translation and 3 pages of Official Copy).
Notice of Allowance received for Japanese Patent Application No. 2016-224506, mailed on Jan. 24, 2020, 4 pages (1 page of English Translation and 3 pages of Official Copy).
Notice of Allowance received for Japanese Patent Application No. 2016-224507, mailed on Mar. 26, 2019, 3 pages (1 page of English Translation and 2 pages of Official Copy).
Notice of Allowance received for Japanese Patent Application No. 2016-224508, mailed on Jun. 20, 2017, 3 pages (Official Copy only) See Communication Under 37 CFR § 1.98(a) (3).
Notice of Allowance received for Japanese Patent Application No. 2016-540927, mailed on May 14, 2018, 4 pages (1 page of English Translation and 3 pages of Official Copy).
Notice of Allowance received for Japanese Patent Application No. 2016-558332, mailed on Jan. 11, 2019, 4 pages (1 page of English Translation and 3 pages of Official Copy).
Notice of Allowance received for Japanese Patent Application No. 2016-569665, mailed on Feb. 22, 2019, 4 pages (1 Page of English Translation and 3 Pages of Official Copy).
Notice of Allowance received for Japanese Patent Application No. 2017-013383, mailed on Mar. 31, 2017, 3 pages. (Official Copy Only) See Communication Under 37 CFR § 1.98(a) (3).
Notice of Allowance received for Japanese Patent Application No. 2017-085582, mailed on Nov. 30, 2018, 4 pages (1 page of English Translation and 3 pages of Official Copy).
Notice of Allowance received for Japanese Patent Application No. 2017-507413, mailed on Jul. 22, 2019, 4 pages (1 page of English Translation and 3 pages of Official Copy).
Notice of Allowance received for Japanese Patent Application No. 2018-113081, mailed on Nov. 8, 2021, 15 pages (1 page of English Translation and 14 pages of Official Copy).
Notice of Allowance received for Japanese Patent Application No. 2018-241505, mailed on Oct. 4, 2019, 4 pages (1 page of English Translation and 3 pages of Official Copy).
Notice of Allowance received for Japanese Patent Application No. 2018-551159, mailed on Jun. 15, 2020, 5 pages (2 pages of English Translation and 3 pages of Official Copy).
Notice of Allowance received for Japanese Patent Application No. 2018-560107, mailed on Dec. 6, 2019, 4 pages (1 page of English Translation and 3 pages of Official Copy).
Notice of Allowance received for Japanese Patent Application No. 2019-053379, mailed on Nov. 16, 2020, 5 pages (2 pages of English Translation and 3 pages of Official Copy).
Notice of Allowance received for Japanese Patent Application No. 2019-107235, mailed on May 15, 2020, 5 pages (2 pages of English Translation and 3 pages of Official Copy).
Notice of Allowance received for Japanese Patent Application No. 2019-116580, mailed on Oct. 2, 2020, 4 pages (1 page of English Translation and 3 pages of Official Copy).
Notice of Allowance received for Japanese Patent Application No. 2019-194603, mailed on Apr. 19, 2021, 4 pages (1 page of English Translation and 3 pages of Official Copy).
Notice of Allowance received for Japanese Patent Application No. 2019-238894, mailed on Oct. 5, 2020, 4 pages (1 page of English Translation and 3 pages of Official Copy).
Notice of Allowance received for Japanese Patent Application No. 2019-510416, mailed on Oct. 12, 2020, 5 pages (2 pages of English Translation and 3 pages of Official Copy).
Notice of Allowance received for Japanese Patent Application No. 2019-511975, mailed on Dec. 14, 2020, 4 pages (1 page of English Translation and 3 pages of Official Copy).
Notice of Allowance received for Japanese Patent Application No. 2020-103213, mailed on Oct. 25, 2021, 5 pages (2 pages of English Translation and 3 pages of Official Copy).
Notice of Allowance received for Japanese Patent Application No. 2020-126751, mailed on Aug. 16, 2021, 5 pages (2 pages of English Translation and 3 pages of Official Copy).
Notice of allowance received for Japanese Patent Application No. 2020-159979, mailed on Nov. 8, 2021, 5 pages (2 pages of English Translation and 3 pages of Official Copy).
Notice of Allowance received for Japanese Patent Application No. 2020-183773, mailed on Dec. 23, 2021, 4 pages (1 page of English Translation and 3 pages of Official Copy).
Notice of Allowance received for Japanese Patent Application No. 2020-569806, mailed on Jul. 12, 2021, 4 pages (1 page of English Translation and 3 pages of Official Copy).

(56) References Cited

OTHER PUBLICATIONS

Notice of Allowance received for Japanese Patent Application No. 2021-015128, mailed on Sep. 3, 2021, 4 pages (1 page of English Translation and 3 pages of Official Copy).
Notice of Allowance received for Japanese Patent Application No. 2021-163037, mailed on Dec. 6, 2021, 4 pages (1 page of English Translation and 3 pages of Official Copy).
Notice of Allowance received for Japanese Patent Application No. 2021-208395, mailed on Mar. 25, 2022, 4 pages (1 page of English Translation and 3 pages of Official Copy).
Notice of Allowance received for Korean Patent Application No. 10-2016-7009347, mailed on May 10, 2018, 4 pages (1 page of English Translation and 3 pages of Official Copy).
Notice of Allowance received for Korean Patent Application No. 10-2016-7009632, mailed on Aug. 17, 2018, 4 pages (1 page of English Translation and 3 pages of Official Copy).
Notice of Allowance received for Korean Patent Application No. 10-2016-7035555, mailed on Sep. 23, 2019, 3 pages (1 page of English Translation and 2 pages of Official Copy).
Notice of Allowance received for Korean Patent Application No. 10-2017-0022365, mailed on Mar. 27, 2018, 4 pages (1 page of English Translation and 3 pages of Official Copy).
Notice of Allowance received for Korean Patent Application No. 10-2017-0022546, mailed on Feb. 27, 2018, 4 pages (1 page of English Translation and 3 pages of Official Copy).
Notice of Allowance received for Korean Patent Application No. 10-2017-0022582, mailed on Feb. 27, 2020, 5 pages (2 pages of English Translation and 3 pages of Official Copy).
Notice of Allowance received for Korean Patent Application No. 10-2017-7012145, mailed on Oct. 30, 2019, 3 pages (1 page of English Translation and 2 pages of Official Copy).
Notice of Allowance received for Korean Patent Application No. 10-2017-7015582, mailed on Dec. 27, 2018, 5 pages (2 pages of English Translation and 3 pages of Official Copy).
Notice of Allowance received for Korean Patent Application No. 10-2018-7022895, mailed on Feb. 22, 2019, 4 pages (1 page of English Translation and 3 pages of Official Copy).
Notice of Allowance received for Korean Patent Application No. 10-2018-7028845, mailed on Apr. 16, 2020, 5 pages (2 pages of English Translation and 3 pages of Official Copy).
Notice of Allowance received for Korean Patent Application No. 10-2018-7032467, mailed on Jan. 28, 2019, 4 pages (1 page of English Translation and 3 pages of Official Copy).
Notice of Allowance received for Korean Patent Application No. 10-2018-7033301, mailed on Feb. 20, 2019, 5 pages (2 Pages of English Translation and 3 Pages of Official Copy).
Notice of Allowance received for Korean Patent Application No. 10-2019-7003374, mailed on Oct. 4, 2019, 10 pages (3 pages of English Translation and 7 pages of Official Copy).
Notice of Allowance received for Korean Patent Application No. 10-2019-7003836, mailed on Oct. 4, 2019, 6 pages (3 pages of English Translation and 3 pages of Official Copy).
Notice of Allowance received for Korean Patent Application No. 10-2019-7004734, mailed on Oct. 24, 2019, 7 pages (3 pages of English Translation and 4 pages of Official Copy).
Notice of Allowance received for Korean Patent Application No. 10-2019-7005136, mailed on Feb. 19, 2021, 5 pages (2 pages of English Translation and 3 pages of Official Copy).
Notice of Allowance received for Korean Patent Application No. 10-2019-7005925, mailed on Jan. 21, 2020, 7 pages (3 pages of English Translation and 4 pages of Official Copy).
Notice of Allowance received for Korean Patent Application No. 10-2019-7014494, mailed on Mar. 19, 2020, 4 pages (1 page of English Translation and 3 pages of Official Copy).
Notice of Allowance received for Korean Patent Application No. 10-2019-7014988, mailed on Jan. 19, 2020, 4 pages (1 page of English Translation and 3 pages of Official Copy).
Notice of Allowance received for Korean Patent Application No. 10-2019-7038021, mailed on May 2, 2020, 7 pages (3 pages of English Translation and 4 pages of Official Copy).
Notice of Allowance received for Korean Patent Application No. 10-2020-0048600, mailed on Apr. 30, 2020, 5 pages (2 pages of English Translation and 3 pages of Official Copy).
Notice of Allowance received for Korean Patent Application No. 10-2020-0097418, mailed on Apr. 27, 2021, 5 pages (2 pages of English Translation and 3 pages of Official Copy).
Notice of Allowance received for Korean Patent Application No. 10-2020-7002929, mailed on Nov. 26, 2020, 3 pages (1 page of English Translation and 2 pages of Official Copy).
Notice of Allowance received for Korean Patent Application No. 10-2020-7011172, mailed on Aug. 25, 2020, 9 pages (4 pages of English Translation and 5 pages of Official Copy).
Notice of Allowance received for Korean Patent Application No. 10-2020-7011424, mailed on Jan. 21, 2021, 4 pages (1 page of English Translation and 3 pages of Official Copy).
Notice of Allowance received for Korean Patent Application No. 10-2020-7017803, mailed on Nov. 5, 2020, 6 pages (2 pages of English Translation and 4 pages of Official Copy).
Notice of Allowance received for Korean Patent Application No. 10-2020-7022596, mailed on Jan. 27, 2022, 7 pages (2 pages of English Translation and 5 pages of Official Copy).
Notice of Allowance received for Korean Patent Application No. 10-2020-7027862, mailed on Jun. 29, 2021, 7 pages (3 pages of English Translation and 4 pages of Official Copy).
Notice of Allowance received for Korean Patent Application No. 10-2020-7034180, mailed on Feb. 22, 2022, 8 pages (2 pages of English Translation and 6 pages of Official Copy).
Notice of Allowance received for Korean Patent Application No. 10-2020-7036748, mailed on Jan. 25, 2021, 3 pages (1 page of English Translation and 2 pages of Official Copy).
Notice of Allowance received for Korean Patent Application No. 10-2021-0099243, mailed on Oct. 30, 2021, 4 pages (1 page of English Translation and 3 pages of Official Copy).
Notice of Allowance received for Korean Patent Application No. 10-2021-7005691, mailed on Mar. 29, 2021, 3 pages (1 page of English Translation and 2 pages of Official Copy).
Notice of Allowance received for Korean Patent Application No. 10-2021-7011888, mailed on Jan. 27, 2022, 5 pages (1 page of English Translation and 4 pages of Official Copy).
Notice of Allowance received for Korean Patent Application No. 10-2021-7015473, mailed on Feb. 24, 2022, 5 pages (1 page of English Translation and 4 pages of Official Copy).
Notice of Allowance received for Korean Patent Application No. 10-2021-7020549, mailed on Jul. 13, 2021, 3 pages (1 page of English Translation and 2 pages of Official Copy).
Notice of Allowance received for Korean Patent Application No. 10-2021-7024020, mailed on Jan. 14, 2022, 4 pages (1 page of English Translation and 3 pages of Official Copy).
Notice of Allowance received for Korean Patent Application No. 10-2014-7008348, mailed on Feb. 21, 2019, 5 pages (2 Pages of English Translation and 3 Pages of Official Copy).
Notice of Allowance received for Taiwanese Patent Application No. 103131074, mailed on Nov. 17, 2015, 3 pages (Official Copy only) See Communication Under 37 CFR § 1.98(a) (3).
Notice of Allowance received for Taiwanese Patent Application No. 103136545, mailed on Nov. 27, 2017, 4 pages (1 page of English Translation of Search Report and 3 pages of Official Copy).
Notice of Allowance received for Taiwanese Patent Application No. 104114953, mailed on Oct. 17, 2017, 3 pages (Official Copy only) See Communication Under 37 CFR § 1.98(a) (3).
Notice of Allowance received for Taiwanese Patent Application No. 104117508, mailed on Sep. 18, 2019, 5 pages (2 pages of English Translation and 3 pages of Official Copy).
Notice of Allowance received for Taiwanese Patent Application No. 104140890, mailed on Oct. 25, 2017, 5 pages (Official Copy Only) See Communication Under 37 CFR § 1.98(a) (3).
Notice of Allowance received for Taiwanese Patent Application No. 106141250, mailed on May 24, 2018, 7 pages (3 pages of English Translation and 4 pages of Official Copy).
Notice of Allowance received for Taiwanese Patent Application No. 107121719, mailed on Sep. 27, 2018, 7 pages (3 pages of English Translation and 4 pages of Official Copy).

(56) References Cited

OTHER PUBLICATIONS

Notice of Allowance received for Taiwanese Patent Application No. 107138003, mailed on Aug. 30, 2019, 4 pages (1 page of English Translation and 3 pages of Official Copy).
Notice of Allowance received for the U.S. Appl. No. 14/503,381, mailed on Dec. 16, 2015, 8 pages.
Notice of Allowance received for U.S. Appl. No. 12/074,985, mailed on Jul. 30, 2013, 8 pages.
Notice of Allowance received for U.S. Appl. No. 13/243,045, mailed on Aug. 4, 2021, 8 pages.
Notice of Allowance received for U.S. Appl. No. 13/248,872, mailed on Dec. 4, 2014, 7 pages.
Notice of Allowance received for U.S. Appl. No. 13/248,882, mailed on Mar. 13, 2014, 16 pages.
Notice of Allowance received for U.S. Appl. No. 14/090,344, mailed on Aug. 26, 2015, 7 pages.
Notice of Allowance received for U.S. Appl. No. 14/142,669, mailed on Aug. 25, 2016, 2 pages.
Notice of Allowance received for U.S. Appl. No. 14/142,669, mailed on Jun. 14, 2016, 5 pages.
Notice of Allowance received for U.S. Appl. No. 14/142,669, mailed on Sep. 21, 2016, 2 pages.
Notice of Allowance received for U.S. Appl. No. 14/285,378, mailed May 19, 2016, 10 pages.
Notice of Allowance received for U.S. Appl. No. 14/480,183, mailed on Nov. 29, 2017, 7 pages.
Notice of Allowance received for U.S. Appl. No. 14/503,072, mailed on Jun. 4, 2018, 6 pages.
Notice of Allowance received for U.S. Appl. No. 14/503,072, mailed on Mar. 26, 2018, 6 pages.
Notice of Allowance received for U.S. Appl. No. 14/503,296, mailed on Aug. 28, 2019, 12 pages.
Notice of Allowance received for U.S. Appl. No. 14/503,364, mailed on Jun. 16, 2016, 11 pages.
Notice of Allowance received for U.S. Appl. No. 14/612,214, mailed on Apr. 15, 2020, 8 pages.
Notice of Allowance received for U.S. Appl. No. 14/642,366, mailed on Jan. 14, 2016, 8 pages.
Notice of Allowance received for U.S. Appl. No. 14/719,217, mailed on Feb. 13, 2019, 13 pages.
Notice of Allowance received for U.S. Appl. No. 14/980,344, mailed on Mar. 23, 2020, 9 pages.
Notice of allowance received for U.S. Appl. No. 15/017,436, mailed on May 27, 2016, 17 pages.
Notice of Allowance received for U.S. Appl. No. 15/134,638, mailed on Apr. 10, 2018, 7 pages.
Notice of Allowance received for U.S. Appl. No. 15/134,638, mailed on Jul. 27, 2018, 7 pages.
Notice of Allowance received for U.S. Appl. No. 15/137,944, mailed on Dec. 21, 2017, 8 pages.
Notice of Allowance received for U.S. Appl. No. 15/250,152, mailed on May 1, 2019, 12 pages.
Notice of Allowance received for U.S. Appl. No. 15/269,801, mailed on May 3, 2017, 6 pages.
Notice of Allowance received for U.S. Appl. No. 15/269,801, mailed on Sep. 7, 2017, 5 pages.
Notice of Allowance received for U.S. Appl. No. 15/294,439, mailed on Jan. 8, 2019, 8 pages.
Notice of Allowance received for U.S. Appl. No. 15/294,439, mailed on Sep. 10, 2018, 9 pages.
Notice of Allowance received for U.S. Appl. No. 15/357,873, mailed on Aug. 23, 2017, 10 pages.
Notice of Allowance received for U.S. Appl. No. 15/470,752, mailed on Feb. 7, 2019, 11 pages.
Notice of Allowance received for U.S. Appl. No. 15/845,794, mailed on Feb. 14, 2019, 6 pages.
Notice of Allowance received for U.S. Appl. No. 15/866,341, mailed on Jul. 26, 2019, 8 pages.
Notice of Allowance received for U.S. Appl. No. 15/872,685, mailed on Mar. 8, 2019, 10 pages.
Notice of Allowance received for U.S. Appl. No. 15/894,221, mailed on Apr. 11, 2019, 5 pages.
Notice of Allowance received for U.S. Appl. No. 15/894,221, mailed on Aug. 13, 2019, 2 pages.
Notice of Allowance received for U.S. Appl. No. 15/894,221, mailed on Feb. 1, 2019, 5 pages.
Notice of Allowance received for U.S. Appl. No. 15/894,221, mailed on Mar. 4, 2019, 2 pages.
Notice of Allowance received for U.S. Appl. No. 15/899,966, mailed on Mar. 21, 2019, 7 pages.
Notice of Allowance received for U.S. Appl. No. 15/899,996, mailed on Apr. 24, 2018, 9 pages.
Notice of Allowance received for U.S. Appl. No. 15/900,047, mailed on Dec. 5, 2018, 10 pages.
Notice of Allowance received for U.S. Appl. No. 15/903,456, mailed on May 1, 2019, 6 pages.
Notice of Allowance received for U.S. Appl. No. 15/945,610, mailed on May 20, 2019, 7 pages.
Notice of Allowance received for U.S. Appl. No. 15/992,722, mailed on Oct. 19, 2020, 5 pages.
Notice of Allowance received for U.S. Appl. No. 16/035,419, mailed on May 24, 2019, 14 pages.
Notice of Allowance received for U.S. Appl. No. 16/125,267, mailed on Mar. 3, 2022, 10 pages.
Notice of Allowance received for U.S. Appl. No. 16/131,767, mailed on Sep. 6, 2019, 7 pages.
Notice of Allowance received for U.S. Appl. No. 16/147,023, mailed on Apr. 3, 2020, 2 pages.
Notice of Allowance received for U.S. Appl. No. 16/147,023, mailed on Aug. 13, 2020, 2 pages.
Notice of Allowance received for U.S. Appl. No. 16/147,023, mailed on Feb. 27, 2020, 2 pages.
Notice of Allowance received for U.S. Appl. No. 16/147,023, mailed on Jan. 31, 2020, 7 pages.
Notice of Allowance received for U.S. Appl. No. 16/147,023, mailed on Jul. 2, 2020, 2 pages.
Notice of Allowance received for U.S. Appl. No. 16/147,023, mailed on Jul. 21, 2020, 2 pages.
Notice of Allowance received for U.S. Appl. No. 16/147,023, mailed on Jun. 1, 2020, 2 pages.
Notice of Allowance received for U.S. Appl. No. 16/147,023, mailed on Jun. 18, 2020, 2 pages.
Notice of Allowance received for U.S. Appl. No. 16/147,023, mailed on Mar. 27, 2020, 2 pages.
Notice of Allowance received for U.S. Appl. No. 16/147,023, mailed on May 5, 2020, 2 pages.
Notice of Allowance received for U.S. Appl. No. 16/147,023, mailed on May 20, 2020, 7 pages.
Notice of Allowance received for U.S. Appl. No. 16/147,115, mailed on Oct. 30, 2019, 10 pages.
Notice of Allowance received for U.S. Appl. No. 16/164,561, mailed on Apr. 8, 2020, 5 pages.
Notice of Allowance received for U.S. Appl. No. 16/241,199, mailed on May 13, 2021, 9 pages.
Notice of Allowance received for U.S. Appl. No. 16/369,355, mailed on Sep. 1, 2021, 10 pages.
Notice of Allowance received for U.S. Appl. No. 16/386,707, mailed on Dec. 31, 2020, 18 pages.
Notice of Allowance received for U.S. Appl. No. 16/422,736, mailed on Apr. 20, 2021, 12 pages.
Notice of Allowance received for U.S. Appl. No. 16/422,736, mailed on Jun. 15, 2021, 13 pages.
Notice of Allowance received for U.S. Appl. No. 16/434,865, mailed on Apr. 7, 2020, 5 pages.
Notice of Allowance received for U.S. Appl. No. 16/456,839, mailed on Apr. 15, 2021, 8 pages.
Notice of Allowance received for U.S. Appl. No. 16/456,839, mailed on Dec. 11, 2020, 10 pages.
Notice of Allowance received for U.S. Appl. No. 16/542,084, mailed on May 20, 2020, 7 pages.
Notice of Allowance received for U.S. Appl. No. 16/553,622, mailed on Sep. 11, 2020, 8 pages.

(56) References Cited

OTHER PUBLICATIONS

Notice of Allowance received for U.S. Appl. No. 16/667,271, mailed on May 12, 2020, 11 pages.
Notice of Allowance received for U.S. Appl. No. 16/670,949, mailed on May 27, 2021, 7 pages.
Notice of Allowance received for U.S. Appl. No. 16/670,949, mailed on Sep. 14, 2021, 7 pages.
Notice of Allowance received for U.S. Appl. No. 16/843,638, mailed on Feb. 4, 2022, 7 pages.
Notice of Allowance received for U.S. Appl. No. 16/843,638, mailed on Oct. 29, 2021, 28 pages.
Notice of Allowance received for U.S. Appl. No. 16/987,003, mailed on Aug. 18, 2021, 9 pages.
Notice of Allowance received for U.S. Appl. No. 16/990,974, mailed on Apr. 28, 2021, 5 pages.
Notice of Allowance received for U.S. Appl. No. 16/990,974, mailed on Jan. 22, 2021, 7 pages.
Notice of Allowance received for U.S. Appl. No. 17/015,429, mailed on Apr. 4, 2022, 2 pages.
Notice of Allowance received for U.S. Appl. No. 17/015,429, mailed on Apr. 15, 2022, 2 pages.
Notice of Allowance received for U.S. Appl. No. 17/015,429, mailed on Dec. 13, 2021, 2 pages.
Notice of Allowance received for U.S. Appl. No. 17/015,429, mailed on Dec. 24, 2021, 2 pages.
Notice of Allowance received for U.S. Appl. No. 17/015,429, mailed on Feb. 16, 2022, 5 pages.
Notice of Allowance received for U.S. Appl. No. 17/015,429, mailed on Jun. 17, 2021, 10 pages.
Notice of Allowance received for U.S. Appl. No. 17/015,429, mailed on Mar. 4, 2022, 2 pages.
Notice of Allowance received for U.S. Appl. No. 17/015,429, mailed on May 10, 2022, 2 pages.
Notice of Allowance received for U.S. Appl. No. 17/015,429, mailed on Nov. 24, 2021, 2 pages.
Notice of Allowance received for U.S. Appl. No. 17/015,429, mailed on Oct. 8, 2021, 5 pages.
Notice of Allowance received for U.S. Appl. No. 17/015,429, mailed on Oct. 22, 2021, 2 pages.
Notice of Allowance received for U.S. Appl. No. 17/015,429, mailed on Sep. 22, 2021, 6 pages.
Office Action received for European Patent Application No. 151684750, mailed on Oct. 5, 2018, 4 pages.
Office Action received for European Patent Application No. 157283524, mailed on Jan. 25, 2018, 10 pages.
Office Action received for Japanese Patent Application No. 2016-224507, mailed on Dec. 1, 2017, 14 pages (7 pages of English Translation and 7 pages of Official Copy).
Office Action received for Australian Patent Application No. 2012200716, mailed on Nov. 15, 2013, 3 pages.
Office Action received for Australian Patent Application No. 2014204462, mailed on Apr. 29, 2016, 3 pages.
Office Action received for Australian Patent Application No. 2014334869, mailed on Jan. 11, 2017, 4 pages.
Office Action received for Australian Patent Application No. 2015100708, issued on Sep. 8, 2015, 4 pages.
Office Action received for Australian Patent Application No. 2015100709, issued on Sep. 9, 2015 (Examination Report 1), 4 pages.
Office Action received for Australian Patent Application No. 2015100709, issued on Sep. 9, 2015 (Examination Report 2), 4 pages.
Office Action received for Australian Patent Application No. 2015266650, mailed on Apr. 10, 2017, 4 pages.
Office Action received for Australian Patent Application No. 2015266693, mailed on Apr. 10, 2017, 4 pages.
Office Action received for Australian Patent Application No. 2015302298, mailed on Apr. 4, 2018, 3 pages.
Office Action received for Australian Patent Application No. 2015302298, mailed on Jul. 20, 2018, 3 pages.
Office Action received for Australian Patent Application No. 2015302298, mailed on Sep. 14, 2017, 3 pages.
Office Action received for Australian Patent Application No. 2015302298, mailed on Sep. 4, 2018, 5 pages.
Office Action received for Australian Patent Application No. 2016100367, issued on May 25, 2016, 3 pages.
Office Action received for Australian Patent Application No. 2016100367, mailed on Oct. 26, 2016, 3 pages.
Office Action received for Australian Patent Application No. 2016100383, issued on Jun. 9, 2016, 2 pages.
Office Action received for Australian Patent Application No. 2016100383, issued on Nov. 11, 2016, 3 pages.
Office Action received for Australian Patent Application No. 2016201310, mailed on Feb. 28, 2017, 3 Pages.
Office Action received for Australian Patent Application No. 2016203896, mailed on Jan. 19, 2018, 4 pages.
Office Action received for Australian Patent Application No. 2016203896, mailed on Mar. 6, 2017, 3 Pages.
Office Action received for Australian Patent Application No. 2016203898, mailed on Dec. 19, 2017, 4 pages.
Office Action received for Australian Patent Application No. 2016203898, mailed on Feb. 17, 2017, 3 Pages.
Office Action received for Australian Patent Application No. 2017100070, mailed on Mar. 16, 2017, 6 pages.
Office Action received for Australian Patent Application No. 2017100553, mailed on Aug. 4, 2017, 5 pages.
Office Action received for Australian Patent Application No. 2017201064, mailed on Mar. 9, 2017, 2 pages.
Office Action received for Australian Patent Application No. 2017201068, mailed on Jan. 17, 2018, 5 pages.
Office Action received for Australian Patent Application No. 2017201068, mailed on Mar. 10, 2017, 2 pages.
Office Action received for Australian Patent Application No. 2017266867, mailed on Dec. 6, 2018, 3 pages.
Office Action received for Australian Patent Application No. 2017330208, mailed on Jul. 25, 2019, 5 pages.
Office Action received for Australian Patent Application No. 2018202559, mailed on Apr. 8, 2019, 4 pages.
Office Action Received for Australian Patent Application No. 2018202559, mailed on Jan. 16, 2019, 6 pages.
Office Action received for Australian Patent Application No. 2018202559, mailed on Jul. 19, 2019, 5 pages.
Office Action received for Australian Patent Application No. 2018202712, mailed on Mar. 22, 2019, 5 pages.
Office Action received for Australian Patent Application No. 2018202712, mailed on Nov. 15, 2019, 5 pages.
Office Action received for Australian Patent Application No. 2018202712, mailed on Nov. 20, 2018, 12 pages.
Office Action received for Australian Patent Application No. 2018202712, mailed on Sep. 2, 2019, 4 pages.
Office Action received for Australian Patent Application No. 2018203732, mailed on Feb. 26, 2019, 5 pages.
Office Action received for Australian Patent Application No. 2018203732, mailed on Jun. 6, 2019, 4 pages.
Office Action received for Australian Patent Application No. 2018203732, mailed on Jun. 21, 2018, 3 pages.
Office Action Received for Australian Patent Application No. 2018203732, mailed on Nov. 30, 2018, 3 Pages.
Office Action received for Australian Patent Application No. 2018229544, mailed on Nov. 15, 2019, 4 pages.
Office Action received for Australian Patent Application No. 2018270420, mailed on Apr. 19, 2021, 4 pages.
Office Action received for Australian Patent Application No. 2018270420, mailed on Jan. 7, 2021, 5 pages.
Office Action received for Australian Patent Application No. 2018270420, mailed on Jul. 21, 2020, 5 pages.
Office Action received for Australian Patent Application No. 2018279788, mailed on Feb. 8, 2019, 4 pages.
Office Action received for Australian Patent Application No. 2018312629, mailed on Feb. 25, 2019, 4 pages.
Office Action received for Australian Patent Application No. 2019201101, mailed on Feb. 28, 2019, 3 pages.

(56) References Cited

OTHER PUBLICATIONS

Office Action received for Australian Patent Application No. 2019203473, mailed on Oct. 25, 2019, 2 pages.
Office Action received for Australian Patent Application No. 2019204387, mailed on Jun. 17, 2020, 7 pages.
Office Action received for Australian Patent Application No. 2019268070, mailed on Jan. 27, 2022, 3 pages.
Office Action received for Australian Patent Application No. 2019268070, mailed on Jan. 29, 2021, 6 pages.
Office Action received for Australian Patent Application No. 2019268070, mailed on Sep. 21, 2021, 4 pages.
Office Action received for Australian Patent Application No. 2019281965, mailed on May 11, 2022, 5 pages.
Office Action received for Australian Patent Application No. 2019281965, mailed on Nov. 30, 2021, 3 pages.
Office Action received for Australian Patent Application No. 2020200685, mailed on Apr. 20, 2020, 3 pages.
Office Action received for Australian Patent Application No. 2020200685, mailed on Aug. 12, 2020, 3 pages.
Office Action received for Australian Patent Application No. 2020200685, mailed on Feb. 10, 2020, 4 pages.
Office Action received for Australian Patent Application No. 2020201721, mailed on Feb. 26, 2021, 7 pages.
Office Action received for Australian Patent Application No. 2020203899, mailed on May 5, 2021, 10 pages.
Office Action received for Australian Patent Application No. 2020203899, mailed on May 5, 2022, 4 pages.
Office Action received for Australian Patent Application No. 2020203899, mailed on Nov. 26, 2021, 4 pages.
Office Action received for Australian Patent Application No. 2020204256, mailed on Jun. 21, 2021, 2 pages.
Office Action received for Australian Patent Application No. 2020207785, mailed on Dec. 14, 2021, 5 pages.
Office Action received for Australian Patent Application No. 2020207785, mailed on Jul. 13, 2021, 3 pages.
Office Action received for Australian Patent Application No. 2020239783, mailed on Oct. 13, 2020, 4 pages.
Office Action received for Australian Patent Application No. 2020289822, mailed on Aug. 24, 2021, 7 pages.
Office Action received for Australian Patent Application No. 2021200415, mailed on Jan. 18, 2022, 3 pages.
Office Action received for Australian Patent Application No. 2021202352, mailed on Mar. 15, 2022, 3 pages.
Office Action received for Chinese Patent Application No. 201410407626.4, mailed on May 21, 2018, 13 pages (4 Page of English Translation and 9 pages of Official Copy).
Office Action received for Chinese Patent Application No. 201410407626.4, mailed on Oct. 31, 2016, 10 pages (4 pages of English Translation and 6 pages of Official Copy).
Office Action received for Chinese Patent Application No. 201410407626.4, mailed on Sep. 11, 2017, 11 pages (3 pages of English Translation and 8 pages of Official Copy).
Office Action received for Chinese Patent Application No. 201480058054.1, mailed on Jan. 22, 2019, 6 pages (2 pages of English Translation and 4 pages of Official Copy).
Office Action received for Chinese Patent Application No. 201480058054.1, mailed on May 3, 2018, 18 pages (4 pages of English Translation and 14 pages of Official Copy).
Office Action received for Chinese Patent Application No. 201510284715.9, mailed on Apr. 14, 2020, 19 pages (7 pages of English Translation and 12 pages of Official Copy).
Office Action received for Chinese Patent Application No. 201510284715.9, mailed on Dec. 18, 2019, 24 pages (7 pages of English Translation and 17 pages of Official Copy).
Office Action received for Chinese Patent Application No. 201510284715.9, mailed on Dec. 21, 2018, 22 pages (5 pages of English Translation and 17 pages of Official Copy).
Office Action received for Chinese Patent Application No. 201510284715.9, mailed on Jun. 19, 2019, 26 pages (8 pages of English Translation and 18 pages of Official Copy).
Office Action received for Chinese Patent Application No. 201510284896.5, mailed on Jun. 28, 2018, 15 pages (4 pages of English Translation and 11 pages of Official Copy).
Office Action received for Chinese Patent Application No. 201510284896.5, mailed on Mar. 6, 2019, 13 pages (4 pages of English Translation and 9 pages of Official Copy).
Office Action received for Chinese Patent Application No. 201510284896.5, mailed on Mar. 14, 2022, 10 pages (5 pages of English Translation and 5 pages of Official Copy).
Office Action received for Chinese Patent Application No. 201510284896.5, mailed on Sep. 3, 2019, 9 pages (2 pages of English Translation and 7 pages of Official Copy).
Office Action received for Chinese Patent Application No. 201520358683.8, mailed on Sep. 2, 2015, Sep. 2, 2015, 4 pages (2 pages of English Translation and 2 pages of Official Copy).
Office Action received for Chinese Patent Application No. 201580043701.6, mailed on Dec. 24, 2018, 20 pages (5 pages of English Translation and 15 pages of Official Copy).
Office Action received for Chinese Patent Application No. 201580043701.6, mailed on May 8, 2021, 10 pages (1 page of English Translation and 9 pages of Official Copy).
Office Action received for Chinese Patent Application No. 201580043701.6, mailed on Nov. 4, 2019, 20 pages (6 pages of English Translation and 14 pages of Official Copy).
Office Action received for Chinese Patent Application No. 201580043701.6, mailed on Oct. 12, 2020, 22 pages (5 pages of English Translation and 17 pages of Official Copy).
Office Action received for Chinese Patent Application No. 201580043701.6, mailed on Sep. 10, 2021, 10 pages (5 pages of English Translation and 5 pages of Official Copy).
Office Action received for Chinese Patent Application No. 201610459968.X, mailed on Aug. 23, 2018, 14 pages (6 pages of English Translation and 8 pages of Official Copy).
Office Action received for Chinese Patent Application No. 201610459968.X, mailed on Aug. 23, 2019, 12 pages (5 pages of English Translation and 7 pages of Official Copy).
Office Action received for Chinese Patent Application No. 201610459968.X, mailed on Feb. 18, 2020, 8 pages (3 pages of English Translation and 5 pages of Official Copy).
Office Action received for Chinese Patent Application No. 201610459968.X, mailed on Feb. 22, 2019, 11 pages (5 Pages of English Translation and 6 pages of Official Copy).
Office Action received for Chinese Patent Application No. 201620480708.6, mailed on Jan. 9, 2017, 3 pages (1 page of English Translation and 2 pages of Official Copy).
Office Action received for Chinese Patent Application No. 201620480708.6, mailed on Sep. 14, 2016, 3 pages (1 page of English Translation and 2 pages of Official Copy).
Office Action received for Chinese Patent Application No. 201620480846.4, mailed on Jan. 9, 2017, 3 pages (1 page of English Translation and 2 pages of Official Copy).
Office Action received for Chinese Patent Application No. 201620480846.4, mailed on Sep. 14, 2016, 3 pages (1 page of English Translation and 2 pages of Official Copy).
Office Action received for Chinese Patent Application No. 201710093861.2, mailed on Mar. 5, 2019, 6 pages (3 pages of English Translation and 3 pages of Official Copy).
Office Action received for Chinese Patent Application No. 201710093861.2, mailed on Sep. 14, 2018, 15 pages (6 pages of English Translation and 9 pages of Official Copy).
Office Action received for Chinese Patent Application No. 201710094150.7, mailed on Dec. 19, 2018, 12 Pages (5 pages of English translation and 7 pages of Official Copy).
Office Action received for Chinese Patent Application No. 201710094150.7, mailed on Jan. 10, 2022, 6 pages (3 pages of English Translation and 3 pages of Official Copy).
Office Action received for Chinese Patent Application No. 201710094150.7, mailed on Jul. 31, 2019, 6 pages (2 pages of English Translation and 4 pages of Official Copy).
Office Action received for Chinese Patent Application No. 201710198190.6, mailed on Jan. 24, 2022, 16 pages (6 pages of English Translation and 10 pages of Official Copy).

(56) References Cited

OTHER PUBLICATIONS

Office Action received for Chinese Patent Application No. 201710198190.6, mailed on May 8, 2021, 22 pages (8 pages of English Translation and 14 pages of Official Copy).
Office Action received for Chinese Patent Application No. 201710198190.6, mailed on Oct. 12, 2020, 18 pages (6 pages of English Translation and 12 pages of Official Copy).
Office Action received for Chinese Patent Application No. 201710198190.6, mailed on Sep. 25, 2019, 27 pages (12 pages of English Translation and 15 pages of Official Copy).
Office Action received for Chinese Patent Application No. 201711292804.3, mailed on Aug. 5, 2020, 26 pages (16 pages of English Translation and 10 pages of Official Copy).
Office Action received for Chinese Patent Application No. 201711292804.3, mailed on Feb. 23, 2021, 17 pages (8 pages of English Translation and 9 pages of Official Copy).
Office Action received for Chinese Patent Application No. 201711292804.3, mailed on Sep. 10, 2021, 19 pages (8 pages of English Translation and 11 pages of Official Copy).
Office Action received for Chinese Patent Application No. 201780002398.4, mailed on Feb. 27, 2019, 6 pages (3 pages of English Translation and 3 pages of Official Copy).
Office Action received for Chinese Patent Application No. 201780002398.4, mailed on Sep. 12, 2018, 17 pages (5 pages of English Translation and 12 pages of Official Copy).
Office Action received for Chinese Patent Application No. 201780053143.0, mailed on Dec. 16, 2021, 19 pages (10 pages of English Translation and 9 pages of Official Copy).
Office Action received for Chinese Patent Application No. 201780053143.0, mailed on Dec. 24, 2020, 21 pages (11 pages of English Translation and 10 pages of Official Copy).
Office Action received for Chinese Patent Application No. 201780053143.0, mailed on Mar. 30, 2022, 12 pages (5 pages of English Translation and 7 pages of Official Copy).
Office Action received for Chinese Patent Application No. 201780053143.0, mailed on May 22, 2020, 21 pages (11 pages of English Translation and 10 pages of Official Copy).
Office Action received for Chinese Patent Application No. 201780053143.0, mailed on Sep. 3, 2021, 24 pages (15 pages of English Translation and 9 pages of Official Copy).
Office Action received for Chinese Patent Application No. 201810094316.X, mailed on Apr. 28, 2019, 9 pages (3 pages of English Translation and 6 pages of Official Copy).
Office Action received for Chinese Patent Application No. 201810094316.X, mailed on Aug. 5, 2019, 9 pages (3 pages of English Translation and 6 pages of Official Copy).
Office Action received for Chinese Patent Application No. 201810094316.X, mailed on Oct. 29, 2018, 12 pages (5 pages of English Translation and 7 pages of Official Copy).
Office Action received for Chinese Patent Application No. 201810338038.8, mailed on Jan. 21, 2020, 26 pages (13 pages of English Translation and 13 pages of Official Copy).
Office Action received for Chinese Patent Application No. 201810338038.8, mailed on May 14, 2019, 26 pages (13 pages of English Translation and 13 pages of Official Copy).
Office Action received for Chinese Patent Application No. 201810338040.5, mailed on Jun. 3, 2021, 25 pages (15 pages of English Translation and 10 pages of Official Copy).
Office Action received for Chinese Patent Application No. 201810338040.5, mailed on Oct. 25, 2021, 22 pages (13 pages of English Translation and 9 pages of Official Copy).
Office Action received for Chinese Patent Application No. 201810338826.7, mailed on Apr. 3, 2019, 21 pages (13 pages of English Translation and 8 pages of Official Copy).
Office Action received for Chinese Patent Application No. 201810338826.7, mailed on Jan. 16, 2020, 16 Pages (10 pages of English Translation and 6 pages of Official Copy).
Office Action received for Chinese Patent Application No. 201810338826.7, mailed on Oct. 21, 2019, 19 pages (12 pages of English Translation and 7 pages of Official Copy).
Office Action received for Chinese Patent Application No. 201810339290.0, mailed on Jun. 4, 2021, 20 pages (11 pages of English Translation and 9 pages of Official Copy).
Office Action received for Chinese Patent Application No. 201810339290.0, mailed on Oct. 18, 2021, 20 pages (11 pages of English Translation and 9 pages of Official Copy).
Office Action received for Chinese Patent Application No. 201810954931.3, mailed on Jan. 15, 2021, 11 pages (5 pages of English Translation and 6 pages of Official Copy).
Office Action received for Chinese Patent Application No. 201810955077.2, mailed on Feb. 20, 2021, 19 pages (8 pages of English Translation and 11 pages of Official Copy).
Office Action received for Chinese Patent Application No. 201811460172.1, mailed on Jan. 21, 2020, 17 pages (8 pages of English Translation and 9 pages of Official Copy).
Office Action received for Chinese Patent Application No. 201811460172.1, mailed on Oct. 14, 2020, 7 pages (4 pages of English Translation and 3 pages of Official Copy).
Office Action received for Chinese Patent Application No. 201880000798.6, mailed on Aug. 5, 2020, 18 pages (9 pages of English Translation and 9 pages of Official Copy).
Office Action received for Chinese Patent Application No. 201880000798.6, mailed on Dec. 30, 2021, 10 pages (5 pages of English Translation and 5 pages of Official Copy).
Office Action received for Chinese Patent Application No. 201880000798.6, mailed on Jul. 2, 2021, 15 pages (8 pages of English Translation and 7 pages of Official Copy).
Office Action received for Chinese Patent Application No. 201910070375.8, mailed on Dec. 4, 2019, 23 pages (12 pages of English Translation and 11 pages of Official Copy).
Office Action received for Chinese Patent Application No. 201910070375.8, mailed on Sep. 3, 2020, 8 pages (4 pages of English Translation and 4 pages of Official Copy).
Office Action received for Chinese Patent Application No. 201910109868.8, mailed on Jun. 30, 2020, 15 pages (7 pages of English Translation and 8 pages of Official Copy).
Office Action received for Chinese Patent Application No. 201910109868.8, mailed on Mar. 16, 2020, 19 pages (10 pages of English Translation and 9 pages of Official Copy).
Office Action received for Chinese Patent Application No. 201910109868.8, mailed on Sep. 19, 2019, 23 pages (11 pages of English Translation and 12 pages of Official Copy).
Office Action received for Chinese Patent Application No. 201910246400.3, mailed on Apr. 19, 2022, 24 pages (13 pages of English Translation and 11 pages of Official Copy).
Office Action received for Chinese Patent Application No. 201910246439.5, mailed on Apr. 23, 2020, 14 pages (7 pages of English Translation and 7 pages of Official Copy).
Office Action received for Chinese Patent Application No. 201910246439.5, mailed on Oct. 15, 2019, 17 pages (9 pages of English Translation and 8 pages of Official Copy).
Office Action received for Chinese Patent Application No. 201910246439.5, mailed on Sep. 2, 2020, 15 pages (8 pages of English Translation and 7 pages of Official Copy).
Office Action received for Chinese Patent Application No. 201910278273.5, mailed on Jan. 3, 2020, 17 pages (10 pages of English Translation and 7 pages of Official Copy).
Office Action received for Chinese Patent Application No. 201910278273.5, mailed on Jun. 9, 2020, 8 pages (5 pages of English Translation and 3 pages of Official Copy).
Office Action received for Chinese Patent Application No. 201910744886.3, mailed on Jan. 18, 2021, 10 pages (4 pages of English Translation and 6 pages of Official Copy).
Office Action received for Chinese Patent Application No. 201910899698.8, mailed on Mar. 23, 2020, 15 pages (9 pages of English Translation and 6 pages of Official Copy).
Office Action received for Chinese Patent Application No. 201910899698.8, mailed on May 27, 2020, 10 pages (6 pages of English Translation and 4 pages of Official Copy).
Office Action received for Chinese Patent Application No. 201911199010.1, mailed on Mar. 29, 2021, 14 pages (8 pages of English Translation and 6 pages of Official Copy).

(56) References Cited

OTHER PUBLICATIONS

Office Action received for Chinese Patent Application No. 201911199010.1, mailed on Nov. 4, 2020, 20 pages (10 pages of English Translation and 10 pages of Official Copy).
Office Action received for Chinese Patent Application No. 201911199010.1, mailed on Sep. 3, 2021, 12 pages (7 pages of English Translation and 5 pages of Official Copy).
Office Action received for Chinese Patent Application No. 201980009669.8, mailed on Dec. 3, 2021, 26 pages (12 pages of English Translation and 14 pages of Official Copy).
Office Action received for Chinese Patent Application No. 201980041865.3, mailed on Apr. 13, 2022, 12 pages (6 pages of English Translation and 6 pages of Official Copy).
Office Action received for Chinese Patent Application No. 201980041865.3, mailed on May 24, 2021, 14 pages (8 pages of English Translation and 6 pages of Official Copy).
Office Action received for Chinese Patent Application No. 201410407626.4, mailed on Feb. 12, 2019, 13 pages (3 Pages of English Translation and 10 pages of Official Copy).
Office Action received for Danish Patent Application No. PA201670628, mailed on Jun. 6, 2017, 3 pages.
Office Action received for Danish Patent Application No. PA201670628, mailed on Oct. 26, 2016, 7 pages.
Office Action received for Danish Patent Application No. PA201770418, mailed on May 8, 2018, 3 pages.
Office Action received for Danish Patent Application No. PA201770419, mailed on Jan. 10, 2018, 4 pages.
Office Action received for Danish Patent Application No. PA201770712, mailed on Jul. 20, 2018, 4 pages.
Office Action received for Danish Patent Application No. PA201770712, mailed on Mar. 1, 2019, 3 pages.
Office Action received for Danish Patent Application No. PA201770713, mailed on Apr. 18, 2018, 4 pages.
Office Action received for Danish Patent Application No. PA201770713, mailed on Jun. 7, 2019, 4 pages.
Office Action received for Danish Patent Application No. PA201770713, mailed on Nov. 13, 2018, 3 pages.
Office Action received for Danish Patent Application No. PA201770714, mailed on Aug. 17, 2018, 6 pages.
Office Action received for Danish Patent Application No. PA201770714, mailed on Feb. 21, 2018, 3 pages.
Office Action received for Danish Patent Application No. PA201770714, mailed on Oct. 13, 2017, 9 pages.
Office Action received for Danish Patent Application No. PA201770715, mailed on Mar. 8, 2018, 4 pages.
Office Action received for Danish Patent Application No. PA201770715, mailed on Oct. 29, 2018, 4 pages.
Office Action received for Danish Patent Application No. PA201770782, mailed on Jan. 26, 2018, 8 pages.
Office Action received for Danish Patent Application No. PA201770782, mailed on Nov. 22, 2018, 3 pages.
Office Action received for Danish Patent Application No. PA201870370, mailed on Nov. 9, 2018, 4 pages.
Office Action received for Danish Patent Application No. PA201870371, mailed on Nov. 20, 2018, 3 pages.
Office Action received for Danish Patent Application No. PA201870855, mailed on May 14, 2020, 4 pages.
Office Action received for Danish Patent Application No. PA201870855, mailed on Nov. 7, 2019, 4 pages.
Office Action received for Danish Patent Application No. PA201970127, mailed on Dec. 20, 2019, 3 pages.
Office Action received for Danish Patent Application No. PA201970127, mailed on Feb. 24, 2020, 2 pages.
Office Action received for European Patent Application No. 12770400.5, mailed on Mar. 10, 2015, 5 pages.
Office Action received for European Patent Application No. 12773460.6, mailed on Feb. 19, 2018, 6 pages.
Office Action Received for European Patent Application No. 13171145.9, mailed on Apr. 28, 2016, 5 pages.
Office Action Received for European Patent Application No. 13171145.9, mailed on May 3, 2018, 4 pages.
Office Action received for European Patent Application No. 15168475.0, mailed on Dec. 19, 2016, 5 pages.
Office Action received for European Patent Application No. 15168475.0, mailed on May 6, 2020, 5 pages.
Office Action received for European Patent Application No. 15719347.5, mailed on Apr. 9, 2020, 4 pages.
Office Action received for European Patent Application No. 15719347.5, mailed on Jun. 17, 2019, 4 pages.
Office Action received for European Patent Application No. 15727291.5, mailed on Jan. 15, 2018, 8 pages.
Office Action received for European Patent Application No. 16201159.7, mailed on Jun. 12, 2019, 10 pages.
Office Action Received for European Patent Application No. 16201195.1, mailed on Feb. 14, 2018, 12 pages.
Office Action received for European Patent Application No. 16201205.8, mailed on Feb. 16, 2018, 12 pages.
Office Action received for European Patent Application No. 17799904.2, mailed on Oct. 21, 2020, 6 pages.
Office Action received for European Patent Application No. 17853654.6, mailed on Mar. 23, 2020, 4 pages.
Office Action received for European Patent Application No. 18208881.5, mailed on Jun. 11, 2019, 5 pages.
Office Action received for European Patent Application No. 18208881.5, mailed on May 7, 2021, 6 pages.
Office Action received for European Patent Application No. 18704335.1, mailed on Sep. 23, 2019, 7 pages.
Office Action received for European Patent Application No. 18713408.5, mailed on May 20, 2019, 5 pages.
Office Action received for European Patent Application No. 18713408.5, mailed on May 26, 2020, 5 pages.
Office Action received for European Patent Application No. 18713408.5, mailed on Nov. 4, 2020, 6 pages.
Office Action received for European Patent Application No. 18713408.5, mailed on Nov. 20, 2019, 4 pages.
Office Action received for European Patent Application No. 18830326.7, mailed on Apr. 30, 2020, 5 pages.
Office Action received for European Patent Application No. 18830326.7, mailed on Aug. 13, 2020, 6 pages.
Office Action received for European Patent Application No. 18830326.7, mailed on Aug. 27, 2019, 6 pages.
Office Action received for European Patent Application No. 18830326.7, mailed on Nov. 22, 2019, 8 pages.
Office Action received for European Patent Application No. 18830326.7, mailed on Sep. 16, 2019, 6 pages.
Office Action received for European Patent Application No. 19150528.8, mailed on Jul. 1, 2020, 6 pages.
Office Action received for European Patent Application No. 19160344.8, mailed on Mar. 26, 2021, 7 pages.
Office Action received for European Patent Application No. 19160344.8, mailed on Oct. 7, 2021, 8 pages.
Office Action received for European Patent Application No. 19160348.9, mailed on May 14, 2020, 4 pages.
Office Action received for European Patent Application No. 19160348.9, mailed on Nov. 17, 2020, 6 pages.
Office Action received for European Patent Application No. 19186538.5, mailed on Oct. 12, 2020, 7 pages.
Office Action received for European Patent Application No. 19186538.5, mailed on Oct. 22, 2021, 7 pages.
Office Action received for European Patent Application No. 19194828.0, mailed on May 10, 2021, 6 pages.
Office Action received for European Patent Application No. 19194828.0, mailed on Oct. 15, 2020, 7 pages.
Office Action received for European Patent Application No. 19716254.8, mailed on Aug. 9, 2021, 8 pages.
Office Action received for European Patent Application No. 19731554.2, mailed on Apr. 19, 2022, 8 pages.
Office Action received for European Patent Application No. 19769336.9, mailed on Nov. 4, 2021, 6 pages.
Office Action received for European Patent Application No. 20186286.9, mailed on Jan. 25, 2022, 8 pages.

(56) References Cited

OTHER PUBLICATIONS

Office Action received for European Patent Application No. 20186286.9, mailed on Jul. 29, 2021, 8 pages.
Office Action received for European Patent Application No. 20191533.7, mailed on May 12, 2022, 5 pages.
Office Action received for European Patent Application No. 20198076.0, mailed on Mar. 25, 2022, 5 pages.
Office Action received for European Patent Application No. 20198076.0, mailed on Sep. 22, 2021, 6 pages.
Office Action received for German Patent Application No. 202015004267.8, mailed on Nov. 4, 2015, 4 pages (3 pages of English Translation and 1 page of Official Copy).
Office Action received for Indian Patent Application No. 201617006865, mailed on Dec. 11, 2019, 7 pages.
Office Action received for Indian Patent Application No. 201617039493, mailed on Oct. 21, 2019, 6 pages.
Office Action received for Indian Patent Application No. 201618024020, mailed on Sep. 14, 2020, 7 pages.
Office Action received for Indian Patent Application No. 201817036875, mailed on Oct. 29, 2021, 8 pages.
Office Action received for Indian Patent Application No. 201917024374, mailed on Dec. 30, 2021, 10 pages.
Office Action received for Indian Patent Application No. 201918003782, mailed on Nov. 18, 2021, 8 pages.
Office Action received for Indian Patent Application No. 201918027146, mailed on Jan. 4, 2022, 7 pages.
Office Action received for Indian Patent Application No. 202018009834, mailed on Nov. 12, 2021, 6 pages.
Office Action received for Indian Patent Application No. 202018009906, mailed on Apr. 29, 2022, 9 pages.
Office Action received for Indian Patent Application No. 202018014786, mailed on Nov. 9, 2021, 7 pages.
Office Action received for Indian Patent Application No. 202018038351, mailed on Feb. 25, 2022, 6 pages.
Office Action received for Indian Patent Application No. 202018041558, mailed on Dec. 3, 2021, 7 pages.
Office Action received for Indian Patent Application No. 202018044420, mailed on Jan. 31, 2022, 6 pages.
Office Action received for Indian Patent Application No. 202118009403, mailed on Feb. 21, 2022, 6 pages.
Office Action received for Indian Patent Application No. 202118018461, mailed on Feb. 23, 2022, 6 pages.
Office Action received for Japanese Patent Application No. 2013-098406, mailed on Jul. 19, 2016, 10 pages (5 pages of English Translation and 5 pages of Official Copy).
Office Action received for Japanese Patent Application No. 2015-083696, mailed on Jun. 17, 2016, 12 pages (7 pages of English Translation and 5 pages of Official Copy).
Office Action received for Japanese Patent Application No. 2016-131998, mailed on Aug. 10, 2018, 9 pages (5 pages of English Translation and 4 pages of Official Copy).
Office Action received for Japanese Patent Application No. 2016-131998, mailed on Sep. 25, 2017, 10 pages (5 pages of English translation and 5 pages of Official Copy).
Office Action received for Japanese Patent Application No. 2016-224506, mailed on May 14, 2019, 22 pages (11 pages of English Translation and 11 pages of Official Copy).
Office Action received for Japanese Patent Application No. 2016-224507, mailed on Jun. 16, 2017, 16 pages (8 pages of English Translation and 8 pages of Official Copy).
Office Action received for Japanese Patent Application No. 2016-540927, mailed on Jun. 20, 2017, 12 pages (7 pages of English Translation and 5 pages of Official Copy).
Office Action received for Japanese Patent Application No. 2016-558332, mailed on Dec. 8, 2017, 12 pages (6 pages of English translation and 6 pages of Official Copy).
Office Action received for Japanese Patent Application No. 2016-558332, mailed on Jul. 27, 2018, 9 pages (4 pages of English Translation and 5 pages of Official Copy).
Office Action received for Japanese Patent Application No. 2016-569665, mailed on Aug. 20, 2018, 9 pages (4 pages of English Translation and 5 pages of Official Copy).
Office Action received for Japanese Patent Application No. 2016-569665, mailed on Jan. 19, 2018, 10 pages (5 pages of English Translation and 5 pages of Official Copy).
Office Action received for Japanese Patent Application No. 2017-075031, mailed on Jul. 30, 2018, 16 pages (8 pages of English Translation and 8 pages of Official Copy).
Office Action received for Japanese Patent Application No. 2017-085582, mailed on Jul. 2, 2018, 11 pages (6 pages of English Translation and 5 pages of Official Copy).
Office Action received for Japanese Patent Application No. 2017-507413, mailed on Feb. 22, 2019, 11 pages (5 pages of English Translation and 6 pages of Official Copy).
Office Action received for Japanese Patent Application No. 2017-507413, mailed on May 25, 2018, 14 pages (7 pages of English Translation and 7 pages of Official Copy).
Office Action received for Japanese Patent Application No. 2018-113081, mailed on Apr. 9, 2019, 6 pages (3 pages of English Translation and 3 pages of Official Copy).
Office Action received for Japanese Patent Application No. 2018-113081, mailed on Jan. 10, 2020, 8 pages (4 pages of English Translation and 4 pages of Official Copy).
Office Action received for Japanese Patent Application No. 2018-113081, mailed on Oct. 2, 2020, 7 pages (4 pages of English Translation and 3 pages of Official Copy).
Office Action received for Japanese Patent Application No. 2018-551159, mailed on Jan. 27, 2020, 8 pages (4 pages of English Translation and 4 pages of Official Copy).
Office Action received for Japanese Patent Application No. 2018-551159, mailed on Sep. 30, 2019, 6 pages (3 pages of English Translation and 3 pages of Official Copy).
Office Action received for Japanese Patent Application No. 2018-560107, mailed on Jun. 14, 2019, 26 pages (13 pages of English Translation and 13 pages of Official Copy).
Office Action received for Japanese Patent Application No. 2019-053379, mailed on May 29, 2020, 11 pages (6 pages of English Translation and 5 pages of Official Copy).
Office Action received for Japanese Patent Application No. 2019-053379, mailed on Oct. 18, 2019, 11 pages (6 pages of English Translation and 5 pages of Official Copy).
Office Action received for Japanese Patent Application No. 2019-107235, mailed on Oct. 18, 2019, 8 pages (4 pages of English Translation and 4 pages of Official Copy).
Office Action received for Japanese Patent Application No. 2019-194603, mailed on Jan. 4, 2021, 8 pages (4 pages of English Translation and 4 pages of Official Copy).
Office Action received for Japanese Patent Application No. 2019-238894, mailed on Mar. 6, 2020, 7 pages (3 pages of English Translation and 4 pages of Official Copy).
Office Action received for Japanese Patent Application No. 2019-510416, mailed on May 15, 2020, 4 pages (2 pages of English Translation and 2 pages of Official Copy).
Office Action received for Japanese Patent Application No. 2019-510416, mailed on Oct. 18, 2019, 4 pages (2 pages of English translation and 2 pages of Official Copy).
Office Action received for Japanese Patent Application No. 2019-511975, mailed on Apr. 10, 2020, 6 pages (3 pages of English Translation and 3 pages of Official Copy).
Office Action received for Japanese Patent Application No. 2019-563560, mailed on Jun. 14, 2021, 6 pages (3 pages of English Translation and 3 pages of Official Copy).
Office Action received for Japanese Patent Application No. 2019-563560, mailed on Nov. 30, 2020, 7 pages (3 pages of English Translation and 4 pages of Official Copy).
Office Action received for Japanese Patent Application No. 2020-028315, mailed on Feb. 7, 2022, 6 pages (3 pages of English Translation and 3 pages of Official Copy).
Office Action received for Japanese Patent Application No. 2020-028315, mailed on Jul. 6, 2020, 18 pages (10 pages of English Translation and 8 pages of Official Copy).

(56) References Cited

OTHER PUBLICATIONS

Office Action received for Japanese Patent Application No. 2020-028315, mailed on Nov. 9, 2020, 11 pages (6 pages of English Translation and 5 pages of Official Copy).
Office Action received for Japanese Patent Application No. 2020-126751, mailed on Jan. 5, 2021, 8 pages (4 pages of English Translation and 4 pages of Official Copy).
Office Action received for Japanese Patent Application No. 2020-159979, mailed on May 10, 2021, 9 pages (5 pages of English Translation and 4 pages of Official Copy).
Office Action received for Japanese Patent Application No. 2020-184605, mailed on Feb. 14, 2022, 24 pages (11 pages of English Translation and 13 pages of Official Copy).
Office Action received for Japanese Patent Application No. 2020-566978, mailed on Feb. 4, 2022, 12 pages (6 pages of English Translation and 6 pages of Official Copy).
Office Action received for Japanese Patent Application No. 2021-001028, mailed on Jan. 31, 2022, 10 pages (5 pages of English Translation and 5 pages of Official Copy).
Office Action received for Japanese Patent Application No. 2021-015128, mailed on Jun. 14, 2021, 4 pages (2 pages of English Translation and 2 pages of Official Copy).
Office Action received for Korean Patent Application No. 10-2014-7008348, mailed on Jan. 22, 2019, 16 pages (1 page of English Translation and 15 pages of Official Copy).
Office Action received for Korean Patent Application No. 10-2015-7010262, mailed on Mar. 8, 2017, 6 pages (3 pages of English Translation and 3 pages of Official Copy).
Office Action received for Korean Patent Application No. 10-2015-7010262, mailed on May 24, 2016, 10 pages (3 pages of English Translation and 7 pages of Official Copy).
Office Action received for Korean Patent Application No. 10-2016-0152210, mailed on Jan. 29, 2019, 7 pages (3 pages of English Translation and 4 pages of Official Copy).
Office Action received for Korean Patent Application No. 10-2016-0152210, mailed on May 14, 2018, 13 pages (6 pages of English Translation and 7 pages of Official Copy).
Office Action received for Korean Patent Application No. 10-2016-0152210, mailed on May 30, 2019, 8 pages (4 pages of English Translation and 4 pages of Official Copy).
Office Action received for Korean Patent Application No. 10-2016-7009347, mailed on Feb. 18, 2018, 9 pages (4 pages of English Translation and 5 pages of Official Copy).
Office Action received for Korean Patent Application No. 10-2016-7009632, mailed on Feb. 2, 2018, 11 pages (5 pages of English Translation and 6 pages of Official Copy).
Office Action received for Korean Patent Application No. 10-2016-7035555, mailed on Dec. 26, 2017, 5 pages (2 pages of English Translation and 3 pages of Official Copy).
Office Action received for Korean Patent Application No. 10-2016-7035555, mailed on Jul. 18, 2019, 9 pages (4 pages of English Translation and 5 pages of Official Copy).
Office Action received for Korean Patent Application No. 10-2016-7035555, mailed on Sep. 18, 2018, 9 pages (4 pages of English Translation and 5 pages of Official Copy).
Office Action received for Korean Patent Application No. 10-2017-0022365, mailed on Jun. 26, 2017, 10 pages (4 pages of English Translation and 6 pages of Official Copy).
Office Action received for Korean Patent Application No. 10-2017-0022546, mailed on Jun. 21, 2017, 12 pages (5 pages of English Translation and 7 pages of Official Copy).
Office Action received for Korean Patent Application No. 10-2017-0022582, mailed on Jul. 31, 2019, 5 pages (2 pages of English Translation and 3 pages of Official Copy).
Office Action received for Korean Patent Application No. 10-2017-0022582, mailed on Sep. 19, 2018, 6 pages (2 pages of English Translation and 4 pages of Official Copy).
Office Action received for Korean Patent Application No. 10-2017-7012145, mailed on Jul. 18, 2019, 5 pages (2 Pages of English Translation and 3 Pages of Official Copy).
Office Action received for Korean Patent Application No. 10-2017-7012145, mailed on Sep. 13, 2018, 6 pages (3 pages of English Translation and 3 pages of Official Copy).
Office Action received for Korean Patent Application No. 10-2017-7015582, mailed on Apr. 5, 2018, 8 pages (4 pages of English Translation and 4 pages of Official Copy).
Office Action received for Korean Patent Application No. 10-2017-7015582, mailed on Jun. 12, 2017, 9 pages (4 pages of English Translation and 5 pages of Official Copy).
Office Action received for Korean Patent Application No. 10-2018-7022895, mailed on Aug. 17, 2018, 8 pages (3 pages of English Translation and 5 pages of Official Copy).
Office Action received for Korean Patent Application No. 10-2018-7028845, mailed on Jun. 19, 2019, 7 pages (3 pages of English Translation and 4 pages of Official Copy).
Office Action received for Korean Patent Application No. 10-2018-7033301, mailed on Dec. 14, 2018, 6 pages (2 pages of English Translation and 4 pages of Official Copy).
Office Action received for Korean Patent Application No. 10-2019-7003374, mailed on Jun. 10, 2019, 7 pages (2 pages of English Translation and 5 pages of official Copy).
Office Action received for Korean Patent Application No. 10-2019-7003836, mailed on Jun. 14, 2019, 7 pages (2 pages of English Translation and 5 pages of Official Copy).
Office Action received for Korean Patent Application No. 10-2019-7004734, mailed on Jul. 4, 2019, 7 pages (2 pages of English Translation and 5 pages of Official Copy).
Office Action received for Korean Patent Application No. 10-2019-7005136, mailed on Jan. 28, 2020, 5 pages (2 pages of English Translation and 3 pages of Official Copy).
Office Action received for Korean Patent Application No. 10-2019-7005925, mailed on Jul. 4, 2019, 24 pages (11 pages of English Translation and 13 pages of Official Copy).
Office Action received for Korean Patent Application No. 10-2019-7014494, mailed on Jun. 14, 2019, 11 pages (5 pages of English Translation and 6 pages of Official Copy).
Office Action received for Korean Patent Application No. 10-2019-7014988, mailed on Jul. 19, 2019, 9 pages (4 pages of English Translation and 5 pages of Official Copy).
Office Action received for Korean Patent Application No. 10-2019-7033799, mailed on Apr. 27, 2021, 9 pages (4 pages of English Translation and 5 pages of Official Copy).
Office Action received for Korean Patent Application No. 10-2019-7033799, mailed on Nov. 23, 2021, 6 pages (3 pages of English Translation and 3 pages of Official Copy).
Office Action received for Korean Patent Application No. 10-2020-0097418, mailed on Aug. 28, 2020, 6 pages (2 pages of English Translation and 4 pages of Official Copy).
Office Action received for Korean Patent Application No. 10-2020-7002929, mailed on Mar. 22, 2020, 5 pages (2 pages of English Translation and 3 pages of Official Copy).
Office Action received for Korean Patent Application No. 10-2020-7011424, mailed on Jul. 7, 2020, 6 pages (2 pages of English Translation and 4 pages of Official Copy).
Office Action received for Korean Patent Application No. 10-2020-7020782, mailed on Aug. 19, 2020, 8 pages (4 pages of English Translation and 4 pages of Official Copy).
Office Action received for Korean Patent Application No. 10-2020-7020782, mailed on Mar. 29, 2021, 7 pages (3 pages of English Translation and 4 pages of Official Copy).
Office Action received for Korean Patent Application No. 10-2020-7022596, mailed on Jul. 28, 2021, 26 pages (13 pages of English Translation and 13 pages of Official Copy).
Office Action received for Korean Patent Application No. 10-2020-7027862, mailed on Jan. 29, 2021, 8 pages (3 pages of English Translation and 5 pages of Official Copy).
Office Action received for Korean Patent Application No. 10-2020-7034180, mailed on Aug. 17, 2021, 15 pages (6 pages of English Translation and 9 pages of Official Copy).
Office Action received for Korean Patent Application No. 10-2020-7034405, mailed on Dec. 4, 2021, 15 pages (7 pages of English Translation and 8 pages of Official Copy).

(56) References Cited

OTHER PUBLICATIONS

Office Action received for Korean Patent Application No. 10-2021-7011888, mailed on Jul. 27, 2021, 11 pages (5 pages of English Translation and 6 pages of Official Copy).
Office Action received for Korean Patent Application No. 10-2021-7015473, mailed on Aug. 25, 2021, 5 pages (2 page of English Translation and 3 pages of Official Copy).
Office Action received for Korean Patent Application No. 10-2021-7032984, mailed on Feb. 22, 2022, 8 pages (4 pages of English Translation and 4 pages of Official Copy).
Office Action received for Korean Patent Application No. 10-2022-0010942, mailed on Apr. 27, 2022, 5 pages (2 pages of English Translation and 3 pages of Official Copy).
Office Action received for Korean Patent Application No. 10-2022-7004578, mailed on Mar. 22, 2022, 11 pages (5 pages of English Translation and 6 pages of Official Copy).
Office Action received for Korean Patent Application No. 10-2016-7009347, mailed on Mar. 9, 2017, 15 pages (7 pages of English Translation and 8 pages of Official Copy).
Office Action received for Korean Patent Application No. 10-2018-7028845, mailed on Dec. 10, 2018, 8 pages (4 pages of English Translation and 4 pages of Official Copy).
Office Action received for Taiwan Patent Application No. 103136545, mailed on May 25, 2016, 7 pages (3 pages of English Translation and 4 pages of Official Copy).
Office Action received for Taiwan Patent Application No. 103131074, mailed on Jul. 21, 2015, 16 pages (7 pages of English Translation and 9 pages of Official Copy).
Office Action received for Taiwanese Patent Application No. 104114953, issued on Feb. 18, 2017, 9 pages (4 pages of English Translation and 5 pages of Official Copy).
Office Action received for Taiwanese Patent Application No. 104114953, mailed on Jun. 8, 2016, 11 pages (5 pages of English Translation and 6 pages of Official Copy).
Office Action received for Taiwanese Patent Application No. 104117508, issued on Jul. 14, 2017, 9 pages (4 pages of English Translation and 5 pages of Official Copy).
Office Action received for Taiwanese Patent Application No. 104117508, issued on Jul. 20, 2016, 19 pages (8 pages of English Translation and 11 pages of Official Copy).
Office Action received for Taiwanese Patent Application No. 104117508, issued on Mar. 20, 2017, 22 pages (9 pages of English Translation and 13 pages of Official Copy).
Office Action received for Taiwanese Patent Application No. 104117508, mailed on Jan. 25, 2019, 24 pages (5 pages of English Translation and 19 pages of Official Copy).
Office Action received for Taiwanese Patent Application No. 104117508, mailed on May 22, 2019, 7 pages (3 pages of English Translation and 4 pages of Official Copy).
Office Action received for Taiwanese Patent Application No. 107138003, issued on Mar. 20, 2019, 6 pages (3 pages of English Translation and 3 pages of Official Copy).
Real Solution of two-step-authentication Password Management for Authentication Enhancement, Fukuda Takao, Nikkei Pc, Jpn, Nikkei Business Publications, Inc., No. 694, Mar. 24, 2014, 11 pages (3 pages of English translation and 8 pages of Official Copy).
Record of Oral Hearing received for U.S. Appl. No. 13/243,045, mailed on Apr. 1, 2019, 18 pages.
Record of Oral Hearing received for U.S. Appl. No. 13/243,045, mailed on May 7, 2021, 18 pages.
Record of Oral Hearing received for U.S. Appl. No. 15/714,887, mailed on Feb. 15, 2022, 16 pages.
Requirement for Restriction/Election received for U.S. Appl. No. 16/938,362, mailed on May 4, 2022, 6 pages.
Result of Consultation received for European Patent Application No. 18713408.5, mailed on Aug. 30, 2021, 5 pages.
Result of Consultation received for European Patent Application No. 18830326.7, mailed on Jun. 21, 2021, 5 pages.
Result of Consultation received for European Patent Application No. 19160344.8, mailed on Feb. 4, 2022, 3 pages.
Result of Consultation received for European Patent Application No. 19194828.0, mailed on May 9, 2022, 4 pages.
Search Report and Opinion received for Danish Patent Application No. PA201770418, mailed on Jun. 23, 2017, 8 pages.
Search Report and Opinion received for Danish Patent Application No. PA201770419, mailed on Jun. 19, 2017, 6 pages.
Search Report and Opinion received for Danish Patent Application No. PA201770712, mailed on Oct. 25, 2017, 10 pages.
Search Report and Opinion received for Danish Patent Application No. PA201770713, mailed on Oct. 31, 2017, 9 pages.
Search Report and Opinion received for Danish Patent Application No. PA201770715, issued on Nov. 9, 2017, 10 pages.
Search Report and Opinion received for Danish Patent Application No. PA201870370, mailed on Sep. 7, 2018, 11 pages.
Search Report and Opinion received for Danish Patent Application No. PA201870371, mailed on Sep. 14, 2018, 14 pages.
Search Report and Opinion received for Danish Patent Application No. PA201870855, mailed on Apr. 3, 2019, 12 pages.
Search Report and Opinion received for Danish Patent Application No. PA201970127, mailed on Oct. 4, 2019, 9 pages.
Summons to Attend Oral Proceedings received for European Patent Application No. 12770400.5, mailed on Mar. 19, 2018, 10 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201159.7, mailed on Feb. 4, 2021, 12 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 17799904.2, mailed on Dec. 20, 2021, 8 pages.
Summons to Attend Oral Proceedings received for European Patent Application No. 18713408.5, mailed on Apr. 30, 2021, 5 pages.
Summons to Attend Oral Proceedings received for European Patent Application No. 18830326.7, mailed on Feb. 25, 2021, 6 pages.
Summons to Attend Oral Proceedings received for European Patent Application No. 19150528.8, mailed on Mar. 15, 2022, 7 pages.
Summons to Attend Oral Proceedings received for European Patent Application No. 19194828.0, mailed on Feb. 3, 2022, 10 pages.
Summons to Attend Oral Proceedings received for European Patent Application No. 19194828.0, mailed on Feb. 10, 2022, 2 pages.
Supplemental Notice of Allowance received for U.S. Appl. No. 15/899,996, mailed on Jul. 25, 2018, 2 pages.
Third Party Observations received for European Patent Application No. 15168475.0, mailed on Jul. 19, 2016, 4 pages.
Decision to Refuse received for European Patent Application No. 08834386.8, mailed on Apr. 8, 2013, 8 pages.
Office Action received for European Patent Application No. 08834386.8, mailed on Aug. 23, 2010, 4 pages.
Summons to Attend Oral Proceedings received for European Patent Application No. 08834386.8, mailed on Aug. 24, 2012, 4 pages.
Notice of Allowance received for Taiwan Patent Application No. 097134592, mailed on Aug. 12, 2014, 3 pages (Official Copy only) See Communication Under 37 CFR § 1.98(a) (3).
Notice of Allowance received for Taiwan Patent Application No. 101107082, mailed on Oct. 22, 2014, 2 pages (Official Copy only) See Communication Under 37 CFR § 1.98(a) (3).
Office Action received for Taiwan Patent Application No. 101107082, mailed on Jul. 7, 2014, 21 pages (7 pages of English Translation and 14 pages of Official Copy).
Notice of Allowance received for Korean Patent Application No. 10-2010-7008899, mailed on Feb. 12, 2016, 1020107008899_KRNOA_02_12_2016, 3 pages (1 page of English Translation and 2 pages of official Copy).
Office Action received for Korean Patent Application No. 10-2010-7008899, mailed on Aug. 17, 2014, 7 pages (3 pages of English Translation and 4 pages of Official Copy).

(56) References Cited

OTHER PUBLICATIONS

Office Action received for Korean Patent Application No. 10-2010-7008899, mailed on Feb. 3, 2015, 7 pages (3 pages of English Translation and 4 pages of Official Copy).
Office Action received for Korean Patent Application No. 10-2010-7008899, mailed on Jan. 28, 2013, 5 pages (2 pages of English Translation and 3 pages of Official Copy).
Office Action received for Korean Patent Application No. 10-2010-7008899, mailed on Jun. 12, 2015, 4 pages (2 pages of English Translation and 2 pages of Official Copy).
Office Action received for Korean Patent Application No. 10-2010-7008899, mailed on Mar. 29, 2012, 6 pages (2 pages of English Translation and 4 pages of Official Copy).
Office Action received for Korean Patent Application No. 10-2010-7008899, mailed on May 30, 2011, 4 pages (2 pages of English Translation and 2 pages of Official Copy).
Decision from Intellectual Property Tribunal received for Korean Patent Application No. 10-2011-7023152, mailed on Feb. 17, 2015, 22 pages (7 pages of English Translation and 15 pages of Official Copy).
Office Action received for Korean Patent Application No. 10-2011-7023152, mailed on Apr. 22, 2014, 6 pages (3 pages of English Translation and 3 pages of Official Copy).
Notice of Allowance received for Korean Patent Application No. 10-2014-7004771, mailed on Oct. 29, 2015, 3 pages (1 page of English Translation and 2 pages of Official Copy).
Office Action received for Korean Patent Application No. 10-2014-7004771, mailed on Jun. 12, 2015, 6 pages (3 pages English Translation and 3 pages of Official Copy).
Office Action received for Korean Patent Application No. 10-2014-7004771, mailed on Apr. 22, 2014, 5 pages (2 pages of English Translation and 3 pages of Official Copy).
Office Action received for Korean Patent Application No. 10-2014-7004771, mailed on Oct. 21, 2014, 7 pages (3 pages of English Translation and 4 pages of Official Copy).
Notice of Allowance received for Korean Patent Application No. 10-2014-7004772, mailed on Feb. 12, 2016, 4 pages (1 page of English Translation and 3 pages of Official Copy).
Office Action received for Korean Patent Application No. 10-2014-7004772, mailed on Apr. 22, 2014, 8 pages (3 pages of English translation and 5 pages of Official Copy).
Office Action received for Korean Patent Application No. 10-2014-7004772, mailed on Oct. 21, 2014, 5 pages (2 pages of English Translation and 3 pages of official Copy).
Notice of Allowance received for Korean Patent Application No. 10-2014-7004773, mailed on Jan. 7, 2016, 3 pages (1 page English Translation and 2 pages of Official Copy).
Office Action received for Korean Patent Application No. 10-2014-7004773, mailed on Apr. 22, 2014, 9 pages (4 pages of English Translation and 5 pages of Office Action).
Office Action received for Korean Patent Application No. 10-2014-7004773, mailed on Jun. 12, 2015, 6 pages (3 pages English Translation and 3 pages of Official Copy).
Office Action received for Korean Patent Application No. 10-2014-7004773, mailed on Oct. 21, 2014, 9 pages (4 pages of English Translation and 5 pages of Official Copy).
Notice of Allowance received for Korean Patent Application No. 10-2014-7025441, issued on Feb. 26, 2016, 3 pages (1 page English Translation and 2 pages of Official Copy).
Notice of Preliminary Rejection received for Korean Patent Application No. 10-2014-7025441, mailed on Jun. 12, 2015, 9 pages (4 pages of English Translation and 5 pages of Official Copy).
Office Action received for Korean Patent Application No. 10-2014-7025441, mailed on Oct. 21, 2014, 5 pages (2 pages of English Translation and 3 pages of official Copy).
Notice of Allowance received for Korean Patent Application No. 10-2015-7004548, issued on Feb. 26, 2016, 3 pages (1 page English Translation and 2 pages of Official Copy).
Notice of Preliminary Rejection received for Korean Patent Application No. 10-2015-7004548, mailed on Jun. 12, 2015, 8 pages (4 pages of English Translation and 4 pages of Official Copy).
Notice of Preliminary Rejection received from Korean Patent Application No. 10-2015-7010262, mailed on Jun. 12, 2015, 5 pages (2 pages of English Translation and 3 pages of Official Copy).
Office Action received for Taiwan Patent Application No. 103136545, mailed on Nov. 2, 2015, 39 pages (15 pages of English Translation and 24 pages of Official Copy).
Final Office Action received for U.S. Appl. No. 12/207,370, mailed on Dec. 13, 2011, 15 pages.
Final Office Action received for U.S. Appl. No. 12/207,370, mailed on Feb. 15, 2013, 17 pages.
Non-Final Office Action received for U.S. Appl. No. 12/207,370, mailed on Aug. 2, 2012, 16 pages.
Non-Final Office Action received for U.S. Appl. No. 12/207,370, mailed on May 6, 2011, 15 pages.
Non-Final Office Action received for U.S. Appl. No. 12/207,370, mailed on Oct. 17, 2013, Oct. 17, 2013, 17 pages.
Notice of Allowance received for U.S. Appl. No. 12/207,370, mailed on Jun. 7, 2013, 9 pages.
Notice of Allowance received for U.S. Appl. No. 12/207,370, mailed on Mar. 6, 2014, 5 pages.
Supplemental Notice of Allowance received for U.S. Appl. No. 12/207,370, mailed on Aug. 8, 2013, 2 pages.
Advisory Action received for U.S. Appl. No. 12/207,374, mailed on Feb. 25, 2013, 3 pages.
Advisory Action received for U.S. Appl. No. 12/207,374, mailed on May 15, 2014, 3 pages.
Final Office Action received for U.S. Appl. No. 12/207,374, mailed on Jan. 31, 2014, 12 pages.
Final Office Action received for U.S. Appl. No. 12/207,374, mailed on Nov. 6, 2012, 25 pages.
Final Office Action received for U.S. Appl. No. 12/207,374, mailed on Oct. 21, 2011, 16 pages.
Non-Final Office Action received for U.S. Appl. No. 12/207,374, mailed on Apr. 15, 2011, 13 pages.
Non-Final Office Action received for U.S. Appl. No. 12/207,374, mailed on Jun. 7, 2013, Jun. 7, 2013, 26 pages.
Non-Final Office Action received for U.S. Appl. No. 12/207,374, mailed on May 24, 2012, 20 pages.
Notice of Allowance received for U.S. Appl. No. 12/207,374, mailed on Aug. 29, 2014, 8 pages.
Notice of Allowance received for U.S. Appl. No. 12/207,374, mailed on Dec. 4, 2014, 8 pages.
Decision to Grant received for the European Patent Application No. 12181538.5, mailed on Jul. 2, 2015, 1 page.
Extended European Search Report received for European Patent Application No. 12181538.5, mailed on Oct. 23, 2012, 6 pages.
Intention to Grant received for European Patent Application No. 12181538.5, mailed on Feb. 20, 2015, 8 pages.
Office Action received for European Patent Application No. 12181538.5, mailed on Dec. 16, 2013, 4 pages.
Final Office Action received for U.S. Appl. No. 13/243,045, mailed on Aug. 5, 2015, 10 pages.
Non-Final Office Action received for U.S. Appl. No. 13/243,045, mailed on Mar. 17, 2015, 9 pages.
Non-Final Office Action received for U.S. Appl. No. 13/243,326, mailed on Feb. 14, 2013, Feb. 14, 2013, 13 pages.
Notice of Allowance received for U.S. Appl. No. 13/243,326, mailed on Sep. 23, 2013, Sep. 23, 2013, 11 pages.
Extended European Search Report (includes Partial European Search Report and European Search Opinion) received for European Patent Application No. 13171145.9, mailed on Feb. 5, 2014, 6 pages.
Notice of Allowance received for U.S. Appl. No. 14/142,657, mailed on Jan. 8, 2015, 5 pages.
Notice of Allowance received for U.S. Appl. No. 14/142,657, mailed on Jul. 23, 2015, 2 pages.
Notice of Allowance received for U.S. Appl. No. 14/142,657, mailed on Jun. 29, 2015, 7 pages.
Notice of Allowance received for U.S. Appl. No. 14/142,657, mailed on Sep. 10, 2014, 9 pages.

(56) References Cited

OTHER PUBLICATIONS

Notice of Allowance received for U.S. Appl. No. 14/142,661, mailed on Aug. 3, 2015, 10 pages.
Notice of Allowance received for U.S. Appl. No. 14/142,661, mailed on Sep. 28, 2015, 9 pages.
Notice of Allowance received for U.S. Appl. No. 14/142,661, mailed on Dec. 3, 2015, 2 pages.
Final Office Action received for U.S. Appl. No. 14/142,669, mailed on Jun. 12, 2015, 14 pages.
Non-Final Office Action received for U.S. Appl. No. 14/142,669, mailed on Oct. 28, 2015, 14 pages.
Non-Final Office Action received for U.S. Appl. No. 14/142,669, mailed on Sep. 12, 2014, 11 pages.
Notice of Allowance received for U.S. Appl. No. 14/142,674, mailed on Feb. 18, 2015, 7 pages.
Notice of Allowance received for U.S. Appl. No. 14/142,674, mailed on Jan. 23, 2015, 7 pages.
Notice of Allowance received for U.S. Appl. No. 14/142,674, mailed on Sep. 26, 2014, 18 pages.
Notice of Allowance received for U.S. Appl. No. 14/255,765, mailed on Jun. 12, 2014, 10 pages.
Advisory Action received for U.S. Appl. No. 14/311,214, mailed on Feb. 10, 2015, 4 pages.
Final Office Action received for U.S. Appl. No. 14/311,214, mailed on Jan. 8, 2015, 12 pages.
Final Office Action received for U.S. Appl. No. 14/311,214, mailed on Sep. 24, 2015, 15 pages.
Non-Final Office Action received for U.S. Appl. No. 14/311,214, mailed on Apr. 10, 2015, 12 pages.
Non-Final Office Action received for U.S. Appl. No. 14/311,214, mailed on Sep. 18, 2014, 10 pages.
Notice of Allowance received for U.S. Appl. No. 14/311,214, mailed on Jan. 21, 2016, 7 pages.
Final Office Action received for U.S. Appl. No. 14/479,088, mailed on Mar. 11, 2015, 10 pages.
Non-Final Office Action received for U.S. Appl. No. 14/479,088, mailed on Jul. 6, 2015, 10 pages.
Non-Final Office Action received for U.S. Appl. No. 14/479,088, mailed on Nov. 18, 2014, 8 pages.
Notice of Allowance received for U.S. Appl. No. 14/479,088, mailed on Nov. 12, 2015, 7 pages.
Notice of Allowance received for U.S. Appl. No. 14/479,088, mailed on Mar. 9, 2016, 2 pages.
Notice of Allowance received for U.S. Appl. No. 14/479,088, mailed on Dec. 23, 2015, 5 pages.
Notice of Allowance received for U.S. Appl. No. 14/479,088, mailed on Jan. 11, 2016, 2 pages.
Notice of Allowance received for U.S. Appl. No. 14/661,796, mailed on Jul. 7, 2015, 10 pages.
Notice of Allowance received for U.S. Appl. No. 14/661,796, mailed on Jul. 23, 2015, 2 pages.
Notice of Allowance received for U.S. Appl. No. 14/873,023, mailed on Dec. 23, 2015, 10 pages.
Notice of Allowance received for U.S. Appl. No. 14/873,023, mailed on Jan. 14, 2016, 2 pages.
Notice of Allowance received for U.S. Appl. No. 15/357,873, mailed on Jan. 8, 2018, 9 pages.
Extended European Search Report (includes Partial European Search Report and European Search Opinion) received for European Patent Application No. 15168475.0, mailed on Oct. 21, 2015, 6 pages.
Notice of Acceptance received for Australian Patent Application No. 2008305338, mailed on Oct. 27, 2011, 1 page.
Office Action received for Australian Patent Application No. 2008305338, mailed on Mar. 21, 2011, 3 pages.
Office Action received for Australian Patent Application No. 2008305338, mailed on Oct. 19, 2010, 3 pages.
Notice of Allowance received for Chinese Patent Application No. 200880108306.1, mailed on Oct. 28, 2014, 2 pages (Official Copy only) See Communication Under 37 CFR § 1.98(a) (3).
Office Action received for Chinese Patent Application No. 200880108306.1, mailed on Aug. 24, 2011, 10 pages (English Translation only).
Office Action received for Chinese Patent Application No. 200880108306.1, mailed on Mar. 20, 2012, 8 pages (English Translation only).
Office Action received for Chinese Patent Application No. 200880108306.1, mailed on Mar. 27, 2014, 6 pages (3 pages of English Translation and 3 pages of Office Action).
Office Action received for Japanese Patent Application No. 2010-525891, mailed on Jun. 12, 2012, 11 pages (5 pages of English Translation and 6 pages of Official Copy).
Office Action received for Australian Patent Application No. 2012200716, issued on Jul. 16, 2014, 4 pages.
Examiner's Pre-Review Report received for Japanese Patent Application No. 2013-098406, mailed on Oct. 8, 2015, 7 pages (4 pages of English Translation and 3 pages of Official Copy).
Office Action received for Japanese Patent Application No. 2013-098406, mailed on Dec. 9, 2013, Dec. 9, 2013, 12 pages (6 pages of English Translation and 6 pages of Official Copy).
Office Action received for Japanese Patent Application No. 2013-098406, mailed on Dec. 15, 2014, 12 pages (7 pages of English Translation and 5 pages of Official Copy).
Office Action received from Japanese Patent Application No. 2013-098406, mailed on May 8, 2015, 14 pages (9 pages of English Translation and 5 pages of Official Copy).
Office Action received for Australian Patent Application No. 2014204462, issued on May 8, 2015, 4 pages.
Examination Report received for Australian Patent Application No. 2015202397, mailed on Feb. 29, 2016, 4 pages.
Adractas et al., "The road to mobile payments services", Mckinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Adrianisen, "Samsung Galaxy S8 Face Recognition—Register Your Face Review!", Retrieved from < https://www.youtube.com/watch?v=04KVPaCJq94>, Apr. 27, 2017, 1 page.
Bao et al., "Location-based and Preference-Aware Recommendation Using Sparse Geo- Social Networking Data", ACM SIGSPATIAL GIS '12, Redondo Beach, CA, USA, Online available at: https://www.microsoft.com/en-us/research/wp-content/uploads/2016/02/LocationRecommendation.pdf, Nov. 6-9, 2012, 10 pages.
Brumberg et al., "The Unlock Project: A Python-based framework for practical brain- computer interface communication "app" development", Conf Proc IEEE Eng Med Biol Soc. 2012, doi:10.1109/EMBC.2012.6346473, Institute of Electrical and Electronics Engineers, 2012, 11 pages.
CV Meerkat, "Extracting Face Orientation in Real-time", Available online at: <https://www.youtube.com/watch?v=Ugwfnjx6UYw>, Jul. 22, 2016, 3 pages.
Das et al., "A Security Framework for Mobile-to-Mobile Payment Network", International Conference on Personal Wireless Communications, Jan. 25, 2005, pp. 420-423.
Drareni Jamil, "Face Tracking and Head Pose Estimation with Open CV", Available online at: <https://www.youtube.com/watch?v=Etj_aktbnwM>, Jun. 9, 2013, 3 pages.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only) See Communication Under 37 CFR § 1.98(a) (3).
How To Smartphone, "Samsung Galaxy S7—screen rotation on / off", Available Online at <https://www.youtube.com/watch?v=np54sEEI11E >, see video from 1:10 to 1:30., Dec. 12, 2016, 3 pages.
IDEX, "IDEX Fingerprint Sensor Mobile Glass Display", YouTube, available at <https://www.youtube.com/watch?v=X1dAIP5sFzw>, Apr. 11, 2013, 2 pages.
Iphoneblog, "iOS 5.0.1 Security Flaw—Bypass the Passcode—Access Camera Roll", You Tube, available at <https://www.youtube.com/watch?v=qd0Fwgaymb0>, Feb. 24, 2012, 2 pages.

(56) References Cited

OTHER PUBLICATIONS

Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31(Official Copy only) See Communication Under 37 CFR § 1.98(a) (3).
Komachi Aneem, "Time Attendance—Face Recognition—Biometrics", Available at <https://www.youtube.com/watch?v=ascITiliSbc>, Feb. 9, 2010, 1 page.
Kurihara Ryo, "Torisetsu of Os X that we want to know", Mac Fan, Japan, Mai Navi Co. Ltd., vol. 21, No. 6, Jun. 1, 2013, 8 pages (Official Copy only) See Communication Under 37 CFR § 1.98(a) (3).
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Naver Blog, "How to Use Smart Wallet and Registered Card", Online Available at <http://feena74.blog.me/140185758401>, Mar. 29, 2013, 20 pages.
Nhdanh -Protocol Corp, "How to Enroll Face Enbioaccess T9 Nitgen Korea—Đăng Ký Khuôn Mặt Enbioaccess T9 Nitgen", Available online at <https://www.youtube.com/watch?v=mFn03PD4NIE>, Mar. 30, 2017, 1 page.
Okazolab, "Kinect Based 3D Head Tracking in Behavioural Research", Available online at: <https://www.youtube.com/watch?v=nigRvT9beQw>, Aug. 8, 2012, 3 pages.
Onefacein, "[How It Works] Securing Your Smartphone with OneFaceIn", Biometric Password Manager, Available at <https://www.youtube.com/watch?v=h-JG5SPxBQ0>, Dec. 2, 2016, 1 page.
Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
International Preliminary Report on Patentability received for PCT Patent Application No. PCT/US2008/075738, completed on Jan. 28, 2010, 15 pages.
International Search Report and Written Opinion received for PCT Patent Application No. PCT/US2008/075738, mailed on Jul. 2, 2009, 14 pages.
International Search Report and Written Opinion received for PCT Patent Application No. PCT/US2014/054800, mailed on Jan. 29, 2015, 33 pages.
International Search Report and Written Opinion received for PCT Patent Application No. PCT/US2015/025188, mailed on Jun. 23, 2015, 11 pages.
IPhone 4S Tips 'N' Tricks: Access the Camera from the Lock Screen—Phones 4u, YouTube, available at <https://www.youtube.com/watch?v=C8eDN4Vu2mg>, Dec. 9, 2011, 2 pages.
Phonebuff, "How to Use Face Unlock on Android 4.0 ICS", Retrieved from <https://www.youtube.com/watch?v=0ASf6jkpFKE>, Dec. 15, 2011, 1 page.
Plaisant et al., "Touchscreen Toggle Switches: Push or slide? Design Issues and Usability Study", Technical Report CAR-TR-521, CS-TR-2557, Nov. 1990, pp. 1-10.
PSP Security Ltd., "AccuFACE features", Available online at <https://www.youtube.com/watch?v=p3jvGoEbioY>, Oct. 14, 2009, 1 page.
PSP Security Ltd., "Psp Security—AccuFACE Step by Step Enrollment Process", Available online at <https://www.youtube.com/watch?v=0IIF50Odya0>, Oct. 14, 2009, 1 page.
Pu Fang, "Research on Location-aware Service in Pervasive Computing", Issue No. 7, Information Technology Series, China Doctoral Dissertations, Jul. 15, 2008, 140 pages (Official Copy only) See Communication Under 37 CFR § 1.98(a) (3).
Qiye Wang, "Design and Implementation of SAN Device Access Control in Unified Storage Platform", Master's Theses, Huazhong University of Science & Technology, Wuhan, Jun. 2008, 63 pages (Official Copy only) See Communication Under 37 CFR § 1.98(a) (3).

Riley et al., "Instruction, Feedback and Biometrics: The User Interface for Fingerprint Authentication System", Interact 2009, Part II, LNCS 5727, IFPI International Federation for Information Processing, 2009, pp. 293-305.
Sawamura Toru, "Emergency Proposal; personal information should be immediately unitarily managed", PC fan, Japan, Mainichi Communications Inc., 11th Edition, vol. 11, No. 240, Jun. 15, 2004, pp. 20-21 (official Copy only) See Communication Under 37 CFR § 1.98(a) (3).
Schofield Tim, "Face Unlock Demonstration on the HTC EVO 4G LTE", Retrieved from <https://www.youtube.com/watch?v=TNL9Or_9SWg>, May 31, 2012, 1 page.
SchÜrmann et al., "BANDANA—Body Area Network Device-to-Device Authentication Using Natural gAit", Ambient Intelligence, Comnet, Aalto University, DOI: 10.1109/PERCOM.2017.7917865, Dec. 11, 2016, 11 pages.
Sensory Trulysecure, "AppLock Face/Voice Recognition", Available at <https://www.youtube.com/watch?v=odax5O51aT0>, May 27, 2015, 1 page.
Stateoftech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.
Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, 16 pages (Official Copy only) See Communication Under 37 CFR § 1.98(a) (3).
Thanakulmas Thanit, "MasterCard Identity Check Facial Recognition Biometrics", Available at <https://www.youtube.com/watch?v=g4sMbrkt1gl>, Oct. 10, 2016, 1 page.
Videoreborn, "Motorola Atrix 4g: Wet Fingerprint Scanner Better Than iPhone 5S Fingerprint Scanner!", YouTube, available at <https://www.youtube.com/watch?v=MSJIIG93MPg>, Mar. 16, 2011, 2 pages.
Wang Na, "Research of Face Detection System Based on Mobile Phone Platform", Video Engineering, vol. 36, No. 11, Nov. 2012, 5 pages (Official Copy Only) See Communication Under 37 CFR § 1.98(a) (3).
Weiss et al., "Smartphone and Smartwatch-Based Biometrics using Activities of Daily Living", IEEE Access, DOI : 10.1109/ACCESS.2019.2940729, vol. XX, 2017, 13 pages.
Wikipedia, "QR code", Available online at: https://en.wikipedia.org/w/index.php?title=OR_code&oldid=452939488, Sep. 28, 2011, pp. 1-9.
Yongxi et al.h "Application of RFID Technology in Mobile Payment", China Academic Journal Electronic Publishing House, 1994-2022, Nov. 25, 2012, pp. 97-99 (Official Copy Only) See Communication Under 37 CFR § 1.98(a) (3).
Zhang et al., "WristUnlock: Secure and Usable Smartphone Unlocking with Wrist Wearables", IEEE Conference on Communications and Network Security (CNS), 2019, 9 pages.
Non-Final Office Action received for U.S. Appl. No. 18/137,985, mailed on Dec. 21, 2023, 8 pages.
Office Action received for Australian Patent Application No. 2023203469, mailed on Dec. 18, 2023, 4 pages.
Office Action received for Japanese Patent Application No. 2022-163568, mailed on Dec. 22, 2023, 8 pages (4 pages of English Translation and 4 pages of Official Copy).
Summons to Attend Oral Proceedings received for European Patent Application No. 19160348.9, mailed on Dec. 19, 2023, 7 pages.
Applicant-Initiated Interview Summary received for U.S. Appl. No. 17/962,369, mailed on Oct. 16, 2023, 4 pages.
Decision to Grant received for European Patent Application No. 19716254.8, mailed on Oct. 6, 2023, 2 pages.
Final Office Action received for U.S. Appl. No. 17/725,311, mailed on Oct. 13, 2023, 66 pages.
Kormann et al., "Risks of the Passport Single Signon Protocol", IEEE Computer Networks, Jul. 2000, 12 pages.
Non-Final Office Action received for U.S. Appl. No. 17/900,734, mailed on Oct. 24, 2023, 12 pages.
Non-Final Office Action received for U.S. Appl. No. 18/105,191, mailed on Oct. 13, 2023, 23 pages.

(56) References Cited

OTHER PUBLICATIONS

Notice of Allowance received for Japanese Patent Application No. 2020-184605, mailed on Oct. 10, 2023, 4 pages (1 page of English Translation and 3 pages of Official Copy).
Notice of Allowance received for Japanese Patent Application No. 2021-149549, mailed on Oct. 16, 2023, 4 pages (1 page of English Translation and 3 pages of Official Copy).
Applicant-Initiated Interview Summary received for U.S. Appl. No. 17/087,855, mailed on Jul. 5, 2022, 2 pages.
Board Decision received for Chinese Patent Application No. 201510284715.9, mailed on Jul. 21, 2022, 22 pages (2 pages of English Translation and 20 pages of Official Copy).
Board Decision received for Chinese Patent Application No. 201710198190.6, mailed on May 23, 2022, 2 pages (1 page of English Translation and 1 page of Official Copy).
Board Decision received for Chinese Patent Application No. 201810338826.7, mailed on May 30, 2022, 20 pages (2 pages of English Translation and 18 pages of Official Copy).
Board Opinion received for Chinese Patent Application No. 201510284715.9, mailed on Jun. 6, 2022, 14 pages (3 pages of English Translation and 11 pages of Official Copy).
Brief Communication Regarding Oral Proceedings received for European Patent Application No. 19150528.8, mailed on Sep. 5, 2022, 2 pages.
Corrected Notice of Allowance received for U.S. Appl. No. 17/208,957, mailed on Jun. 30, 2022, 2 pages.
Decision on Appeal received for Korean Patent Application No. 10-2019-7033799, mailed on Jul. 19, 2022, 23 pages (3 pages of English Translation and 20 pages of Official Copy).
Decision to Grant received for European Patent Application No. 18713408.5, mailed on Sep. 1, 2022, 3 pages.
Decision to Grant received for European Patent Application No. 19160344.8, mailed on Sep. 1, 2022, 3 pages.
Hwang et al., "Toward Event-Based Haptics: Rendering Contact Using Open-Loop Force Pulses", 12th International Symposium on Haptic Interfaces for Virtual Environment and Teleoperator Systems, 2004, 8 pages.
Intention to Grant received for European Patent Application No. 18713408.5, mailed on May 23, 2022, 10 pages.
Intention to Grant received for European Patent Application No. 19194828.0, mailed on Jun. 30, 2022, 9 pages.
Intention to Grant received for European Patent Application No. 19769336.9, mailed on May 31, 2022, 13 pages.
Liu et al., "PKI Authentication System Combining with Fingerprint", Computer Engineering, vol. 39, No. 09, May 2005, 3 pages (Official Copy only). {See Communication under 37 CFR § 1.98(a) (3)}.
Minutes of the Oral Proceedings received for European Patent Application No. 19194828.0, mailed on Jun. 28, 2022, 6 pages.
Non-Final Office Action received for U.S. Appl. No. 17/087,855, mailed on Jul. 21, 2022, 23 pages.
Non-Final Office Action received for U.S. Appl. No. 17/516,495, mailed on Jul. 6, 2022, 10 pages.
Notice of Acceptance received for Australian Patent Application No. 2021202352, mailed on Jun. 6, 2022, 3 pages.
Notice of Allowance received for Chinese Patent Application No. 201510284896.5, mailed on Jun. 6, 2022, 2 pages (1 page of English Translation and 1 page of Official Copy).
Notice of Allowance received for Chinese Patent Application No. 201980041865.3, mailed on Aug. 16, 2022, 6 pages (3 pages of English Translation and 3 pages of Official Copy).
Notice of Allowance received for Japanese Patent Application No. 2020-028315, mailed on May 27, 2022, 3 pages (1 page of English Translation and 2 pages of Official Copy).
Notice of Allowance received for Japanese Patent Application No. 2021-035572, mailed on Jun. 3, 2022, 4 pages (1 page of English Translation and 3 pages of Official Copy).
Notice of Allowance received for Japanese Patent Application No. 2022-070240, mailed on Aug. 5, 2022, 4 pages (1 page of English Translation and 3 pages of Official Copy).
Notice of Allowance received for Korean Patent Application No. 10-2021-7032984, mailed on Jun. 29, 2022, 5 pages (2 pages of English Translation and 3 pages of Official Copy).
Notice of Allowance received for Korean Patent Application No. 10-2022-0010942, mailed on Aug. 10, 2022, 6 pages (2 pages of English Translation and 4 pages of Official Copy).
Notice of Allowance received for Korean Patent Application No. 10-2020-7034405, mailed on Jun. 20, 2022, 6 pages (2 pages of English Translation and 4 pages of Official Copy).
Notice of Allowance received for U.S. Appl. No. 16/369,473, mailed on Jun. 8, 2022, 7 pages.
Notice of Allowance received for U.S. Appl. No. 17/015,429, mailed on Jun. 1, 2022, 5 pages.
Notice of Allowance received for U.S. Appl. No. 17/208,957, mailed on Aug. 17, 2022, 11 pages.
Notice of Allowance received for U.S. Appl. No. 17/208,957, mailed on Jun. 15, 2022, 12 pages.
Notice of Hearing received for Indian Patent Application No. 201617039493, mailed on Aug. 10, 2022, 3 pages.
Office Action received for Australian Patent Application No. 2019281965, mailed on Aug. 31, 2022, 5 pages.
Office Action received for Chinese Patent Application No. 201710198190.6, mailed on Jul. 5, 2022, 7 pages (3 pages of English Translation and 4 pages of Official Copy).
Office Action received for Chinese Patent Application No. 201980009669.8, mailed on Aug. 3, 2022, 19 pages (12 pages of English Translation and 7 pages of Official Copy).
Office Action received for European Patent Application No. 19160348.9, mailed on Aug. 4, 2022, 6 pages.
Office Action received for Japanese Patent Application No. 2019-563560, mailed on Jul. 4, 2022, 34 pages (15 pages of English Translation and 19 pages of Official Copy).
Office Action received for Japanese Patent Application No. 2021-084065, mailed on Jun. 24, 2022, 12 pages (6 pages of English Translation and 6 pages of Official Copy).
Office Action received for Korean Patent Application No. 10-2022-7012864, mailed on Jun. 27, 2022, 9 pages (4 pages of English Translation and 5 pages of Official Copy).
Office Action received for Korean Patent Application No. 10-2022-7012869, mailed on Jun. 27, 2022, 11 pages (5 pages of English Translation and 6 pages of Official Copy).
Summons to Attend Oral Proceedings received for European Patent Application No. 18208881.5, mailed on Jun. 29, 2022, 9 pages.
Applicant-Initiated Interview Summary received for U.S. Appl. No. 17/062,941, mailed on Dec. 14, 2023, 2 pages.
Applicant-Initiated Interview Summary received for U.S. Appl. No. 18/136,819, mailed on Dec. 20, 2023, 2 pages.
Notice of Allowance received for Korean Patent Application No. 10-2022-7033655, mailed on Nov. 29, 2023, 6 pages (2 pages of English Translation and 4 pages of Official Copy).
Office Action received for Chinese Patent Application No. 202211283788.2, mailed on Nov. 1, 2023, 10 pages (5 pages of English Translation and 5 pages of Official Copy).
Office Action received for Chinese Patent Application No. 202211285112.7, mailed on Nov. 11, 2023, 6 pages (3 pages of English Translation and 3 pages of Official Copy).
Carrected Notice of Allowance received for U.S. Appl. No. 17/496,716, mailed on Dec. 6, 2023, 2 pages.
Extended European Search Report received for European Patent Application No. 23199594.5, mailed on Nov. 28, 2023, 11 pages.
FSS, "Mobile Banking", Available online at: https://mobile.fssnet.co.in/mpayweb/Retrieved on: Dec. 5, 2023, 2 pages.
Notice of Hearing received for Indian Patent Application No. 201618024020, mailed on Nov. 21, 2023, 2 pages.
Non-Final Office Action received for U.S. Appl. No. 17/062,941, mailed on Nov. 24, 2023, 8 pages.
Notice of Allowance received for Australian Patent Application No. 2022209019, mailed on Nov. 15, 2023, 3 pages.
Notice of Allowance received for Korean Patent Application No. 10-2022-7014519, mailed on Nov. 16, 2023, 7 pages (2 pages of English Translation and 5 pages of Official Copy).
Notice of Hearing received for Indian Patent Application No. 201617039493, mailed on Nov. 21, 2023, 3 pages.

(56) References Cited

OTHER PUBLICATIONS

Notice of Hearing received for Indian Patent Application No. 202018014786, mailed on Nov. 29, 2023, 3 pages.
Numnonda Thanachart, "Mobile payment", Software Park Thailand, Available online at: https://www.slideshare.net/softwarepark/mobile-payment, Nov. 23, 2010, 6 pages.
Office Action received for Australian Patent Application No. 2022200900, mailed on Nov. 30, 2023, 3 pages.
Office Action received for Chinese Patent Application No. 201910246439.5, mailed on Nov. 22, 2023, 20 pages (3 pages of English Translation and 17 pages of Official Copy).
Pouralinazar Behzad, "The System for Secure Mobile Payment Transactions", Available online at: https://www.diva-portal.org/smash/get/diva2:616934/FULLTEXT01.pdf, 2013, 78 pages.
Decision to Refuse received for Japanese Patent Application No. 2021-168243, mailed on Aug. 14, 2023, 7 pages (3 pages of English Translation and 4 pages of Official Copy).
Final Office Action received for U.S. Appl. No. 17/962,369, mailed on Aug. 15, 2023, 20 pages.
Notice of Allowance received for Korean Patent Application No. 10-2021-7010306, mailed on Aug. 14, 2023, 7 pages (2 pages of English Translation and 5 pages of Official Copy).
Notice of Allowance received for U.S. Appl. No. 17/062,941, mailed on Aug. 11, 2023, 11 pages.
Office Action received for Australian Patent Application No. 2022231779, mailed on Aug. 7, 2023, 5 pages.
6. Office Action received for Chinese Patent Application No. 202211283788.2, mailed on Jul. 7, 2023, 11 pages (8 pages of English Translation and 3 pages of Official Copy).
Brief Communication regarding Oral Proceedings received for European Patent Application No. 20198076.0, mailed on May 2, 2023, 1 page.
Corrected Notice of Allowance received for U.S. Appl. No. 17/409,570, mailed on May 10, 2023, 2 pages.
Decision to Grant received for European Patent Application No. 20186286.9, mailed on May 11, 2023, 4 pages.
Intention to Grant received for European Patent Application No. 19716254.8, mailed on May 16, 2023, 9 pages.
Non-Final Office Action received for U.S. Appl. No. 17/725,311, mailed on May 10, 2023, 54 pages.
Notice of Allowance received for Japanese Patent Application No. 2021-084065, mailed on May 15, 2023, 4 pages (1 page of English Translation and 3 pages of Official Copy).
Notice of Allowance received for U.S. Appl. No. 17/955,311, mailed on May 22, 2023, 7 pages.
Office Action received for Australian Patent Application No. 2022218517, mailed on Apr. 27, 2023, 7 pages.
Office Action received for Australian Patent Application No. 2022235545, mailed on May 11, 2023, 3 pages.
Office Action received for Chinese Patent Application No. 201910109868.8, mailed on Apr. 23, 2023, 29 pages (3 pages of English Translation and 26 pages of Official Copy).
Office Action received for Korean Patent Application No. 10-2022-7029609, mailed on Apr. 28, 2023, 9 pages (4 pages of English Translation and 5 pages of Official Copy).
Brief Communication Regarding Oral Proceedings received for European Patent Application No. 20198076.0, mailed on Aug. 28, 2023, 1 page.
Notice of Acceptance received for Australian Patent Application No. 2022206826, mailed on Aug. 24, 2023, 3 pages.
Office Action received for Australian Patent Application No. 2022209019, mailed on Aug. 18, 2023, 4 pages.
Advisory Action received for U.S. Appl. No. 17/962,369, mailed on Nov. 13. 2023, 4 pages.
Applicant-Initiated Interview Summary received for U.S. Appl. No. 17/900,734, mailed on Nov. 20, 2023, 4 pages.
Decision on Appeal received for Korean Patent Application No. 10-2022-7004578, mailed on Oct. 31, 2023, 26 pages (5 pages of English Translation and 21 pages of Official Copy).
Office Action received for Australian Patent Application No. 2022231779, mailed on Nov. 6, 2023, 3 pages.
Supplemental Notice of Allowance received for U.S. Appl. No. 17/496,716, mailed on Nov. 17, 2023, 2 pages.
Advisory Action received for U.S. Appl. No. 17/193,991, mailed on Jan. 31, 2023, 3 pages.
Advisory Action received for U.S. Appl. No. 17/863,974, mailed on Feb. 15, 2023, 2 pages.
Appeal Decision received for Australian Patent Application No. 2019268070, mailed on Dec. 22, 2022, 26 pages.
Applicant-Initiated Interview Summary received for U.S. Appl. No. 17/062,941, mailed on Apr. 19, 2023, 2 pages.
Applicant-Initiated Interview Summary received for U.S. Appl. No. 17/409,570, mailed on Dec. 27, 2022, 2 pages.
Applicant-Initiated Interview Summary received for U.S. Appl. No. 17/479,974, mailed on Apr. 4, 2023, 2 pages.
Choong et al., "Fingerprint Self-Captures: Usability of a fingerprint system with real-time feedback", IEEE Fifth International Conference on Biometrics: Theory, Applications and Systems (BTAS). IEEE, 2012. URL: https://ieeexplore.ieee.orgistamp/stamp.jsp?tp. Szar-munber=6374553, 2012, pp. 16-22.
Corrected Notice of Allowance received for U.S. Appl. No. 16/938,362, mailed on Feb. 7, 2023, 4 pages.
Corrected Notice of Allowance received for U.S. Appl. No. 17/087,855, mailed on Jan. 12, 2023, 6 pages.
Corrected Notice of Allowance received for U.S. Appl. No. 17/087,855, mailed on Jan. 25, 2023, 4 pages.
Corrected Notice of Allowance received for U.S. Appl. No. 17/498,557, mailed on Feb. 15, 2023, 4 pages.
Corrected Notice of Allowance received for U.S. Appl. No. 17/498,557, mailed on Jan. 11, 2023, 2 pages.
Corrected Notice of Allowance received for U.S. Appl. No. 17/498,557, mailed on Mar. 15, 2023, 2 pages.
Decision to Refuse received for European Patent Application No. 18208881.5, mailed on Dec. 23, 2022, 12 pages.
Extended European Search Report received for European Patent Application No. 22197752.3, mailed on Feb. 15, 2023, 7 pages.
Extended European Search Report received for European Patent Application No. 22197755.6, mailed on Feb. 20, 2023, 8 pages.
Extended European Search Report received for European Patent Application No. 22198902.3, mailed on Jan. 20, 2023, 9 pages.
Extended European Search Report received for European Patent Application No. 22212086.7, mailed on Feb. 21, 2023, 10 pages.
Extended European Search Report received for European Patent Application No. 23157906.1, mailed on Apr. 6, 2023, 10 pages.
Intention to Grant received for European Patent Application No. 20186286.9, mailed on Feb. 17, 2023, 9 pages.
Intention to Grant received for European Patent Application No. 211662879, mailed on Feb. 23, 2023, 9 pages.
International Search Report and Written Opinion received for PCT Patent Application No. PCT/US2022/042978, mailed on Nov. 29, 2022, 15 pages.
Minutes of Oral Proceedings received for European Patent Application No. 18208881.5, mailed on Dec. 22, 2022, 4 pages.
Non-Final Office Action received for U.S. Appl. No. 17/479,974, mailed on Mar. 30, 2023, 6 pages.
Non-Final Office Action received for U.S. Appl. No. 17/479,974, mailed on Feb. 22, 2023, 30 pages.
Non-Final Office Action received for U.S. Appl. No. 17/863,974, mailed on Apr. 13, 2023, 30 pages.
Non-Final Office Action received for U.S. Appl. No. 17/955,311, mailed on Mar. 15, 2023, 6 pages.
Notice of Acceptance received for Australian Patent Application No. 2019268070, mailed on Feb. 27, 2023, 3 pages.
Notice of Allowance received for Chinese Patent Application No. 201910246400.3, mailed on Jan. 28, 2023, 5 pages (1 page of English Translation and 4 pages of Official Copy).
Notice of Allowance received for Japanese Patent Application No. 2022-007217, mailed on Apr. 10, 2023, 4 pages (1 page of English Translation and 3 pages of Official Copy).
Notice of Allowance received for Korean Patent Application No. 10-2022-7012864, mailed on Dec. 15, 2022, 7 pages (2 pages of English Translation and 5 pages of Official Copy).

(56) References Cited

OTHER PUBLICATIONS

Notice of Allowance received for Korean Patent Application No. 10-2022-7012869, mailed on Apr. 18, 2023, 7 pages (2 pages of English Translation and 5 pages of Official Copy).
Notice of Allowance received for U.S. Appl. No. 16/938,362, mailed on Apr. 10, 2023, 7 pages.
Notice of Allowance received for U.S. Appl. No. 16/938,362, mailed on Jan. 19, 2023, 8 pages.
Notice of Allowance received for U.S. Appl. No. 17/193,991, mailed on Mar. 29, 2023, 9 pages.
Notice of Allowance received for U.S. Appl. No. 17/409,570, mailed on Apr. 11, 2023, 7 pages.
Notice of Allowance received for U.S. Appl. No. 17/409,570, mailed on Jan. 25, 2023, 7 pages.
Notice of Allowance received for U.S. Appl. No. 17/519,025, mailed on Mar. 2, 2023, 8 pages.
Office Action received for Australian Patent Application No. 2022200900, mailed on Mar. 28, 2023, 3 pages.
Office Action received for Chinese Patent Application No. 201780053143.0, mailed on Nov. 30, 2022, 13 pages (6 pages of English Translation and 7 pages of Official Copy).
Office Action received for Chinese Patent Application No. 201910246439.5, mailed on Apr. 6, 2023, 14 pages (7 pages of English Translation and 7 pages of Official Copy).
Office Action received for Chinese Patent Application No. 201910901500.5, mailed on Nov. 24, 2022, 22 pages (7 pages of English Translation and 15 pages of Official Copy).
Office Action received for Chinese Patent Application No. 201980009669.8, mailed on Mar. 1, 2023, 19 pages (11 pages of English Translation and 8 pages of Official Copy).
Office Action received for Chinese Patent Application No. 202211283788.2, mailed on Mar. 22, 2023, 15 pages (7 pages of English Translation and 8 pages of Official Copy).
Office Action received for European Patent Application No. 19769669.3, mailed on Apr. 18, 2023, 20 pages.
Office Action received for European Patent Application No. 21166718.3, mailed on Feb. 20, 2023, 7 pages.
Office Action received for European Patent Application No. 21173988.3, mailed on Jan. 19, 2023, 5 pages.
Office Action received for German Patent Application No. 112014004134.3, mailed on Dec. 21, 2022, 22 pages (8 pages of English Translation and 14 pages of Official Copy).
Office Action received for Japanese Patent Application No. 2019-563560, mailed on Jan. 20, 2023, 56 pages (25 pages of English Translation and 31 pages of Official Copy).
Office Action received for Japanese Patent Application No. 2021-084065, mailed on Apr. 10, 2023, 6 pages (3 pages of English Translation and 3 pages of Official Copy).
Office Action received for Japanese Patent Application No. 2021-168243, mailed on Feb. 6, 2023, 8 pages (4 pages of English Translation and 4 pages of Official Copy).
Office Action received for Korean Patent Application No. 10-2021-7010306, mailed on Feb. 15, 2023, 10 pages (5 pages of English Translation and 5 pages of Official Copy).
Office Action received for Korean Patent Application No. 10-2022-7004578, mailed on Jan. 27, 2023, 8 pages (4 pages of English Translation and 4 pages of Official Copy).
Office Action received for Korean Patent Application No. 10-2022-7014519, mailed on Jan. 26, 2023, 9 pages (4 pages of English Translation and 5 pages of Official Copy).
Office Action received for Korean Patent Application No. 10-2022-7015289, mailed on Jan. 28, 2023, 12 pages (5 pages of English translation and 7 pages of Official copy).
Pre-Appeal Review Report received for Japanese Patent Application No. 2020-566978, mailed on Feb. 21, 2023, 4 pages (2 pages of English Translation and 2 pages of Official Copy).
Search Report received for Danish Patent Application No. 202270438, mailed on Dec. 5, 2022, 9 pages.
Summons to Attend Oral Proceedings received for European Patent Application No. 20198076.0, mailed on Feb. 16, 2023, 8 pages.

Applicant-Initiated Interview Summary received for U.S. Appl. No. 17/479,974, mailed on Jul. 21, 2023, 2 pages.
Applicant-Initiated Interview Summary received for U.S. Appl. No. 17/962,369, mailed on Jul. 24, 2023, 4 pages.
Non-Final Office Action received for U.S. Appl. No. 17/496,716, mailed on Jul. 18, 2023, 15 pages.
Notice of Allowance received for U.S. Appl. No. 17/193,991, mailed on Jul. 17, 2023, 10 pages.
Notice of Allowance received for U.S. Appl. No. 17/409,570, mailed on Jul. 20, 2023, 7 pages.
Notice of Allowance received for U.S. Appl. No. 17/863,974, mailed on Jul. 21, 2023, 2 pages.
Office Action received for Australian Patent Application No. 2022200900, mailed on Jul. 13, 2023, 3 pages.
Office Action received for Danish Patent Application No. 202270438, mailed on Jul. 10, 2023, 4 pages.
Applicant Initiated Interview Summary received for U.S. Appl. No. 17/725,311, mailed on Jun. 30, 2023, 5 pages.
Decision to Refuse received for Japanese Patent Application No. 2021-149549, mailed on Jun. 26, 2023, 4 pages (2 pages of English Translation and 2 pages of Official Copy).
Notice of Acceptance received for Australian Patent Application No. 2022235545, mailed on Jun. 27, 2023, 3 pages.
Notice of Allowance received for U.S. Appl. No. 17/863,974, mailed on Jul. 11, 2023, 5 pages.
Office Action received for Australian Patent Application No. 2022206826, mailed on Jul. 4, 2023, 3 pages.
Office Action received for Japanese Patent Application No. 2020-184605, mailed on Jul. 3, 2023, 6 pages (3 pages of English Translation and 3 pages of Official Copy).
Advisory Action received for U.S. Appl. No. 17/479,974, mailed on May 6, 2024, 4 pages.
Alexandridis et al., "Forthroid on Android: A QR-code based Information Access System for Smart Phones", 18th IEEE Workshop on Local & Metropolitan Area Networks (LAN MAN)., 2011, 6 pages.
Applicant-Initiated Interview Summary received for U.S. Appl. No. 17/685,039, mailed on May 16, 2024, 4 pages.
Applicant-Initiated Interview Summary received for U.S. Appl. No. 18/105,191, mailed on Apr. 30, 2024, 2 pages.
Board Decision received for Chinese Patent Application No. 201910901500.5, mailed on Apr. 19, 2024, 2 pages (1 page of English Translation and 1 page of Official Copy).
Brief Communication Regarding Oral Proceedings received for European Patent Application No. 19160348.9, mailed on May 2, 2024, 4 pages.
Final Office Action received for U.S. Appl. No. 17/062,941, mailed on Jun. 3, 2024, 12 pages.
Non-Final Office Action received for U.S. Appl. No. 18/137,985, mailed on Jun. 5, 2024, 9 pages.
Non-Final Office Action received for U.S. Appl. No. 18/239,701, mailed on Jun. 7, 2024, 10 pages.
Notice of Acceptance received for Australian Patent Application No. 2023200797, mailed on May 21, 2024, 3 pages.
Notice of Allowance received for Chinese Patent Application No. 201910901500.5, mailed on May 6, 2024, 4 pages (1 page of English Translation and 3 pages of Official Copy).
Notice of Allowance received for Japanese Patent Application No. 2021-168243, mailed on Apr. 30, 2024, 4 pages (1 page of English Translation and 3 pages of Official Copy).
Notice of Allowance received for U.S. Appl. No. 17/725,311, mailed on May 1, 2024, 5 pages.
Notice of Allowance received for U.S. Appl. No. 18/105,191, mailed on May 22, 2024, 8 pages.
Notice of Hearing received for Indian Patent Application No. 201918003782, mailed on May 8, 2024, 2 pages.
Notice of Hearing received for Indian Patent Application No. 202018041558, mailed on May 20, 2024, 2 pages.
Office Action received for Australian Patent Application No. 2022218517, mailed on Apr. 24, 2024, 4 pages.
Office Action received for Australian Patent Application No. 2023203469, mailed on Apr. 24, 2024, 4 pages.

(56) References Cited

OTHER PUBLICATIONS

Office Action received for Chinese Patent Application No. 201980064012.1, mailed on Mar. 19, 2024, 18 pages (10 pages of English Translation and 8 pages of Official Copy).
Office Action received for Chinese Patent Application No. 202011020666.5, mailed on Apr. 27, 2024, 21 pages (10 pages of English Translation and 11 pages of Official Copy).
Office Action received for European Patent Application No. 19731554.2, mailed on May 8, 2024, 5 pages.
Ohbuchi et al., "Barcode Readers using the Camera Device in Mobile Phones", International Conference on Cyberworlds IEEE, 2004, 6 pages.
Result of Consultation received for European Patent Application No. 19160348.9, mailed on May 8, 2024, 4 pages.
101454795, Cited by Chinese Patent Office in an Office Acton for related Patent Application No. 201911023090.5 on Jan. 29, 2024.
102750631, Cited by Chinese Patent Office in an Office Acton for related Patent Application No. 201911023090.5 on Jan. 29, 2024.
2009-42802, Cited by Chinese Patent Office in an Office Acton for related Patent Application No. 2023-009554 on Apr. 1, 2024.
Weiyi, Liu, " Financial Revolution in the era of Internet Finance and Big Data", China Electric Power Press, Apr. 30, 2014, 7 pages.
Advisory Action received for U.S. Appl. No. 17/479,974, mailed on Apr. 25, 2024, 4 pages.
Advisory Action received for U.S. Appl. No. 17/900,734, mailed on Mar. 21, 2024, 5 pages.
Interview Summary received for U.S. Appl. No. 17/479,974, mailed on Mar. 14, 2024, 2 pages.
Interview Summary received for U.S. Appl. No. 17/900,734, mailed on Feb. 22, 2024, 3 pages.
Interview Summary received for U.S. Appl. No. 18/136,819, mailed on Mar. 19, 2024, 2 pages.
Notice of Allowance received for U.S. Appl. No. 17/587,558, mailed on Apr. 16, 2024, 2 pages.
Notice of Allowance received for U.S. Appl. No. 17/725,311, mailed on Mar. 28, 2024, 2 pages.
To Grant received for European Patent Application No. 20198076.0, mailed on Feb. 1, 2024, 4 pages.
Answer to Appeal Brief received for U.S. Appl. No. 17/962,369, mailed on Apr. 10, 2024, 18 pages.
Office Action received for U.S. Appl. No. 18/105,191, mailed on Feb. 20, 2024, 20 pages.
Final Office Action received for U.S. Appl. No. 18/136,819, mailed on Mar. 4, 2024, 10 pages.
To Grant received for European Patent Application No. 21166718.3, mailed on Mar. 25, 2024, 8 pages.
International Preliminary Report on Patentability received for PCT Patent Application No. PCT/US2022/042978, mailed on Apr. 4, 2024, 12 pages.
Krumm et al., "Multi-camera multi-person tracking for easyliving", Third IEEE International Workshop on Visual Surveillance, Available online at: http://mesh.brown.edu/en193s05-2004/pdfs/KrummEtAl-iwvs00.pdf, Jul. 1, 2000, 8 pages.
Mahfouz et al., "Android users in the wild: Their authentication and usage behavior", Pervasive and Mobile Computing, vol. 32, Jul. 11, 2016, pp. 50-61.
Non-Final Office Action received for U.S. Appl. No. 17/685,039, mailed on Mar. 26, 2024, 40 pages.
Non-Final Office Action received for U.S. Appl. No. 18/136,819, mailed on Apr. 10, 2024, 9 pages.
Non-Final Office Action received for U.S. Appl. No. 18/237,849, mailed on Mar. 26, 2024, 47 pages.
Notice of Acceptance received for Australian Patent Application No. 2022231779, mailed on Feb. 5, 2024, 3 pages.
Notice of Allowance received for Chinese Patent Application No. 202211285112.7, mailed on Mar. 21, 2024, 2 pages (1 page of English Translation and 1 page of Official Copy).
Notice of Allowance received for U.S. Appl. No. 17/587,558, mailed on Apr. 3, 2024, 19 pages.
Notice of Allowance received for U.S. Appl. No. 17/725,311, mailed on Feb. 14, 2024, 8 pages.
Notice of Hearing received for Indian Patent Application No. 202018044420, mailed on Feb. 28, 2024, 2 pages.
Notice of Hearing received for Indian Patent Application No. 202118009403, mailed on Mar. 15, 2024, 2 pages.
Office Action received for Australian Patent Application No. 2022203027, mailed on Mar. 14, 2024, 3 pages.
Office Action received for Chinese Patent Application No. 201880001546.5, mailed on Feb. 24, 2024, 21 pages (11 pages of English Translation and 10 pages of Official Copy).
Office Action received for Chinese Patent Application No. 201880003211.7, mailed on Jan. 23, 2024, 20 pages (10 pages of English Translation and 10 pages of Official Copy).
Office Action received for Chinese Patent Application No. 201911022883.5, mailed on Jan. 6, 2024, 9 pages (4 pages of English Translation and 5 pages of Official Copy).
Office Action received for Chinese Patent Application No. 201911023090.5, mailed on Jan. 29, 2024, 27 pages (7 pages of English Translation and 20 pages of Official Copy).
Office Action received for Chinese Patent Application No. 202110011700.0, mailed on Jan. 24, 2024, 11 pages (5 pages of English Translation and 6 pages of Official Copy).
Office Action received for European Patent Application No. 22188377.0, mailed on Mar. 7, 2024, 7 pages.
Office Action received for Japanese Patent Application No. 2021-168243, mailed on Mar. 8, 2024, 4 pages (2 pages of English Translation and 2 pages of Official Copy).
Office Action received for Japanese Patent Application No. 2022-140146, mailed on Mar. 1, 2024, 8 pages (4 pages of English Translation and 4 pages of Official Copy).
Office Action received for Japanese Patent Application No. 2023-001790, mailed on Mar. 4, 2024, 10 pages (5 pages of English Translation and 5 pages of Official Copy).
Office Action received for Japanese Patent Application No. 2023-009554, mailed on Apr. 1, 2024, 4 pages (2 pages of English Translation and 2 pages of Official Copy).
Office Action received for Korean Patent Application No. 10-2022-0150750, mailed on Feb. 20, 2024, 7 pages (3 pages of English Translation and 4 pages of Official Copy).
Office Action received for Korean Patent Application No. 10-2023-7025821, mailed on Mar. 12, 2024, 11 pages (5 pages of English Translation and 6 pages of Official Copy).
Record of Oral Hearing received for U.S. Appl. No. 17/516,495, mailed on Mar. 5, 2024, 15 pages.
Summons to Attend Oral Proceedings received for European Patent Application No. 20191533.7, mailed on Feb. 13, 2024, 7 pages.
Supplemental Notice of Allowance received for U.S. Appl. No. 17/496,716, mailed on Feb. 1, 2024, 2 pages.
Weiyi, Liu, "Financial Revolution in the era of Internet Finance and Big Data", China Electric Power Press, Apr. 30, 2014, 7 pages (Official Copy only). {See Communication under 37 CFR § 1.98(a) (3)}.
106533918, Cited by Chinese Patent Office in an Office Action for related Patent Application No. 201980064012.1 on Mar. 19, 2024.
106895554, Cited by Chinese Patent Office in an Office Action for related Patent Application No. 201980064012.1 on Mar. 19, 2024.
Brief Communication Regarding Oral Proceedings received for European Patent Application No. 19160348.9, mailed on Jun. 12, 2024, 1 page.
Intention to Grant received for European Patent Application No. 221505951, mailed on Jun. 7, 2024, 9 pages.
Office Action received for Japanese Patent Application No. 2022-163568, mailed on Jun. 3, 2024, 8 pages (4 pages of English Translation and 4 pages of Official Copy).

* cited by examiner

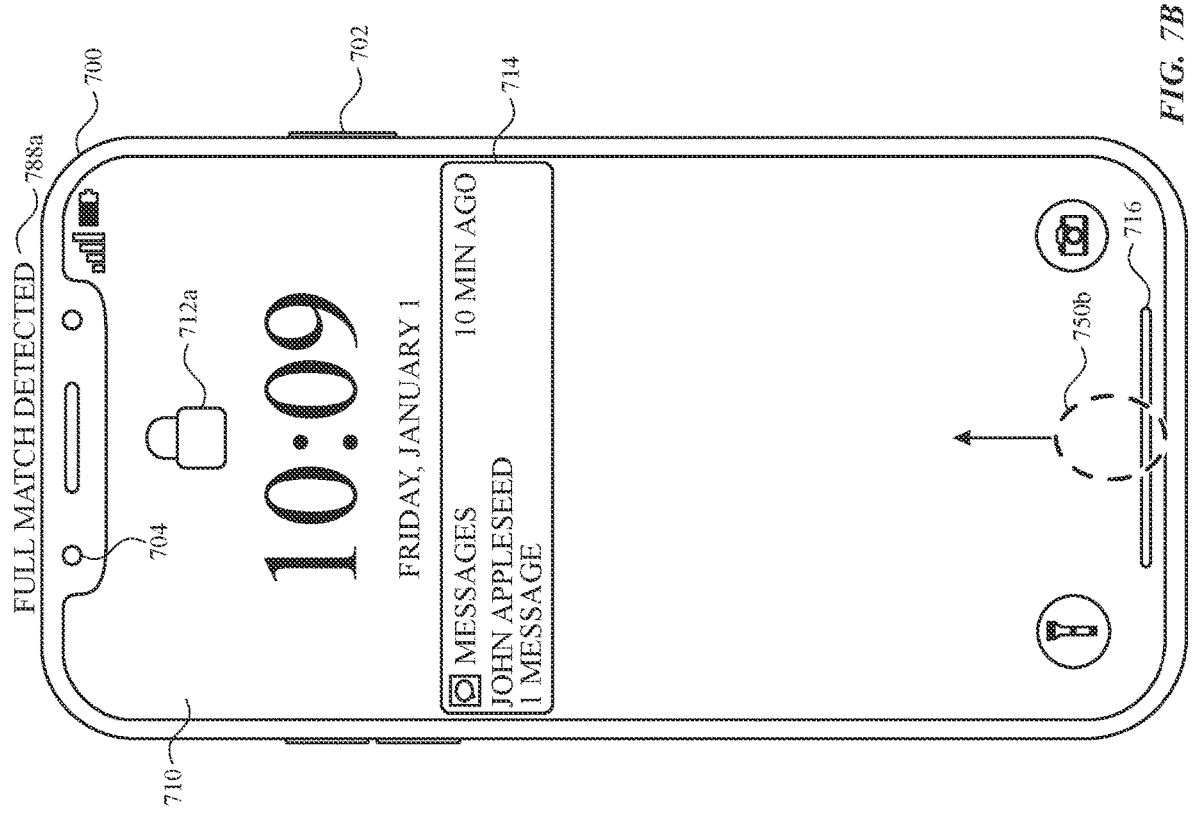
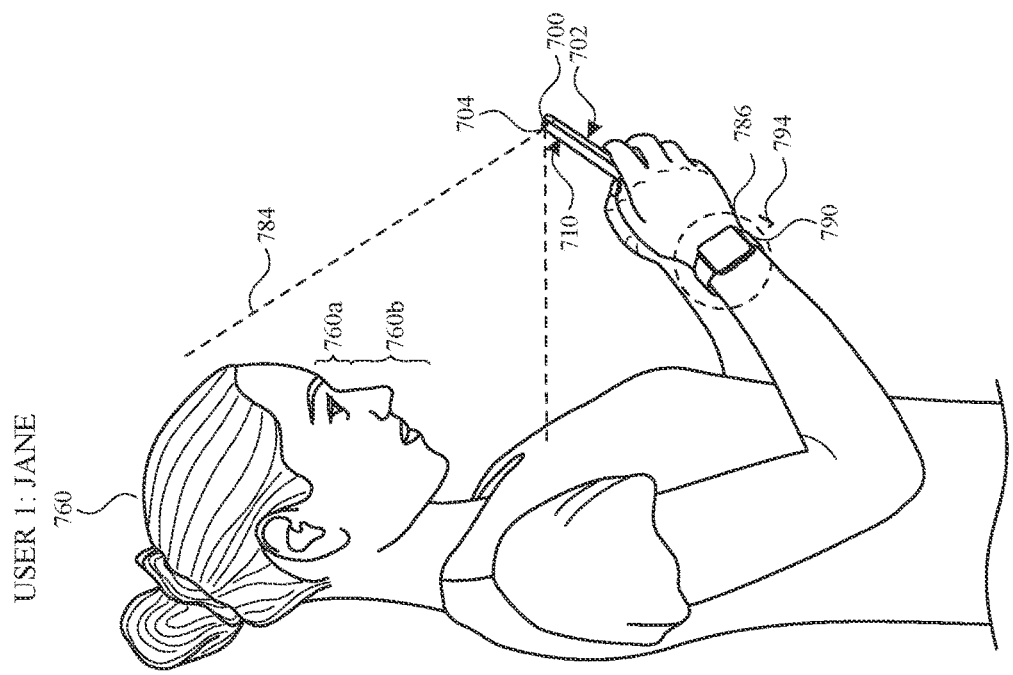

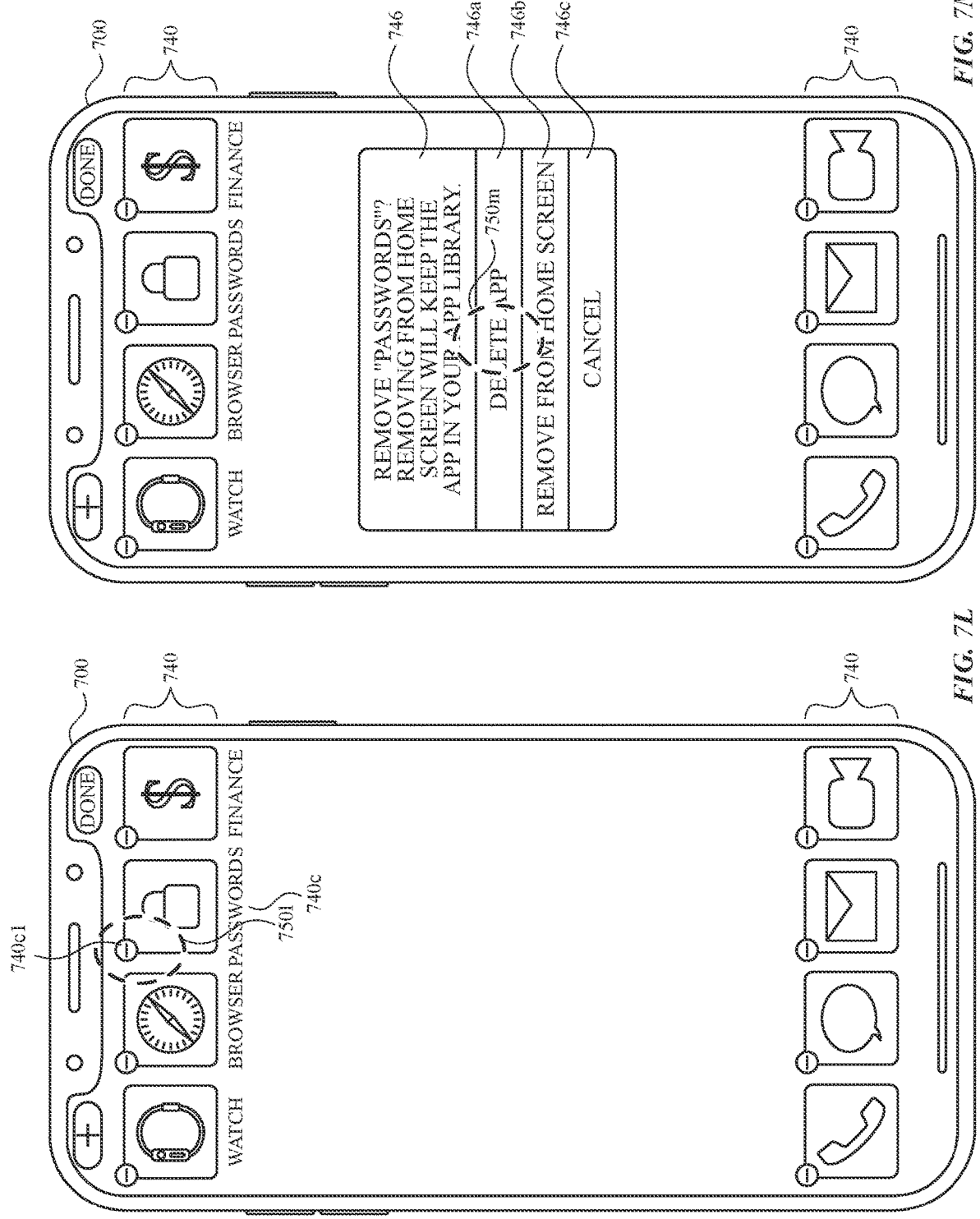

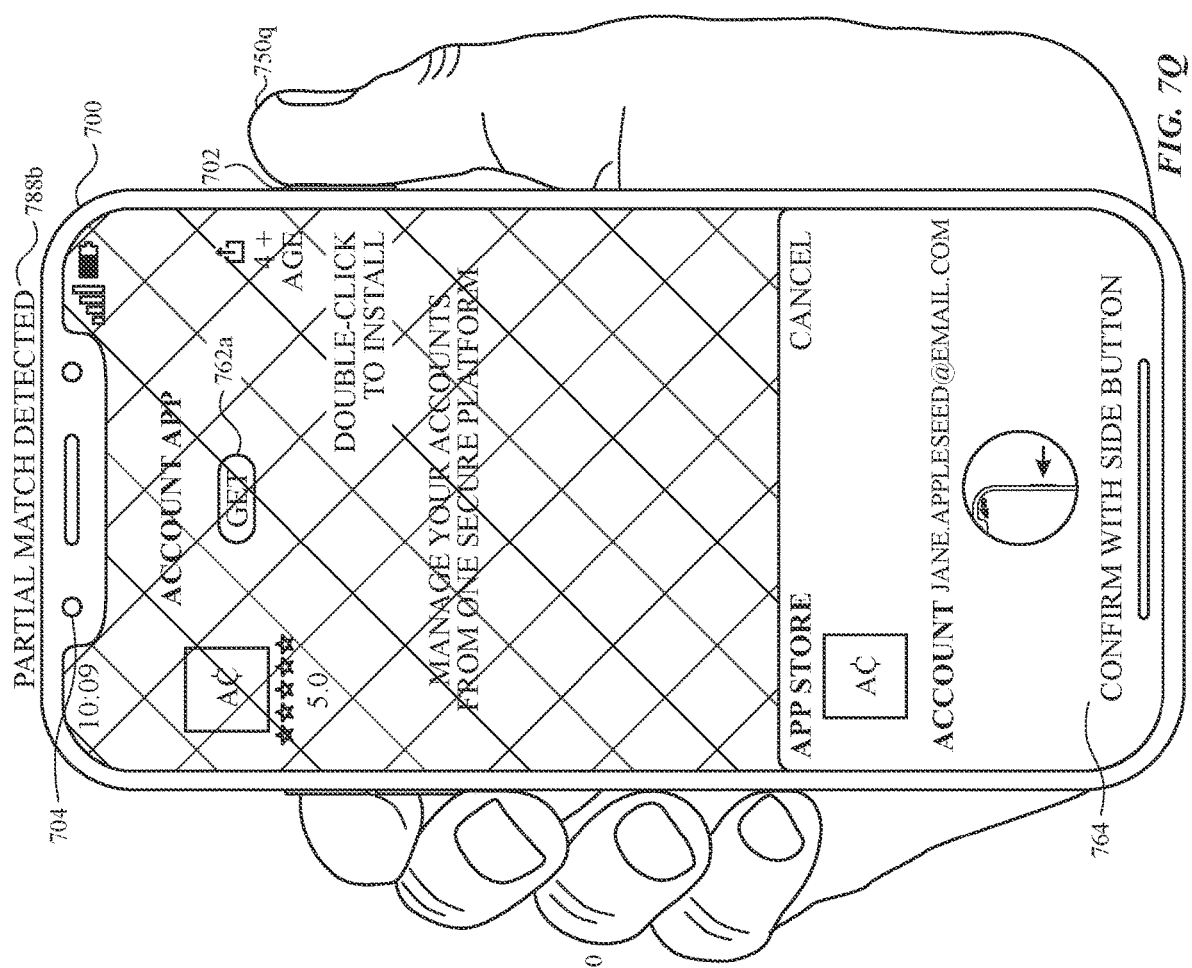

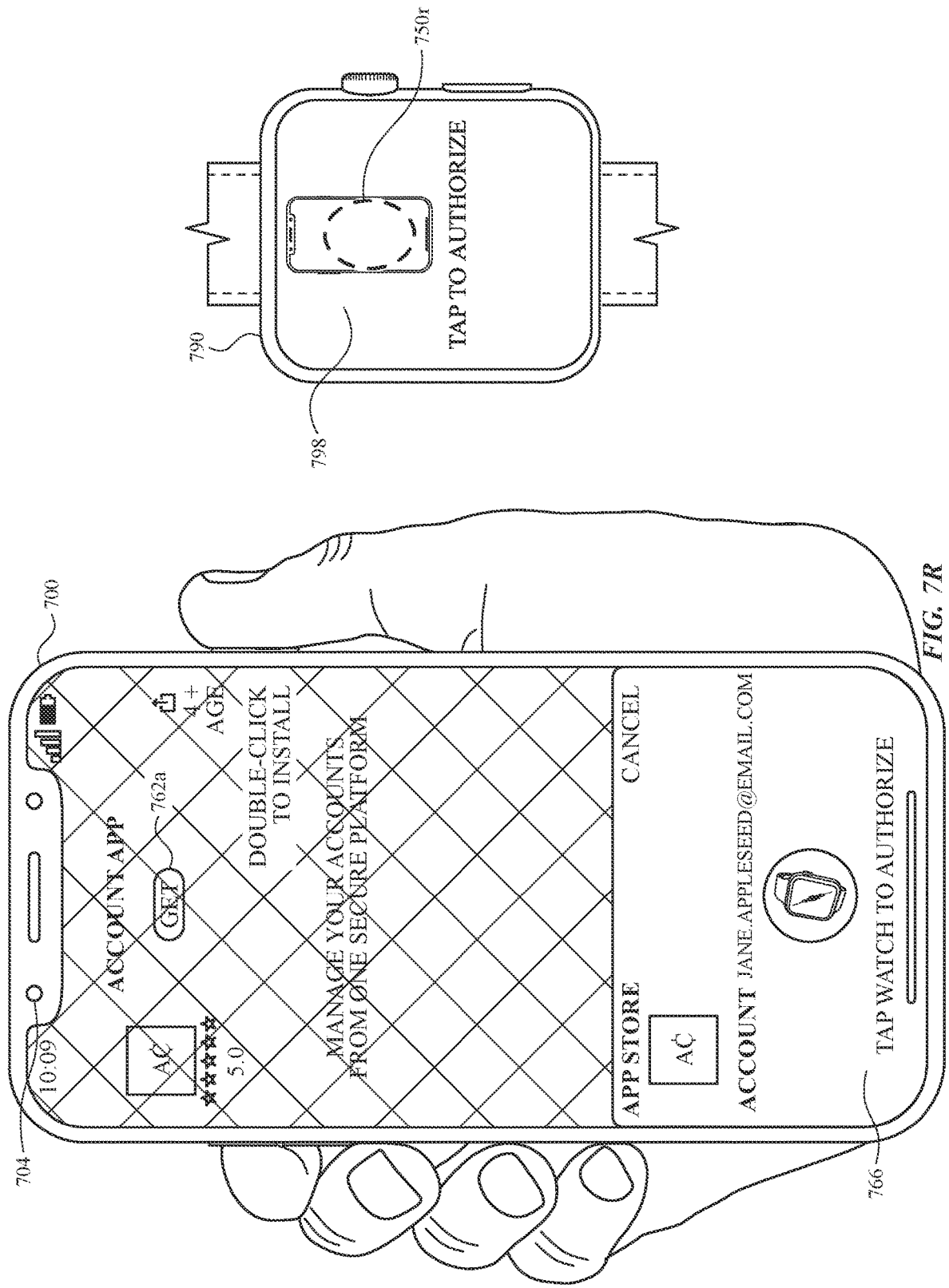

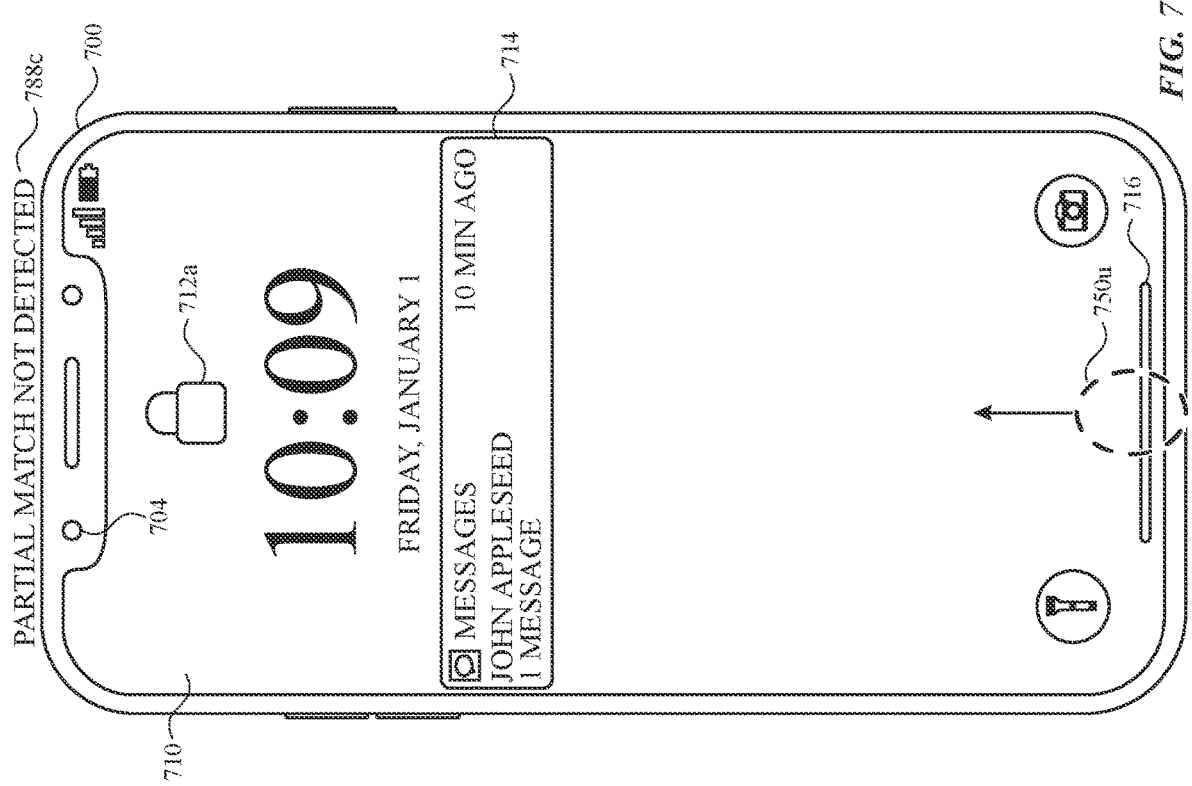
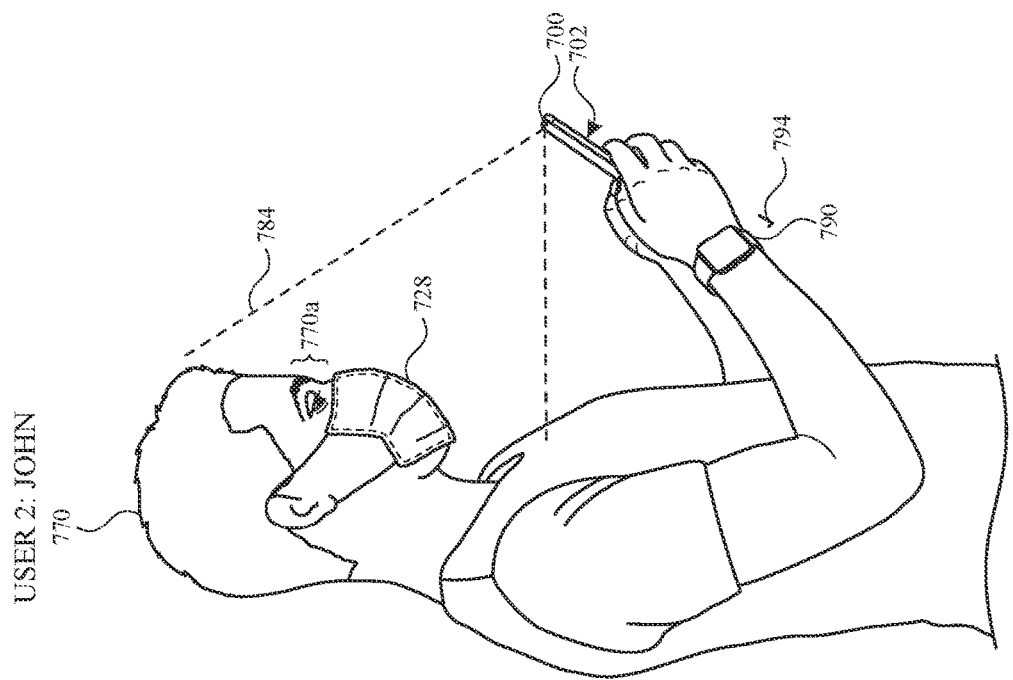
FIG. 7T
FIG. 7U

USER 1: JANE

PARTIAL MATCH DETECTED

USER 1: JANE

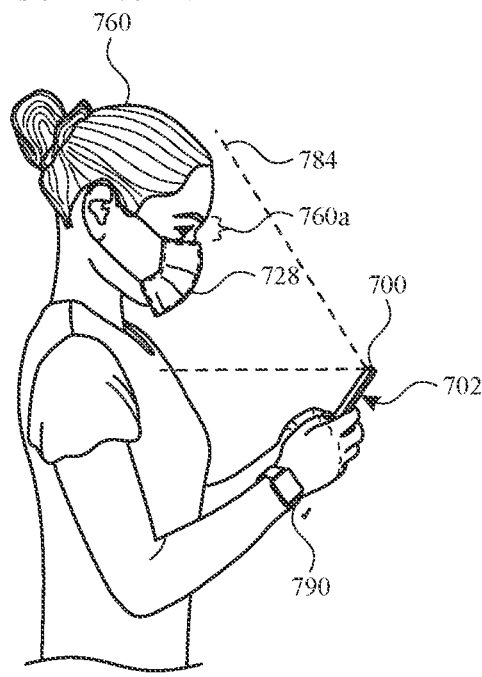
FIG. 11A
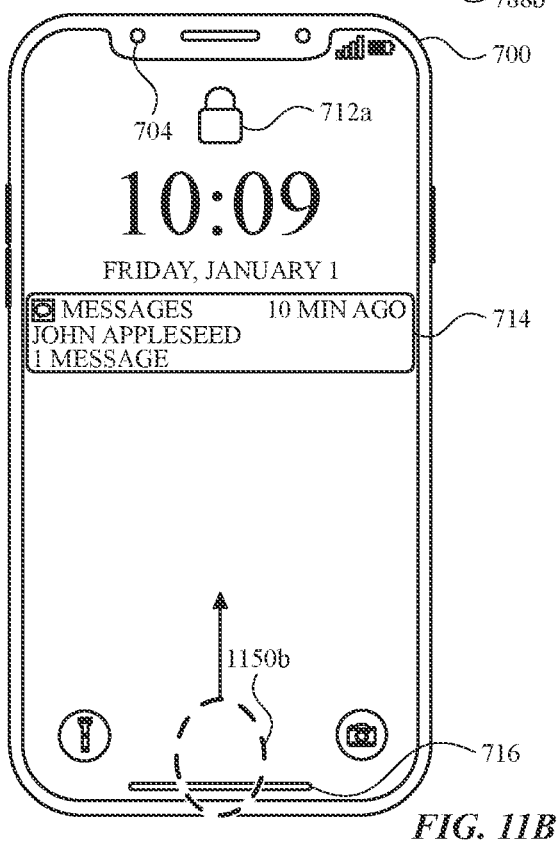
FIG. 11B
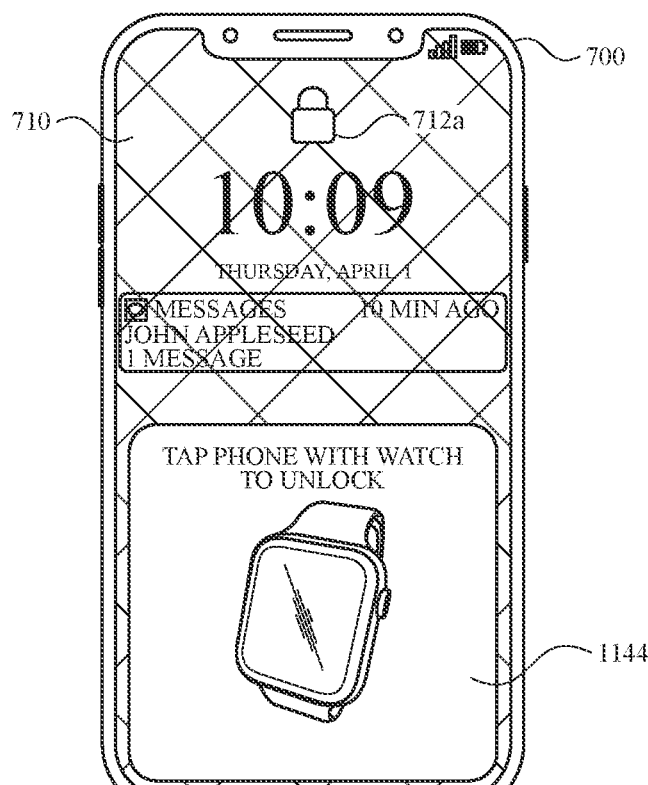
FIG. 11C

USER 1: JANE

PARTIAL MATCH DETECTED

USER 1: JANE

USER 1: JANE

1400 ⟶

1402
Receive, via the one or more input devices, a request to unlock the computer system while the computer system is in a locked state.

1404
In response to receiving the request to unlock the computer system:

1406
In accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transition the computer system from the locked state to an unlocked state.

1408
In accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, cause an output of a prompt that indicates that one or more interactions with the external accessory device can be used to unlock the computer system.

1502
Receive, via the one or more input devices, a request to unlock the computer system while the computer system is in a locked state.

1504
In response to receiving the request to unlock the computer system:

1506
In accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transition the computer system from the locked state to an unlocked state.

1508
In accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, cause an output of a prompt that indicates that voice input is required to unlock the computer system.

*FIG. 15A*

USER INTERFACES FOR AUTHENTICATING TO PERFORM SECURE OPERATIONS

CROSS-REFERENCE TO RELATED APPLICATIONS

This application claims priority to U.S. Provisional Patent Application Ser. No. 63/186,694, entitled "USER INTERFACES FOR AUTHENTICATING TO PERFORM SECURE OPERATIONS," filed on May 10, 2021, the contents of which is hereby incorporated by reference in its entirety.

FIELD

The present disclosure generally relates to authentication and, more specifically, to computer user interfaces and techniques for providing one or more alternative authentication methods after a first authentication method (e.g., biometric authentication) is unsuccessful.

BACKGROUND

Biometric authentication, for instance, of a face, iris, or fingerprint, using electronic devices is a convenient, efficient, and secure method of authenticating users of electronic devices. Biometric authentication allows a device to quickly, easily, and securely verify the identity of any number of users.

BRIEF SUMMARY

Some techniques for implementing authentication using computer systems (e.g., electronic computing devices), however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for implementing authentication. Such methods and interfaces optionally complement or replace other methods for implementing authentication. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with one or more biometric sensors, one or more input devices, and an external accessory device is described. The method comprises receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that one or more interactions with the external accessory device can be used to unlock the computer system; and after causing the output of the prompt: in accordance with a determination that the one or more interactions with the external accessory device have been detected, transitioning the computer system from the locked state to the unlocked state; and in accordance with a determination that the one or more interactions with the external accessory device have not been detected, maintaining the computer system in the locked state.

In accordance with some embodiments, a non-transitory computer-readable storage medium is described. The non-transitory computer-readable storage medium stores one or more programs configured to be executed by one or more processors of a computer system that is in communication with one or more biometric sensors, one or more input devices, and an external accessory device, the one or more programs including instructions for: receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that one or more interactions with the external accessory device can be used to unlock the computer system; and after causing the output of the prompt: in accordance with a determination that the one or more interactions with the external accessory device have been detected, transitioning the computer system from the locked state to the unlocked state; and in accordance with a determination that the one or more interactions with the external accessory device have not been detected, maintaining the computer system in the locked state.

In accordance with some embodiments, a transitory computer-readable storage medium is described. The transitory computer-readable storage medium stores one or more programs configured to be executed by one or more processors of a computer system that is in communication with one or more biometric sensors, one or more input devices, and an external accessory device, the one or more programs including instructions for: receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that one or more interactions with the external accessory device can be used to unlock the computer system; and after causing the output of the prompt: in accordance with a determination that the one or more interactions with the external accessory device have been detected, transitioning the computer system from the locked state to the unlocked state; and in accordance with a determination that the one or more interactions with the external accessory device have not been detected, maintaining the computer system in the locked state.

In accordance with some embodiments, a computer system is described. The computer system is in communication with one or more biometric sensors, one or more input devices, an external accessory device; and memory storing one or more programs configured to be executed by the one or more processors, the one or more programs including instructions for: receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that one or more interactions with the external accessory device can be used to unlock the computer system; and after causing the output of the prompt: in accordance with a determination that the one or more interactions with the external accessory device have been detected, transitioning the computer system from the locked state to the unlocked state; and in accordance with a determination that the one or more interactions with the external accessory device have not been detected, maintaining the computer system in the locked state.

In accordance with some embodiments, a computer system is described. The computer system is in communication with: one or more biometric sensors; one or more input devices; and an external accessory device is described. The computer system comprises: means for receiving, via the one or more input devices, a request to unlock the computer system while the computer system is in a locked state: means, responsive to receiving the request to unlock the computer system, for: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that one or more interactions with the external accessory device can be used to unlock the computer system; and means, after causing the output of the prompt, for: in accordance with a determination that the one or more interactions with the external accessory device have been detected, transitioning the computer system from the locked state to the unlocked state; and in accordance with a determination that the one or more interactions with the external accessory device have not been detected, maintaining the computer system in the locked state.

In accordance with some embodiments, a method performed at a computer system that is in communication with one or more biometric sensors and one or more input devices that include a voice input device is described. The method comprises receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that voice input is required to unlock the computer system; after causing the output of the prompt, receiving, via the voice input device, an indication that voice input has been detected; and in response to receiving the indication that voice input has been detected: in accordance with a determination that the detected voice input matches an authorized voice profile, transitioning the computer system from the locked state to the unlocked state; and in accordance with a determination that the detected voice input does not match the authorized voice profile, maintaining the computer system in the locked state.

In accordance with some embodiments, a non-transitory computer-readable storage medium is described. The non-transitory computer readable storage medium stores one or more programs configured to be executed by one or more processors of a computer system that is in communication with one or more biometric sensors, one or more input devices that include a voice input device, the one or more programs including instructions for: receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that voice input is required to unlock the computer system; after causing the output of the prompt, receiving, via the voice input device, an indication that voice input has been detected: and in response to receiving the indication that voice input has been detected: in accordance with a determination that the detected voice input matches an authorized voice profile, transitioning the computer system from the locked state to the unlocked state; and in accordance with a determination that the detected voice input does not match the authorized voice profile, maintaining the computer system in the locked state.

In accordance with some embodiments, a transitory computer-readable storage medium is described. The transitory computer readable storage medium stores one or more programs configured to be executed by one or more processors of a computer system that is in communication with one or more biometric sensors, one or more input devices that include a voice input device, the one or more programs including instructions for: receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that voice input is required to unlock the computer system; after causing the output of the prompt, receiving, via the voice input device, an indication that voice input has been detected; and in response to receiving the indication that voice input has been detected: in accordance with a determination that the detected voice input matches an authorized voice profile, transitioning the computer system from the locked state to the unlocked state; and in accordance with a determination that the detected voice input does not match the authorized voice profile, maintaining the computer system in the locked state.

In accordance with some embodiments, a computer system is described. The computer system is in communication with one or more biometric sensors, one or more input devices that include a voice input device; and memory storing one or more programs configured to be executed by the one or more processors, the one or more programs including instructions for: receiving, via the one or more input devices, a request to unlock the computer system while the computer system is in a locked state; in response to receiving the request to unlock the computer system: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that voice input is required to unlock the computer system; after causing the output of the prompt, receiving, via the voice input device, an indication that voice input has been detected; and in response to receiving the indication that voice input has been detected: in accordance with a determination that the detected voice input matches an authorized voice profile, transitioning the computer system from the locked state to the unlocked state; and in accordance with a determination that the detected voice input does not match the authorized voice profile, maintaining the computer system in the locked state.

In accordance with some embodiments, a computer system is described. The computer system is communication with one or more biometric sensors, and one or more input devices that include a voice input device. The computer system comprises: means for receiving, via the one or more input devices, a request to unlock the computer system while the computer system is in a locked state; means, responsive to receiving the request to unlock the computer system, for: in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with an enrolled biometric feature, causing an output of a prompt that indicates that voice input is required to unlock the computer system; means, after causing the output of the prompt, for receiving, via the voice input device, an indication that voice input has been detected; and means, responsive to receiving the indication that voice input has been detected, for: in accordance with a determination that the detected voice input matches an authorized voice profile, transitioning the computer system from the locked state to the unlocked state; and in accordance with a determination that the detected voice input does not match the authorized voice profile, maintaining the computer system in the locked state.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for implementing authentication, thereby increasing the effectiveness, efficiency, and user satisfaction with such devices. Such methods and interfaces may complement or replace other methods for implementing authentication.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 11A-11D illustrate exemplary user interfaces for providing authentication at a computer system in accordance with some embodiments.

FIGS. 14A-14B are a flow diagram illustrating a method for providing biometric authentication at a computer system in accordance with some embodiments.

FIGS. 15A-15B are a flow diagram illustrating a method for providing biometric authentication at a computer system in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for implementing authentication. For example, there is a need for electronic devices to authenticate one or more users after biometric authentication is unsuccessful. Such techniques can reduce the cognitive burden on a user who wants to perform a secure operation after one or more authentication techniques are successful, thereby enhancing productivity. Further, such techniques can reduce processor and battery power otherwise wasted on redundant user inputs.

Below, FIGS. 1A-1B, FIG. 2, FIG. 3, FIGS. 4A-4B, FIGS. 5A-5H, and FIG. 6 provide a description of exemplary devices for performing the techniques for implementing authentication.

Figure 7D:
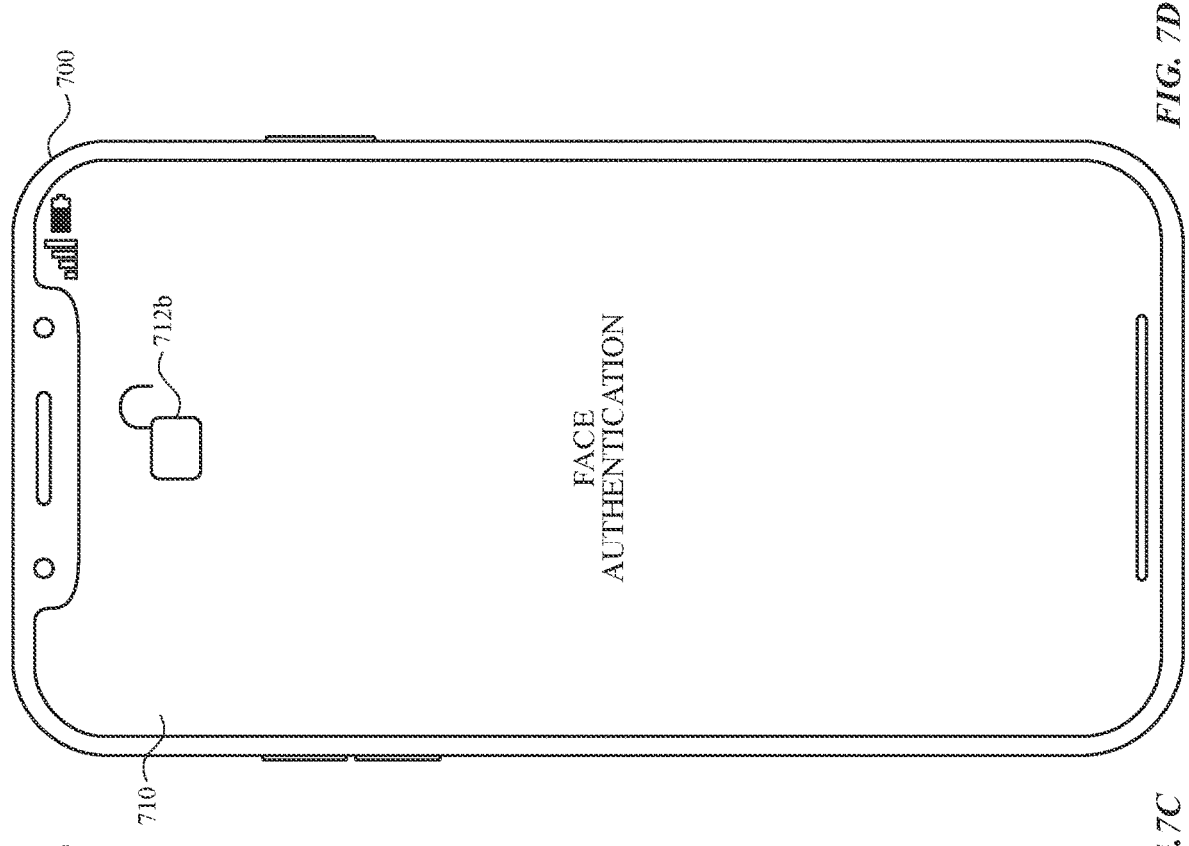
FIGS. 7A-7V illustrate exemplary user interfaces for providing authentication at a computer system in accordance with some embodiments.
Figure 7C:
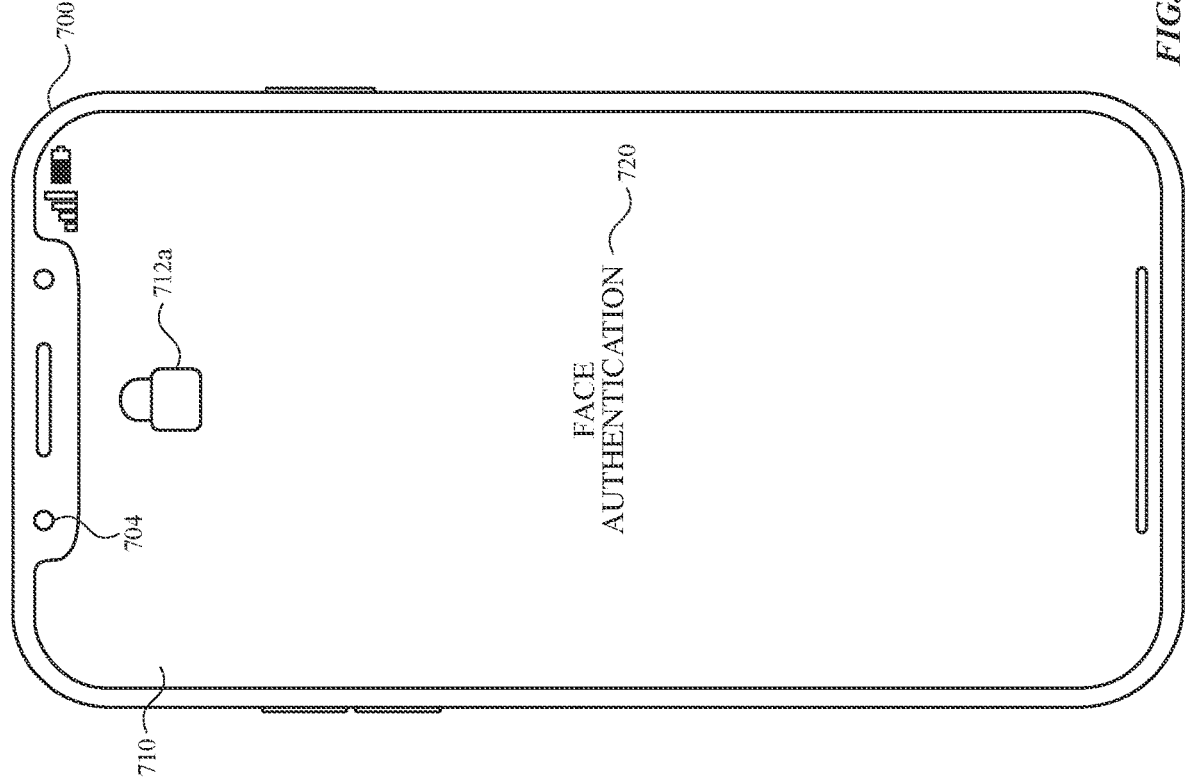
Figure 7F:
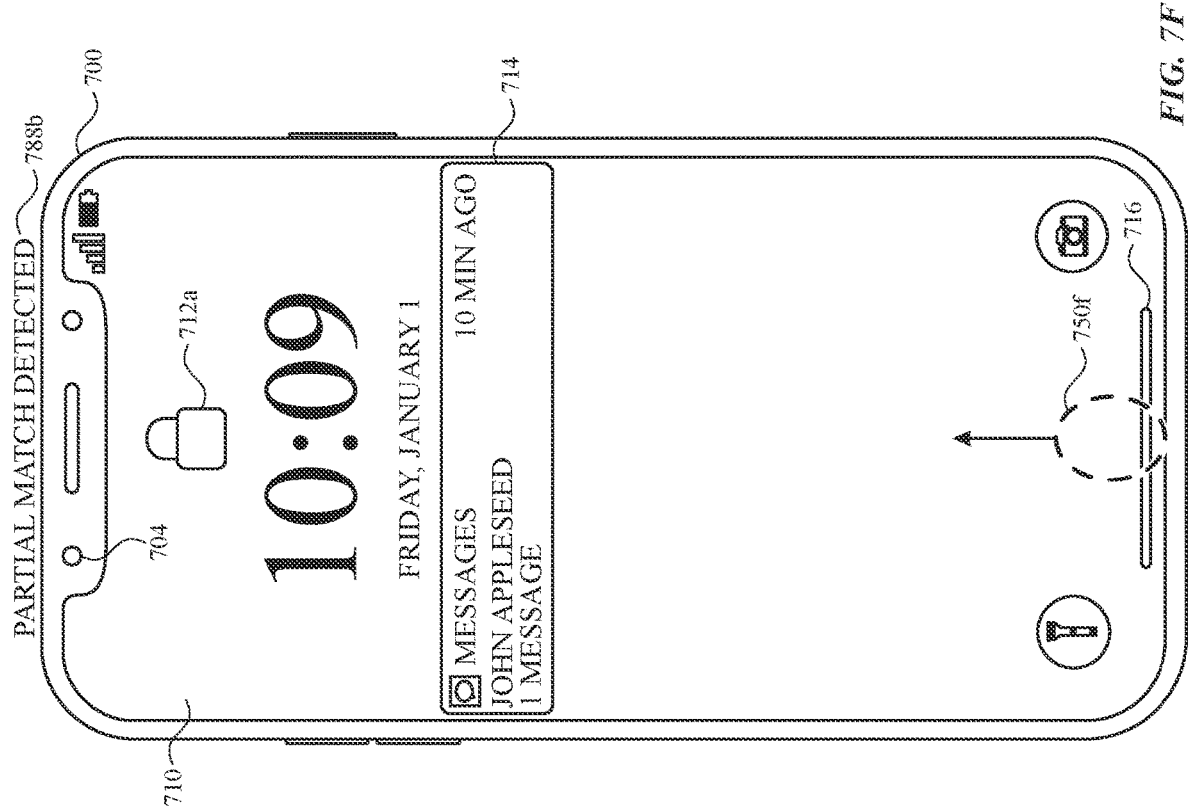
Figure 7E:
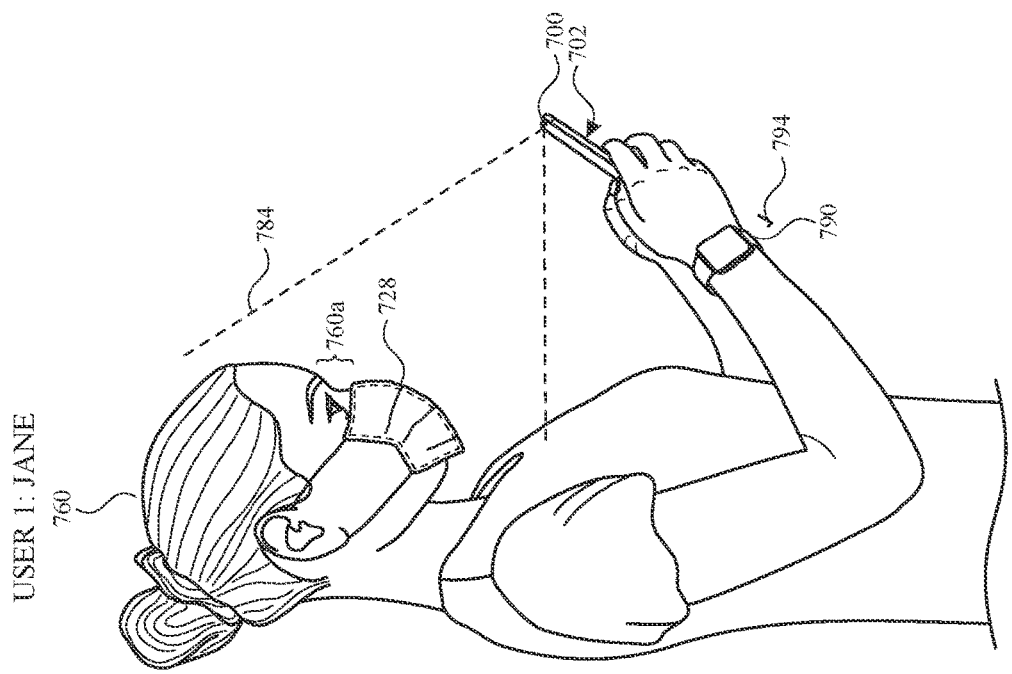
Figure 7G:
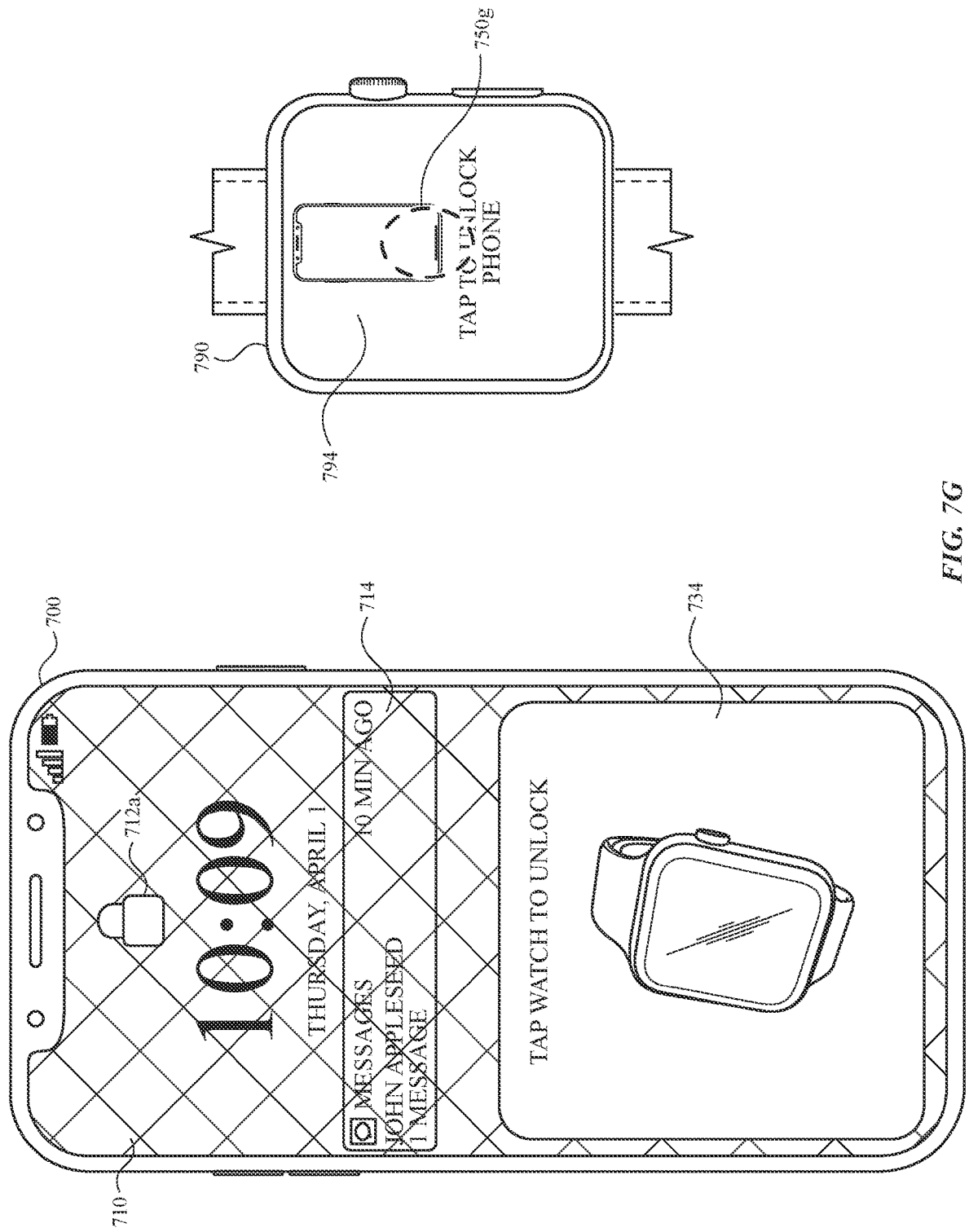
Figure 7I:
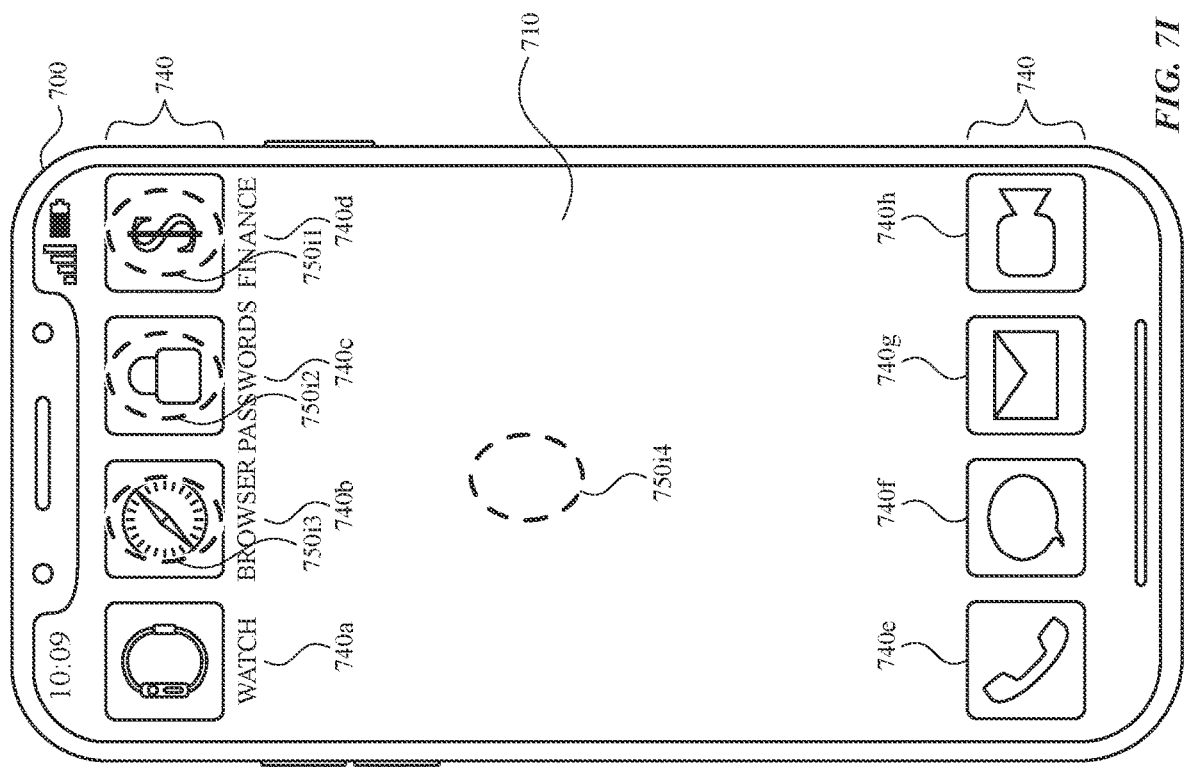
Figure 7H:
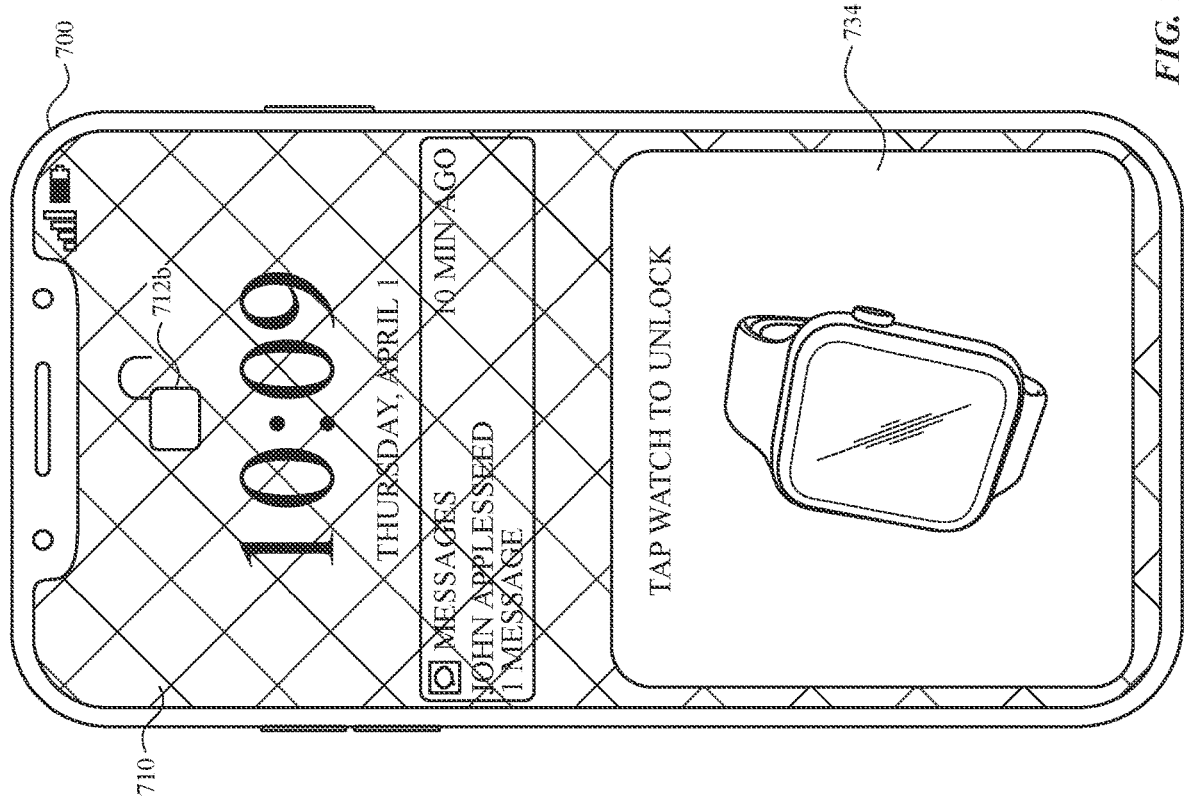
Figure 7J:
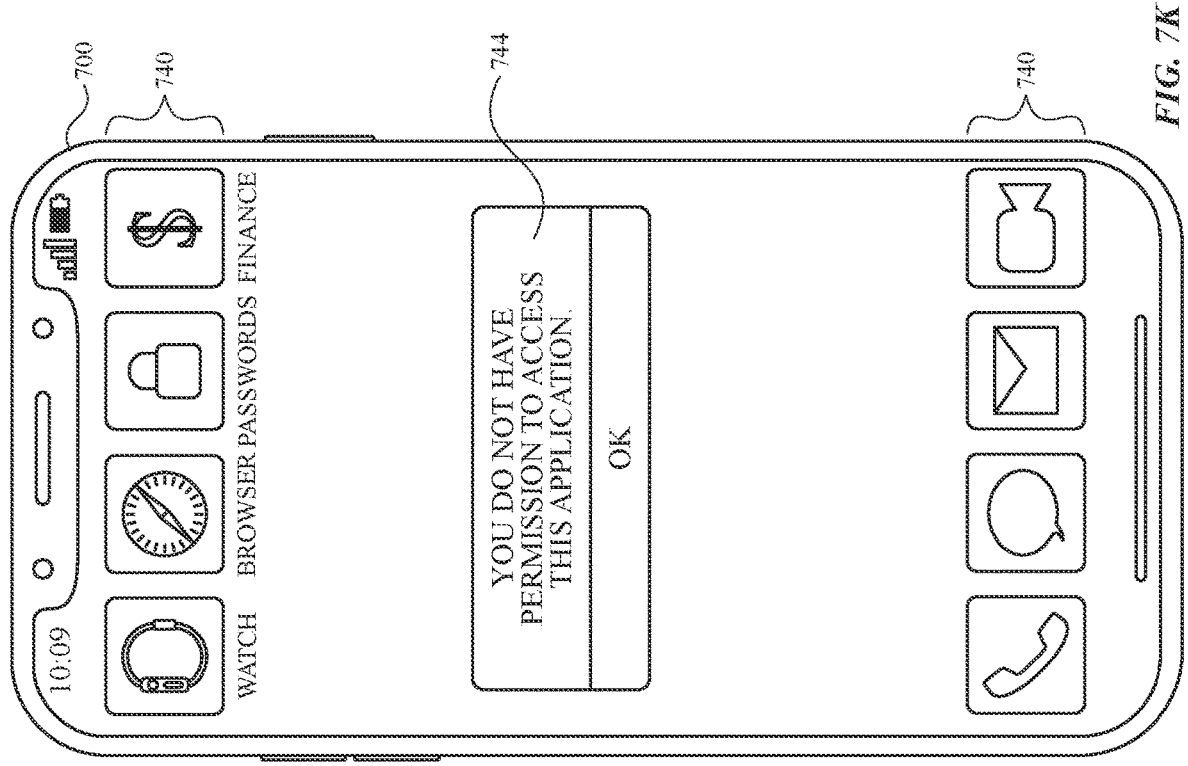
Figure 7K:
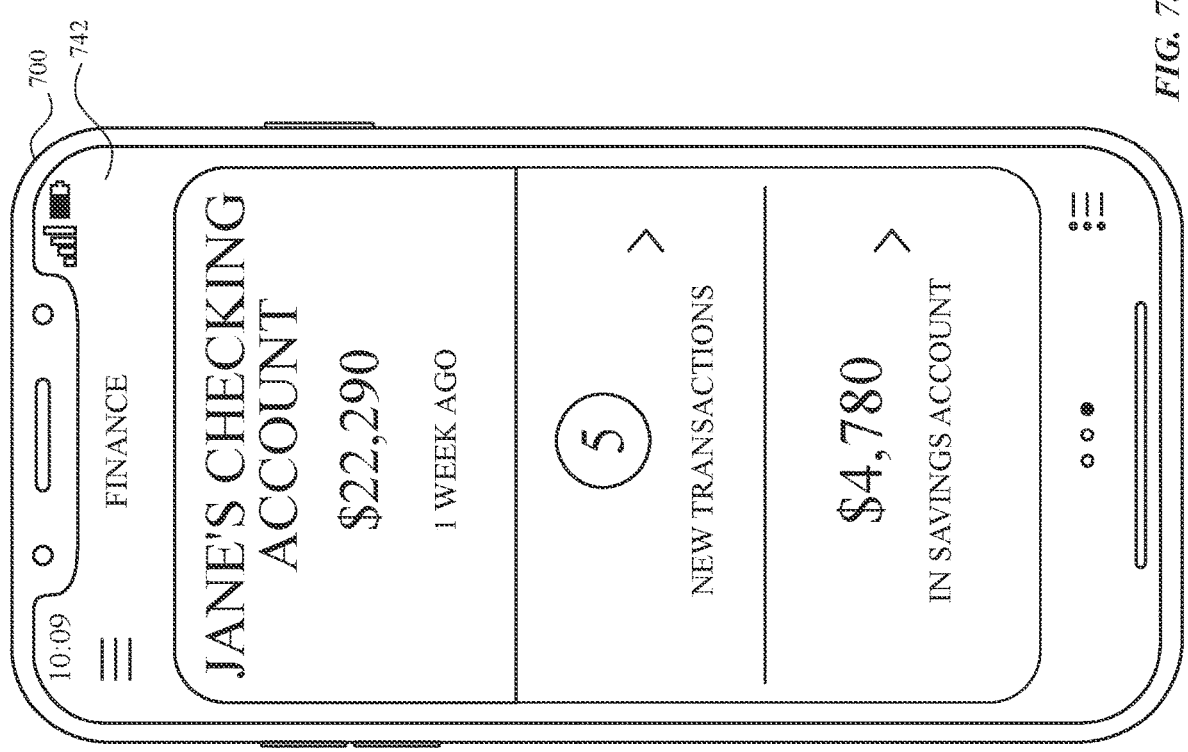
Figure 7N:
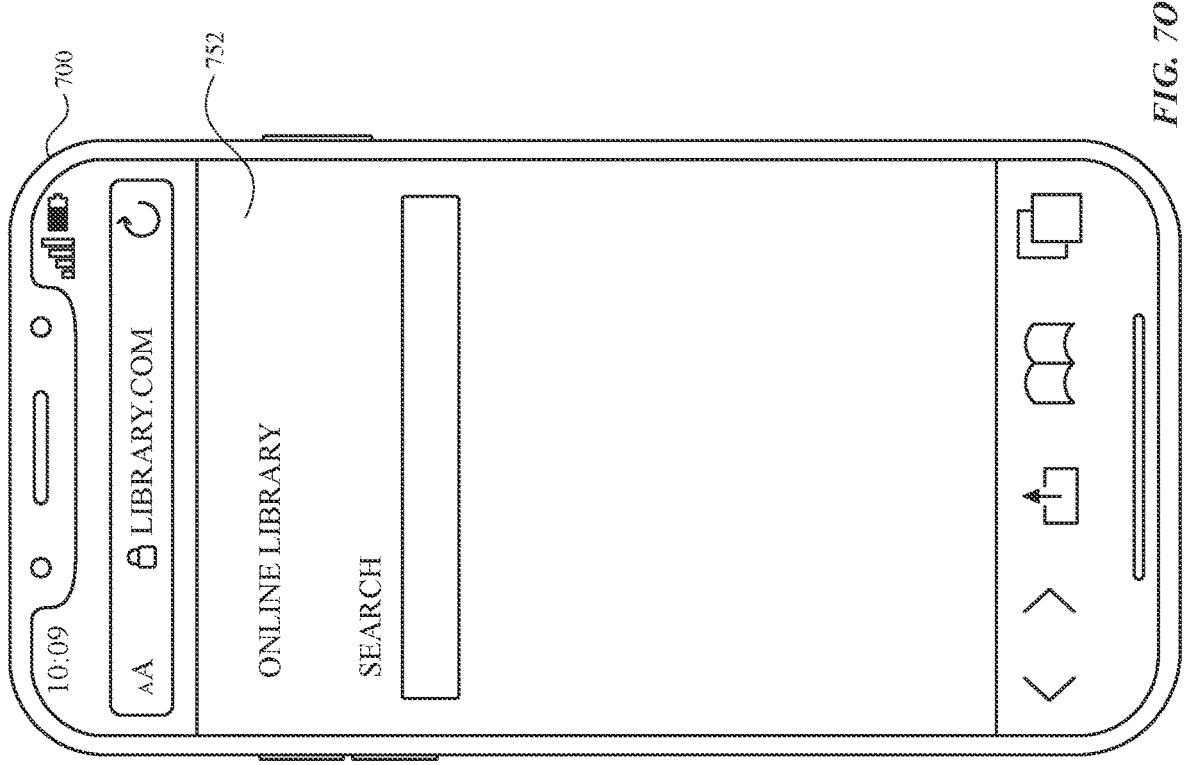
Figure 7O:
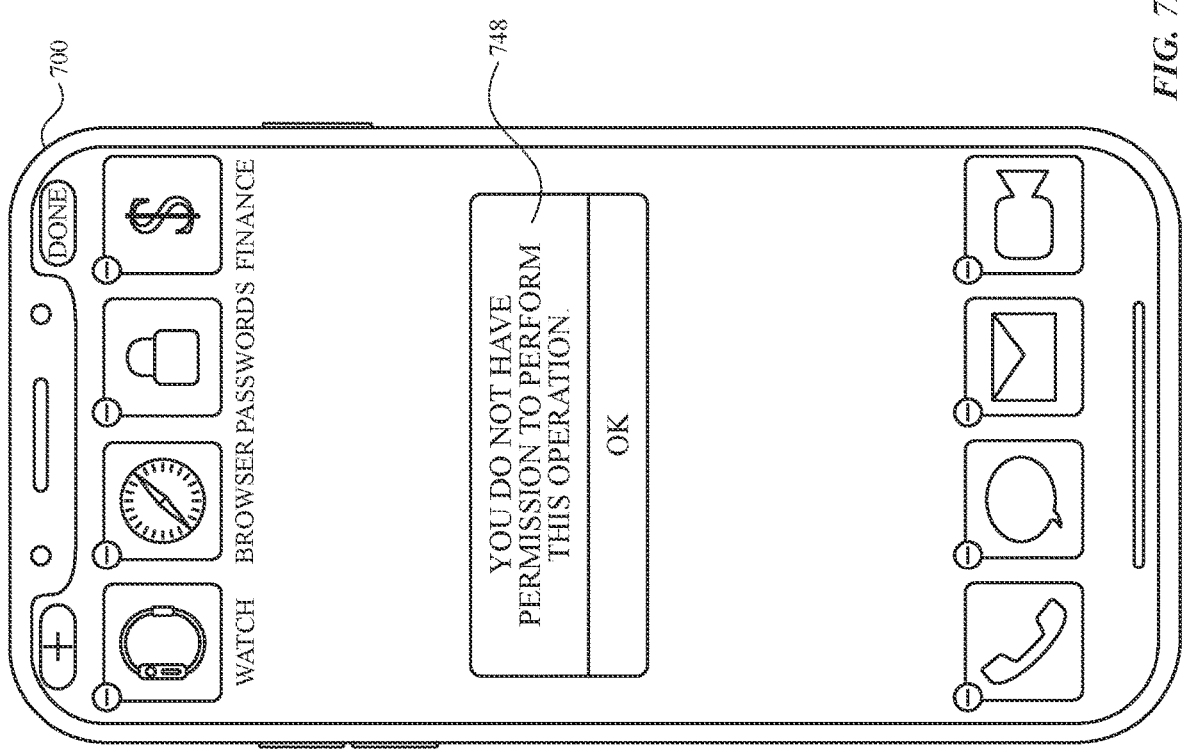
Figure 7S:
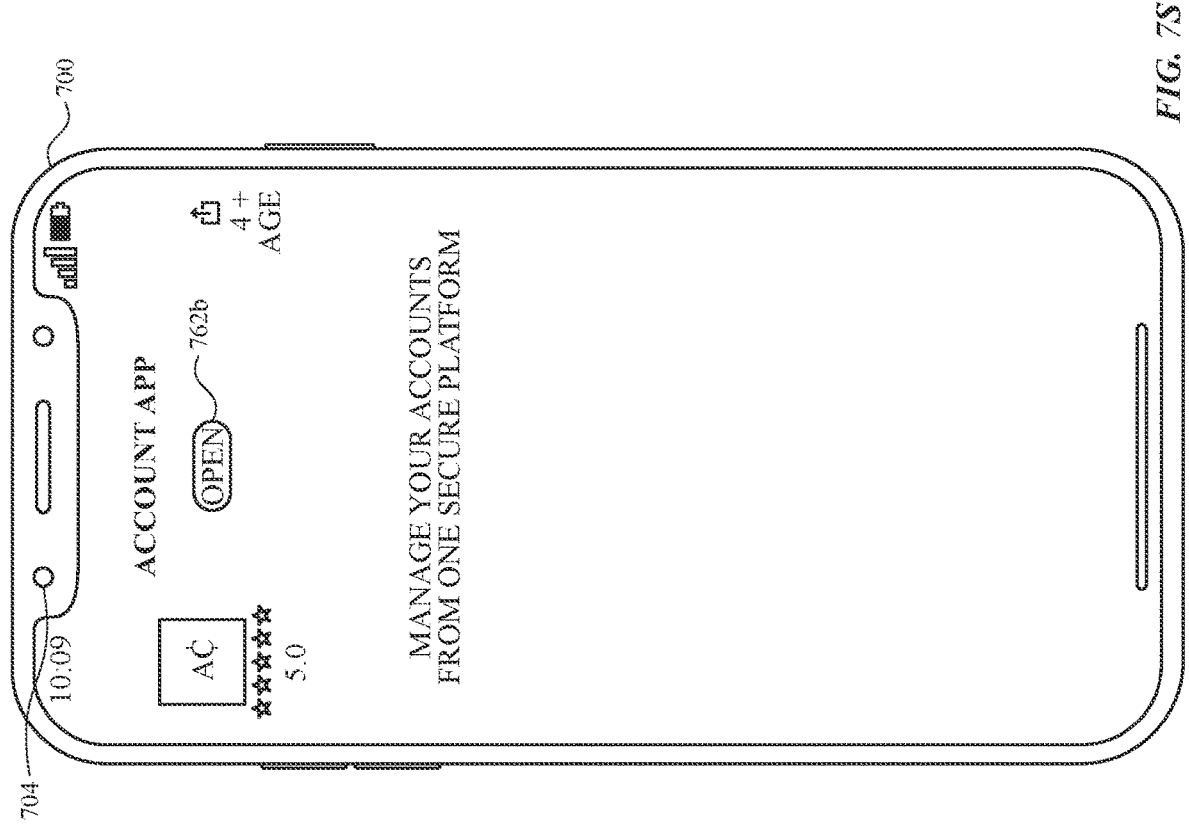
Figure 7V:
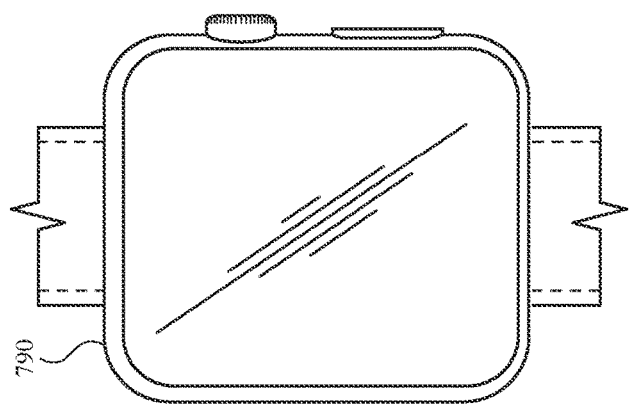
Figure 7V:
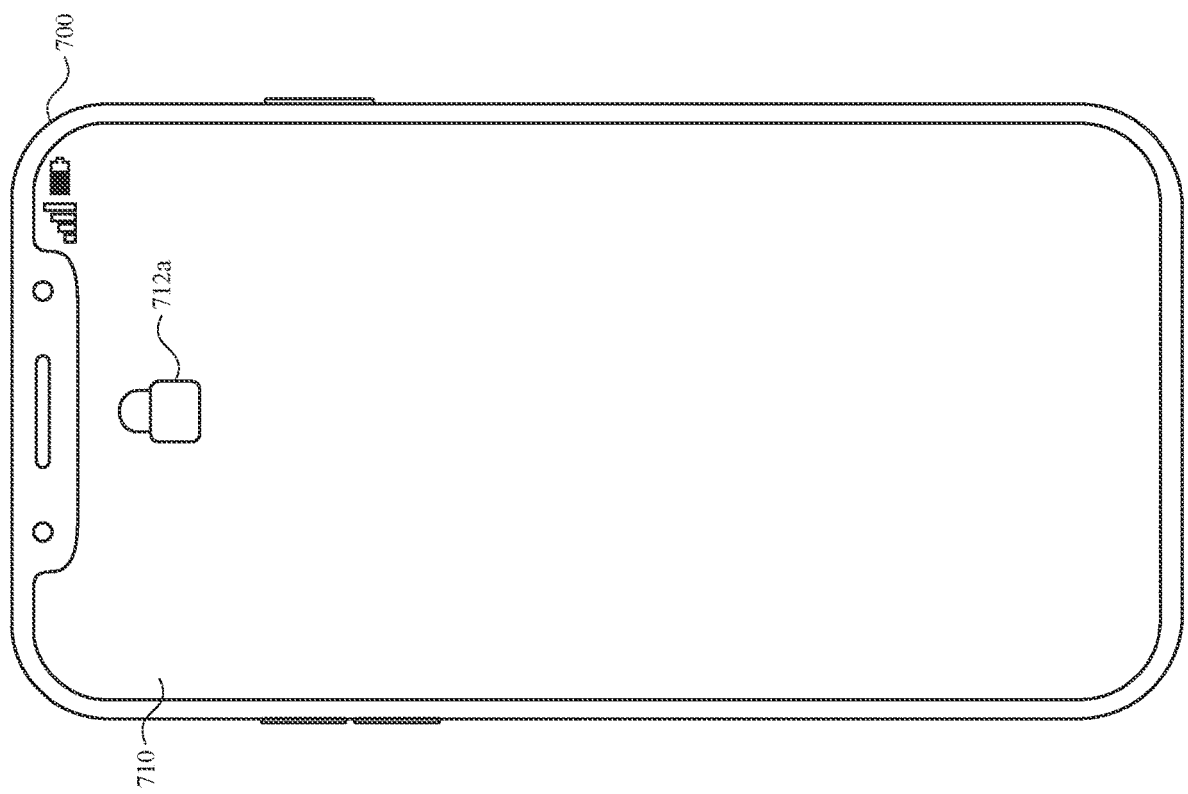
Figure 14B:
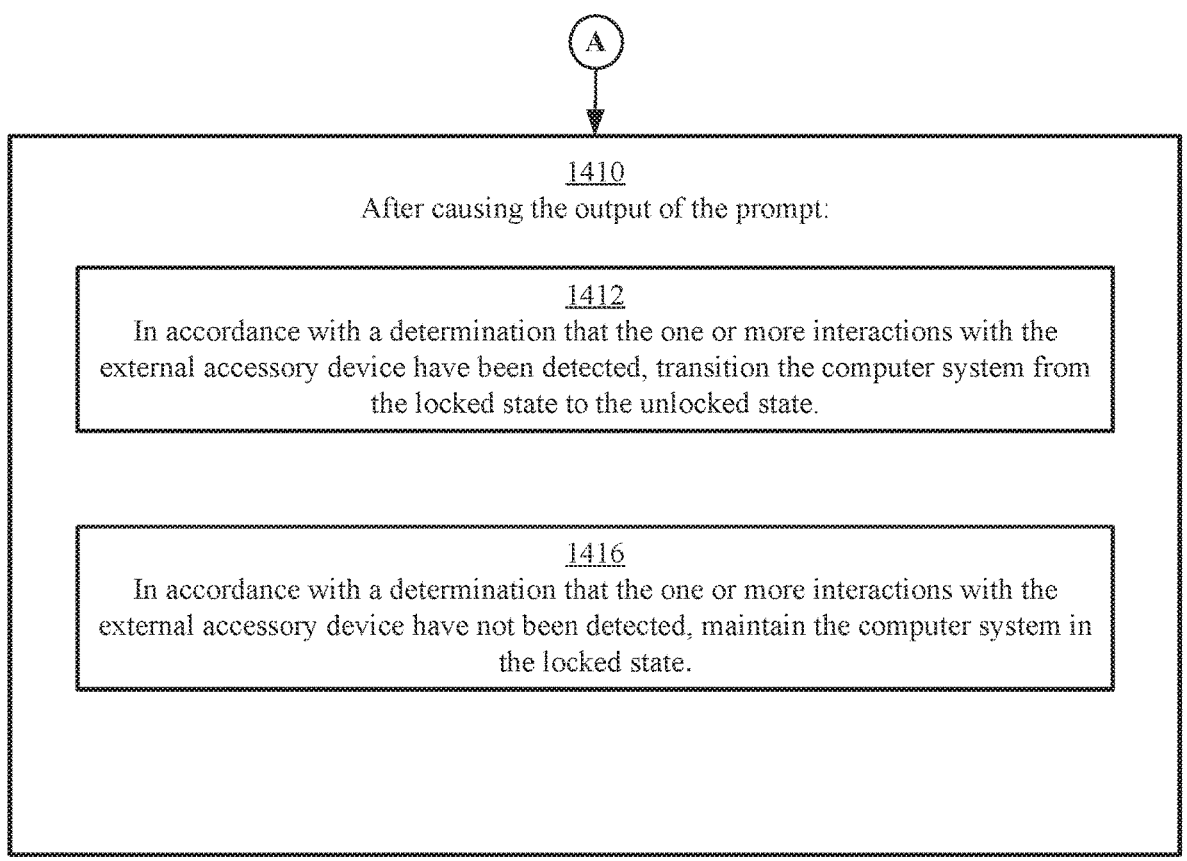
Figure 15B:
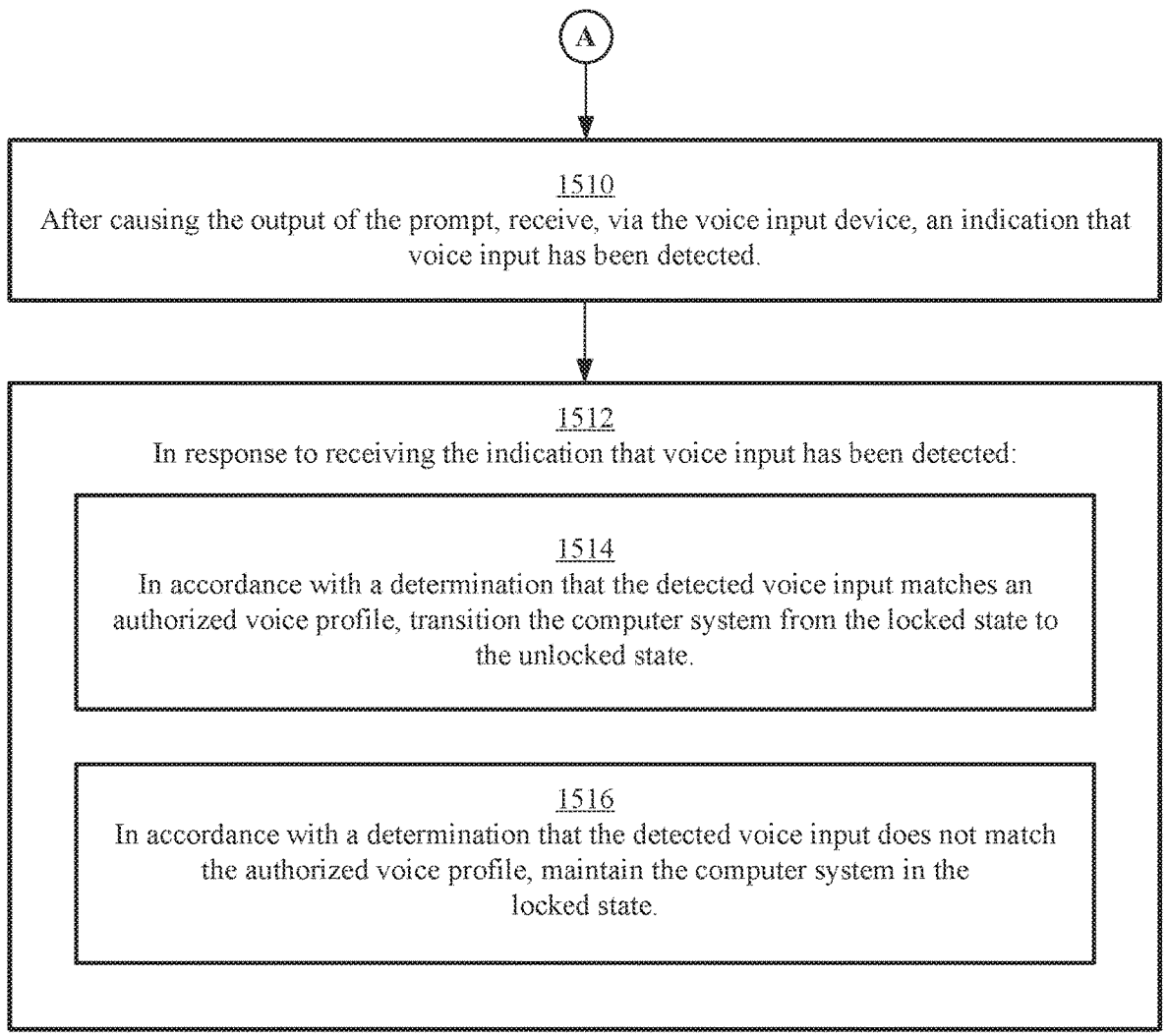

FIGS. 7A-7V illustrate exemplary user interfaces for providing authentication at a computer system in accordance with some embodiments. FIGS. 8A-8D illustrate exemplary user interfaces for providing authentication at a computer system in accordance with some embodiments. FIGS. 9A-9D illustrate exemplary user interfaces for providing authentication at a computer system in accordance with some embodiments. FIGS. 10A-10D illustrate exemplary user interfaces for providing authentication at a computer system in accordance with some embodiments. FIGS. 11A-11D illustrate exemplary user interfaces for providing authentication at a computer system in accordance with some embodiments. FIGS. 12A-12D illustrate exemplary user interfaces for providing authentication at a computer system in accordance with some embodiments. FIGS. 13A-13F illustrate exemplary user interfaces for providing authentication at a computer system in accordance with some embodiments. FIGS. 14A-14B are a flow diagram illustrating a method for providing biometric authentication at a computer system in accordance with some embodiments. FIGS. 15A-15B are a flow diagram illustrating a method for providing biometric authentication at a computer system in accordance with some embodiments. The user interfaces in FIGS. 7A-7V, FIGS. 8A-8D, FIGS. 9A-9D, FIGS. 10A-10D, FIGS. 11A-11D, FIGS. 12A-12D, and FIGS. 13A-13F are used to illustrate the processes described below, including the processes in FIGS. 14A-14B and FIGS. 15A-15B.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and, thus, is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
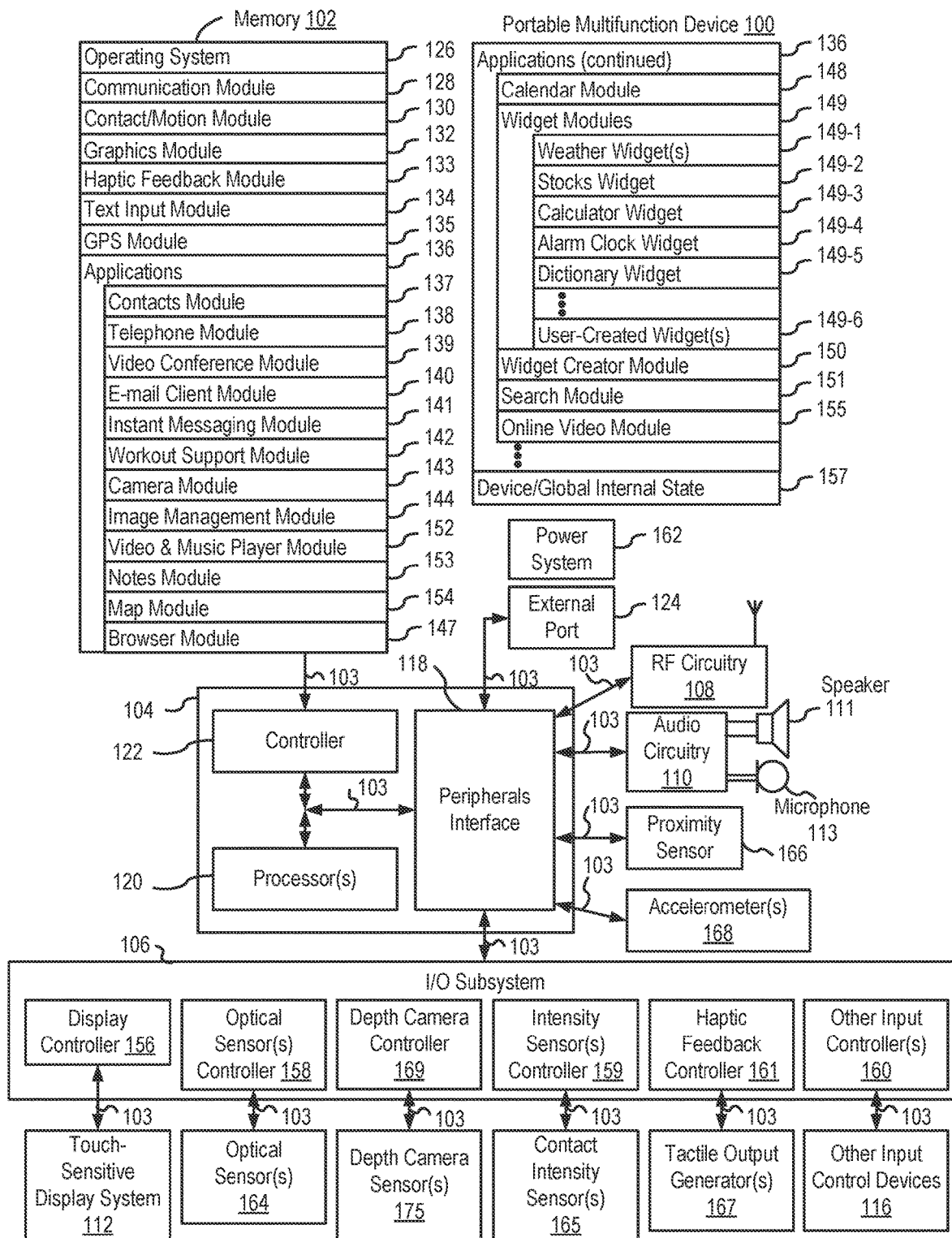
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser.

No. 11/038,590, "Mode-Based Graphical User Interfaces For Touch Sensitive Input Devices," filed Jan. 18, 2005, (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device", Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
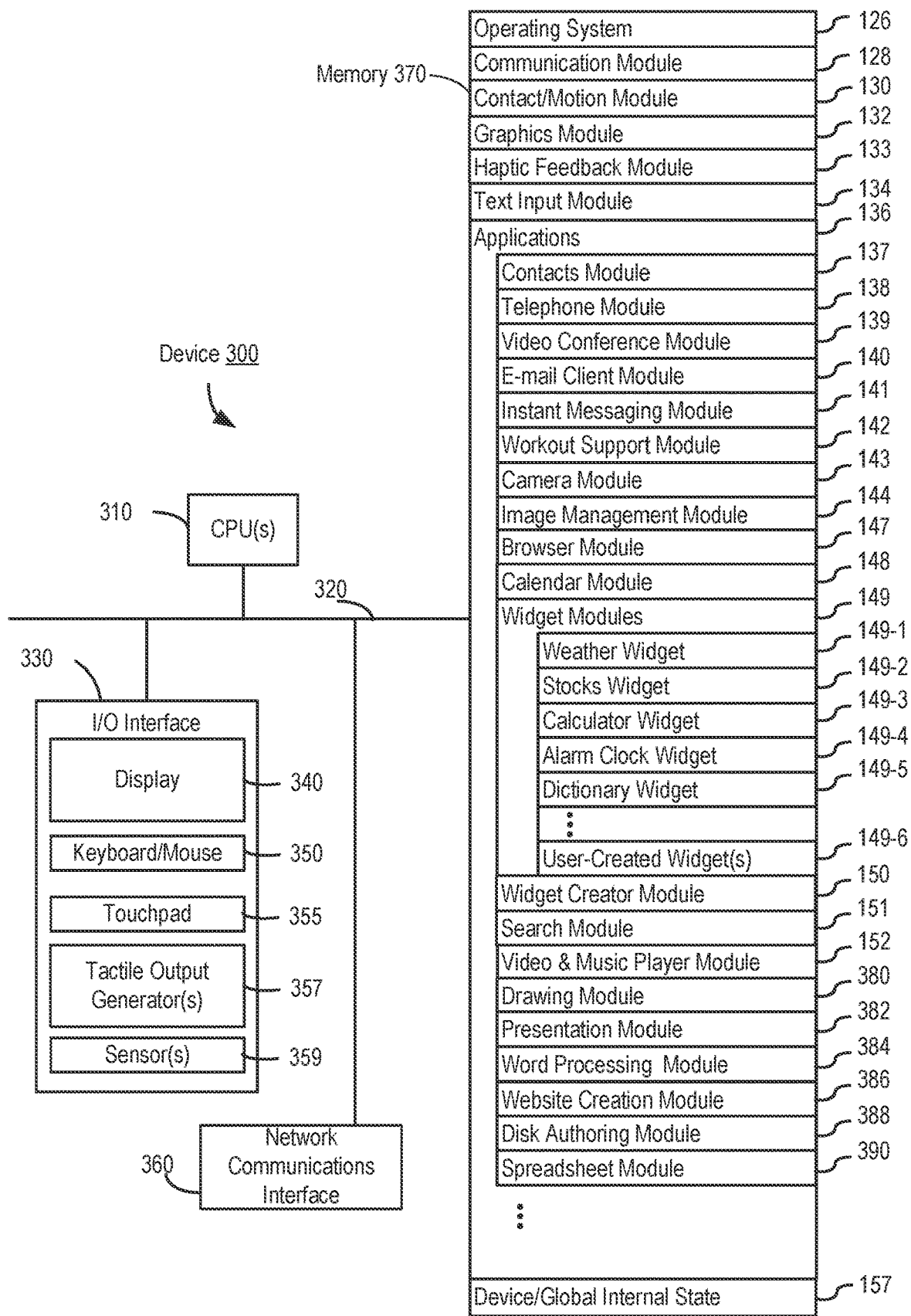
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6:
  Widget creator module 150 for making user-created widgets 149-6;
  Search module 151;
  Video and music player module 152, which merges video player module and music player module,
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
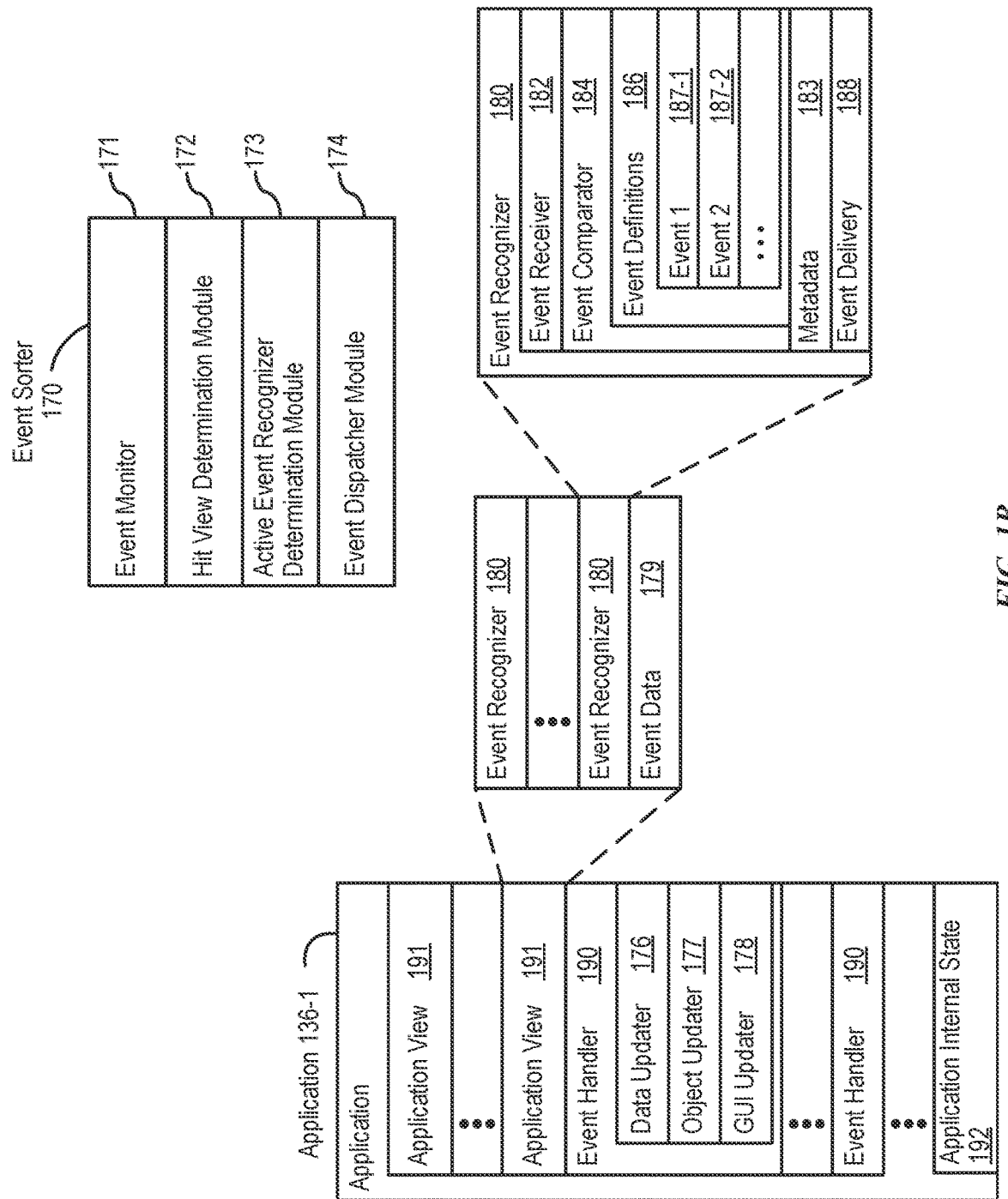
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
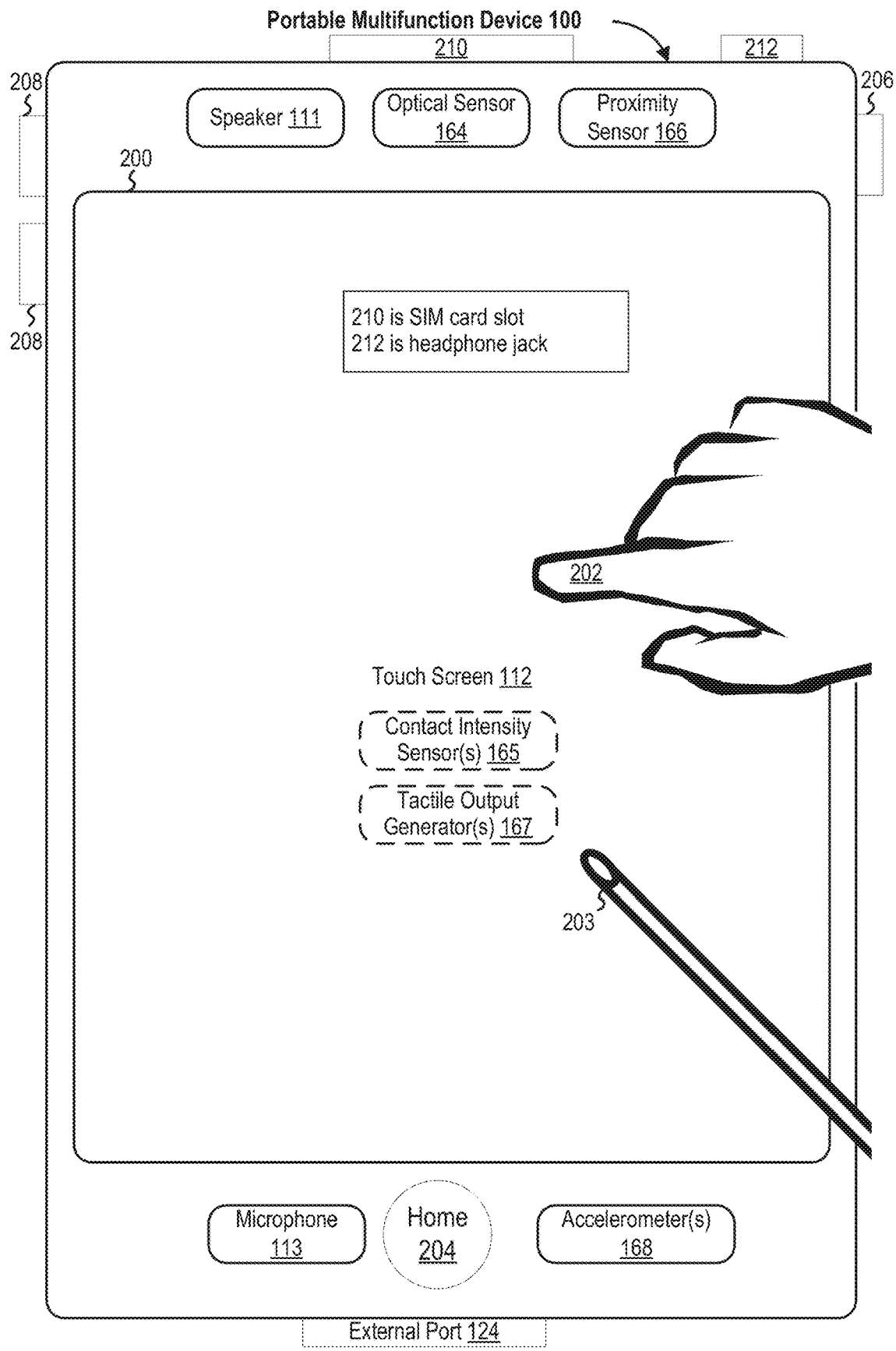
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
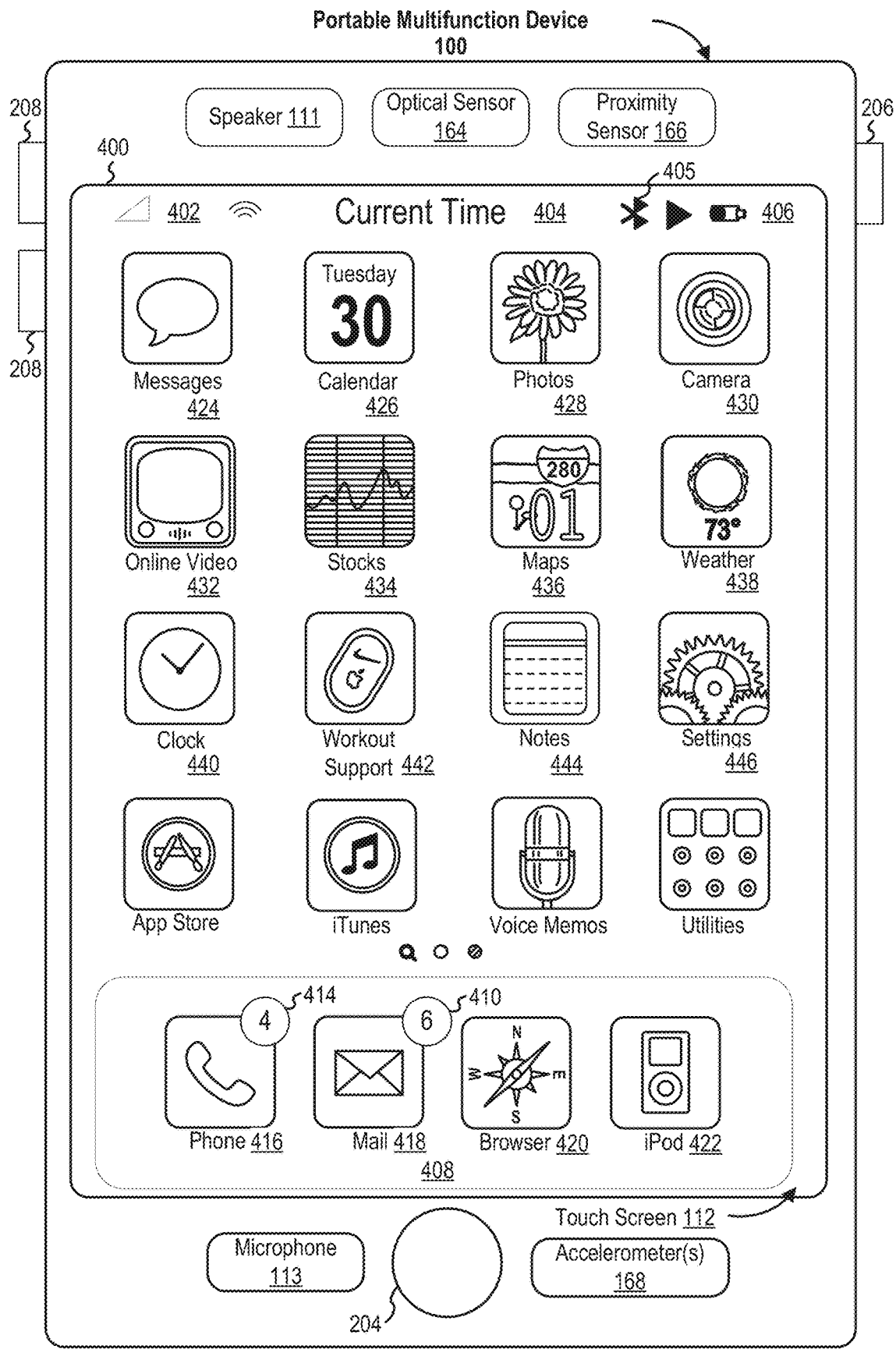
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
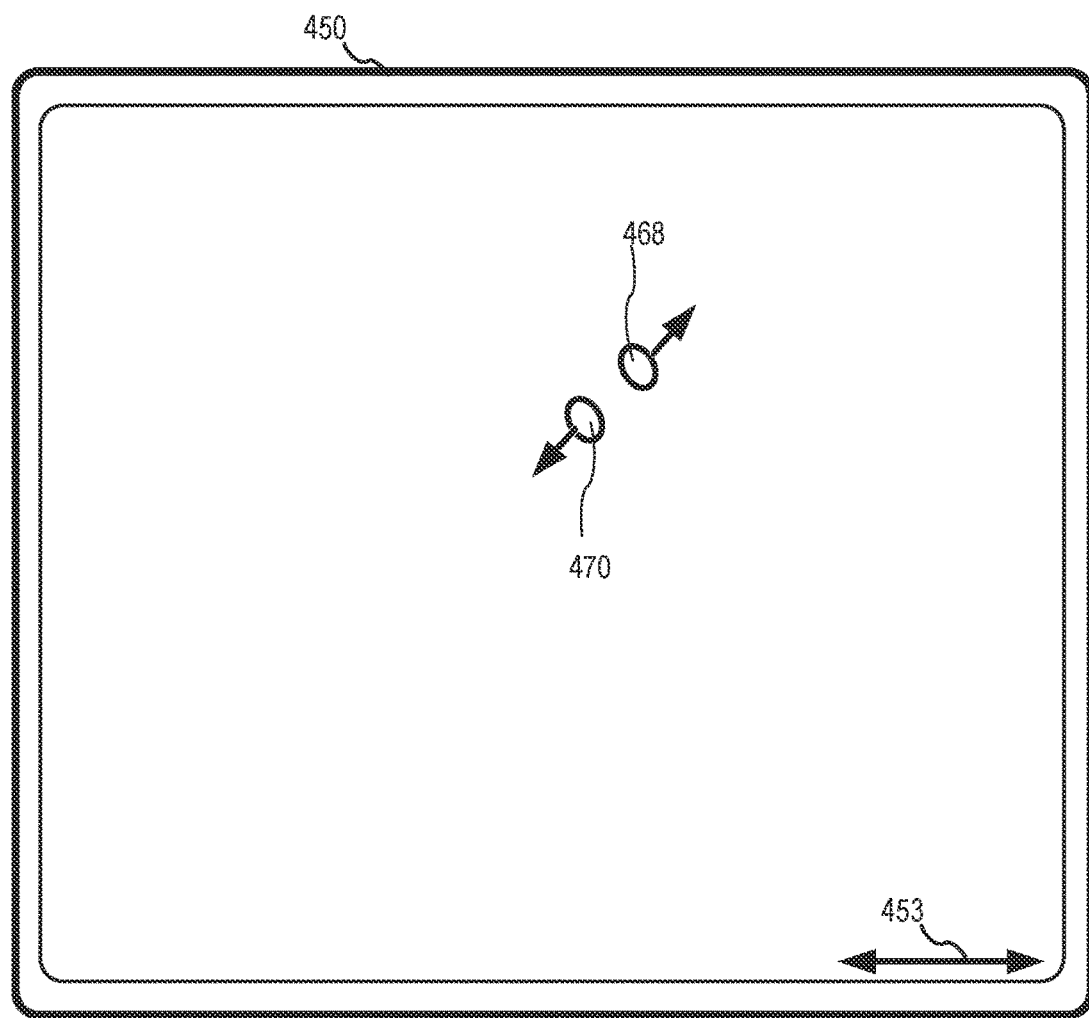
FIG. 4B illustrates an exemplary user interface for a multifunction device with a touch-sensitive surface that is separate from the display in accordance with some embodiments.
Figure 4B:
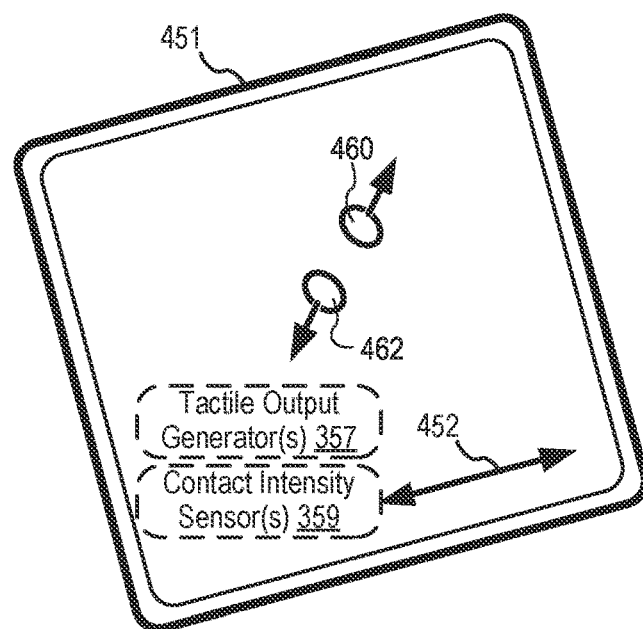

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
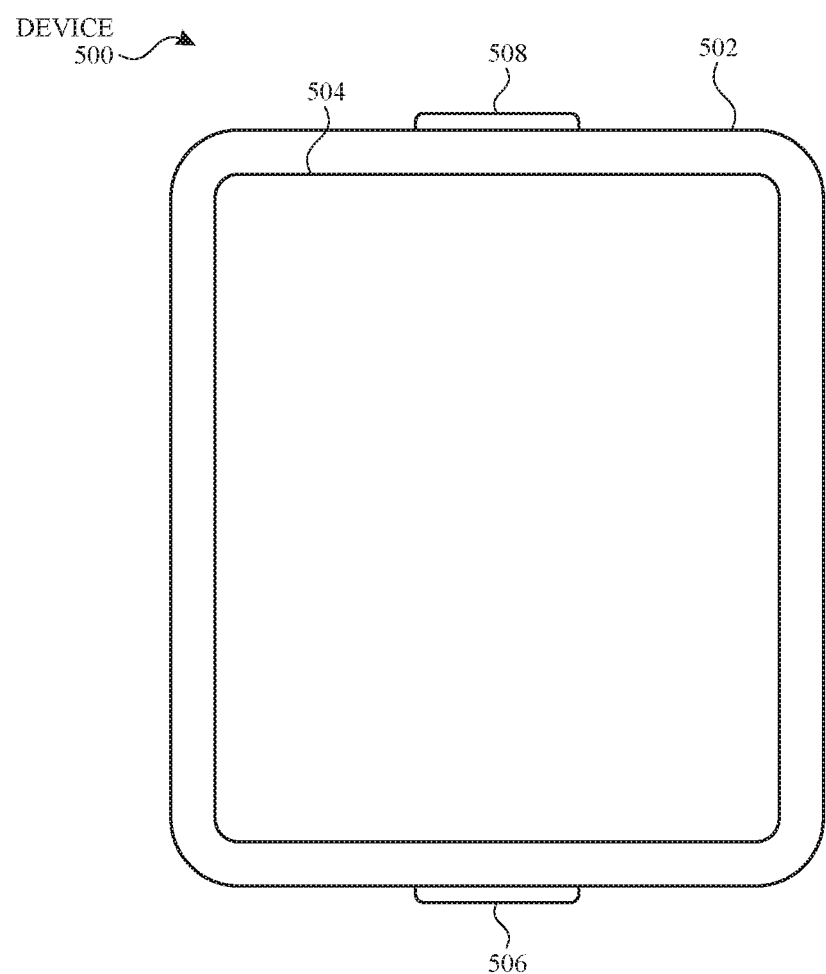
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
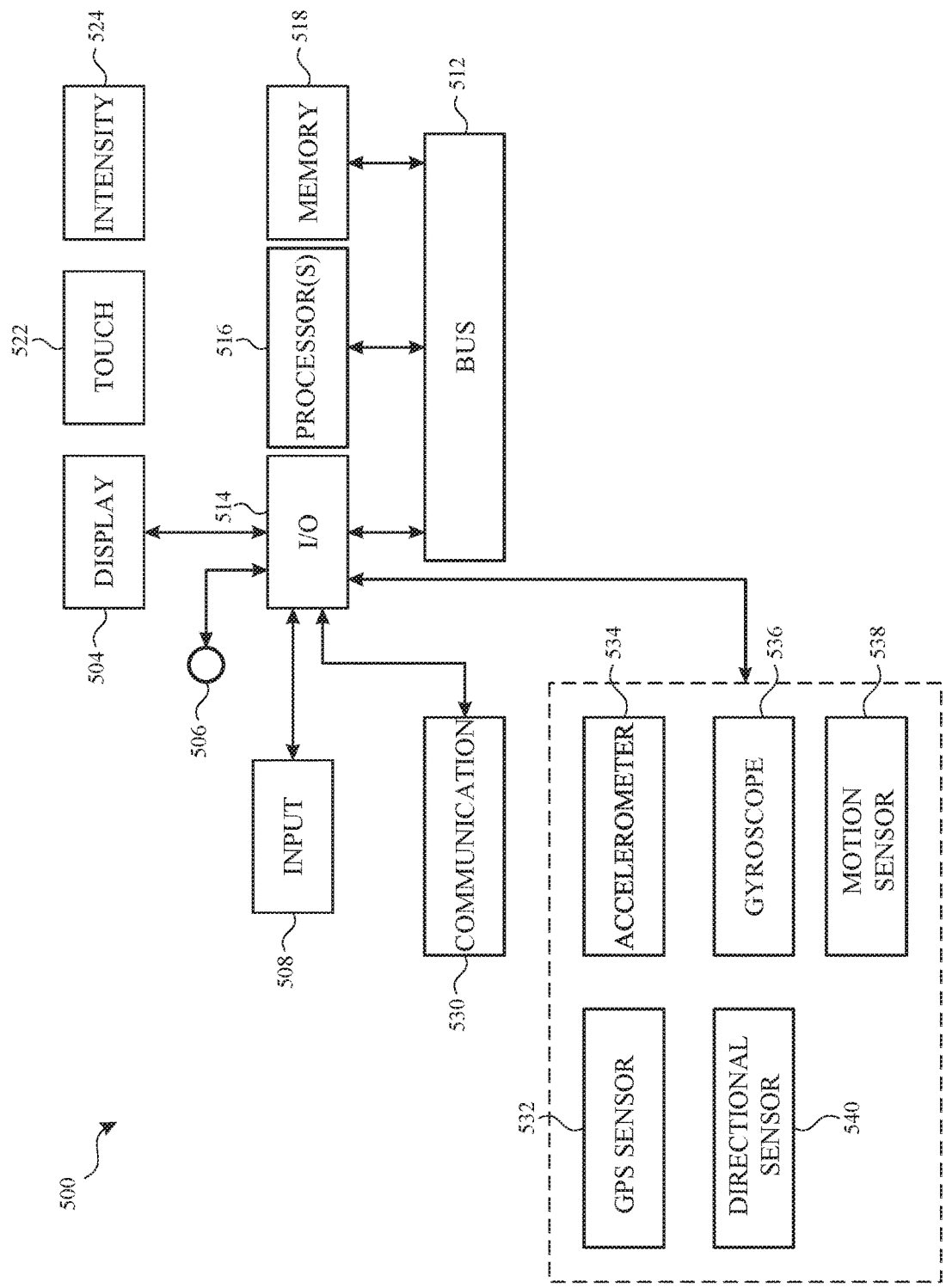
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 1400 and 1500 (FIGS. 14A-14B and FIGS. 15A-15B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
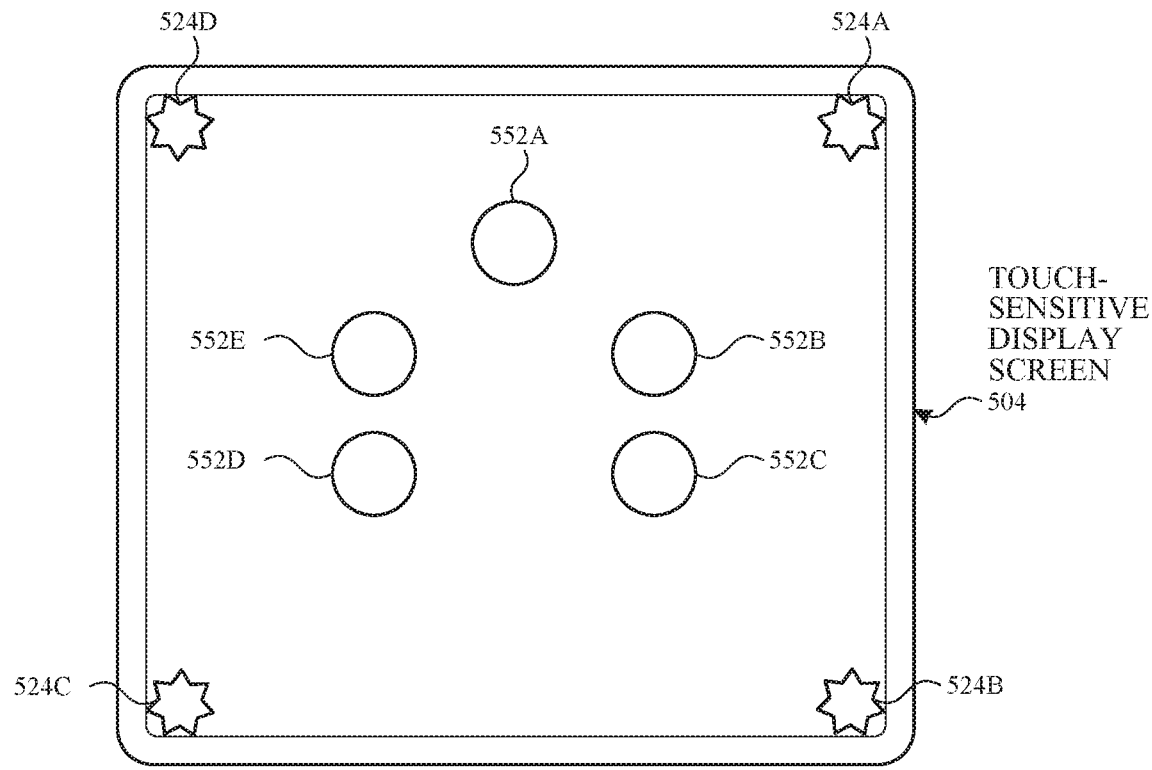
FIGS. 5C-5D illustrate exemplary components of a personal electronic device having a touch-sensitive display and intensity sensors in accordance with some embodiments.
Figure 5C:
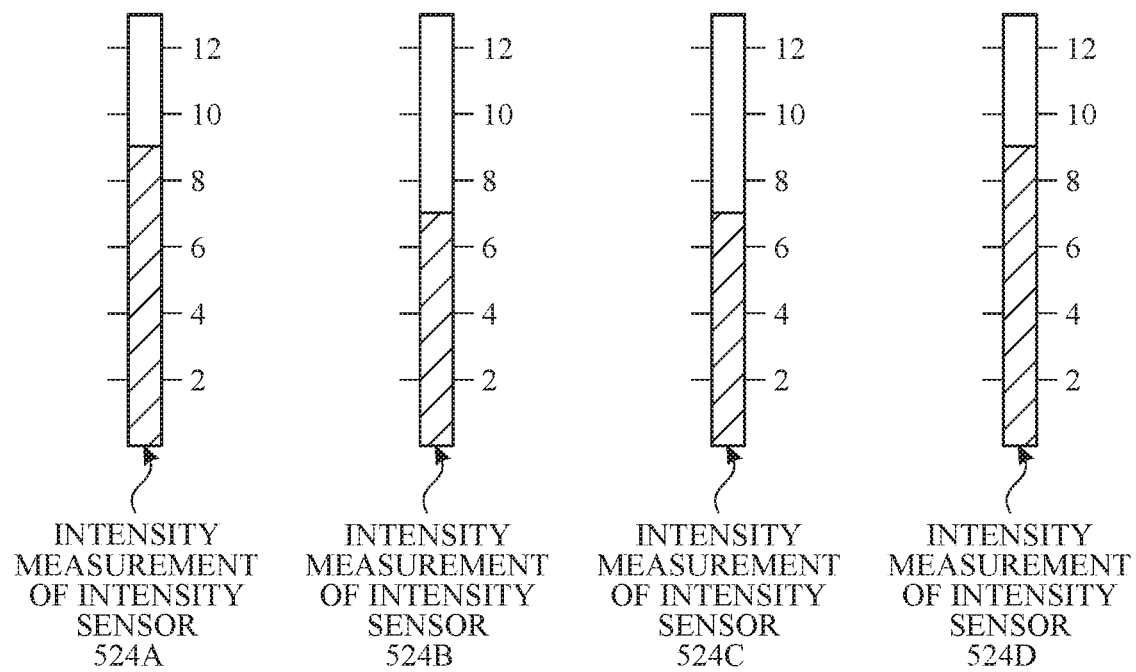
Figure 5D:
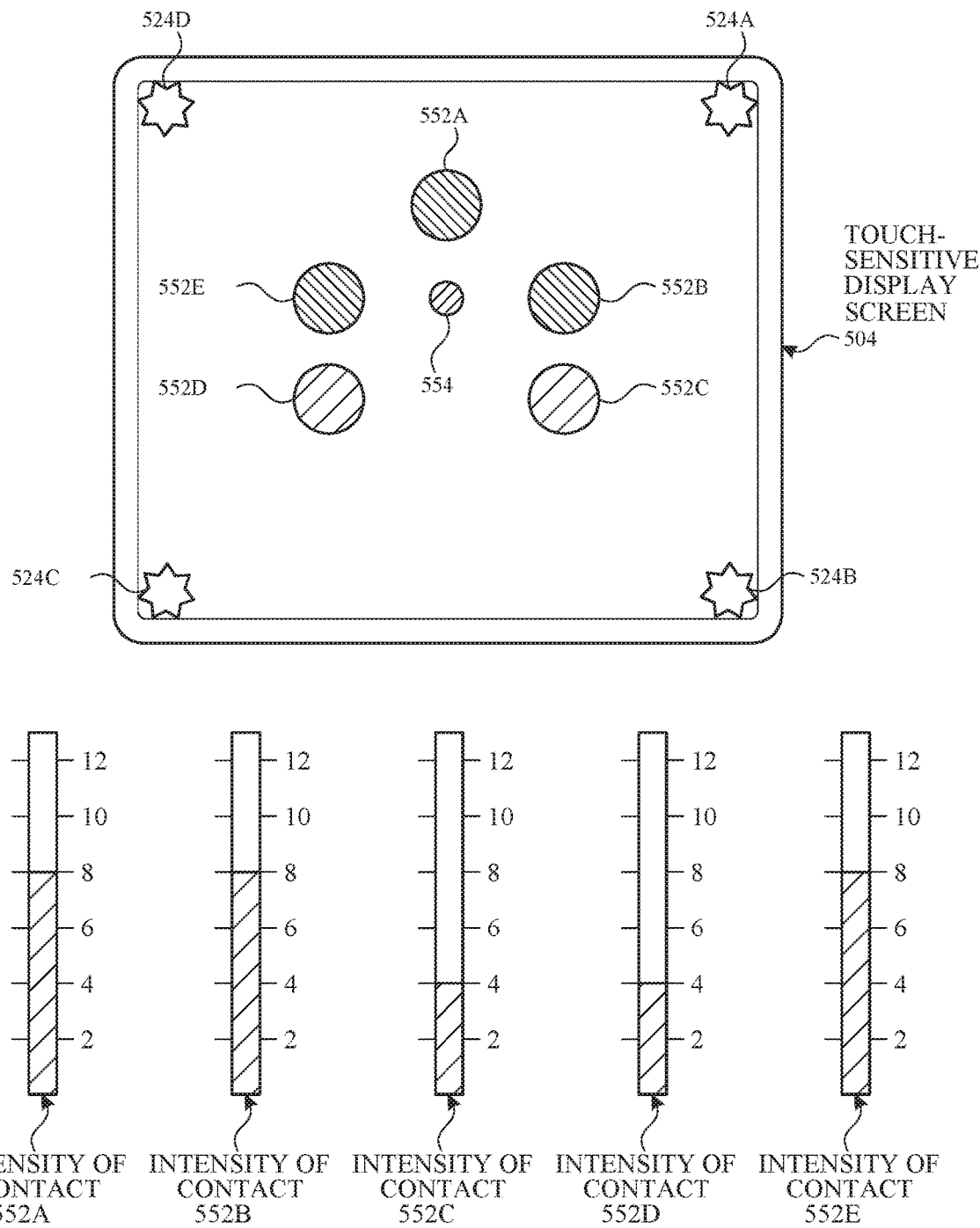

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
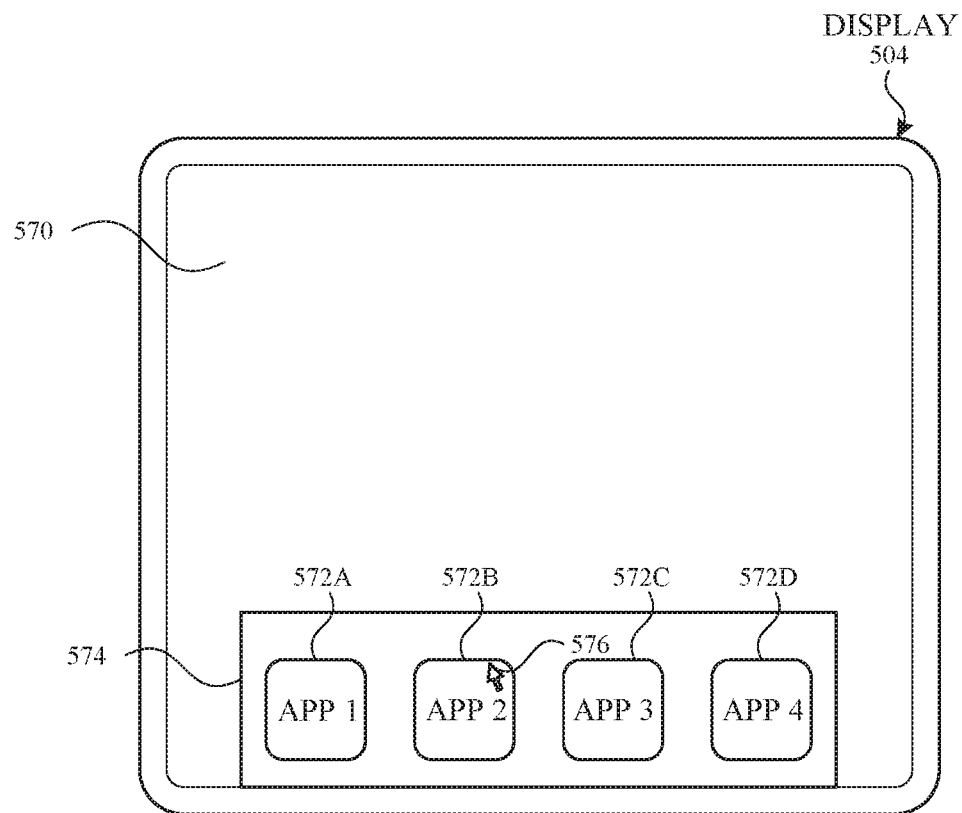
FIGS. 5E-5H illustrate exemplary components and user interfaces of a personal electronic device in accordance with some embodiments.
Figure 5E:
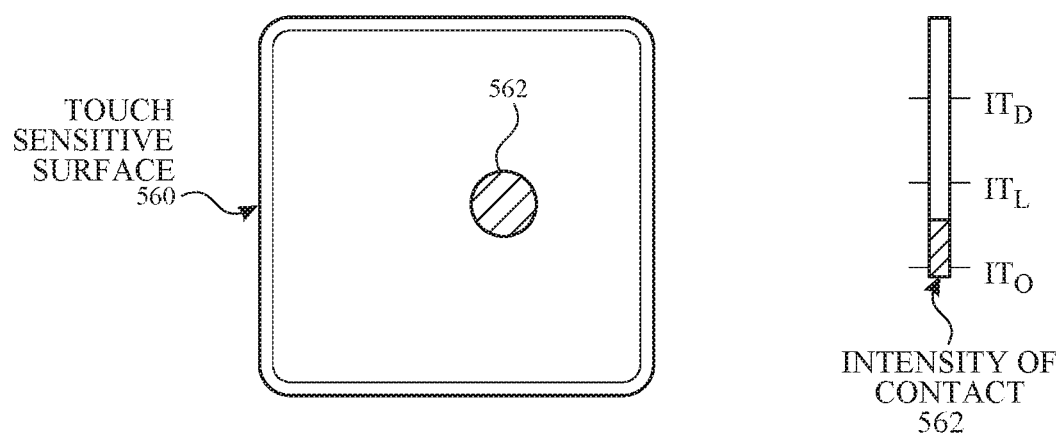
Figure 5F:
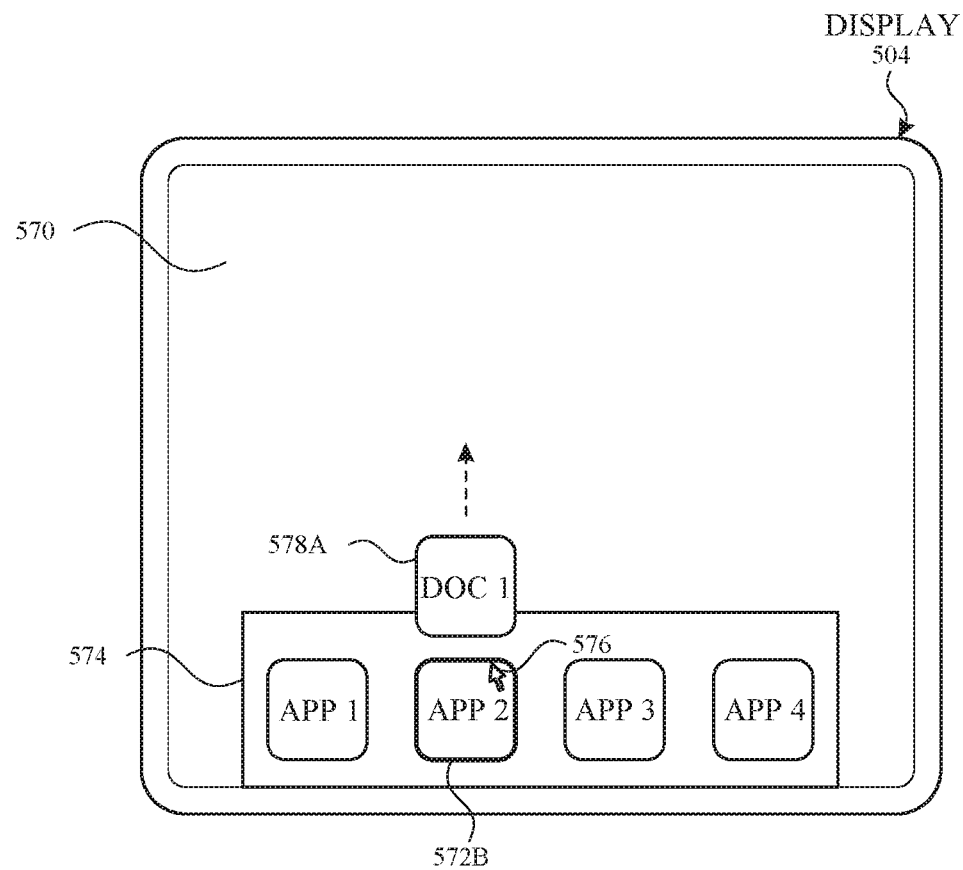
Figure 5F:
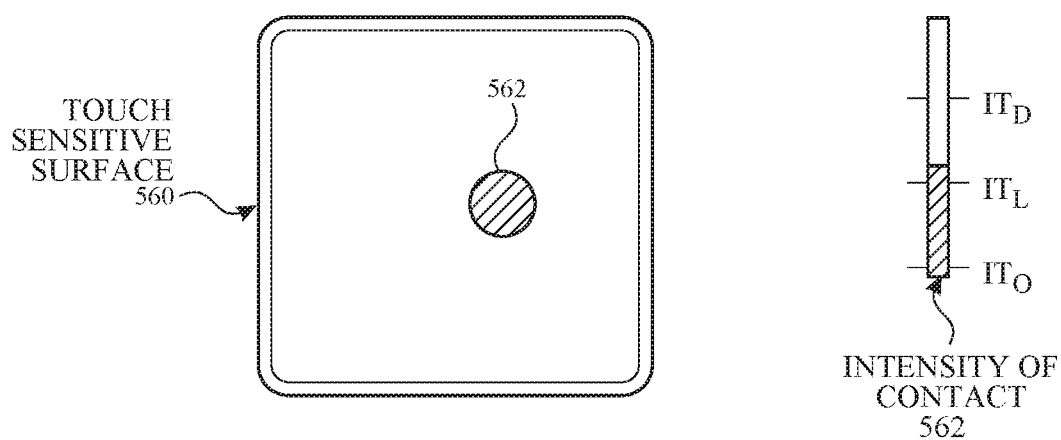
Figure 5G:
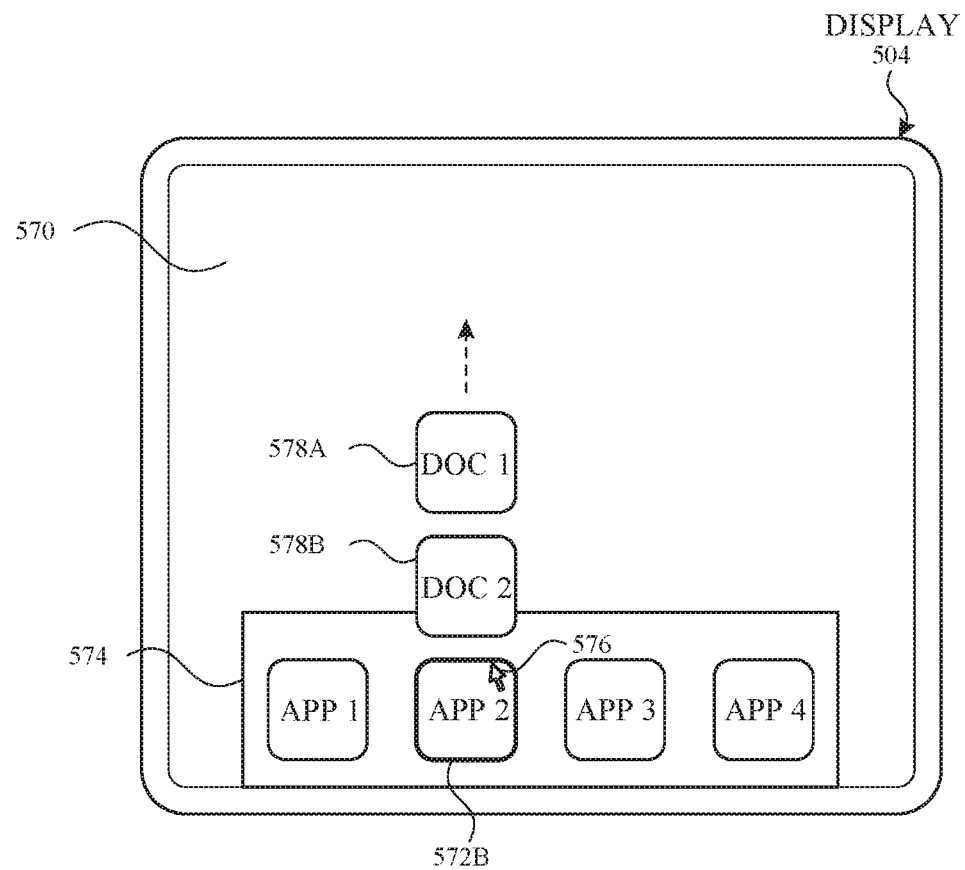
Figure 5G:
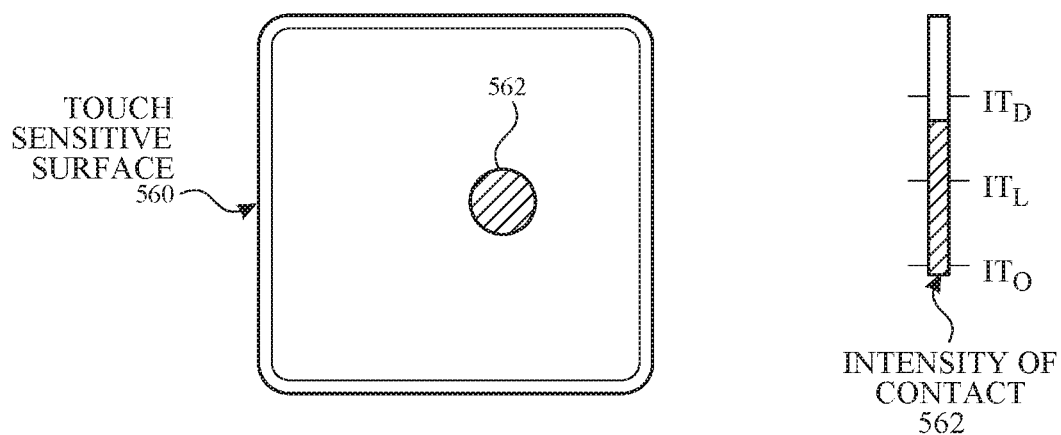
Figure 5H:
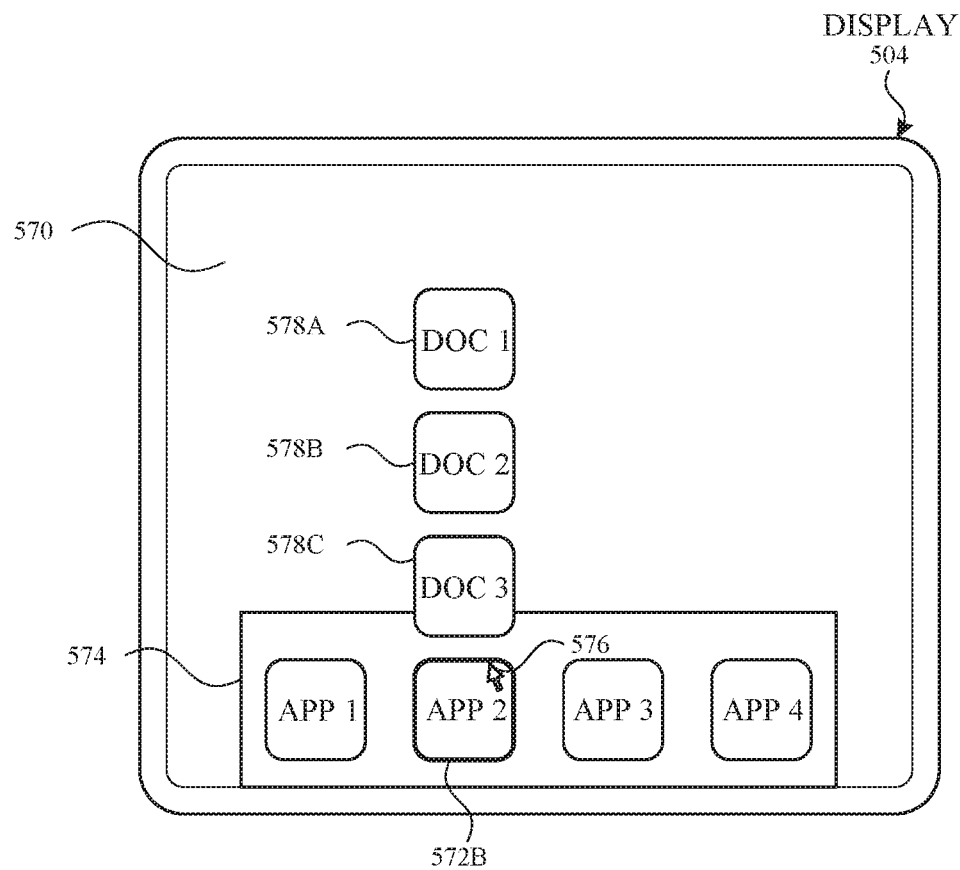
Figure 5H:
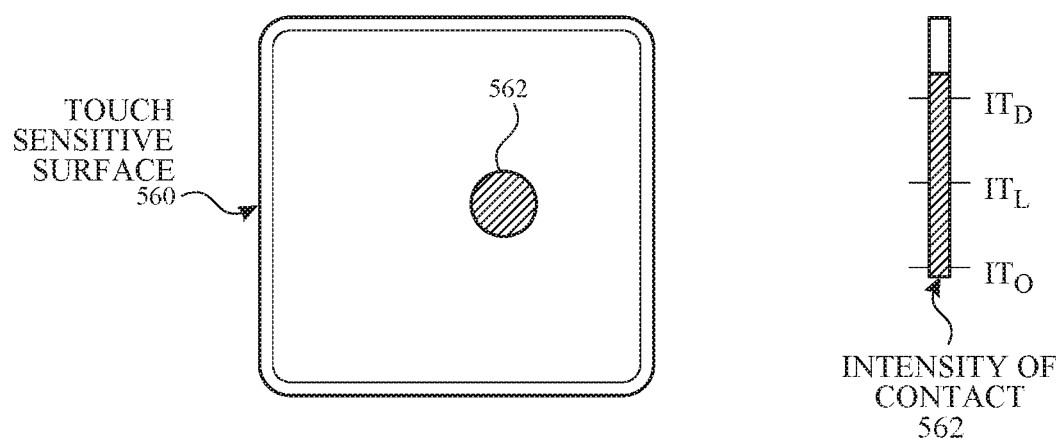

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
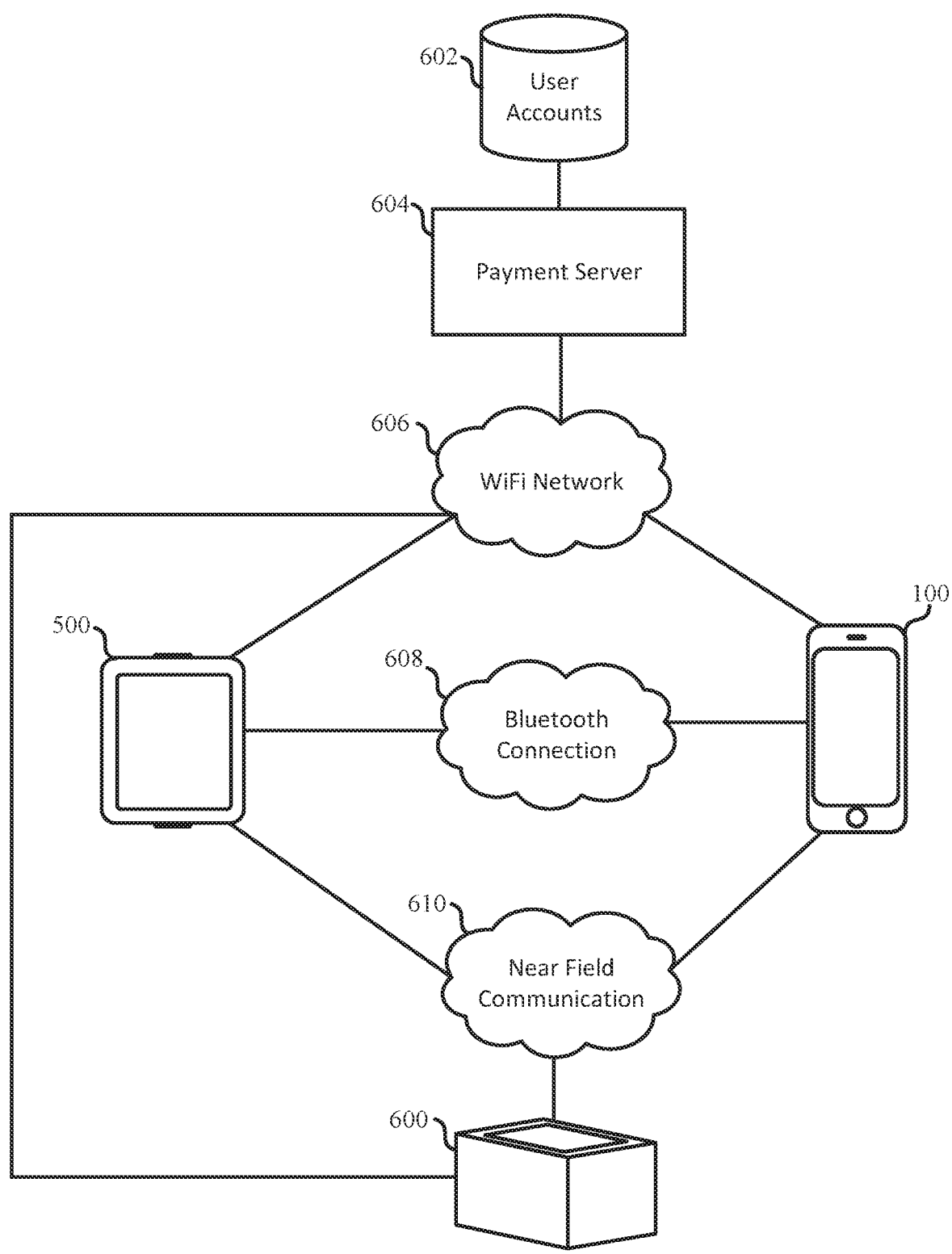
FIG. 6 illustrates exemplary devices connected via one or more communication channels in accordance with some embodiments.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input, including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a Wi-Fi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some embodiments, an electronic device (e.g., 100, 300, 500) communicates with payment terminal 600 using an NFC channel 610. In some embodiments, payment terminal 600 communicates with an electronic device (e.g., 100, 300, 500) using a peer-to-peer NFC mode. The electronic device (e.g., 100, 300, 500) is optionally configured to transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, the generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 600) is established within a defined time period from detection of the input, the secure element releases payment information to be transmitted to the other device (e.g., payment terminal 600). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some embodiments, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some embodiments, a payment is denied when provided payment information is not consistent (e.g., an expiration date does not correspond to a credit, debit, or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some embodiments, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without the involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations optionally includes navigation between user interfaces, activation or deactivation of a predefined set of functions, and activation or deactivation of certain applications. The locked state can be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state optionally responds to a limited set of user inputs, including input that corresponds to an attempt to transition the device to the unlocked state or input that corresponds to powering the device off.

In some embodiments, a secure element (e.g., 115) is a hardware component (e.g., a secure microcontroller chip) configured to securely store data or an algorithm such that the securely stored data is not accessible by the device without proper authentication information from a user of the device. Keeping the securely stored data in a secure element that is separate from other storage on the device prevents access to the securely stored data even if other storage locations on the device are compromised (e.g., by malicious code or other attempts to compromise information stored on the device). In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7V illustrate exemplary user interfaces for providing authentication at a computer system in accordance with some embodiments. The user interfaces in these figures are used to illustrate the processes described below, including the processes in FIGS. 14A-14B and FIGS. 15A-15B.

FIGS. 7A-7D illustrate an exemplary scenario where a user (e.g., as shown in FIG. 7A) is able to successfully perform a secure operation (e.g., unlock computer system 700) (e.g., as shown in FIGS. 7B-7D) when a determination is made that a captured biometric feature (e.g., the face of a user) (e.g., not when only a portion of the biometric feature) matches a biometric profile.

FIG. 7A illustrates user 760 (e.g., "Jane") holding computer system 700 and, optionally (e.g., as indicated by indicator 786), wearing external accessory device 790. In the exemplary embodiments provided in FIGS. 7A-7V, computer system 700 is a smartphone, and external accessory device 790 is a smartwatch. In some embodiments, computer system 700 can be a different type of computer system, such as a tablet computer. In some embodiments, external accessory device 790 can be a different type of external accessory device, such as a smartphone or tablet computer. In some embodiments, computer system 700 and/or external accessory device 790 include one or more components of device 100, device 300, and/or device 500.

As illustrated in FIG. 7A, computer system 700 includes display 710. Computer system 700 also includes one or more inputs devices (e.g., touch screen of display 710, hardware button 702, and a microphone), a wireless communication radio, and one or more biometric sensors (e.g., biometric sensor 704, touch screen of display 710). In some embodiments, biometric sensor 704 includes one or more biometric sensors that include a camera, such as a depth camera (e.g., an infrared camera), a thermographic camera, or a combination thereof. In some embodiments, biometric sensor 704 includes a biometric sensor (e.g., facial recognition sensor), such as those described in U.S. patent application Ser. No. 14/341,860; U.S. Patent Pub. No. 2016/0025993; U.S. patent application Ser. No. 13/810,451; and U.S. Pat. No. 9,098,931, which are hereby incorporated by reference in their entireties for any purpose. In some embodiments, biometric sensor 704 includes one or more fingerprint sensors (e.g., a fingerprint sensor integrated into an affordance). In some embodiments, computer system 700 further includes a light-emitting device (e.g., light projector), such as an IR floodlight, a structured light projector, or a combination thereof. The light-emitting device is, optionally, used to illuminate the biometric feature (e.g., the face) during capture of biometric data of biometric features by biometric sensor 704. In some embodiments, computer system 700 includes a plurality of cameras separate from biometric sensor 704. In some embodiments, computer system 700 includes only one camera separate from biometric sensor 704.

As illustrated in FIG. 7A, user 760 is holding computer system 700 in a position where user 760 can see content displayed on display 710 and biometric sensor 704 can detect the face of user 760 (e.g., which is shown by zone of detection indicator 784). In particular, the face of user 760 includes upper portion 760a and bottom portion 760b. As illustrated in FIG. 7A, upper portion 760a includes the eyes and eyebrows of user 760, and bottom portion 760b includes the nose and mouth of user 760. In some embodiments, other portions of the face of user 760 can be delineated as being a different portion. In some embodiments, upper portion 760a and/or bottom portion 760b can include less or more of the face of user 760. At FIG. 7A, biometric sensor 704 can detect both the upper portion 760a and bottom portion 760b of the face of user 760. As illustrated in FIG. 7A, external accessory device 790 is in an unlocked state, which is represented by unlock indicator 794.

FIGS. 7B-7D illustrate one or more exemplary user interfaces that are displayed on display 710 of computer system 700. In particular, the one or more exemplary user interfaces of FIGS. 7B-7D are described in relation to an exemplary scenario where user 760 attempts to use biometric authentication to unlock computer system 700 while user 760, external accessory device 790, and computer system 700 are oriented and in a state as depicted and described above in relation to FIG. 7A.

As illustrated in FIG. 7B, computer system 700 displays notification 714, which indicates that a message from John Appleseed has been received. User 760 wishes to view the restricted content of notification 714 (e.g., the message from John Appleseed) but is unable to do so, as computer system 700 is currently in a locked state, as indicated by lock indicator 712a. As illustrated in FIG. 7B, computer system 700 displays a locked state user interface (UI) on display 710. The locked state UI includes lock indicator 712a, which provides an indication that computer system 700 is in a locked state. Viewing the restricted content of notification 714 requires successful authentication (e.g., determining that information (or data) about a biometric feature obtained using biometric sensor 704 corresponds to (or matches) stored authorized credentials or biometric features).

At FIG. 7B, computer system 700 detects upward swipe input 750b on (e.g., at a location corresponding to) user interface object 716 and determines that a request to perform a secure operation (e.g., a request to initiate biometric authentication) has been received because an unlock input/gesture, such as an upward swipe input 750b, has been detected. In some embodiments, computer system 700 determines that the request to perform the secure operation has been received when one or more other gestures and/or other inputs are detected, such as an input on hardware button 702 as discussed below in relation to FIGS. 7P-7S. In some embodiments, the one or more other gestures/inputs can include one or more inputs/gesture (e.g., a tap input) that are detected when computer system 700 is in a low power state, one or more gestures/inputs (e.g., a tap input) on a notification (e.g., notification 714) or another user interface object, one or more gestures/inputs on a notification or another user interface object that is displayed while computer system 700 is in a locked state, and/or one or more gestures/inputs (e.g., presses) that are detected on one or more hardware input mechanisms, such as hardware button 702. In some embodiments, computer system 700 receives a request to perform a secure operation when a determination is made that computer system 700 has been lifted (or raised) to a particular position or by more than a particular amount, such as being raised from a substantially horizontal orientation (and/or vertical orientation) to an orientation of computer system 700 shown in FIG. 7A.

At FIG. 7B, in response to detecting upward swipe input 750b and determining that the request to perform a secure operation has been received, computer system 700 initiates biometric authentication. After initiating biometric authentication (e.g., prior to successful authentication), computer system 700 determines that a face is detected by biometric sensor 704.

As illustrated in FIG. 7C, in response to determining that the request to perform a secure operation has been received and determining that a face is detected by biometric sensor 704, computer system 700 displays biometric authentication status 720 (e.g., "Face Authentication") on display 710 to indicate that biometric authentication is being performed. In addition, computer system 700 continues to display lock indicator 712a to indicate that computer system 700 remains in the locked state. At FIGS. 7B-7C, computer system 700 determines that the face of user 760 (e.g., the biometric feature) that is being captured by biometric sensor 704 has resulted in successful biometric authentication. As indicated by indication 788a of FIG. 7B ("FULL MATCH DETECTED"), computer system 700 has determined that a full match of the biometric feature has been detected. That is, a determination has been made that the face of user 760 matches (e.g., within a certain confidence interval) an enrolled (e.g., a saved, secured, verified, and/or a trusted) version of the biometric feature (e.g., a version of the biometric feature that data representation upper portion 760a and bottom portion 760b). In some embodiments, the enrolled version of the biometric feature belongs to an authorized biometric profile (e.g., enrolled biometric data, biometric data that enrolled before the current biometric authentication process was initiated and/or when computer system 700 was in an unlocked state). In some embodiments, one or more biometric features other than the face of user 760 (e.g., fingerprint, eyes) can be detected and used to determine whether the biometric authentication was successful (e.g., using an authorized biometric profile that includes enrolled data that is representative of the respective biometric feature). In some embodiments, indication 788a is not displayed by computer system 700.

At FIG. 7D, because the determination was made that the full match of the biometric feature has been detected (e.g., and/or that full biometric authentication was successful), computer system 700 transitions from the locked state to an unlocked state. Because the determination was made that the full match of the biometric feature has been detected, computer system 700 replaces lock indicator 712a with unlock indicator 712b on display 710, as illustrated in FIGS. 7C-7D. Unlock indicator 712b indicates that computer system 700 is in an unlocked state. In some embodiments, after displaying the user interface of FIG. 7D, computer system 700 can display one or more user interfaces and/or perform one or more operations that would have been previously restricted to the user if biometric authentication were not successful (e.g., as discussed below in relation to FIGS. 7I-7O).

FIGS. 7E-7H illustrate an exemplary scenario where a user is able to successfully perform a secure operation when a determination is made that partial biometric authentication is successful, but full biometric authentication was not successful, and an alternative method for authenticating is provided to the user because of the determination that partial biometric authentication was successful. As used herein, a determination is made that partial biometric authentication is successful when only a portion (e.g., eyes, fingertip, bottom portion of an eye) of a captured biometric feature matches an enrolled portion (e.g., eyes, fingertip, bottom portion of an eye) of a biometric feature.

FIG. 7E illustrates user 760 holding computer system 700 and wearing external accessory device 790 in the same position that user 760 was holding computer system 700 in FIG. 7A. To contrast FIG. 7E with FIG. 7A, user 760 is wearing mask 728 (e.g., a face covering) in FIG. 7E while user 760 was not wearing a mask in FIG. 7A. Because user 760 is wearing a mask in FIG. 7E, biometric sensor 704 can only detect upper portion 760a of the face of user 760 (e.g., which is shown by zone of detection indicator 784). Bottom portion 760b of FIG. 7A is covered by mask 728 in FIG. 7E. While user 760 is illustrated wearing mask 728 that covers bottom portion 760b, the embodiments described herein would operate similarly even if another portion of user 760 was covered (e.g., user 760 could wear an eye mask without wearing mask 728, such that upper portion 760a could be covered while bottom portion 760b is uncovered). While user 760 is wearing a mask at FIG. 7E, a user wearing another item (e.g., a scarf, a towel) can have a similar impact (as described herein) as a user wearing a mask.

FIGS. 7F-7H illustrate one or more exemplary user interfaces that are displayed on display 710 of computer system 700. In particular, the one or more exemplary user interfaces of FIG. 7F-7H are described in relation to an exemplary scenario where user 760 attempts to use biometric authentication (e.g., while wearing a mask) to unlock computer system 700, and an alternative method for authenticating is provided to the user because partial biometric authentication (and/or another method of authenticating) was successful.

At FIG. 7F, computer system 700 displays notification 714, which indicates that a message from John Appleseed has been received. User 760 wishes to view the restricted content of notification 714 (e.g., the message from John Appleseed) but is unable to do so, as computer system 700 is currently in a locked state (e.g., as indicated by lock indicator 712a). As illustrated in FIG. 7F, computer system 700 displays a locked state user interface with lock indicator 712a, which provides an indication that computer system 700 is in a locked state. At FIG. 7F, computer system 700 detects upward swipe input 750f on user interface object 716 and determines that a request to perform a secure operation (e.g., a request to initiate biometric authentication) has been received because an unlock input, such as an upward swipe input 750f, has been detected. At FIG. 7F, in response to detecting upward swipe input 750f and determining that the request to perform a secure operation has been received, computer system 700 initiates a biometric authentication process.

At FIG. 7F, as a part of the biometric authentication process, computer system 700 determines that the face of user 760 (e.g., biometric data) that is being captured by biometric sensor 704 does not match an enrolled biometric feature (e.g., full biometric authentication is unsuccessful). Here, the face of user 760 does match the enrolled biometric feature because only upper portion 760a of the face of user 760 can accurately captured. As illustrated in FIG. 7F, portions (e.g., bottom portion 760b of FIG. 7E) are obstructed by mask 728, so computer system 700 is not able to accurately capture these obstructed portions. In some embodiments, computer system 700 determines that full biometric authentication (e.g., the captured feature matching the enrolled biometric feature) is unsuccessful and/or the face of user 760 (e.g., biometric data) that is being captured by biometric sensor 704 does not match the enrolled biometric feature because a determination has been made that a mask (e.g., mask 728) has been detected on the face of user 760. After determining that the face of user 760 that is being captured by biometric sensor 704 does not match an enrolled biometric feature, computer system 700 determines that partial biometric authentication is successful (e.g., as indicated by indication 788b, "PARTIAL MATCH DETECTED"). In some embodiments, indication 788b is not displayed by computer system 700. At FIG. 7F, the determination is made that partial biometric authentication is successful because the captured portion (e.g., upper portion 760a) of the face of user 760 matches (e.g., within a threshold confidence interval) an enrolled portion (e.g., upper portion) of the biometric feature that belongs to a biometric profile corresponding to user 760.

As illustrated in FIG. 7G, because computer system 700 determined that the face of user 760 (e.g., biometric data) that is being captured by biometric sensor 704 does not match an enrolled biometric feature, computer system 700 remains in the locked state (e.g., is not transitioned to the unlocked state). As illustrated in FIG. 7G, computer system 700 continues to display lock indicator 712a because of this determination. However, as illustrated in FIG. 7G, computer system 700 displays prompt 734 because a determination was made that a partial match of the enrolled biometric feature was detected (e.g., the determination was made that biometric authentication is successful). That is, a portion (e.g. upper portion 760a) of the captured biometric feature matches an enrolled portion of the biometric feature, Prompt 734 includes the phrase, "TAP WATCH TO UNLOCK," and indicates an alternative authentication method that can be used to perform the secure operation (e.g., unlock computer system 700), As illustrated in FIG. 7G, because the determination was made that partial match was detected, external accessory device 790 is updated to display prompt 796, which indicates that the alternative authentication method can be used to perform the secure operation (e.g., including the phrase "TAP TO UNLOCK PHONE"). In addition, external accessory device 790 displays prompt 796 and/or computer system 700 displays prompt 734 because a determination is made that external accessory device 790 is in an unlocked state (e.g., as indicated by indicator 794 of FIG. 7E, as discussed above in relation to FIG. 7A). In some embodiments, one or more of prompt 734 and prompt 796 would not be displayed and the alternative authentication method cannot be used to perform the secure operation when a determination is-made-that-is made that external accessory device 790 is in a locked state. In some embodiments, when external accessory device 790 is in a locked state, a determination is made that external accessory device 790 cannot be used to unlocked computer system 700 (e.g., because no authentication has been provided for external accessory device 790 and/or a determination is made that external accessory device 790 is less secure than when external accessory device 790 is authenticated).

As illustrated in FIG. 7G, prompt 734 and prompt 796 indicate the same alternative authentication method that can be used to perform the secure operation, where the alternative authentication method is completed by a user tapping on external accessory device 790 to unlock computer system 700. Notably, in FIG. 7G, prompt 734 and prompt 796 are displayed because the determination was made that a partial match of the enrolled biometric feature was detected, and computer system 700 remains in the locked state (e.g., among the other reasons discussed above). In other words, computer system 700 provides an alternative authentication method because a determination is made that a partial match of the enrolled biometric feature was detected (and because a determination is made that full match of the enrolled biometric feature was not detected). In some embodiments, computer system 700 and/or external accessory device 790 does not display a prompt and computer system 700 remains in the locked state because a determination is made that a partial match of the enrolled biometric feature was not detected (and because a determination is made that full match of the enrolled biometric feature was not detected), as described below in relation to FIGS. 7T-7V. In some embodiments, computer system 700 and/or external accessory device 790 does not display a prompt and computer system 700 remains in the locked state when a determination is made that the gaze of user 760 is not directed toward computer system 700 and/or biometric sensor 704. In some embodiments, computer system 700 and/or external accessory device 790 does not display a prompt until a determination is made that the gaze of user 760 is directed toward computer system 700 and/or biometric sensor 704. In some embodiments, computer system 700 and/or external accessory device 790 does not display a prompt because a determination is made that external accessory device 790 is not within a predetermination distance (e.g., 1-3 meters) from computer system 700 (e.g., during the biometric authentication process). In some embodiments, computer system 700 and/or external accessory device 790 does not display a prompt because a determination is made that external accessory device 790 is not unlocked (e.g., during the biometric authentication process). At FIG. 7G, tap input 750g is detected on the display of external accessory device 790.

As illustrated in FIG. 7H, in response to the detection of tap input 750g, computer system 700 is transitioned from a locked state to an unlocked state (e.g., as indicated by unlock indicator 712b of FIG. 7H replacing lock indicator 712a of FIG. 7G). Thus, as described above in relation to FIGS. 7E-7H, computer system 700 performs the secure operation (e.g., unlocks) using an alternative authentication method when full biometric authentication is unsuccessful and partial biometric authentication is successful (e.g., among the other reasons discussed above, such as external accessory device 790 being unlocked and within a predetermined distance from computer system 700). In some embodiments, computer system 700 is maintained in the locked state when the alternative authentication method (e.g., indicated by prompt 734 and/or prompt 796) is not provided and/or is not successful (e.g., a swipe input is received when the prompt instructed the user to provide a tap input). Although the alternative authentication method described in FIGS. 7E-7H is performed when a tap input is received on external accessory device 790, computer system 700 and/or external accessory device 790 can display a prompt concerning one or more other alternative authentication methods and/or one or more other alternative authentication methods can be performed to cause computer system 700 to perform the secure operation (e.g., unlock). In some embodiments, the one or more alternative authentication methods can include computer system 700 and/or external accessory device 790 detecting other types of inputs and/or gestures than tap input 750g, such as a press-and-hold gesture/input, a multi-tap gesture/input, a swipe gesture/input, a pinch gesture/input, or any combination thereof. In some embodiments, the one or more alternative authentication methods can include computer system 700 and/or external accessory device 790 detecting a series of predefined inputs/gestures, where the inputs/gestures have to be detected in a certain order, on a certain location of a device/system, and/or on a particular device/system. In some embodiments, the one or more alternative authentication methods can include one or more techniques are described below in relation to FIGS. 8A-8D, FIGS. 9A-9D, FIGS. 10A-10D, FIGS. 11A-11D, FIGS. 12A-12D, FIGS. 13A-13F, and/or any combination thereof.

FIGS. 7I-7O illustrate exemplary embodiments that are provided to describe how computer system 700 can provide different levels of access privileges (e.g., read, write, update, and delete privileges) based on which form of authentication (e.g., full biometric authentication or partial biometric authentication combined with alternative authentication) was determined to be successful. In some embodiments, computer system 700 can provide different levels of access privileges for different applications based on which form of authentication was determined to be successful. In some embodiments, computer system 700 provides the user with more access privileges when computer system 700 is unlocked after a determination has been made that full biometric authentication is successful than the access privileges provided when computer system 700 is unlocked after the alternative authentication method is provided and/or is determined to be successful (and, in addition, after full biometric authentication is determined to be unsuccessful, partial biometric authentication is determined to be successful). In some embodiments, computer system 700 provides the user with more access privileges when computer system 700 is unlocked after a determination has been made that full biometric authentication is successful because full biometric authentication is considered a more reliable (e.g., more secure, trusted) form of authentication than the alternative authentication method (e.g., and partial biometric authentication).

At FIG. 7I, computer system 700 is displaying a home screen user interface that includes application icons 740. Application icons 740 include watch application icon 740a, browser application icon 740b, passwords application icon 740c, financial application icon 740d, phone application icon 740e, messaging application icon 740f, e-mail application icon 740g, and camera application icon 740h. In some embodiments, computer system 700 allows a user to interact with and/or perform functions related to each application (e.g., that corresponds to application icons 740) installed on computer system 700 and/or perform one or more system functions based on which authentication method was used to unlock computer system 700.

FIGS. 7J-7K illustrate alternative embodiments that are provided to describe the different access privileges for an application that computer system 700 can provide to a user who has been authenticated via full biometric authentication (e.g., as described above in relation to FIGS. 7A-7D) and a user who has been authenticated via the alternative authentication method (e.g., as described above in relation to FIGS. 7E-7G). In particular, FIG. 7J illustrates an embodiment where the user has been authenticated via full biometric authentication and FIG. 7K illustrates an embodiment where the user has been authenticated via the alternative authentication method (e.g., as described above in relation to FIGS. 7E-7G). At FIG. 7I, computer system 700 detects tap input 750i1 on financial application icon 740d and, as described below, displays the user interface of FIG. 7J or the user interface of FIG. 7K based on the authentication method that was used to unlock computer system 700.

As illustrated in FIG. 7J, in response to detecting tap input 750i1, computer system 700 opens a financial application that corresponds to financial application icon 740d and displays financial application user interface 742. Financial application user interface 742 contains account information concerning financial accounts for user 760 ("JANE'S CHECKING ACCOUNT"). This information includes sensitive information, such as balances and transaction information related to the financial accounts for user 760. At FIG. 7J, computer system 700 displays financial application user interface 742 that includes account information because the user has been authenticated via full biometric authentication to unlock computer system 700 (e.g., sometime after computer system 700 is transitioned to the unlocked state, as described above in relation to FIGS. 7A-7D). Thus, at FIG. 7J, computer system 700 has provided the user will full access privileges to create, view, update, and delete sensitive information.

Alternatively, as illustrated in FIG. 7K, computer system 700 displays prompt 744 in response to detecting tap input 750i1. Prompt 744 indicates that the user does not have permission to access the financial application that corresponds to financial application icon 740d. At FIG. 7K, computer system 700 displays prompt 744 instead of opening the financial application because the alternative authentication method was used to unlock computer system 700 (e.g., sometime after computer system 700 is transitioned to the unlocked state, as described above in relation to FIGS. 7E-7G) and the user does not have access privileges to open the financial application. Thus, as compared to FIG. 7J (e.g., full biometric authentication used to unlock computer system 700), computer system 700 provides a user with reduced access privileges at FIG. 7K because the alternative authentication method was used to unlock computer system 700. In some embodiments, instead of displaying prompt 744, computer system 700 opens the financial application but does not display some or all of the account information for Jane's accounts (e.g., shown in FIG. 7J). Thus, in some embodiments, computer system 700 allows a user to open the financial application without being able to obtain sensitive information related to Jane's account. In some embodiments, at FIG. 7K, computer system 700 displays a request for the user to provide full biometric authentication in response to detecting tap input 750i1 of FIG. 7I.

Computer system 700 is not limited to providing different access privileges for only financial applications based on whether computer system 700 was unlocked via full biometric authentication or the alternative authentication method. It is understood that computer system 700 can provide different access privileges for any application that a user can interact with via computer system 700. For example, in response to detecting tap input 750i2 on passwords application icon 740c, computer system 700 opens a passwords application (e.g., an application for storing passwords) when full biometric authentication has been used to unlock computer system 700 but does not open the passwords application when the alternative authentication method has been used to unlock computer system 700. In some embodiments, computer system 700 allows a user to update and/or delete one or more passwords in the passwords application and/or perform one or more operations when full biometric authentication has been used to unlock computer system 700 but does not allow a user to update and/or delete one or more passwords in the passwords application and/or perform one or more operations when the alternative authentication method has been used to unlock computer system 700.

Turning back to FIG. 7I, computer system 700 detects press-and-hold input 750i4 on display 710. As illustrated in FIG. 7L, in response to detecting press-and-hold input 750i4, computer system 700 displays delete affordance 740c1 near passwords application icon 740c. FIGS. 7M-7N illustrate alternative embodiments that are provided to describe the different access-privileges for an operation that computer system 700 can provide to a user who has been authenticated via full biometric authentication (e.g., as described above in relation to FIGS. 7A-7D) and a user who has been authenticated via the alternative authentication method (e.g., as described above in relation to FIGS. 7E-7G). In particular, FIG. 7M illustrates an embodiment where the user has been authenticated via full biometric authentication and FIG. 7N illustrates an embodiment where the user has been authenticated via the alternative authentication method (e.g., as described above in relation to FIGS. 7E-7G). At FIG. 7L, computer system 700 detects tap input 750l on delete affordance 740c1 and, as described below, displays the user interface of FIG. 7M or the user interface of FIG. 7N based on the authentication method that was used to unlock computer system 700.

As illustrated in FIG. 7M, in response to detecting tap input 750l, computer system 700 displays menu 746 that includes delete application option 746a, remove-from-home-screen option 746b, and cancel option 746c. At FIG. 7M, computer system 700 displays menu 746 because user 760 has been authenticated via full biometric authentication to unlock computer system 700 (e.g., sometime after computer system 700 is transitioned to the unlocked state, as described above in relation to FIGS. 7A-7D). In some embodiments, in response to receiving tap input 750m on delete application option 746a, computer system 700 uninstalls the passwords application that corresponds to passwords application icon 740c. In some embodiments, computer system 700 uninstalls the passwords application because user 760 has been authenticated via full biometric authentication to unlock computer system 700.

Alternatively, as illustrated in FIG. 7N, computer system 700 displays prompt 748 in response to detecting tap input 750l. Prompt 748 indicates that the user does not have permission to perform the delete operation and/or display menu 746 of FIG. 7M. At FIG. 7N, computer system 700 displays prompt 748 instead of displaying menu 746 because the alternative authentication method was used to unlock computer system 700 (and the user does not have the access-privileges to perform one or more of the operations provided by menu 746). Thus, as compared to FIG. 7M (e.g., full biometric authentication used to unlock computer system 700), computer system 700 provides a user with reduced access-privileges at FIG. 7N because the alternative authentication method was used to unlock computer system 700. In some embodiments, at FIG. 7N, computer system 700 displays a modified version of menu 746 with only the options that the user are allowed to perform (e.g., the operation associated with cancel option 746c) when the alternative authentication method was used to unlock computer system 700. In some embodiments, at FIG. 7N, computer system 700 displays menu 746 but, in response to detecting an input on one of the options on menu 746, does not perform an operation associated with the option on menu 746 (e.g., does not delete the passwords application when an input on delete application option 746a is deleted). In some embodiments, at FIG. 7N, computer system 700 displays menu 746 but, in response to detecting an input on one of the options on menu 746, displays prompt 748 to indicate that the user does not have permission to perform the particular operation. In some embodiments, at FIG. 7N, in response to detecting an input on one of the options on menu 746, computer system 700 initiates a process for completing full biometric authentication to allow the user to perform the operation that is associated with the option on menu 746.

FIG. 7O illustrates an embodiment where computer system 700 provides the same access-privileges for an application, irrespective of the authentication method that was used to unlock computer system 700. Looking back at FIG. 7I, computer system 700 detects tap input 750i3 on browser application icon 740b. As illustrated in FIG. 7O, in response to detecting tap input 750i3, computer system 700 opens a browser application that corresponds to browser application icon 740b and displays a browser user interface 752. At FIG. 7O, computer system 700 opens the browser application and displays browser user interface 752 in response to detecting tap input 750i3, irrespective of the authentication method that was used to unlock computer system 700. Thus, for some applications, computer system 700 can provide the same access-privileges regardless of which authentication method was used to unlock computer system 700 (e.g., as opposed to detecting tap input 750i1 and 750i2, as discussed above in relation to FIGS. 7J-7K). In some embodiments, computer system 700 provides limited access-privileges, such as read-only privileges (e.g., cannot update/delete), basic feature only privileges (e.g., can browse the web, listen to music), no secure information privileges (e.g., no access to financial application and/or payment processing application) when (e.g., or after) the alternative authentication method is used to unlock computer system 700. In some embodiments, the level/type (e.g., read-only, basic feature only) of the limited access-privileges is provided by computer system 700 based on whether a user could be fully authenticated using the alternative authentication method (e.g., voice input being received as the alternative authenticated method that is detected with background noise can cause a reduced set of privileges than voice input being received as the alternative authentication method without background noise, as described below in relation to FIGS. 8A-8D). Thus, in some embodiments, the level/type of the limited access-privileges is provided by computer system 700 based on whether user actions when completing the alternative authentication method satisfy various confidence thresholds (e.g., user action to complete an alternative authentication method satisfying 90% confidence threshold has more reduced access-privileges than user action to complete the alternative authentication method satisfying the 95% confidence threshold).

FIGS. 7P-7S illustrates one or more exemplary user interfaces that are displayed on display 710 of computer system 700. In particular, the one or more exemplary user interfaces of FIGS. 7P-7S are described in relation to an exemplary scenario where user 760 attempts to use biometric authentication (e.g., while wearing a mask) to download an application. One reason why FIGS. 7P-7S are provided to show that secure operation other than unlocking computer system 700 can be performed using the same techniques as described above in relation to FIGS. 7E-7H.

At FIG. 7P, user 760 wishes to download an application (e.g., "Account App") while wearing mask 728 but is unable to do so without authenticating. As illustrated in FIG. 7Q, computer system 700 displays notification 764 to confirm downloading of the application by pressing the side button (e.g., "confirm with side button"). In some embodiments, computer system 700 displays notification 764 in response to detecting an input on get option 762a.

At FIG. 7Q, computer system 700 detects press input 750q on hardware button 702. In response to detecting press input 750q, computer system 700 determines that a request to perform a secure operation (e.g., a request to initiate biometric authentication) has been received because a unlock input, such as press input 750q, has been detected. At FIG. 7Q, because press input 750q was detected and it was determined that the request to perform a secure operation has been received, computer system 700 initiates biometric authentication. After initiating biometric authentication, computer system 700 determines that only upper portion 760a of the face of user 760 is available to be captured by biometric sensor 704. At FIG. 7Q, because the determination was made that that only upper portion 760a of the face of user 760 is available to be captured by biometric sensor 704, computer system 700 determines that biometric authentication using only upper portion 760a is successful because only upper portion 760a that is captured in FIG. 7P matches (or significantly matches) the enrolled portion of biometric feature that corresponds to user 760.

As illustrated in FIG. 7R, successful because only upper portion 760a that is captured in FIG. 7P matches (or significantly matches) the enrolled portion of biometric feature that corresponds to user 760 (e.g., partial biometric authentication is successful), computer system 700 displays prompt 766 and external accessory device 790 displays prompt 796 (e.g., using similar techniques as described above in relation to prompt 734 of FIG. 7G). Prompt 766 and prompt 798 indicate that an alternative authentication method can be used to perform the secure transaction (e.g., "TAP TO AUTHORIZE"). At FIG. 7R, tap input 750r is detected on the display of external accessory device 790.

At FIG. 7S, in response to the detection of tap input 750r, computer system 700 downloads the application (e.g., "Account App") and replaces get option 762a of FIG. 7R with open option 762b of FIG. 7S. In some embodiments, computer system 700 does not authorize downloading an application when only a portion of the biometric feature is available and the alternative authentication method has been completed. In some embodiments, individual settings (or multiple settings for each) are displayed to individually control whether or not computer system 700 will authenticate using only a portion of the biometric feature and the alternative authentication method for an individual secure operation.

FIGS. 7T-7V illustrate one or more exemplary user interfaces that are displayed on display 710 of computer system 700. In particular, the one or more exemplary user interfaces of FIG. 7T-7V are described in relation to an exemplary scenario where user 770 attempts to use biometric authentication (e.g., while wearing a mask) to unlock computer system 700 and an alternative authentication method for authenticating is not provided to the user because full biometric authentication and partial biometric authentication is not successful.

At FIG. 7U, computer system 700 displays notification 714, which indicates that a message from John Appleseed has been received. User 770 (e.g., John) wishes to view the restricted content of notification 714 (e.g., the message from John Appleseed) but is unable to do so, as computer system 700 is currently in a locked state (e.g., as indicated by lock indicator 712a). As illustrated in FIG. 7U, computer system 700 displays a locked state user interface with lock indicator 712a, which provides an indication that computer system 700 is in a locked state. At FIG. 7U, computer system 700 detects upward swipe input 750*u* on user interface object 716 and determines that a request to perform a secure operation (e.g., a request to initiate biometric authentication) has been received because an unlock input, such as an upward swipe input 750*u*, has been detected. At FIG. 7U, in response to detecting upward swipe input 750*u* and determining that the request to perform a secure operation has been received, computer system 700 initiates a biometric authentication process.

At FIG. 7U, as a part of the biometric authentication process, computer system 700 determines that the face of user 770 (e.g., biometric data) that is being captured by biometric sensor 704 does not match an enrolled biometric feature (e.g., full biometric authentication is unsuccessful) and also determines that the portion 770*a* does not match the enrolled portion of the biometric feature (e.g., partial biometric authentication is unsuccessful) (e.g., as indicated by indication 788*c*). Here, biometric data captured via biometric sensor 704 does not match the enrolled biometric feature and the enrolled portion of the biometric feature because computer system 700 does not have an enrolled biometric profile stored for user 770 like it has for user 760.

As illustrated in FIG. 7V, because computer system 700 determined that the biometric data that is being captured by biometric sensor 704 does not match the enrolled biometric feature and the enrolled portion of the biometric feature, computer system 700 remains in the locked state (e.g., is not transitioned to the unlocked state). In addition, computer system 700 and/or external accessory device 790 does not display a prompt indicating that an alternative authentication method can be performed to transition computer system 700 to a locked state because computer system 700 determined that the biometric data that is being captured by biometric sensor 704 does not match the enrolled biometric feature and the enrolled portion of the biometric feature. Notably, although computer system 700 detects a portion of the face of user 770, computer system 700 does not perform the secure operation and does not provide an alternative way to the user to unlock computer system 700 because user 770 is not enrolled and/or the captured biometric data does not sufficiently match a portion of the biometric feature. Moreover, computer system 700 is not configured to perform the secure operation when an alternative authentication method (e.g., tap input on external accessory device 790) is received without a prompt to perform the alternative authentication method is displayed. Thus, in some embodiments, computer system 700 remains in the locked state in response to detecting a tap input on the display of external accessory device 790 (and/or in response to detecting an alternative authentication method).

While FIGS. 7A-7V describe computer system 700 using various authentication techniques to determine whether to unlock computer system 700 and/or confirming an application for downloading (or, in general, downloading a file), the discussion of FIGS. 7A-7V can also be adapted to work with other secure operations that require authentication, such as authorizing the auto-filling of a password/passcode, performance of a transaction (e.g., using one or more components as discussed in FIG. 6), changing system configurations, etc.

FIGS. 8A-8D illustrate exemplary user interfaces for providing authentication at a computer system in accordance with some embodiments. In particular, FIGS. 8A-8D are provided to show an alternative authentication method that can be used in conjunction with and/or in lieu of the alternative authentication methods described above in relation to FIGS. 7E-7H and below in relation to FIGS. 9A-9D, FIGS. 10A-10D, FIGS. 11A-11D, FIGS. 12A-12D, and FIGS. 13A-13F. The alternative authentication method described below in relation to FIGS. 8A-8D can be swapped out and/or included with the alternative authentication method described above in relation to FIGS. 7A-7V (e.g., tap on watch to unlock). The alternative authentication method described in relation to FIGS. 8A-8D involves the detection of voice input (e.g., by computer system 700 and/or an external accessory device, such external accessory device 790) that is used to authenticate the user and cause computer system 700 to be transitioned from the locked state to an unlocked state.

Figure 8A:
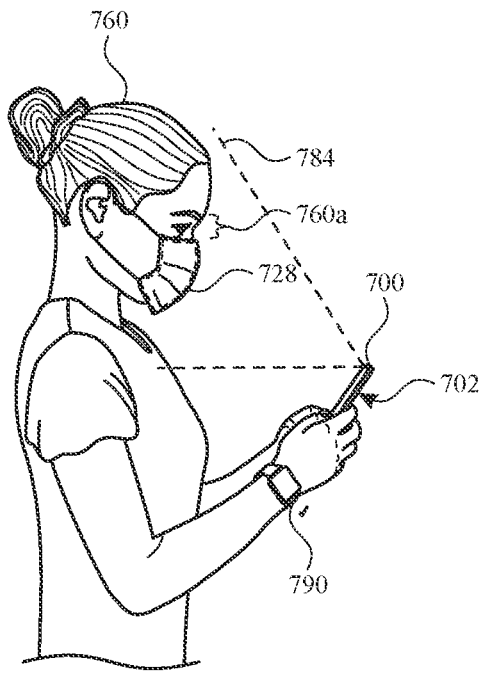
FIGS. 8A-8D illustrate exemplary user interfaces for providing authentication at a computer system in accordance with some embodiments.
Figure 8B:
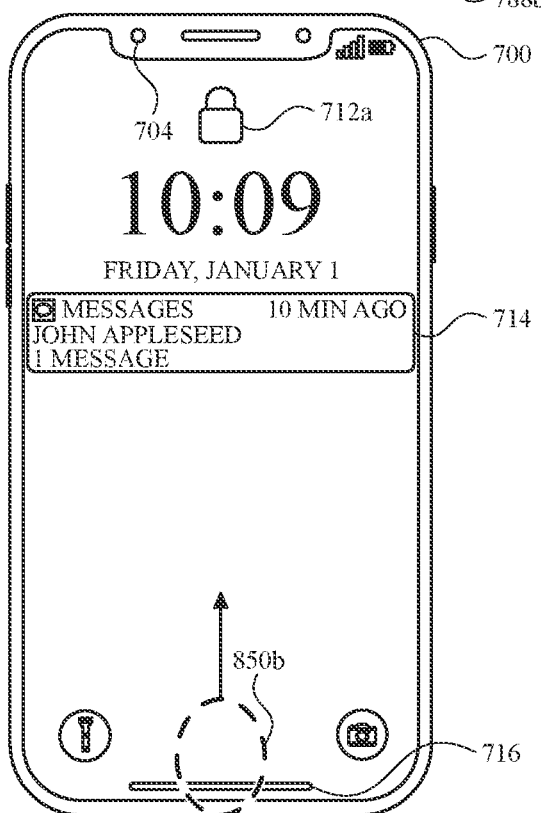

As illustrated in FIG. 8A, user 760 is holding computer system 700 while wearing mask 728 and external accessory device 790. At FIG. 8B, computer system 700 displays notification 714, which indicates that a message from John Appleseed has been received. At FIG. 8B, computer system 700 detects upward swipe input 850*b*. At FIG. 8B, in response to detecting upward swipe input 850*b*, computer system 700 initiates a biometric authentication process. At FIG. 8B, computer system 700 determines that full biometric authentication is unsuccessful and partial biometric authentication is successful (e.g., as indicated by indication 788*b*, "PARTIAL MATCH DETECTED") based on upper portion 760*a* being captured by biometric sensor 704 (e.g., for similar reasons as described above in relation to FIG. 7F).

Figure 8C:
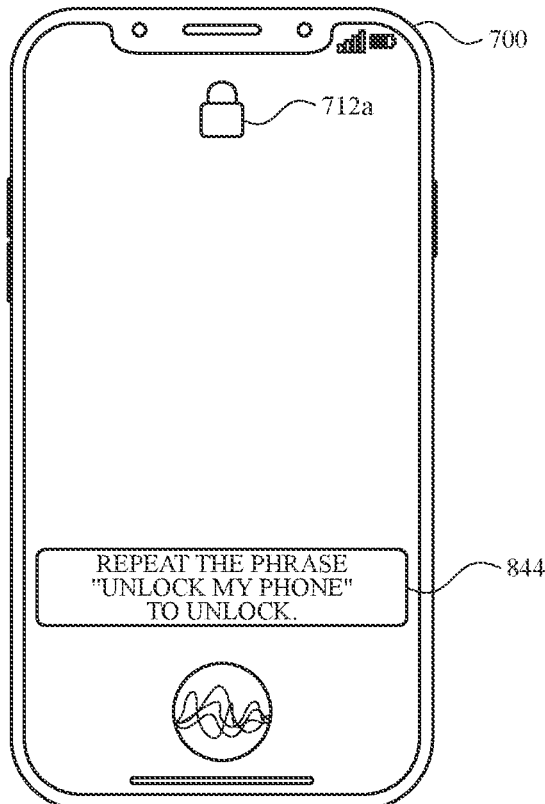

As illustrated in FIG. 8C, because the full biometric authentication is unsuccessful, computer system 700 remains in the locked state (e.g., as indicated by lock indicator 712*a*, for similar reasons as described above in relation to FIG. 7G). As illustrated in FIG. 8C, computer system 700 displays prompt 844 because computer system 700 determined that full biometric authentication is unsuccessful and partial biometric authentication is successful (e.g., for similar reasons as described above in relation to displaying prompt 734 in FIG. 7G). Prompt 844 indicates that an alternative authentication method can be used to perform the secure operation. In particular, prompt 844 indicates that a user will need to provide voice input that includes "UNLOCK MY PHONE" in order to unlock computer system 700. In some embodiments, prompt 844 can be updated to include other phrases to indicate that a user will need to provide additional voice input to unlock computer system 700. In some embodiments, prompt 844 is updated to include a new phrase after voice input is detected that includes the previously displayed phrase and/or voice input that includes the previously displayed phrase is verified. In some embodiments, computer system 700 automatically generates the phrase. In some embodiments, computer system 700 generates the phrase from a group or predefined set of phrases that are associated with a voice profile that corresponds to one or more users (e.g., user 760 and not user 770) of computer system 700. In some embodiments, a prompt that is similar to prompt 844 is displayed on an external accessory device because computer system 700 determined that full biometric authentication is unsuccessful and partial biometric authentication is successful.

Figure 8D:
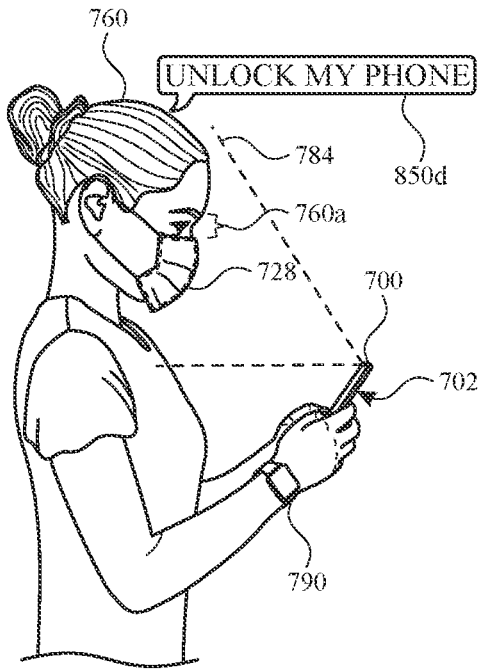

At FIG. 8D, computer system 700 detects voice input 850*d* that includes the phrase "UNLOCK MY PHONE" via one or more microphones of computer system 700. In some embodiments, an external accessory device (e.g., external accessory device 790) detects voice input 850*d*). In some embodiments, upon a determination that the voice input matches (e.g., sufficiently matches within a certain level of confidence (e.g., 80-100%) an enrolled voice profile, computer system 700 is transitioned from the locked state to an unlocked state (e.g., similar to the transition described above in relation to FIG. 7H). In some embodiments, upon a determination that the voice input does not sufficiently match an enrolled voice profile and/or the voice input does not include the required phrase (e.g., phrase indicated by prompt 844), computer system 700 remains in the locked state. In some embodiments, upon a determination that the voice input does not sufficiently match an enrolled voice profile (or any other alternative authentication method fails), computer system 700 provides the opportunity for the user to provide the voice input again (or perform the alternative authentication method again). In some embodiments, computer system 700 requires a determination to be made that full biometric authentication or another form of authentication (e.g., password authentication) is successful before computer system 700 can be unlocked once a predetermined number (e.g., 1-5) of attempts have been made to provide the required voice input (or to authenticate via the alternative authentication method successfully). In some embodiments, upon a determination that the voice input does not sufficiently match an enrolled voice profile (or any other alternative authentication method fails), computer system 700 is transitioned to the unlocked state, and computer system 700 provides a limited set of access-privileges (e.g., as described above in relation to FIGS. 7I-7O).

FIGS. 9A-9D illustrate exemplary user interfaces for providing authentication at a computer system in accordance with some embodiments. In particular, FIGS. 9A-9D are provided to show an alternative authentication method that can be used in conjunction with and/or in lieu of the alternative authentication methods described herein in relation to FIGS. 7E-7H, FIGS. 8A-8D, FIGS. 10A-10D, FIGS. 11A-11D, FIGS. 12A-12D, and FIGS. 13A-13F. The alternative authentication method described below in relation to FIGS. 9A-9D can be swapped out and/or included with the alternative authentication method described above in relation to FIGS. 7A-7V (e.g., tap on watch to unlock). The alternative authentication method described in relation to FIGS. 9A-9D involves the detection of a press input on a hardware component of external accessory device 790.

Figure 9A:
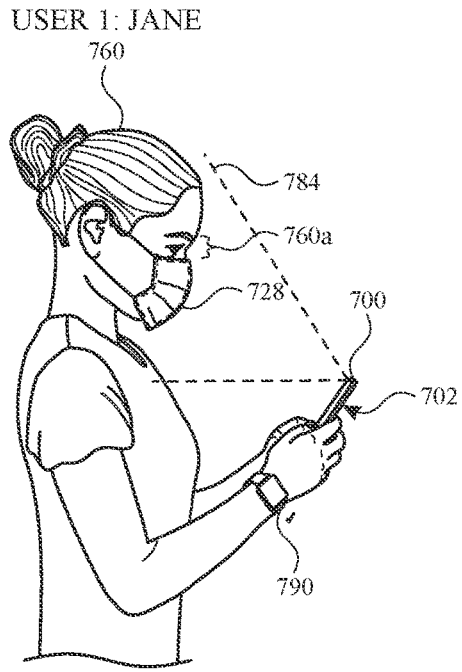
FIGS. 9A-9D illustrate exemplary user interfaces for providing authentication at a computer system in accordance with some embodiments.
Figure 9B:
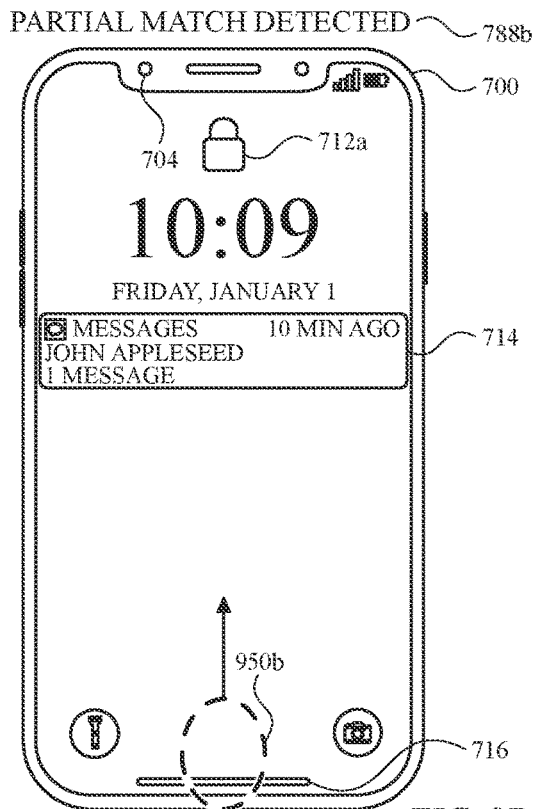

As illustrated in FIG. 9A, user 760 is holding computer system 700 while wearing mask 728 and external accessory device 790. At FIG. 9B, computer system 700 displays notification 714, which indicates that a message from John Appleseed has been received. At FIG. 9B, computer system 700 detects upward swipe input 950b. At FIG. 9B, in response to detecting upward swipe input 950b, computer system 700 initiates a biometric authentication process and determines that full biometric authentication is unsuccessful and partial biometric authentication is successful (e.g., as indicated by indication 788b, "PARTIAL MATCH DETECTED") based on upper portion 760a being captured by biometric sensor 704 (e.g., for similar reasons as described above in relation to FIG. 7F).

Figure 9C:
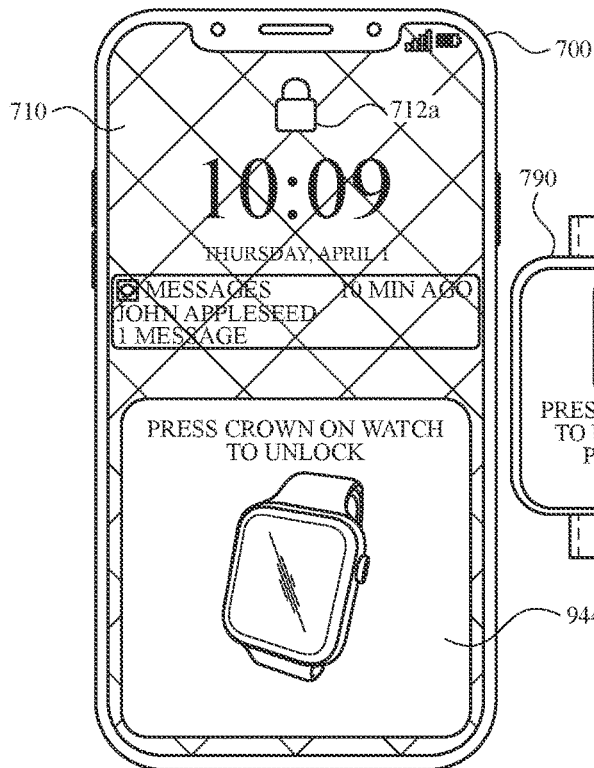
Figure 9D:
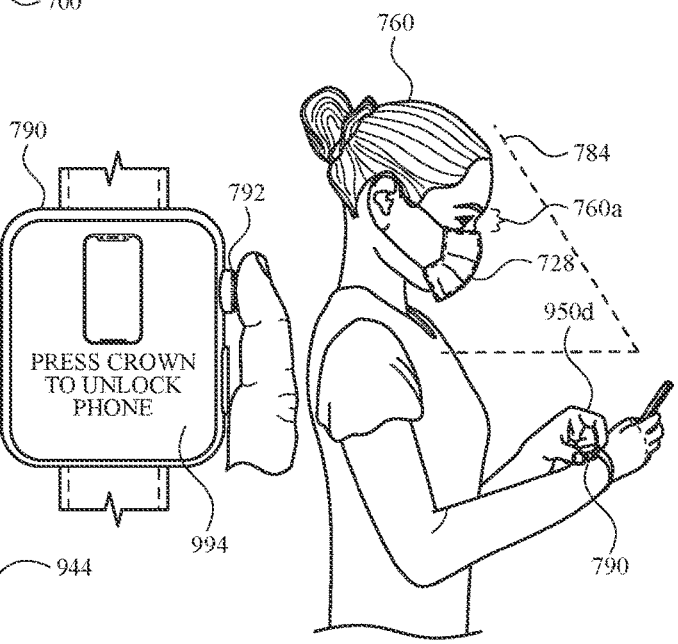

As illustrated in FIG. 9C, because the full biometric authentication is unsuccessful, computer system 700 remains in the locked state (e.g., as indicated by lock indicator 712a, for similar reasons as described above in relation to FIG. 7G). As illustrated in FIG. 9C, computer system 700 displays prompt 944 and external accessory device 790 displays prompt 994 because computer system 700 determined that full biometric authentication is unsuccessful and partial biometric authentication is successful (e.g., for similar reasons as described above in relation to displaying prompt 734 in FIG. 7G). Prompt 944 and prompt 994 indicate that an alternative authentication method can be used to perform the secure operation. In particular, prompt 944 and prompt 994 indicate the crown on external accessory device 790 will need to be pressed before computer system 700 can be unlocked. At FIG. 9D, press input 950d is detected on hardware button 792 (e.g., crown of external accessory device 790). In some embodiments, in response to the detection of press input 950d, computer system 700 is transitioned from the locked state to an unlocked state (e.g., similar to the transition described above in relation to FIG. 7H). In some embodiments, in response to no detection of a press input on hardware button 792, computer system 700 remains in the locked state. While FIGS. 9A-9D describe an alternative authentication method that involves pressing hardware button 792, one or more other alternative authentication methods can require interactions with hardware components of computer system 700 and/or external accessory device 790, such as rotating a hardware component (e.g., hardware button 792), pressing a component element for a predetermined period of time, providing multiple inputs and/or different types of inputs to one or more different hardware components.

FIGS. 10A-10D illustrate exemplary user interfaces for providing authentication at a computer system in accordance with some embodiments. In particular, FIGS. 10A-10D are provided to show an alternative authentication method that can be used in conjunction with and/or in lieu of the alternative authentication methods described herein in relation to FIGS. 7E-7H, FIGS. 8A-8D, FIGS. 9A-9D, FIGS. 11A-11D, FIGS. 12A-12D, and FIGS. 13A-13F. The alternative authentication method described below in relation to FIGS. 10A-10D can be swapped out and/or included with the alternative authentication method described above in relation to FIGS. 7A-7V (e.g., tap on watch to unlock). The alternative authentication method described in relation to FIGS. 10A-10D involves the rotation of external accessory device 790.

Figure 10A:
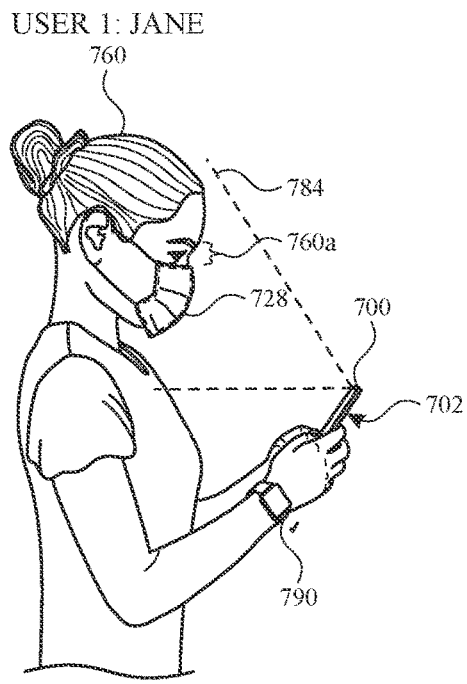
FIGS. 10A-10D illustrate exemplary user interfaces for providing authentication at a computer system in accordance with some embodiments.
Figure 10B:
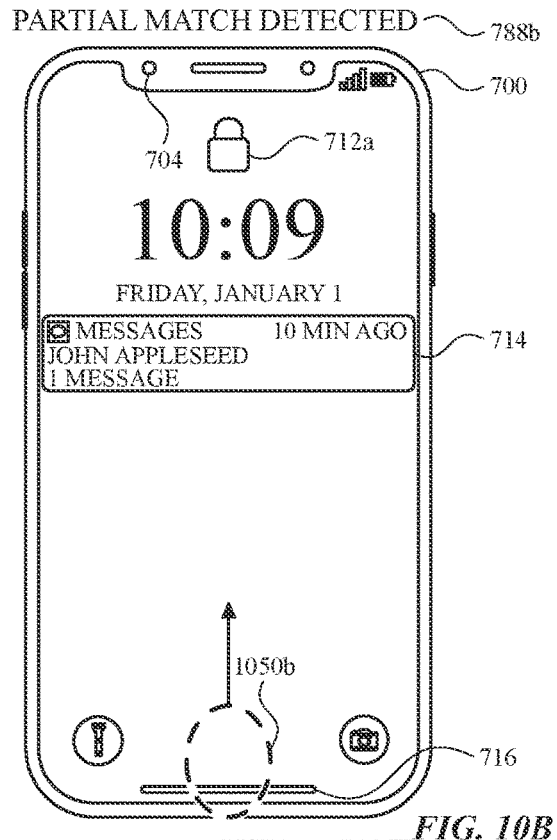

As illustrated in FIG. 10A, user 760 is holding computer system 700 while wearing mask 728 and external accessory device 790. At FIG. 10B, computer system 700 displays notification 714, which indicates that a message from John Appleseed has been received. At FIG. 10B, computer system 700 detects upward swipe input 1050b. At FIG. 10B in response to detecting upward swipe input 1050b, computer system 700 initiates a biometric authentication process and determines that full biometric authentication is unsuccessful and partial biometric authentication is successful (e.g., as indicated by indication 788b, "PARTIAL MATCH DETECTED") based on upper portion 760a being captured by biometric sensor 704 (e.g., for similar reasons as described above in relation to FIG. 7F).

Figure 10C:
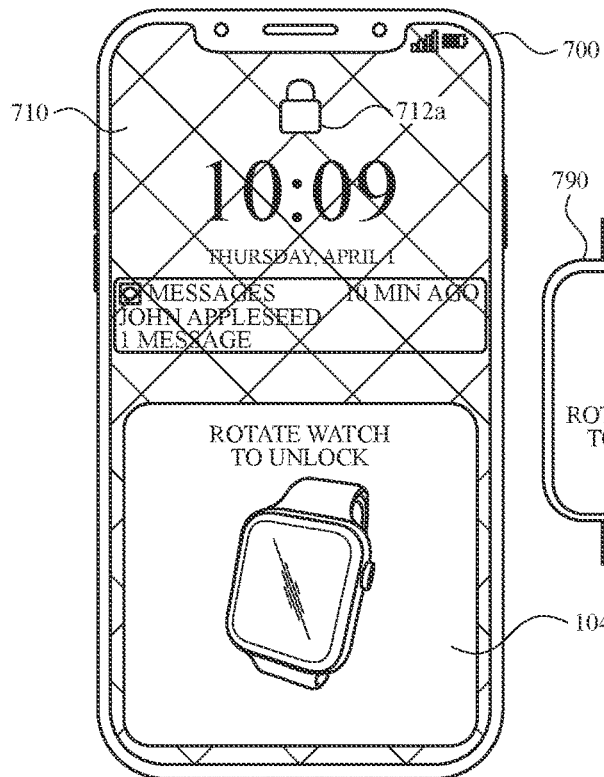
Figure 10D:
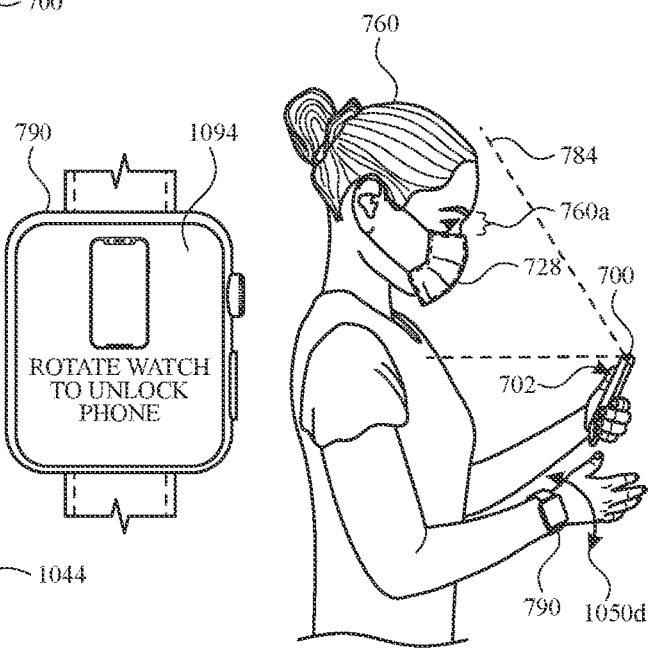

As illustrated in FIG. 10C, because the full biometric authentication is unsuccessful, computer system 700 remains in the locked state (e.g., as indicated by lock indicator 712a, for similar reasons as described above in relation to FIG. 7G). As illustrated in FIG. 10C, computer system 700 displays prompt 1044 and external accessory device 790 displays prompt 1094 because computer system 700 determined that full biometric authentication is unsuccessful and partial biometric authentication is successful (e.g., for similar reasons as described above in relation to displaying prompt 734 in FIG. 7G). Prompt 1044 and prompt 1094 indicate that an alternative authentication method can be used to perform the secure operation. In particular, prompt 1044 and prompt 1094 indicate external accessory device 790 will need to be rotated before computer system 700 can be unlocked. At FIG. 10D, rotation input 1050d is detected and/or external accessory device 790 is determined to have been rotated (e.g., based on data gathered from one or more accelerometers and/or gyroscopes include in external accessory device 790). In some embodiments, in response to the detection of rotation input 1050*d*, computer system 700 is transitioned from the locked state to an unlocked state (e.g., similar to the transition described above in relation to FIG. 7H). In some embodiments, in response to no detection of a rotation input, computer system 700 remains in the locked state. While FIGS. 10A-10D describe an alternative authentication method that involves rotating external accessory device 790, one or more other alternative authentication methods can require moving computer system 700 and/or external accessory device 790 in different ways, such as lifting, dropping, and/or shaking computer system 700 and/or external accessory device 790. In some embodiments, the one or more alternative authentication methods can require moving (e.g., rotating) computer system 700 and/or external accessory device 790 in a certain pattern (e.g., rotate right followed by rotate left) of a set of predefined motions and prompt 1044 and prompt 1094 can be updated after each motion in the set is completed (e.g., to inform a user of the new motion that is required to unlock computer system 700).

FIGS. 11A-11D illustrate exemplary user interfaces for providing authentication at a computer system in accordance with some embodiments. In particular, FIGS. 11A-11D are provided to show an alternative authentication method that can be used in conjunction with and/or in lieu of the alternative authentication methods described herein in relation to FIGS. 7E-7H, FIGS. 8A-8D, FIGS. 9A-9D, FIGS. 10A-10D, FIGS. 12A-12D, and FIGS. 13A-13F. The alternative authentication method described below in relation to FIGS. 11A-11D can be swapped out and/or included with the alternative authentication method described above in relation to FIGS. 7A-7V (e.g., tap on watch to unlock). The alternative authentication method described in relation to FIGS. 11A-11D involves touching (e.g., tapping) computer system 700 with external accessory device 790, or vice versa.

As illustrated in FIG. 11A, user 760 is holding computer system 700 while wearing mask 728 and external accessory device 790. At FIG. 11B, computer system 700 displays notification 714, which indicates that a message from John Appleseed has been received. At FIG. 11B, computer system 700 detects upward swipe input 1150*b*. At FIG. 11B, in response to detecting upward swipe input 1150*b*, computer system 700 initiates a biometric authentication process and determines that full biometric authentication is unsuccessful and partial biometric authentication is successful (e.g., as indicated by indication 788*b*, "PARTIAL MATCH DETECTED") based on upper portion 760*a* being captured by biometric sensor 704 (e.g., for similar reasons as described above in relation to FIG. 7F).

Figure 11D:
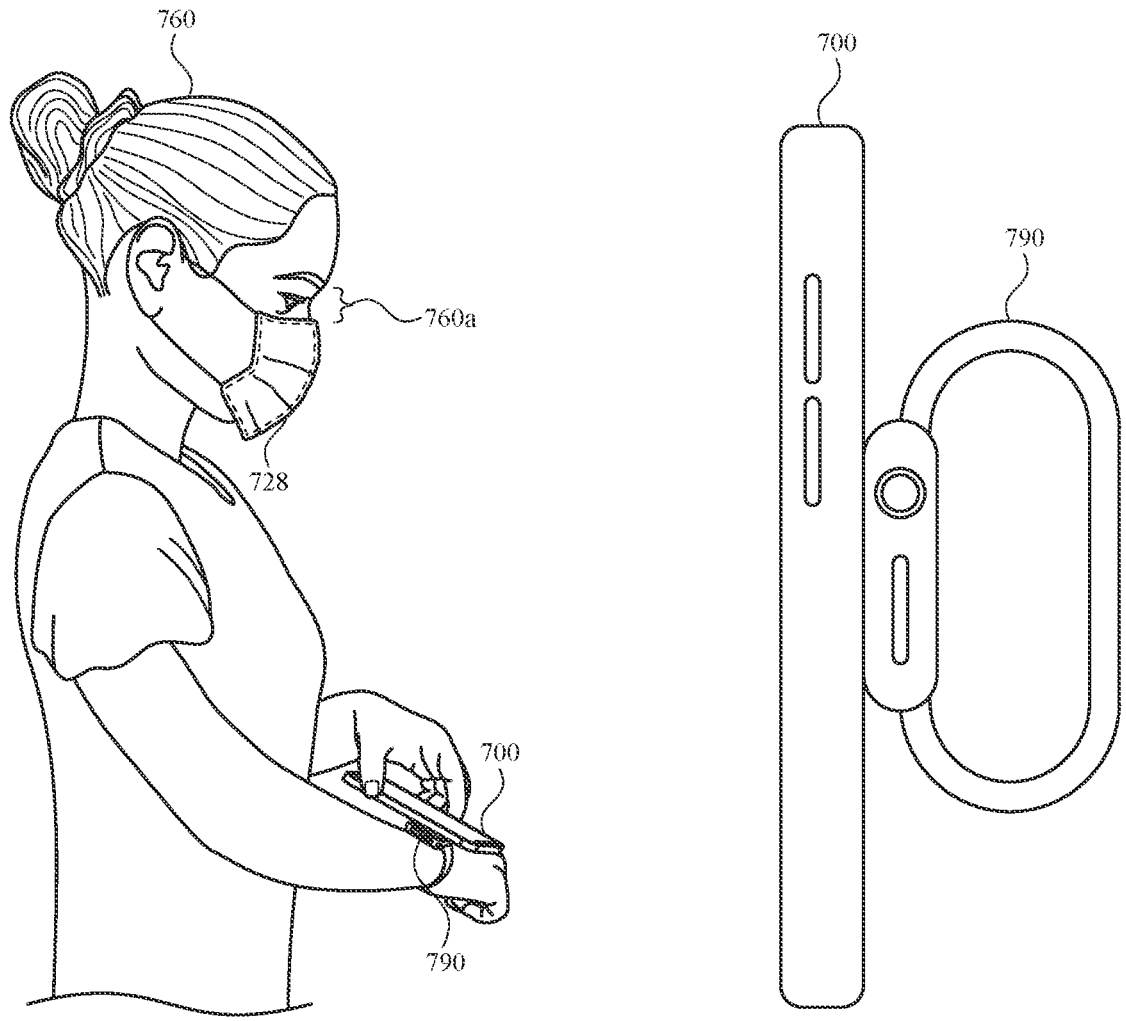

As illustrated in FIG. 11C, because the full biometric authentication is unsuccessful, computer system 700 remains in the locked state (e.g., as indicated by lock indicator 712*a*, for similar reasons as described above in relation to FIG. 7G). As illustrated in FIG. 11C, computer system 700 displays prompt 1144 and external accessory device 790 displays prompt 1194 because computer system 700 determined that full biometric authentication is unsuccessful and partial biometric authentication is successful (e.g., for similar reasons as described above in relation to displaying prompt 734 in FIG. 7G). Prompt 1144 and prompt 1194 indicate that an alternative authentication method can be used to perform the secure operation. In particular, prompt 1144 and prompt 1194 indicates that computer system 700 will need to be tapped with external accessory device 790 before computer system 700 can be unlocked. At FIG. 11D, computer system 700 is forcibly tapped with external accessory device 790 (e.g., or vice-versa) by user 760. In some embodiments, a determination is made that computer system 700 has been tapped by external accessory device 790 based on data gathered from one or more accelerometers and/or gyroscopes include in computer system 700 and/or external accessory device 790. In some embodiments, because the determination is made that computer system 700 has been forcibly tapped with external accessory device 790 (e.g., or vice-versa), computer system 700 is transitioned from the locked state to an unlocked state (e.g., similar to the transition described above in relation to FIG. 7H). In some embodiments, when no determination is made that computer system 700 has been forcibly tapped with external accessory device 790 (e.g., or vice-versa), computer system 700 remains in the locked state. While FIGS. 11A-11D describe an alternative authentication method that involves rotating external accessory device 790, one or more other alternative authentication methods can require tapping the computer system 700 with the external accessory device 790 (e.g., or vice-require) in other ways, such as requiring that the respective devices be tapped a predetermined number of times, requiring that the respective devices be tapped with vary levels of intensities (e.g., hard tap followed by a softer tap).

FIGS. 12A-12D illustrate exemplary user interfaces for providing authentication at a computer system in accordance with some embodiments. In particular, FIGS. 12A-12D are provided to show an alternative authentication method that can be used in conjunction with and/or in lieu of the alternative authentication methods described herein in relation to FIGS. 7E-7H, FIGS. 8A-8D, FIGS. 9A-9D, FIGS. 10A-10D, FIGS. 11A-11D, and FIGS. 13A-13F. The alternative authentication method described below in relation to FIGS. 12A-12D can be swapped out and/or included with the alternative authentication method described above in relation to FIGS. 7A-7V (e.g., tap on watch to unlock). The alternative authentication method described in relation to FIGS. 12A-12D involves squeezing earbud 1200 (e.g., an external accessory device). While FIGS. 12A-12D involves squeezing earbud 1200, it should be understood that other external accessory devices (e.g., external accessory device 790) can also be squeezed as an alternative authentication method.

Figure 12A:
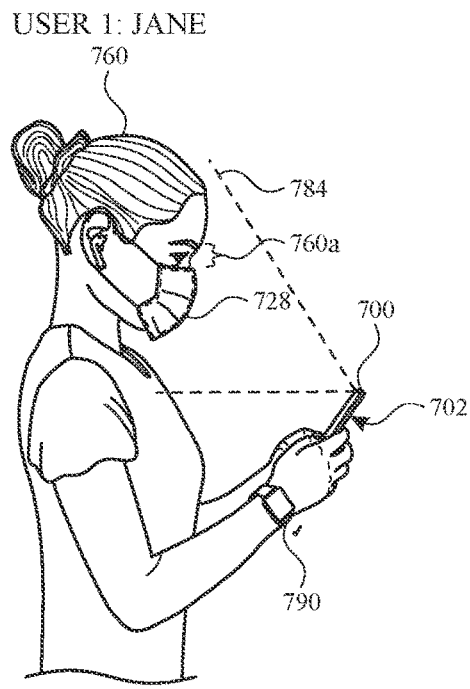
FIGS. 12A-12D illustrate exemplary user interfaces for providing authentication at a computer system in accordance with some embodiments.
Figure 12B:
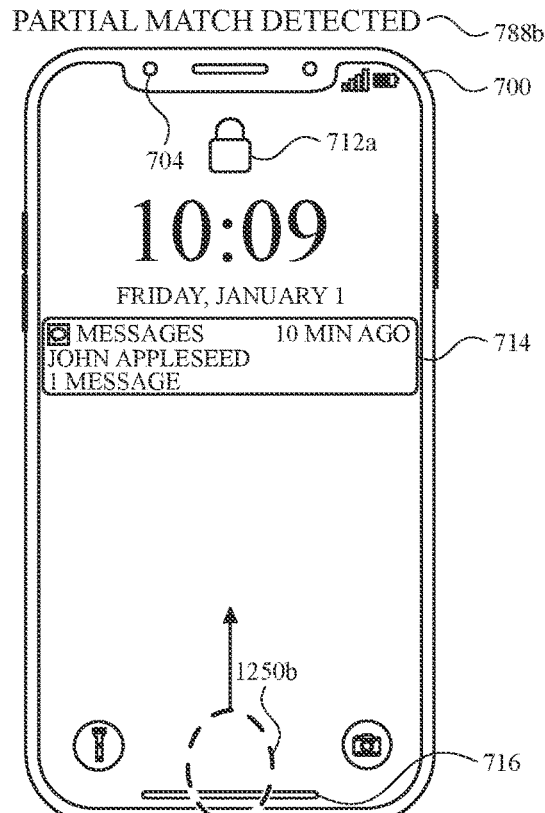

As illustrated in FIG. 12A, user 760 is holding computer system 700 while wearing mask 728, external accessory device 790, and earbud 1200. At FIG. 12B, computer system 700 displays notification 714, which indicates that a message from John Appleseed has been received. At FIG. 12B, computer system 700 detects upward swipe input 1250*b*. At FIG. 12B, in response to detecting upward swipe input 1250*b*, computer system 700 initiates a biometric authentication process and determines that full biometric authentication is unsuccessful and partial biometric authentication is successful (e.g., as indicated by indication 788*b*, "PARTIAL MATCH DETECTED") based on upper portion 760*a* being captured by biometric sensor 704 (e.g., for similar reasons as described above in relation to FIG. 7F).

Figure 12C:
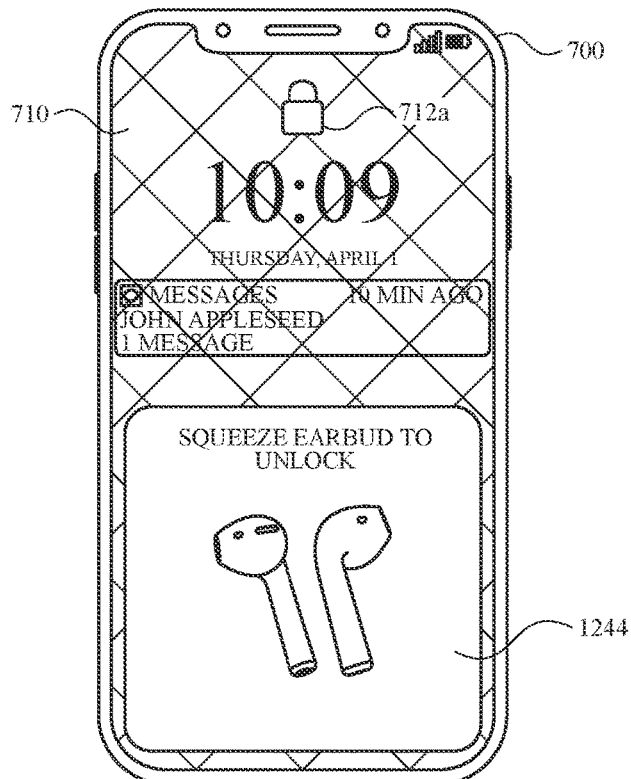

As illustrated in FIG. 12C, because the full biometric authentication is unsuccessful, computer system 700 remains in the locked state (e.g., as indicated by lock indicator 712*a*, for similar reasons as described above in relation to FIG. 7G). As illustrated in FIG. 12C, computer system 700 displays prompt 1244 because computer system 700 determined that full biometric authentication is unsuccessful and partial biometric authentication is successful (e.g., for similar reasons as described above in relation to displaying prompt 734 in FIG. 7G). Prompt 1244 indicates that an alternative method can be used to perform the secure operation. In particular, prompt 1244 indicates that earbud 1200 will need to be squeezed before computer system 700 can be unlocked. In some embodiments, earbud 1200 outputs an audible prompt that indicates that an alternative method can be used to perform the secure operation (e.g., that earbud 1200 will need to be squeezed before computer system 700 can be unlocked).

Figure 12D:
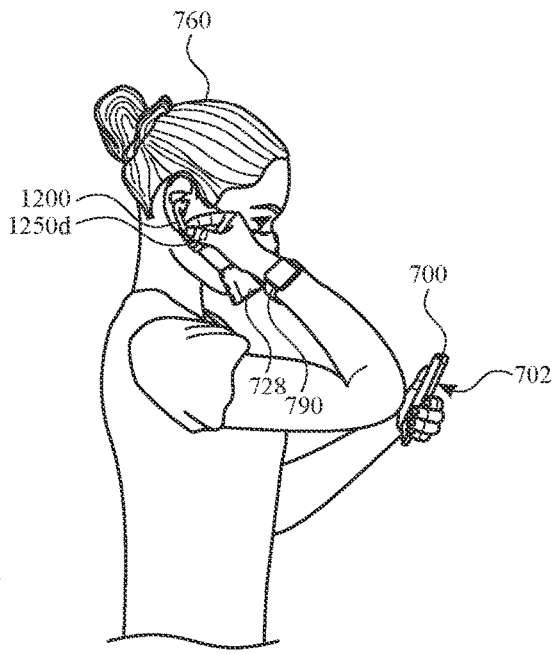

At FIG. 12D, squeeze input 1250d is detected on earbud 1200. In some embodiments, in response to the detection of squeeze input 1250d, computer system 700 is transitioned from the locked state to an unlocked state (e.g., similar to the transition described above in relation to FIG. 7H). In some embodiments, when no squeeze input is detected, computer system 700 remains in the locked state. While FIGS. 12A-12D describe an alternative authentication method that involves squeezing earbud 1200, one or more other alternative authentication methods can require interacting with external accessory devices in other ways, such as requiring a particular earbud to be squeezed (e.g., right earbud, left earbud) a particular amount of times (1-5 times) and/or for a predetermined amount of time (5-30 seconds), requiring a set of external accessory devices to be squeezed in a certain sequence (e.g., squeeze right earbud, squeeze left earbud).

FIGS. 13A-13F illustrate exemplary user interfaces for providing authentication at a computer system in accordance with some embodiments. In particular, FIGS. 13A-13F are provided to show an alternative authentication method that can be used in conjunction with and/or in lieu of the alternative authentication methods described herein in relation to FIGS. 7E-7H, FIGS. 8A-8D, FIGS. 9A-9D, FIGS. 10A-10D, FIGS. 11A-11D, and FIGS. 12A-12D. The alternative authentication method described below in relation to FIGS. 13A-13F can be swapped out and/or included with the alternative authentication method described above in relation to FIGS. 7A-7V (e.g., tap on watch to unlock). The alternative authentication method described in relation to FIGS. 13A-13F involves satisfying multiple authentication criteria (e.g., a confirmation input, following by a near-field communication input).

Figure 13A:
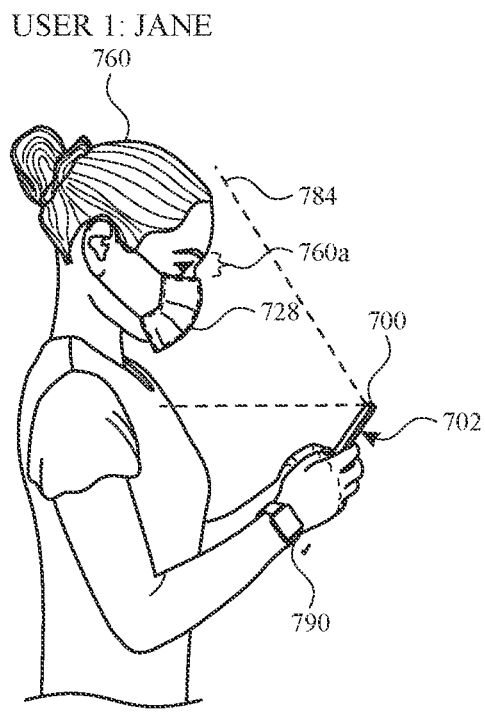
FIGS. 13A-13F illustrate exemplary user interfaces for providing authentication at a computer system in accordance with some embodiments.
Figure 13B:
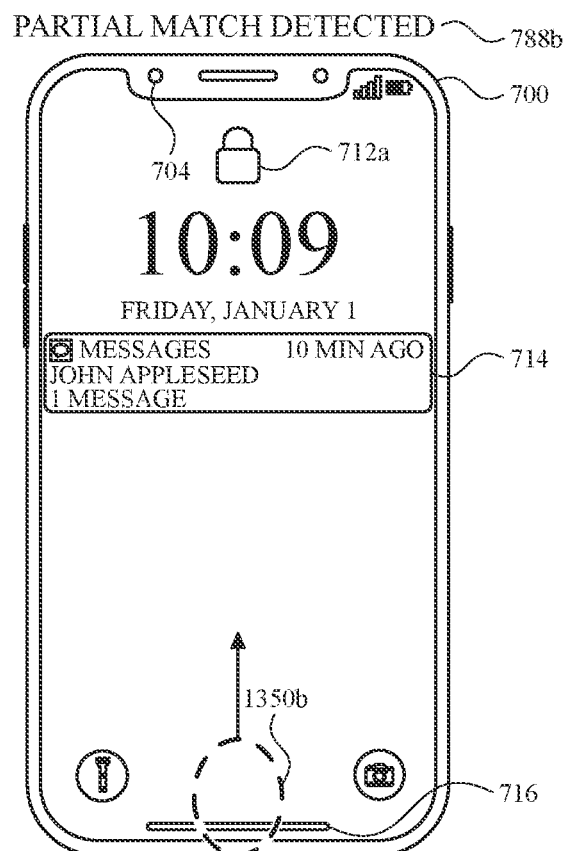

As illustrated in FIG. 13A, user 760 is holding computer system 700 while wearing mask 728 and external accessory device 790. At FIG. 13B, computer system 700 displays notification 714, which indicates that a message from John Appleseed has been received. At FIG. 13B, computer system 700 detects upward swipe input 1350b. At FIG. 13B, in response to detecting upward swipe input 1350b, computer system 700 initiates a biometric authentication process and determines that full biometric authentication is unsuccessful and partial biometric authentication is successful (e.g., as indicated by indication 788b, "PARTIAL MATCH DETECTED") based on upper portion 760a being captured by biometric sensor 704 (e.g., for similar reasons as described above in relation to FIG. 7F).

Figure 13C:
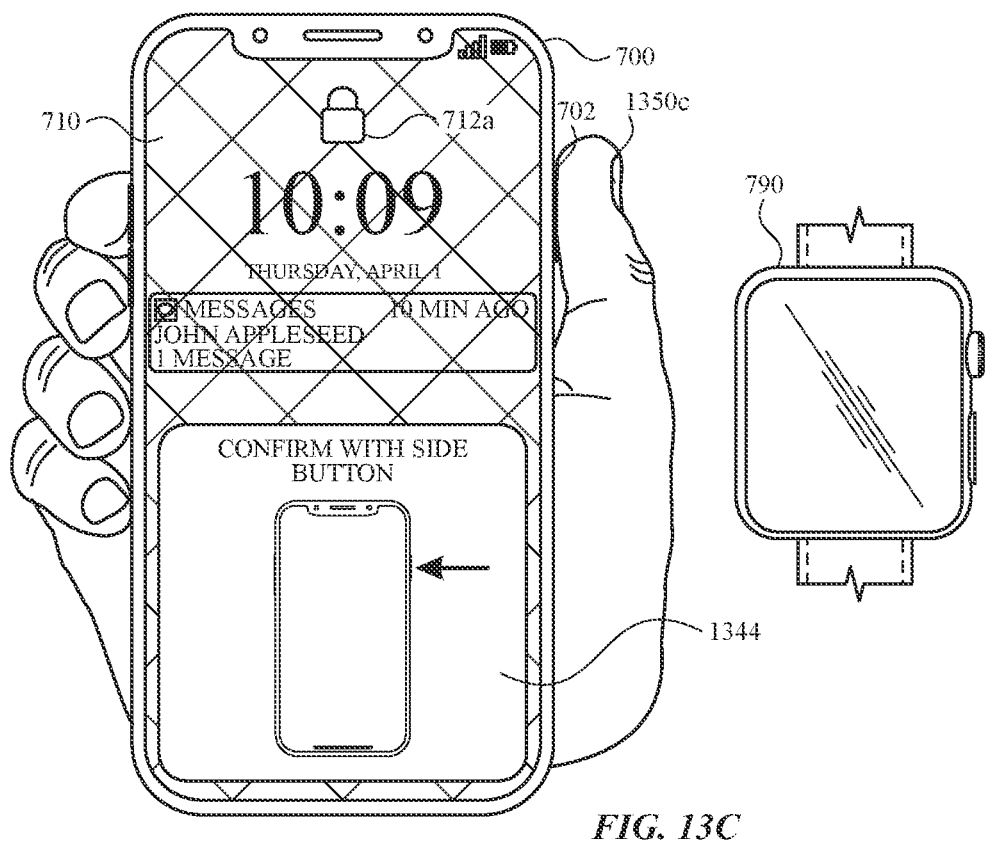

As illustrated in FIG. 13C, because the full biometric authentication is unsuccessful, computer system 700 remains in the locked state (e.g., as indicated by lock indicator 712a, for similar reasons as described above in relation to FIG. 7G). As illustrated in FIG. 13C, computer system 700 displays prompt 1344 because computer system 700 determined that full biometric authentication is unsuccessful and partial biometric authentication is successful (e.g., for similar reasons as described above in relation to displaying prompt 734 in FIG. 7G). Prompt 1344 indicates that an alternative method can be used to perform the secure operation. In particular, prompt 1344 indicates that hardware button 702 will need to be pressed before computer system 700 can be unlocked (e.g., "CONFIRM WITH SIDE BUTTON"). At FIG. 13C, computer system 700 detects press input 1350c.

Figure 13D:
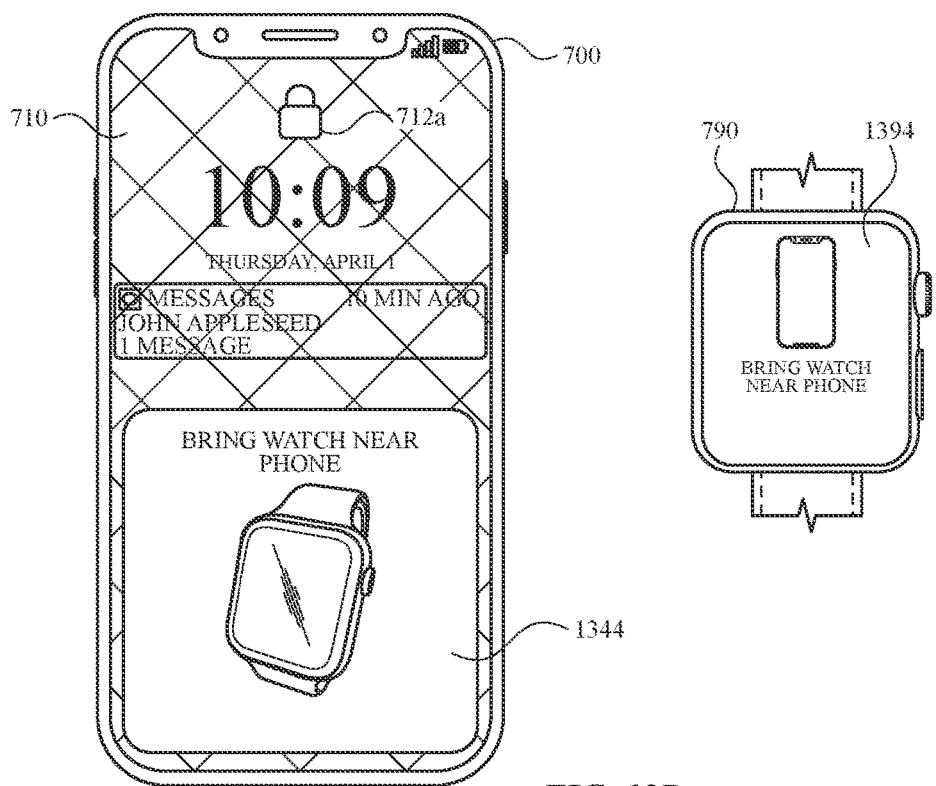
Figure 13E:
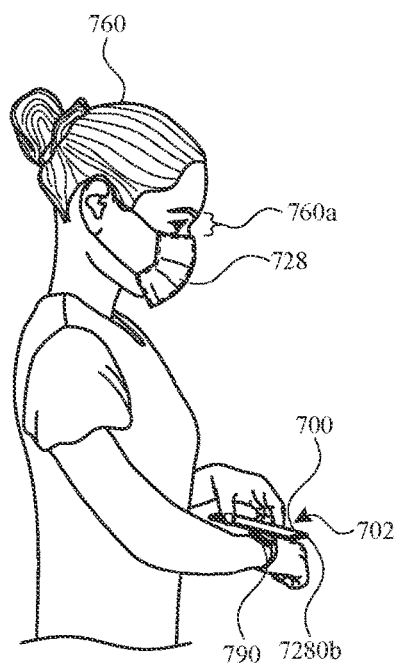
Figure 13F:
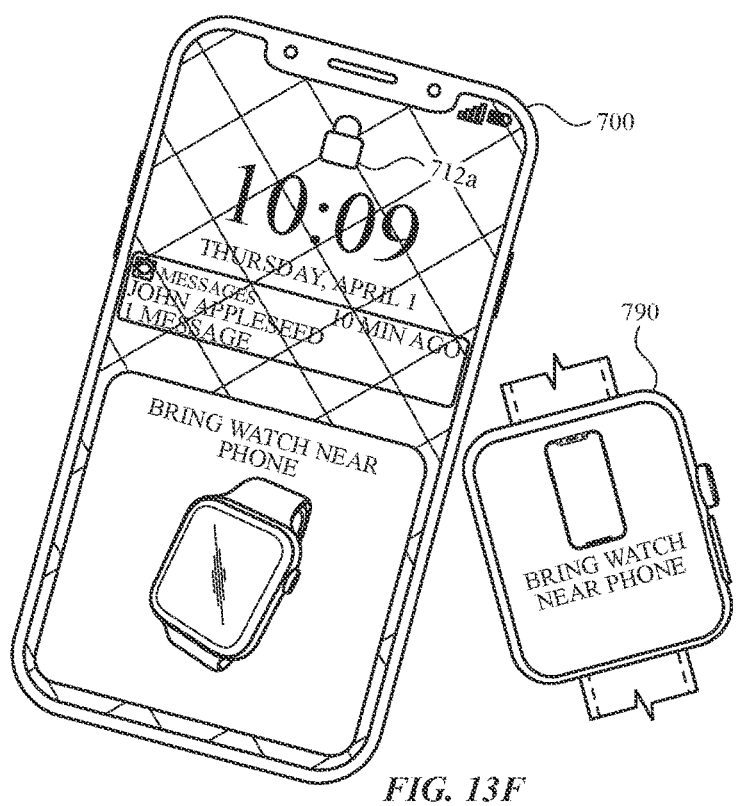

As illustrated in FIG. 13D, in response to detecting press input 1350c, computer system 700 updates prompt 1344 to indicate that computer system 700 needs to be brought near external accessory device 790. In addition, external accessory device 790 displays prompt 1344, which provides a similar indication as prompt 1394. As illustrated in FIGS. 13E-13F, user 760 positions computer system 700 and external accessory device 790 closer together. At FIG. 13E-13F, computer system 700 and external accessory device 790 communicate using a near-field communication (NFC) protocol. In some embodiment, when it is determined that computer system 700 and external accessory device 790 have communicated via the NFC protocol successfully, computer system 700 is transitioned to the unlocked state. In some embodiments, as a part of determining that computer system 700 and external accessory device 790 have communicated via the NFC protocol successfully, a determination is made that computer system 700 and external accessory device 790 have communicated and passed certain verification parameters (such as verifying that computer system 700 and external accessory device 790 are both associated with user 760 and/or the same set of users). In some embodiments, when it is determined that computer system 700 and external accessory device 790 have not communicated via the NFC protocol successfully, computer system 700 remains in the locked state.

FIGS. 14A-14B are a flow diagram illustrating a method for providing authentication at a computer system in accordance with some embodiments. Method 1400 is performed at a computer system (e.g., 100, 300, 500, 700) (e.g., a smartphone, a tablet) that is in communication with (e.g., wirelessly or by wire; integrates or includes) one or more biometric sensors (e.g., 704) (e.g., a fingerprint sensor, a facial recognition sensor (e.g., one or more depth sensors; one or more cameras (e.g., dual cameras, triple camera, quad cameras, etc.)) on the same side or different sides of the computer system (e.g., a front camera, a back camera)), an iris scanner) (e.g., is hidden or concealed), one or more input devices (e.g., 710, 702) (e.g., a touch-sensitive surface, an accelerometer, a hardware button), and an external accessory device (e.g., 790) (e.g., an external peripheral device) (e.g., a computer system (e.g., a wearable device ((e.g., a smartwatch, headphones, glasses)), a device that is external to (e.g., not physically linked to or connected to) the computer system, a device that is in communication with the computer system via a communication channel, a device with a display generation component and one or more input devices). Some operations in method 1400 are, optionally, combined, the orders of some operations are, optionally, changed, and some operations are, optionally, omitted.

As described below, method 1400 provides an intuitive way for providing authentication at a computer system. The method reduces the cognitive burden on a user for providing authentication at a computer system, thereby creating a more efficient human-machine interface. For battery-operated computing devices, enabling a user to provide authentication at a computer system faster and more efficiently conserves power and increases the time between battery charges.

The computer system (e.g., 700) receives (1402), via the one or more input devices (e.g., 702, 710), a request (e.g., 750b, 750f, 750u, 850b, 950b, 1050b, 1150b, 1250b, 1350b) to unlock the computer system (and/or receiving a request to perform a secure operation with the computer system (e.g., unlocking the computer system)) while the computer system is in a locked state (e.g., as indicated by 712a) (e.g., a state where the computer system is locked and/or a state where one or more functions of the computer system are not available without providing authentication). In some embodiments, the request (e.g., as described above in relation to FIGS. 7P-7S) is a request to authorize a payment with the computer system, download an application, authorize use of a secure credential with the computer system, access a restricted application or restricted information with the computer system, and/or auto-fill information with the computer system.

In response to (1404) receiving the request (e.g., 750b, 750f, 750u, 850b, 950b, 1050b, 1150b, 1250b, 1350b) to unlock the computer system (e.g., 700) (and/or, in some embodiments, in response to the request to perform a secure operation (e.g., unlock operation, content viewing operation, secure payment operation, a secure operation that are available to be performed when the first setting is enabled)): in accordance with a determination that a first set of biometric identification criteria is satisfied (e.g., as described above in relation to FIGS. 7A-7D) (e.g., a set of criteria that is satisfied when the first portion of biometric feature is available to be captured and the biometric data (e.g., that includes data corresponding to the first portion of the biometric feature) satisfies a set of biometric authentication criteria (e.g., a set of criteria that includes a criterion that is satisfied when the biometric data that includes a first portion (e.g., 760b) of biometric feature and a second portion (e.g., 760a) of biometric feature sufficiently matches an authorized biometric profile)), wherein the first set of biometric identification criteria is satisfied when a detected biometric feature (e.g., 760a, 760b) detected in conjunction with (e.g., in response to, detected with a predetermined time (e.g., 1-10 seconds) before/after the request is received) the request to unlock the computer system is consistent with (e.g., is determined to match and/or is determined to sufficiently match (e.g., within a confidence threshold level of 90-100%)) an enrolled biometric feature, the computer system (e.g., 700) transitions (1406) the computer system (e.g., 700) from the locked state (e.g., as indicated by 712a) to an unlocked state (e.g., as indicated by 712b) (e.g., without outputting a prompt that indicates that one or more interactions with the external accessory device can be used to unlock the computer system) (e.g., as described above in relation to FIGS. 7A-7D); and in accordance with a determination that a second set of biometric identification criteria is satisfied (e.g., a set of criteria that is satisfied when a first portion (e.g., 760b) of a biometric feature is not available to be captured and the biometric data (e.g., that does not include data corresponding to the first portion of the biometric feature) satisfies a set of biometric authentication criteria (e.g., a set of criteria that includes a criterion that is satisfied when the biometric data that includes data corresponding to a second portion (e.g., 760a) of biometric feature but does not include data corresponding to the first portion (e.g., 760b) of the biometric data that matches (e.g., sufficiently matches (e.g., within a certain confidence threshold (e.g., above 90%) an authorized biometric profile)) without satisfying the first set of biometric identification criteria (e.g., as described above in relation to FIGS. 7E-7H, FIGS. 8A-8D, FIGS. 9A-9D, FIGS. 10A-10D, FIGS. 11A-11D, FIGS. 12A-12D, FIGS. 13A-13F), wherein the second set of biometric identification criteria is satisfied when the detected biometric feature detected in conjunction with (e.g., in response to, detected with a predetermined time (e.g., 1-10 seconds) before/after the request is received) the request (e.g., 750b, 750f, 750u, 850b, 950b, 1050b, 1150b, 1250b, 1350b) to unlock the computer system (e.g., 700) is partially consistent (e.g., at least a portion of the detected biometric feature is determined to match and/or is determined to sufficiently match (e.g., within a confidence threshold level of 90-100%)) with an enrolled biometric feature, the computer system causes (1408) an output (e.g., the computer system and/or another computer system to output) of a prompt (e.g., 734, 744, 748, 766, 796, 844, 944, 1044, 1094, 1144, 1194, 1244, 1344, 1394) (e.g., a visual, haptic, audio prompt) that indicates that one or more interactions (e.g., further interaction) with the external accessory device can be used (and, in some embodiments, are required) to unlock the computer system (e.g., to perform the secure operation). In some embodiments, in response to receiving the request to unlock the computer system and in accordance with a determination that a set of partial biometric identification criteria are satisfied (e.g., as described above in relation to FIGS. 7E-7H, FIGS. 8A-8D, FIGS. 9A-9D, FIGS. 10A-10D, FIGS. 11A-11D, FIGS. 12A-12D, FIGS. 13A-13F), the computer system is maintained in the locked state (e.g., as described above in relation to FIGS. 7E-7H, FIGS. 7P-7S, FIGS. 8A-8D, FIGS. 9A-9D, FIGS. 10A-10D, FIGS. 11A-11D, FIGS. 12A-12D, FIGS. 13A-13F).

After causing (1410) the output of the prompt (e.g., 734, 744, 748, 766, 796, 844, 944, 1044, 1094, 1144, 1194, 1244, 1344, 1394) (and while the computer is in the locked state and the second set of biometric identification criteria are satisfied without satisfying the first set of biometric identification criteria): in accordance with a determination that the one or more interactions (e.g., a tapping on the external accessory device, pressing a button on the external accessory device, moving/rotating the external accessory device, one or more interactions that satisfy a set of unlocking interaction criteria) (e.g., a physical interaction (e.g., on the external accessory device)) (e.g., an interaction that does not cause the accessory device to match data (e.g., data corresponding to a passcode, password, biometric data) received via the interaction to match authorized data (e.g., data corresponding to a passcode, password, biometric data) that was set up previously using the external accessory device) with the external accessory device have been detected (e.g., detected within a predetermined time), the computer system (e.g., 700) transitions (1412) the computer system (e.g., 700) from the locked state to the unlocked state (and/or, in some embodiments, when the request is a request to authorize a payment with the computer system, authorize use of a secure credential with the computer system, access a restricted application or restricted information with the computer system, and/or auto-fill information with the computer system, performing the respective requested operation) (e.g., as described above in relation to FIGS. 7E-7H, FIGS. 7P-7S, FIGS. 8A-8D, FIGS. 9A-9D, FIGS. 10A-10D, FIGS. 11A-11D, FIGS. 12A-12D, FIGS. 13A-13F); and in accordance with a determination that the one or more interactions with the external accessory device (e.g., 790) have not been detected (e.g., within the predetermined time), the computer system maintains (1414) the computer system in the locked state (and/or, in some embodiments, when the request is a request to authorize a payment with the computer system, authorize use of a secure credential with the computer system, access a restricted application or restricted information with the computer system, and/or auto-fill information with the computer system, forgoing performing the respective requested operation) (e.g., as described above in relation to FIGS. 7E-7H, FIGS. 7P-7S, FIGS. 8A-8D, FIGS. 9A-9D, FIGS. 10A-10D, FIGS. 11A-11D, FIGS. 12A-12D, FIGS.

13A-13F). Choosing whether or not to transition the computer system from the locked state to the unlocked state based on whether one or more interactions with the external accessory device have been detected (e.g., after a determination is made that a second set of biometric identification criteria is satisfied without satisfying a first set of biometric identification criteria) allows the computer system to limit unauthorized performance of unlocking the computer system while providing an additional way to authorize the unlocking of the computer system and improves security because the user is more likely to keep the security features enabled if they are less disruptive to use of the computer system. Providing improved security reduces the unauthorized performance of secure operations which, additionally, reduces power usage and improves battery life of the computer system by enabling the user to use the computer system more securely and efficiently. Causing an output of a prompt indicating that one or more interactions with the external accessory device can be used to unlock the computer system provides the user with feedback about the current state of the authentication process and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, after transitioning the computer system (e.g., 700) from the locked state to the unlocked state, the computer system (e.g., 700) receives, via the one or more input devices, a request (e.g., 750*b*, 750*f*, 750*u*, 850*b*, 950*b*, 1050*b*, 1150*b*, 1250*b*, 1350*b*) to perform a secure operation (e.g., other than unlocking the computer system, the request is a request to authorize a payment with the computer system, authorize use of a secure credential with the computer system, access a restricted application or restricted information with the computer system, and/or auto-fill information with the computer system). In some embodiments, in response to receiving the request to perform the secure operation (e.g., 750*b*, 750*f*, 750*u*, 850*b*, 950*b*, 1050*b*, 1150*b*, 1250*b*, 1350*b*): in accordance with a determination that the first set of biometric identification criteria is satisfied, the computer system (e.g., 700) performs the secure operation (e.g., initiating the performance of the secure operation) (e.g., as described above in relation to FIGS. 7E-7H, FIGS. 7P-7S, FIGS. 8A-8D, FIGS. 9A-9D, FIGS. 10A-10D, FIGS. 11A-11D, FIGS. 12A-12D, FIGS. 13A-13F); and in accordance with a determination that the second set of biometric identification criteria are satisfied without satisfying the first set of biometric identification criteria, the computer system (e.g., 700) causes a second output of a second prompt (e.g., 734, 744, 748, 766, 796, 844, 944, 1044, 1094, 1144, 1194, 1244, 1344, 1394) that indicates that a second one or more interactions with the external accessory device can be used to perform the secure operation; and after causing the second output of the second prompt (e.g., 734, 744, 748, 766, 796, 844, 944, 1044, 1094, 1144, 1194, 1244, 1344, 1394) (and while the has not performed the secure operation and the second set of biometric identification criteria are satisfied without satisfying the first set of biometric identification criteria): in accordance with a determination that the second one or more interactions with the external accessory device has been detected, the computer system (e.g., 700) performs the secure operation (e.g., as described above in relation to FIGS. 7E-7H, FIGS. 7P-7S, FIGS. 8A-8D, FIGS. 9A-9D, FIGS. 10A-10D, FIGS. 11A-11D, FIGS. 12A-12D, FIGS. 13A-13F); and in accordance with a determination that the second one or more interactions with the external accessory device (e.g., 790) have not been detected, the computer system (e.g., 700) forgoes performing the secure operation (e.g., as described above in relation to FIGS. 7E-7H, FIGS. 7P-7S, FIGS. 8A-8D, FIGS. 9A-9D, FIGS. 10A-10D, FIGS. 11A-11D, FIGS. 12A-12D, FIGS. 13A-13F). In some embodiments, the second prompt is different from (or the same as) the prompt. In some embodiments, the second one or more interactions are different (or the same as) the one or more interactions. Choosing whether or not to perform a secure operation based on whether one or more interactions with the external accessory device have been detected (e.g., after a determination is made that a second set of biometric identification criteria is satisfied without satisfying a first set of biometric identification criteria) allows the computer system to limit unauthorized performance of the secure operation while providing an additional way to authorize the performance of the secure operation and improves security because the user is more likely to keep the security features enabled if they are less disruptive to use of the computer system. Providing improved security reduces the unauthorized performance of secure operations which, additionally, reduces power usage and improves battery life of the computer system by enabling the user to use the computer system more securely and efficiently. Causing a second output of a second prompt indicating that one or more interactions with the external accessory device can be used to perform a secure operation provides the user with feedback about the current state of the authentication process and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, the second set of biometric identification criteria includes a criterion that is satisfied when a gaze of a user (e.g., 790) directed toward a predetermined portion of the computer system (e.g., 700) (e.g., the display, a particular portion (e.g., an upper portion) of the user interface, etc.) has been detected (e.g., as described above in relation to FIGS. 7E-7H) (e.g., via the one or more biometric sensors (e.g., one or more cameras)) (e.g., for a predetermined period of time (e.g., 1-3 seconds)) (e.g., after the request to unlock the computer system was received) (e.g., a gaze of a user looking in the direction of the computer system). In some embodiments, in response to receiving the request to unlock the computer, the computer system detects the gaze of the user (and a determination is made as to whether the gaze of the user has been detected and/or captured for a predetermined period of time). In some embodiments, the second set of biometric identification criteria is not satisfied when a gaze of a user is detected to be looking away from the computer system for a predetermined period of time. In some embodiments, the second set of biometric identification criteria is satisfied when a gaze of a user is detected (or determined) to be looking at the computer system for a predetermined period of time. Causing the output of the prompt indicating that one or more interactions with the external accessory device can be used to unlock the computer system when the gaze of a user has been detected for a predetermined time automatically limits the display of the prompt, so relevant information is surface when a determination is made that the user is intended to complete biometric identification, which provides improved security. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, the computer system (e.g., 700) is in communication with a first output device (e.g., 710) (e.g., a display generation component (e.g., a display generation component (e.g., a display, a touch-sensitive display) of the computer system), a speaker, one or more haptic output devices). In some embodiments, causing the output of the prompt (e.g., 734, 744, 748, 766, 796, 844, 944, 1044, 1094, 1144, 1194, 1244, 1344, 1394) (e.g., an audio, haptic, and/or visual prompt) includes outputting the prompt via the first output device (e.g., 710). In some embodiments, as a part of outputting the prompt (e.g., 734, 744, 748, 766, 796, 844, 944, 1044, 1094, 1144, 1194, 1244, 1344, 1394) via the first output device (e.g., 710), the computer system (e.g., 700) displays, via the display generation component, the prompt (e.g., 734, 744, 748, 766, 796, 844, 944, 1044, 1094, 1144, 1194, 1244, 1344, 1394). In some embodiments, as a part of outputting the prompt via the first output device, the computer system plays, via one or more speakers, audio. In some embodiments, as a part of outputting the prompt via the first output device, the computer system vibrates. Displaying, via the computer system, the prompt indicating that one or more interactions with the external accessory device can be used to unlock the computer system provides the user with feedback about the current state of the authentication process at the computer system and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, causing the output of the prompt (e.g., 734, 744, 748, 766, 796, 844, 944, 1044, 1094, 1144, 1194, 1244, 1344, 1394) (e.g., an audio, haptic, and/or visual prompt) includes transmitting (e.g., sending) (e.g., indirectly transmitting (e.g., via one or more servers), directly transmitting (e.g., from the computer system directly to the external accessory device (e.g., without the use of an intermediate computer system)) one or more instructions that cause the external accessory device (e.g., 790) to output (e.g., via a display; via a haptic output device; via an audio output device) the prompt. In some embodiments, as a part of causing the output of the prompt that indicates that one or more interactions with the external accessory device (e.g., 790) can be used to unlock the computer system, the computer system (e.g., 700) concurrently displays, via the display generation component, a first prompt (e.g., 734, 744, 748, 766, 844, 944, 1044, 1144, 1244, 1344) that corresponds to the prompt and transmits one or more instructions that cause the external accessory device to display a second prompt (e.g., 796, 1094, 1194, 1394) that corresponds to the prompt. In some embodiments, the first prompt (e.g., 734, 744, 748, 766, 844, 944, 1044, 1144, 1244, 1344) is different (e.g., has a different appearance (e.g., size, shape, color), has different words/graphical indicators, has a different number of words/graphical indicators) from the second prompt (e.g., 796, 1094, 1194, 1394). In some embodiments, the first prompt is the same as the second prompt. Displaying, via the external accessory device, the prompt indicating that one or more interactions with the external accessory device can be used to unlock the computer system provides the user with feedback about the current state of the authentication process at the external accessory device and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/ interacting with the computer system) which, additionally, reduces power usage and improves battery life of the system by enabling the user to use the computer system more quickly and efficiently.

In some embodiments, the computer system (e.g., 700) is not a wearable device (e.g., the computer system is a phone, tablet, laptop, desktop) (e.g., the computer system is not a device that is designed (e.g., manufactured to be without the use of a third-party attachment mechanism) to be (or can be) worn as an accessory, or embedded in clothing).

In some embodiments, the external accessory device (e.g., 790) is a wearable device (e.g., a watch, headphones) (e.g., the computer system is a device that is designed (e.g., manufactured to be without the use of a third-party attachment mechanism) to be (or can be) worn as an accessory, or embedded in clothing).

In some embodiments, the enrolled biometric feature includes data corresponding to a face (e.g., 760*a*, 760*b*, 760*c*) (e.g., a portion of a face of a user (e.g., a user with a profile that has been enrolled (e.g., set up) on the computer system)) or a fingerprint (e.g., portion of a finger of a user, a user with a profile that has been enrolled (e.g., set up) on the computer system). In some embodiments, the first set of biometric identification criteria and the second set of biometric identification criteria are sets of face identification criteria (e.g., biometric criteria based on the detected face of a user (e.g., matching (and/or authenticating using) data corresponding to the detected face of a user and data corresponding to an enrolled face a user)). In some embodiments, the first set of biometric identification criteria and the second set of biometric identification criteria are sets of fingerprint identification criteria (e.g., biometric criteria based on the detected face of a user (e.g., matching (and/or authenticating using) data corresponding to the detected face of a user and data corresponding to an enrolled face a user)).

In some embodiments, the one or more interactions include a gesture (e.g., 750*g*, 750*r*) (e.g., a tap gesture) (and, in some embodiments, a non-tap gesture (e.g., a press-and-hold gesture, a cover gesture (e.g., a gesture that is detected to cover more than a threshold portion (e.g., 50-70%) of external accessory (e.g., 790) and/or the display generation component of the external accessory device) on a touch-sensitive surface of the external accessory device (e.g., on a display generation component of the external accessory device). Transitioning the computer system from the locked state to the unlocked state in accordance with a determination that one or more interactions that include a gesture on the external accessory device have been detected provides the user with more control over the computer system by allowing a user to authenticate using a particular action. Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include a gesture on the external accessory device have been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, the one or more interactions include actuation (e.g., 950*d*) of (e.g., via a pressing input/gesture) a hardware input element (e.g., 792) (e.g., a physical button, a knob, a slider) (e.g., crown of watch, one or more physical buttons on the side, back, and/or front of the external accessory device) that is located on the external accessory device (e.g., 790). In some embodiments, the one or more interactions include a rotational input directed to a hardware input element (e.g., as described above in relation to FIGS. 9A-9D). Transitioning the computer system from the locked state to the unlocked state in accordance with a determination that one or more interactions that include a pressure gesture directed to a hardware input element that is located on the external accessory device have been detected provides the user with more control over the computer system by allowing a user to authenticate using a particular action. Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include a pressure gesture directed to a hardware input element that is located on the external accessory device have been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, the one or more interactions include a compressing gesture (e.g., 1250*d*) (e.g., a squeezing gesture, a force-based gesture, or activation of a physical button) (e.g., a gesture that is detected to be above a threshold level of force) on (e.g., around a portion of, on a surface of) the external accessory device (e.g., 790) (e.g., squeezing or pressing a portion of a set of headphones, ear buds, such as a pattern of squeezing a stem of an earbud or pressing a button of a pair of headphones (e.g., a single squeeze/press, a long squeeze/press, multiple squeezes and/or presses, any combination thereof, etc.). Transitioning the computer system from the locked state to the unlocked state in accordance with a determination that one or more interactions that include a force gesture on the external accessory device has been detected provides the user with more control over the computer system by allowing a user to authenticate using a particular action. Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include a force gesture on the external accessory device has been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, the one or more interactions include the computer system and the external accessory device transmitting data (e.g., connecting, communicating) via a near-field communication protocol (e.g., as described above in relation to FIGS. 13A-13F). Transitioning the computer system from the locked state to the unlocked state in accordance with a determination that one or more interactions that include the computer system and the external accessory device transmitting data via a near-field communication protocol has been detected provides the user with more control over the computer system by allowing a user to authenticate using a particular action. Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include the computer system and the external accessory device transmitting data via a near-field communication protocol has been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, the one or more interactions include a first interaction (e.g., 750q, 1350c) that is detected by the one or more input devices (e.g., 702) of the computer system (e.g., 700) (e.g., a gesture (e.g., double press gesture, rotating gesture) directed to (e.g., on) a hardware input element (e.g., a physical button, a knob, a slider), a gesture (e.g., a tap gesture) (and, in some embodiments, a non-tap gesture (e.g., a swipe gesture, a press-and-hold gesture) directed to the display generation component of the computer system) (e.g., an authorization gesture) and a second interaction (e.g., 750r) detected at the external accessory device (and, in some embodiments, the second interaction is not detected at or on the computer system) (e.g., a force gesture on the external accessory device, a pressing gesture directed to a hardware input element of the external accessory device, near-field communication between the computer system and the external accessory device). In some embodiments, in accordance with a determination that the second interaction is detected before (or after) the first interaction is detected (and/or the second interaction is detected without the first interaction being detected), the computer system is not transitioned from being in the locked state to the unlocked state. In some embodiments, in accordance with a determination that the first interaction is detected before (e.g., within a predetermined period of time before (e.g., 1-60 seconds) (or after) the second interaction is detected), the computer system is transitioned from the locked state to the unlocked state. In some embodiments, in accordance with a determination that the first interaction and the second interaction are concurrently detected, the computer system is transitioned from being in the locked state to the unlocked state. In some embodiments, in accordance with a determination that the first interaction and the second interaction are not concurrently detected, the computer system is not transitioned from being in the locked state to the unlocked state. Transitioning the computer system from the locked state to the unlocked state in accordance with a determination that one or more interactions that include a first interaction that includes a gesture on the computer system and the second interaction on the external accessory device have been detected provides the user with more control over the computer system by allowing a user to authenticate using a particular action. Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include a first interaction that includes a gesture on the computer system and the second interaction on the external accessory device have been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, the one or more interactions is an interaction that is detected when a determination is made that the computer system (e.g., 700) and the external accessory device (e.g., 790) have physically touched (e.g., as described above in relation FIGS. 11A-11D) (and/or are physically touching) (e.g., collided, have been tapped together, have been pushed together, etc.) (e.g., the computer system being tap physically by the external accessory device, or vice-versa). In some embodiments, the determination is made that the computer system and the external accessory device have physically touched based on accelerometer data (e.g., timed accelerometer data, accelerometer data that was detected within a threshold period of time (e.g., 10-60 seconds) after the request to unlock the computer system was received) and/or audio data detected by the computer system and/or the external accessory device (e.g., based on comparing accelerometer data and/or audio data detected by the computer system and the external accessory device, based on individually analyzing the accelerometer data and/or audio data detected by the computer system and the external accessory device). In some embodiments, the one or more interactions include voice input. Transitioning the computer system from the locked state to the unlocked state in accordance with a determination that one or more interactions that include an interaction that is detected when a determination is made that the computer system and the external accessory device have physically touched has been detected provides the user with more control over the computer system by allowing a user to authenticate using a particular action. Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include an interaction that is detected when a determination is made that the computer system and the external accessory device have physically touched have been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, the one or more interactions include a motion gesture (e.g., 1050d) (e.g., one or more wrist raise gestures (e.g., lifting gestures), one or more wrist rotation gestures (e.g., 1050d) (and, in some embodiments, detected via a gyroscope and/or accelerometer) (e.g., a sequence of motions gestures (e.g., lift wrist and rotate wrist left/right) that is performed with the external accessory device (e.g., 790). In some embodiments, the one or more interactions include a particular sequence of interactions. In some embodiments, the prompt indicates the sequence of gestures that are required to be performed. Transitioning the computer system from the locked state to the unlocked state in accordance with a determination that one or more interactions that include a motion gesture that is performed with the external accessory device have been detected provides the user with more control over the computer system by allowing a user to authenticate using a particular action.

Providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that one or more interactions that include a motion gesture that is performed with the external accessory device has been detected improves security by requiring a particular interaction with the external accessory device to be completed because the computer system is unlocked. Providing improved security reduces the unauthorized performance of secure operations which, additionally, reduces power usage and improves battery life of the computer system by enabling the user to use the computer system more securely and efficiently.

In some embodiments, in accordance with a determination that the second set of biometric identification criteria and the first set of biometric identification criteria are not satisfied, the computer system (e.g., 700) maintains the computer system in the locked state without causing the output of the prompt (e.g., as described above in relation to FIGS. 7T-7V). Maintaining the computer system in the locked state without causing the output of the prompt in accordance with a determination that the second set of biometric identification criteria and the first set of biometric identification criteria are not satisfied allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently.

In some embodiments, in accordance with the determination that the one or more interactions with the external accessory device (e.g., 790) have been detected, the computer system (e.g., 700) transitioning from the locked state to the unlocked state includes: in accordance with a determination that the detected one or more interactions with the external accessory device (e.g., 790) satisfy a set of respective criteria (e.g., the one or more match an enrolled profile of the interaction (e.g., a voice interaction that matches an enrolled voice above a first range (e.g., 95%) satisfies the set of respective criteria, a voice interaction that matches an enrolled voice interface between a second range (e.g., 70%-90%) does not satisfy the set of respective criteria (e.g., due to background noise), a connection via near-filed communication that is able to remain connected for at least a first predetermined threshold period of time (e.g., 5 seconds) satisfies the set of respective criteria, connection via near-filed communication that is able to remain connected for a second predetermined threshold period of time (e.g., 3 seconds) but not a first predetermined threshold period of time (e.g., 5 seconds) satisfies the set of respective criteria), the computer system provides (e.g., configuring the computer system to provide) limited access privileges to a user of the computer system (e.g., give user limited access (e.g., read-only access, no access to perform administrative operations and/or destructive operations (e.g., create operates, write operations, update operations, delete operations), no access to sensitive data and/or applications (e.g., and/or to certain data (e.g., passwords) and/or applications (e.g., password applications, payment applications, download application), and/or access to only a predetermined set of applications and/or operations, such as listening to music, web browsing, etc.) (e.g., in response to a request to access/perform one or more operations) (e.g., as described above in relation to FIGS. 7I-7O).

In some embodiments, in accordance with the determination that the one or more interactions with the external accessory device have been detected and in accordance with a determination that the detected one or more interactions with the external accessory device do not satisfy the set of respective criteria, the computer system provides more than the limited access privileges (e.g., more privileges than the limited privileges) (and, in some embodiments, full access privileges) to a user of the computer system (e.g., gives a user more than limited access (e.g., ability to perform one or more administrative operations and/or destructive operations, one or more access to sensitive data and/or applications, ability to access more than the predetermined set of applications) (e.g., as described above in relation to FIGS. 7I-7O). In some embodiments, in accordance with a determination that the second set of biometric identification criteria and the first set of biometric identification criteria are not satisfied, the computer system does not provide the limited access privileges to the user of the computer system (and/or provides no access privileges to a user of the computer system) and does not provide more than the limited access privileges to the user of the computer system (e.g., as described above in relation to FIGS. 7I-7O). In some embodiments, in accordance with a determination that a first set of biometric identification criteria is satisfied and as a part of transitioning the computer system from the locked state to an unlocked state, the computer system provides more than the limited access privileges (and, in some embodiments, full access privileges) to a user of the computer system (e.g., and in some embodiments, more access privileges are provided in accordance with a determination that a first set of biometric identification criteria is satisfied than the number access privileges provides in accordance with the determination that the one or more interactions with the external accessory device have been detected and in accordance with a determination that the detected one or more interactions with the external accessory device do not satisfy the set of respective criteria (e.g., as described above in relation to FIGS. 7I-7O). Providing limited access privileges to a user of the computer system in accordance with a determination that the detected one or more interactions with the external accessory device satisfy a set of respective criteria provides a way for the user to perform some activities without ways for the user to perform other activities. Providing improved security reduces the unauthorized performance of secure operations which, additionally, reduces power usage and improves battery life of the computer system by enabling the user to use the computer system more securely and efficiently.

Note that details of the processes described above with respect to method 1400 (e.g., FIGS. 14A-14B) are also applicable in an analogous manner to the methods described below. For example, method 1500 optionally includes one or more of the characteristics of the various methods described above with reference to method 1400. For example, method 1400 can be combined with method 1500, such that when partial biometric authentication is successful and full biometric authentication is unsuccessful at method 1400, one or more steps of method 1500 can be used as an alternative authentication method to perform the secure operation (e.g., unlock the computer system). For brevity, these details are not repeated below.

FIGS. 15A-15B are a flow diagram illustrating a method for providing authentication at a computer system in accordance with some embodiments. Method 1500 is performed at a computer system (e.g., 100, 300, 500, 700) (e.g., a smartphone, a tablet) that is in communication with (e.g., wirelessly or by wire; integrates or includes) one or more biometric sensors (e.g., 704) (e.g., a fingerprint sensor, a facial recognition sensor (e.g., one or more depth sensors; one or more cameras (e.g., dual cameras, triple camera, quad cameras, etc.)) on the same side or different sides of the computer system (e.g., a front camera, a back camera)), an iris scanner) (e.g., is hidden or concealed) (and, in some embodiments, an external accessory device (e.g., an external peripheral device) (e.g., a computer system (e.g., a wearable device ((e.g., a smartwatch, headphones, glasses)), a device that is external to (e.g., not physically linked to or connected to) the computer system, a device that is in communication with the computer system via a communication channel, a device with a display generation component and one or more input devices) and one or more input devices (e.g., 702, 710) (e.g., a touch-sensitive surface, an accelerometer, a hardware button) that include a voice input device (e.g., a microphone). Some operations in method 1500 are, optionally, combined, the orders of some operations are, optionally, changed, and some operations are, optionally, omitted.

As described below, method 1500 provides an intuitive way for providing authentication at a computer system. The method reduces the cognitive burden on a user for providing authentication at a computer system, thereby creating a more efficient human-machine interface. For battery-operated computing devices, enabling a user to provide authentication at a computer system faster and more efficiently conserves power and increases the time between battery charges.

The computer system receives (1502), via the one or more input devices (e.g., 702, 710), a request (e.g., 750b, 750f, 750u, 850b, 950b, 1050b, 1150b, 1250b, 1350b) to unlock the computer system while the computer system is in a locked state (e.g., as described above in relation to method 1400 of CSI (e.g., step 1402)).

In response to (1504) receiving the request (e.g., 750b, 750f, 750u, 850b, 950b, 1050b, 1150b, 1250b, 1350b) to unlock the computer system: in accordance with a determination that a first set of biometric identification criteria is satisfied (e.g., a set of criteria that is satisfied when the first portion of biometric feature is available to be captured and the biometric data (e.g., that includes data corresponding to the first portion of the biometric feature) satisfies a set of biometric authentication criteria (e.g., a set of criteria that includes a criterion that is satisfied when the biometric data that includes a first portion of biometric feature and a second portion of biometric feature sufficiently matches an authorized biometric profile)), wherein the first set of biometric identification criteria is satisfied when a detected biometric feature detected in conjunction with (e.g., in response to, detected with a predetermined time (e.g., 1-10 seconds) before/after the request is received) the request to unlock the computer system is consistent with (e.g., is determined to match and/or is determined to sufficiently match (e.g., within a confidence threshold level of 90-100%)) an enrolled biometric feature, the computer system (e.g., 700) transitions (1506) the computer system from the locked state (e.g., as indicated by 712a) to an unlocked state (e.g., as indicated by 712b) (e.g., without outputting a prompt that indicates that one or more interactions with the external accessory device can be used to unlock the computer system) (e.g., as described above in relation to FIGS. 7E-7H, FIGS. 8A-8D, FIGS. 9A-9D, FIGS. 10A-10D, FIGS. 11A-11D, FIGS. 12A-12D, FIGS. 13A-13F).

In response to (1504) receiving the request (e.g., 750b, 750f, 750u, 850b, 950b, 1050b, 1150b, 1250b, 1350b) to unlock the computer system: in accordance with a determination that a second set of biometric identification criteria is satisfied (e.g., a set of criteria that is satisfied when a first portion of a biometric feature is not available to be captured and the biometric data (e.g., that does not include data corresponding to the first portion of the biometric feature) satisfies a set of biometric authentication criteria (e.g., a set of criteria that includes a criterion that is satisfied when the biometric data that includes data corresponding to a second portion of biometric feature but does not include data corresponding to the first portion of the biometric data that matches (e.g., sufficiently matches (e.g., within a certain confidence threshold (e.g., above 90%) an authorized biometric profile)) without satisfying the first set of biometric identification criteria, wherein the second set of biometric identification criteria is satisfied when the detected biometric feature detected in conjunction with (e.g., in response to, detected with a predetermined time (e.g., 1-10 seconds) before/after the request is received) the request to unlock the computer system is partially consistent (e.g., at least a portion of the detected biometric feature is determined to match and/or is determined to sufficiently match (e.g., within a confidence threshold level of 90-100%)) with an enrolled biometric feature, the computer system causes (1508) an output (e.g., the computer system and/or another computer system to output) of a prompt (e.g., 844) (e.g., a visual, haptic, audio prompt) that indicates that voice input is required (and, in some embodiments, are required) to unlock the computer system (e.g., to perform the secure operation) (e.g., as described above in relation to FIGS. 7E-7H, FIGS. 8A-8D, FIGS. 9A-9D, FIGS. 10A-10D, FIGS. 11A-11D, FIGS. 12A-12D, FIGS. 13A-13F). In some embodiments, in response to receiving the request to unlock the computer system and in accordance with a determination that a set of partial biometric identification criteria are satisfied, the computer system is maintained in the locked state.

After causing the output of the prompt (e.g., 844), the computer system (e.g., 700) receives (1510), via the voice input device, an indication that voice input has been detected. In some embodiments, as a part of receiving an indication that voice input has been detected, the computer detects voice input via one or more microphones that are in communication with and/or included in the computer system. In some embodiments, as a part of receiving the indication that voice input is detected, the computer system receives an indication of whether the detected voice input satisfies the voice profile for the user profile associated with the computer system (e.g., as described above in relation to FIGS. 8A-8D).

In response to (1512) receiving the indication that voice input (e.g., 850d) has been detected (e.g., detected within a predetermined time) (and while the computer is in the locked state and the respective criteria continue to be met): in accordance with a determination that the detected voice input (e.g., 850d) matches an authorized voice profile (e.g., matches a voice profile for a user associated with the computer system (e.g., 700) (e.g., a voice profile that is corresponds and/or belongs to with a user profile that is) associated with (e.g., associated with a user profile that is stored on, corresponding to, a user profile that is configured to control the computer system)), the computer system (e.g., 700) transitions (1514) the computer system from the locked state (e.g., as indicated by 712*a*) to the unlocked state (e.g., as indicated by 712*b*) (e.g., performing the secure operation) (e.g., as described above in relation to FIGS. 8A-8D); and in accordance with a determination that the detected voice input (e.g., 850*d*) does not match the authorized voice profile, the computer system maintains (1416) the computer system in the locked state (e.g., forgoing performing the secure operation) (e.g., as described above in relation to FIGS. 8A-8D). Choosing whether or not to transition the computer system from the locked state to the unlocked state based on whether one or more interactions with the external accessory device have been detected (e.g., after a determination is made that a partial set of biometric identification criteria is satisfied) allows the computer system to limit unauthorized performance of unlocking the computer system while providing an additional way to authorize the unlocking of the computer system and improves security because the user is more likely to keep the security features enabled if they are less disruptive to use of the computer system. Providing improved security reduces the unauthorized performance of secure operations which, additionally, reduces power usage and improves battery life of the computer system by enabling the user to use the computer system more securely and efficiently. Causing an output of a prompt indicating that one or more interactions with the external accessory device can be used to unlock the computer system provides the user with feedback about the current state of the authentication process and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state in accordance with a determination that the physical biometric feature of the user satisfies the first set of biometric authentication criteria allows the computer system to limit unauthorized performance of unlocking the computer system while providing an additional way to authorize the unlocking of the computer system and improves security because the user is more likely to keep the security features enabled if they are less disruptive to use of the computer system. Providing improved security reduces the unauthorized performance of secure operations which, additionally, reduces power usage and improves battery life of the computer system by enabling the user to use the computer system more securely and efficiently.

In some embodiments, the one or more biometric sensors include one or more microphones and the voice input (e.g., 850*d*) is received when the voice input is detected via the one or more microphones (e.g., as described above in relation to FIGS. 8A-8D).

In some embodiments, in response to (1504) receiving the request (e.g., 750*b*, 750*f*, 750*u*, 850*b*, 950*b*, 1050*b*, 1150*b*, 1250*b*, 1350*b*) to unlock the computer system: in accordance with a determination that the second set of biometric identification criteria and the first set of biometric identification criteria are not satisfied, the computer system maintains the computer system in the locked state without causing the output of the prompt (e.g., as described above in relation to method 1400 and/or FIGS. 7T-7V and FIGS. 8A-8D). Maintaining the computer system in the locked state without causing the output of the prompt in accordance with a determination that the set of partial biometric identification criteria and the first set of biometric identification criteria are not satisfied allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently.

In some embodiments, the prompt (e.g., 844) includes an instruction to recite a predefined set of words (and/or other utterances) (e.g., as described above in relation to FIGS. 8A-8D). In some embodiments, the predefined set of words can be determined by the computer system. In some embodiments, the predefined set of words are the same predefined set of words. In some embodiments, the predefined set of words changes based one or more criteria (e.g., time of day, environmental conditions, randomness, etc.). Having a prompt that includes an instruction to recite the predefined set of words provides the user with feedback about the current state of the authentication process at the computer system and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, the second set of biometric identification criteria includes a criterion that is satisfied when a gaze of a user directed toward a predetermined portion of the computer system (e.g., the display, a particular portion (e.g., an upper portion) of the user interface, etc.) has been detected (e.g., as described above in relation to method 1400 and/or FIGS. 7T-7V and FIGS. 8A-8D) (e.g., via the one or more biometric sensors (e.g., one or more cameras)) (e.g., for a predetermined period of time (e.g., 1-3 seconds)) (e.g., after the request to unlock the computer system was received) (e.g., a gaze of a user looking in the direction of the computer system) (e.g., using one or more techniques as discussed above in relation to method 1400 and/or FIGS. 7E-7G). Causing the output of the prompt indicating that one or more interactions with the external accessory device can be used to unlock the computer system when the gaze of a user has been detected for a predetermined time automatically limits the display of the prompt, so relevant information is surface when a determination is made that the user is intended to complete biometric identification, which provides improved security. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments in accordance with a determination that the detected voice input (e.g., 850) does not match the authorized voice profile (e.g., using one or more techniques as described above in relation to FIGS. 8A-8D), the computer system provides limited access privileges to a second user (e.g., the first user) of the computer system (e.g., using one or more techniques as described above in relation to method 1400 and/or FIGS. 7I-7O). In some embodiments, in accordance with a determination that the detected voice input does match an authorized voice profile, the computer system provides more than the limited access privileges (e.g., more privileges than the limited privileges) (and, in some embodiments, full access privileges) to a user of the computer system (e.g., gives a user more than limited access (e.g., ability to perform one or more administrative operations and/or destructive operations, one or more access to sensitive data and/or applications, ability to access more than the predetermined set of applications) (e.g., using one or more techniques as described above in relation to method 1400 and/or FIGS. 7I-7O). In some embodiments, in accordance with a determination that the partial set of biometric identification criteria and the full set of biometric identification criteria are not satisfied, the computer system does not provide the limited access privileges to the user of the computer system (and/or provides no access privileges to a user of computer system) and does not provide more than the limited access privileges to the user of the computer system (e.g., using one or more techniques as described above in relation to method 1400 and/or FIGS. 7I-7O). In some embodiments, in accordance with a determination that a full set of biometric identification criteria is satisfied and as a part of transitioning the computer system from the locked state to an unlocked state, the computer system provides more than the limited access privileges (and, in some embodiments, full access privileges) to a user of the computer system (e.g., and in some embodiments, one or more access privileges are provided in accordance with a determination that a full set of biometric identification criteria is satisfied than the number access privileges provides in accordance with a determination that the detected voice input does not match an authorized voice profile) (e.g., using one or more techniques as described above in relation to method 1400 and/or FIGS. 7I-7O). Providing limited access privileges to a user of the computer system in accordance with a determination that the detected voice input does not match an authorized voice profile provides a way for the user to perform some activities without ways for the user to perform other activities. Providing improved security reduces the unauthorized performance of secure operations which, additionally, reduces power usage and improves battery life of the computer system by enabling the user to use the computer system more securely and efficiently.

Note that details of the processes described above with respect to method 1500 (e.g., FIGS. 15A-15B) are also applicable in an analogous manner to the methods described above. For example, method 1400 optionally includes one or more of the characteristics of the various methods described above with reference to method 1500. For example, method 1500 can be combined with method 1400, such that when partial biometric authentication is successful and full biometric authentication is unsuccessful at method 1500, one or more steps of method 1400 can be used as an alternative authentication method to perform the secure operation (e.g., unlock the computer system). For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

One aspect of the present technology is the gathering and use of data available from various sources to improve the ability of the computer system to biometrically authenticate the user in order to authorize the performance of secure operations that are initiated at the computer system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the ability of the computer system to biometrically authenticate the user. Accordingly, use of such personal information data enables users to have calculated control over the biometric data that the user has shared with the computer system. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of biometric authentication, the present technology can be configured to allow users to select to "opt in" or "opt out" of participation in the collection of personal information data during registration for services or anytime thereafter. In another example, users can select not to provide biometric data for use in biometric authentication. In yet another example, users can select to limit the type of biometric data that is provided for biometric authentication and/or limit and/or entirely limit the computer system's use of biometric authentication using the biometric data from the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be facilitated to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

What is claimed is:

1. A computer system configured to communicate with one or more biometric sensors, one or more input devices, and an external accessory device, the computer system comprising:
   one or more processors; and
   memory storing one or more programs configured to be executed by the one or more processors, the one or more programs including instructions for:
      receiving, via the one or more input devices, a request to unlock the computer system while the computer system is in a locked state;
      in response to receiving the request to unlock the computer system:
         in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and
         in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with the enrolled biometric feature, causing an output of a prompt that indicates that one or more interactions with the external accessory device can be used to unlock the computer system; and
      after causing the output of the prompt:
         in accordance with a determination that the one or more interactions with the external accessory device have been detected, transitioning the computer system from the locked state to the unlocked state; and
         in accordance with a determination that the one or more interactions with the external accessory device have not been detected, maintaining the computer system in the locked state.

2. The computer system of claim 1, the one or more programs further including instructions for:
   after transitioning the computer system from the locked state to the unlocked state, receiving, via the one or more input devices, a request to perform a secure operation;
   in response to receiving the request to perform the secure operation:
      in accordance with a determination that the first set of biometric identification criteria is satisfied, performing the secure operation; and
      in accordance with a determination that the second set of biometric identification criteria are satisfied without satisfying the first set of biometric identification criteria, causing a second output of a second prompt that indicates that a second one or more interactions with the external accessory device can be used to perform the secure operation; and
   after causing the second output of the second prompt:
      in accordance with a determination that the second one or more interactions with the external accessory device have been detected, performing the secure operation; and
      in accordance with a determination that the second one or more interactions with the external accessory device have not been detected, forgoing performing the secure operation.

3. The computer system of claim 1, wherein the second set of biometric identification criteria includes a criterion that is satisfied when a gaze of a user directed toward a predetermined portion of the computer system has been detected.

4. The computer system of claim 1, wherein:
   the computer system is in communication with a first output device; and
   causing the output of the prompt includes outputting the prompt via the first output device.

5. The computer system of claim 1, wherein causing the output of the prompt includes transmitting one or more instructions that cause the external accessory device to output the prompt.

6. The computer system of claim 1, wherein the computer system is not a wearable device.

7. The computer system of claim 1, wherein the external accessory device is a wearable device.

8. The computer system of claim 1, wherein the enrolled biometric feature includes data corresponding to a face or a fingerprint.

9. The computer system of claim 1, wherein the one or more interactions include a gesture on a touch-sensitive surface of the external accessory device.

10. The computer system of claim 1, wherein the one or more interactions include actuation of a hardware input element that is located on the external accessory device.

11. The computer system of claim 1, wherein the one or more interactions include a compressing gesture on the external accessory device.

12. The computer system of claim 1, wherein the one or more interactions include the computer system and the external accessory device transmitting data via a near-field communication protocol.

13. The computer system of claim 1, wherein the one or more interactions include a first interaction that is detected by the one or more input devices of the computer system and a second interaction detected at the external accessory device.

14. The computer system of claim 1, wherein the one or more interactions is an interaction that is detected when a determination is made that the computer system and the external accessory device have physically touched.

15. The computer system of claim 1, wherein the one or more interactions include a motion gesture that is performed with the external accessory device.

16. The computer system of claim 1, the one or more programs further including instructions for:
in accordance with a determination that the second set of biometric identification criteria and the first set of biometric identification criteria are not satisfied, maintaining the computer system in the locked state without causing the output of the prompt.

17. The computer system of claim 1, wherein, in accordance with the determination that the one or more interactions with the external accessory device have been detected, transitioning the computer system from the locked state to the unlocked state includes:
in accordance with a determination that the one or more interactions with the external accessory device satisfy a set of respective criteria, providing limited access privileges to a user of the computer system.

18. A non-transitory computer-readable storage medium storing one or more programs configured to be executed by one or more processors of a computer system that is in communication with one or more biometric sensors, one or more input devices, and an external accessory device, the one or more programs including instructions for:
receiving, via the one or more input devices, a request to unlock the computer system while the computer system is in a locked state;
in response to receiving the request to unlock the computer system:
in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and
in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with the enrolled biometric feature, causing an output of a prompt that indicates that one or more interactions with the external accessory device can be used to unlock the computer system; and
after causing the output of the prompt:
in accordance with a determination that the one or more interactions with the external accessory device have been detected, transitioning the computer system from the locked state to the unlocked state; and
in accordance with a determination that the one or more interactions with the external accessory device have not been detected, maintaining the computer system in the locked state.

19. A method, comprising: at a computer system that is in communication with one or more biometric sensors, one or more input devices, and an external accessory device:
receiving, via the one or more input devices, a request to unlock the computer system while the computer system is in a locked state;
in response to receiving the request to unlock the computer system:
in accordance with a determination that a first set of biometric identification criteria is satisfied, wherein the first set of biometric identification criteria is satisfied when a detected biometric feature detected in conjunction with the request to unlock the computer system is consistent with an enrolled biometric feature, transitioning the computer system from the locked state to an unlocked state; and
in accordance with a determination that a second set of biometric identification criteria is satisfied without satisfying the first set of biometric identification criteria, wherein the second set of biometric identification criteria is satisfied when the detected biometric feature detected in conjunction with the request to unlock the computer system is partially consistent with the enrolled biometric feature, causing an output of a prompt that indicates that one or more interactions with the external accessory device can be used to unlock the computer system; and
after causing the output of the prompt:
in accordance with a determination that the one or more interactions with the external accessory device have been detected, transitioning the computer system from the locked state to the unlocked state; and
in accordance with a determination that the one or more interactions with the external accessory device have not been detected, maintaining the computer system in the locked state.

20. The non-transitory computer-readable storage medium of claim 18, the one or more programs further including instructions for:
after transitioning the computer system from the locked state to the unlocked state, receiving, via the one or more input devices, a request to perform a secure operation;
in response to receiving the request to perform the secure operation:

in accordance with a determination that the first set of biometric identification criteria is satisfied, performing the secure operation; and in accordance with a determination that the second set of biometric identification criteria are satisfied without satisfying the first set of biometric identification criteria, causing a second output of a second prompt that indicates that a second one or more interactions with the external accessory device can be used to perform the secure operation; and after causing the second output of the second prompt:
in accordance with a determination that the second one or more interactions with the external accessory device have been detected, performing the secure operation; and in accordance with a determination that the second one or more interactions with the external accessory device have not been detected, forgoing performing the secure operation.

21. The non-transitory computer-readable storage medium of claim 18, wherein the second set of biometric identification criteria includes a criterion that is satisfied when a gaze of a user directed toward a predetermined portion of the computer system has been detected.

22. The non-transitory computer-readable storage medium of claim 18, wherein:
the computer system is in communication with a first output device; and
causing the output of the prompt includes outputting the prompt via the first output device.

23. The non-transitory computer-readable storage medium of claim 18, wherein causing the output of the prompt includes transmitting one or more instructions that cause the external accessory device to output the prompt.

24. The non-transitory computer-readable storage medium of claim 18, wherein the computer system is not a wearable device.

25. The non-transitory computer-readable storage medium of claim 18, wherein the external accessory device is a wearable device.

26. The non-transitory computer-readable storage medium of claim 18, wherein the enrolled biometric feature includes data corresponding to a face or a fingerprint.

27. The non-transitory computer-readable storage medium of claim 18, wherein the one or more interactions include a gesture on a touch-sensitive surface of the external accessory device.

28. The non-transitory computer-readable storage medium of claim 18, wherein the one or more interactions include actuation of a hardware input element that is located on the external accessory device.

29. The non-transitory computer-readable storage medium of claim 18, wherein the one or more interactions include a compressing gesture on the external accessory device.

30. The non-transitory computer-readable storage medium of claim 18, wherein the one or more interactions include the computer system and the external accessory device transmitting data via a near-field communication protocol.

31. The non-transitory computer-readable storage medium of claim 18, wherein the one or more interactions include a first interaction that is detected by the one or more input devices of the computer system and a second interaction detected at the external accessory device.

32. The non-transitory computer-readable storage medium of claim 18, wherein the one or more interactions is an interaction that is detected when a determination is made that the computer system and the external accessory device have physically touched.

33. The non-transitory computer-readable storage medium of claim 18, wherein the one or more interactions include a motion gesture that is performed with the external accessory device.

34. The non-transitory computer-readable storage medium of claim 18, the one or more programs further including instructions for:
in accordance with a determination that the second set of biometric identification criteria and the first set of biometric identification criteria are not satisfied, maintaining the computer system in the locked state without causing the output of the prompt.

35. The non-transitory computer-readable storage medium of claim 18, wherein, in accordance with the determination that the one or more interactions with the external accessory device have been detected, transitioning the computer system from the locked state to the unlocked state includes:
in accordance with a determination that the one or more interactions with the external accessory device satisfy a set of respective criteria, providing limited access privileges to a user of the computer system.

36. The method of claim 19, further comprising:
after transitioning the computer system from the locked state to the unlocked state, receiving, via the one or more input devices, a request to perform a secure operation;
in response to receiving the request to perform the secure operation:
in accordance with a determination that the first set of biometric identification criteria is satisfied, performing the secure operation; and
in accordance with a determination that the second set of biometric identification criteria are satisfied without satisfying the first set of biometric identification criteria, causing a second output of a second prompt that indicates that a second one or more interactions with the external accessory device can be used to perform the secure operation; and
after causing the second output of the second prompt:
in accordance with a determination that the second one or more interactions with the external accessory device have been detected, performing the secure operation; and
in accordance with a determination that the second one or more interactions with the external accessory device have not been detected, forgoing performing the secure operation.

37. The method of claim 19, wherein the second set of biometric identification criteria includes a criterion that is satisfied when a gaze of a user directed toward a predetermined portion of the computer system has been detected.

38. The method of claim 19, wherein:
the computer system is in communication with a first output device; and
causing the output of the prompt includes outputting the prompt via the first output device.

39. The method of claim 19, wherein causing the output of the prompt includes transmitting one or more instructions that cause the external accessory device to output the prompt.

40. The method of claim 19, wherein the computer system is not a wearable device.

41. The method of claim 19, wherein the external accessory device is a wearable device.

42. The method of claim 19, wherein the enrolled biometric feature includes data corresponding to a face or a fingerprint.

43. The method of claim 19, wherein the one or more interactions include a gesture on a touch-sensitive surface of the external accessory device.

44. The method of claim 19, wherein the one or more interactions include actuation of a hardware input element that is located on the external accessory device.

45. The method of claim 19, wherein the one or more interactions include a compressing gesture on the external accessory device.

46. The method of claim 19, wherein the one or more interactions include the computer system and the external accessory device transmitting data via a near-field communication protocol.

47. The method of claim 19, wherein the one or more interactions include a first interaction that is detected by the one or more input devices of the computer system and a second interaction detected at the external accessory device.

48. The method of claim 19, wherein the one or more interactions is an interaction that is detected when a determination is made that the computer system and the external accessory device have physically touched.

49. The method of claim 19, wherein the one or more interactions include a motion gesture that is performed with the external accessory device.

50. The method of claim 19, further comprising:
in accordance with a determination that the second set of biometric identification criteria and the first set of biometric identification criteria are not satisfied, maintaining the computer system in the locked state without causing the output of the prompt.

51. The method of claim 19, wherein, in accordance with the determination that the one or more interactions with the external accessory device have been detected, transitioning the computer system from the locked state to the unlocked state includes:
in accordance with a determination that the one or more interactions with the external accessory device satisfy a set of respective criteria, providing limited access privileges to a user of the computer system.

* * * * *